United States Patent
Hwang

(10) Patent No.: US 11,797,299 B2
(45) Date of Patent: Oct. 24, 2023

(54) 3-LEVEL REAL-TIME CONCURRENT PRODUCTION OPERATION WORKGROUP SYSTEMS FOR FINE-GRAINED PROACTIVE CLOSED LOOP PROBLEM SOLVING OPERATIONS

(71) Applicant: HT Research Inc., North Tustin, CA (US)

(72) Inventor: Ivan Chung-Shung Hwang, North Tustin, CA (US)

(73) Assignee: HT RESEARCH INC., North Tustin, CA (US)

( * ) Notice: Subject to any disclaimer, the term of this patent is extended or adjusted under 35 U.S.C. 154(b) by 157 days.

(21) Appl. No.: 17/372,771

(22) Filed: Jul. 12, 2021

(65) Prior Publication Data

US 2023/0026794 A1    Jan. 26, 2023

(51) Int. Cl.
    *G06F 9/22*      (2006.01)
    *G06F 16/23*      (2019.01)
    *G06F 40/40*      (2020.01)

(52) U.S. Cl.
    CPC .......... *G06F 9/223* (2013.01); *G06F 16/2379* (2019.01); *G06F 40/40* (2020.01)

(58) Field of Classification Search
CPC ........ G06F 9/3877; G06F 9/223; G06F 40/40; G06F 15/17393
See application file for complete search history.

(56) References Cited

U.S. PATENT DOCUMENTS

| | | | |
|---|---|---|---|
| 6,944,746 B2* | 9/2005 | So .......................... | G06F 9/3885 |
| | | | 375/E7.199 |
| 7,590,823 B1* | 9/2009 | Ansari ................ | G06F 9/30145 |
| | | | 712/34 |
| 9,164,772 B2* | 10/2015 | Dockser ................ | G06F 9/3855 |
| 10,454,814 B2 | 10/2019 | Brissette et al. | |
| 2006/0029097 A1 | 2/2006 | McGee et al. | |
| 2007/0233455 A1 | 10/2007 | Zimmer et al. | |
| 2008/0175239 A1 | 7/2008 | Sistanizadeh et al. | |
| 2014/0310810 A1 | 10/2014 | Brueckner et al. | |
| 2017/0034198 A1 | 2/2017 | Powers et al. | |
| 2018/0203773 A1 | 7/2018 | Kawada | |
| 2019/0187934 A1 | 6/2019 | Sicola et al. | |

* cited by examiner

*Primary Examiner* — Jacob Petranek
(74) *Attorney, Agent, or Firm* — K&L Gates LLP

(57) ABSTRACT

A method of utilizing 3-level wHCSs created in the first generation to accommodate 3-level conveyer-integrated workgroups in a production facility to make these workgroups work collaboratively as one Task crew-entity is disclosed. By installing the 3-level 3-link-typed TeamProcessors in a 3-level wHCS with Task feedback-control operation-oriented OSs, Task operation programs and Task-operation and management libraries, a 3-level Task operation workgroup-computing Entity-oriented system, can be established to support the Task crew-entity as a whole and provide fine-grained-proactive closed-loop-problem-solving (PS) operations for external users, collaborators and supervisors in a real-time concurrent and secure manner, abiding by the self-improving solution-domain PS-principle.

16 Claims, 39 Drawing Sheets

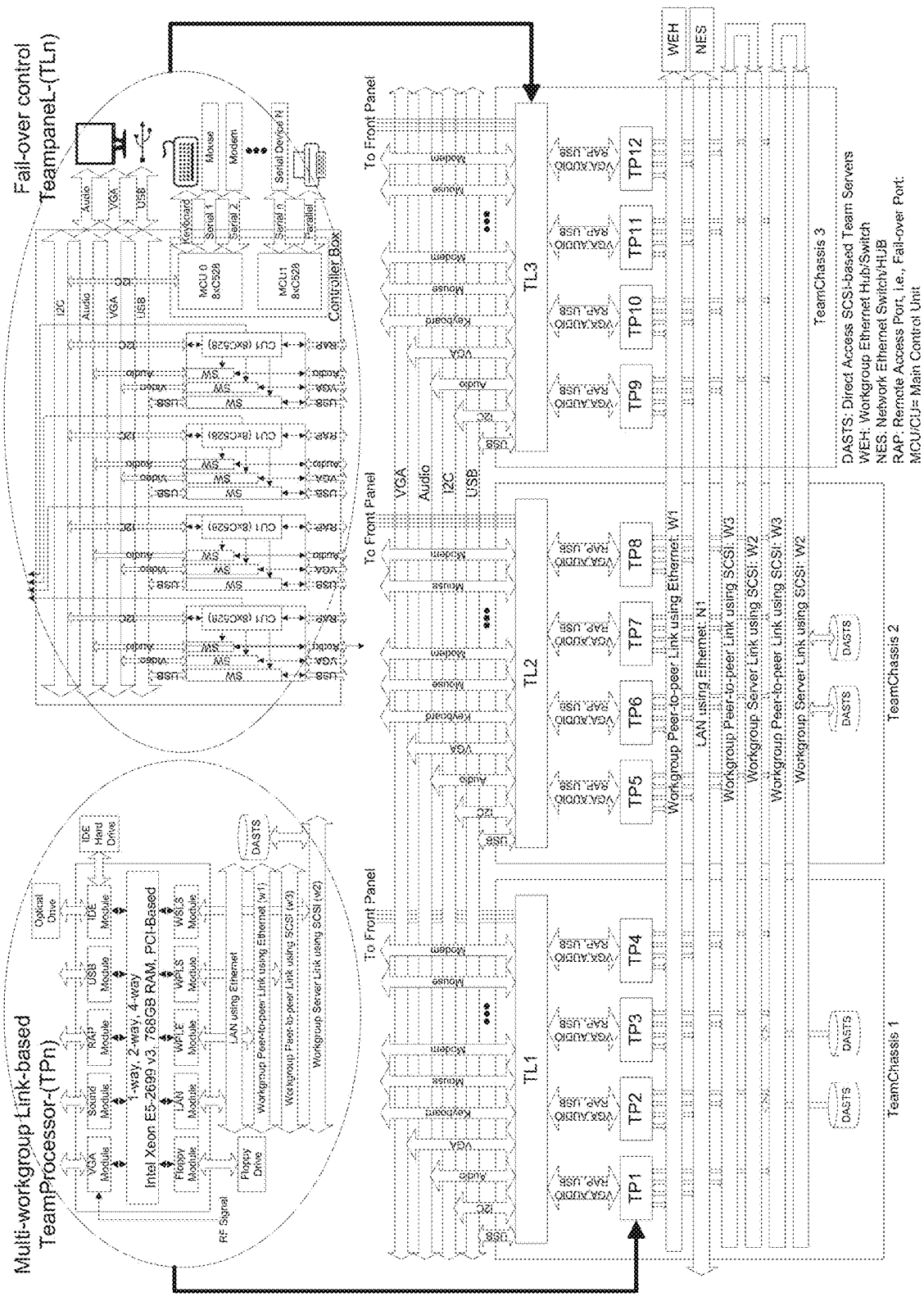

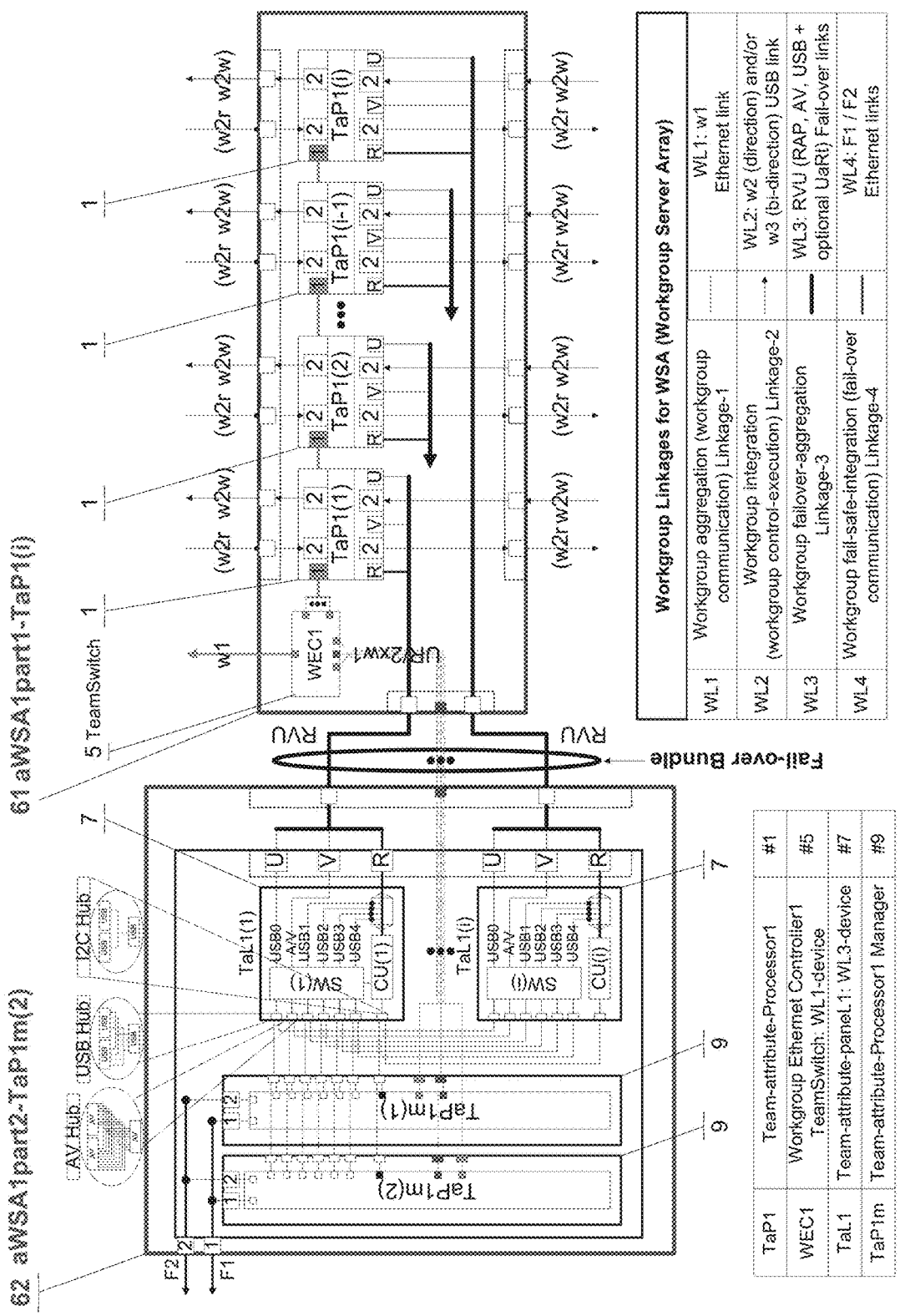
FIG-12a: aWSA1= (w2)-directional attribute-based WSA (i+2)-type1 (with expandable i-parameter)

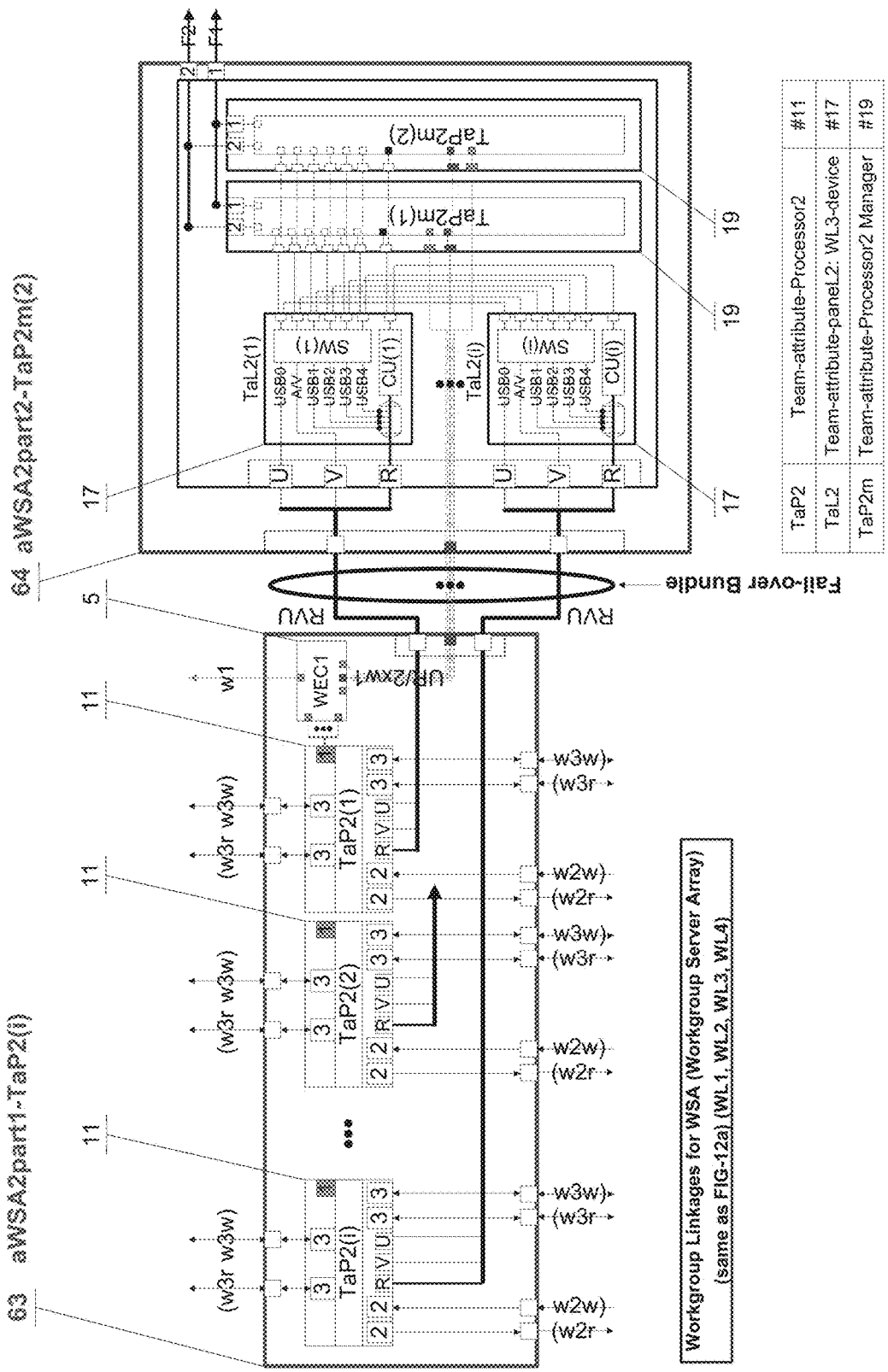
FIG-12b: aWSA2= (w2/w3-hybrid) directional/bi-directional attribute-based WSA (i+2)-type2

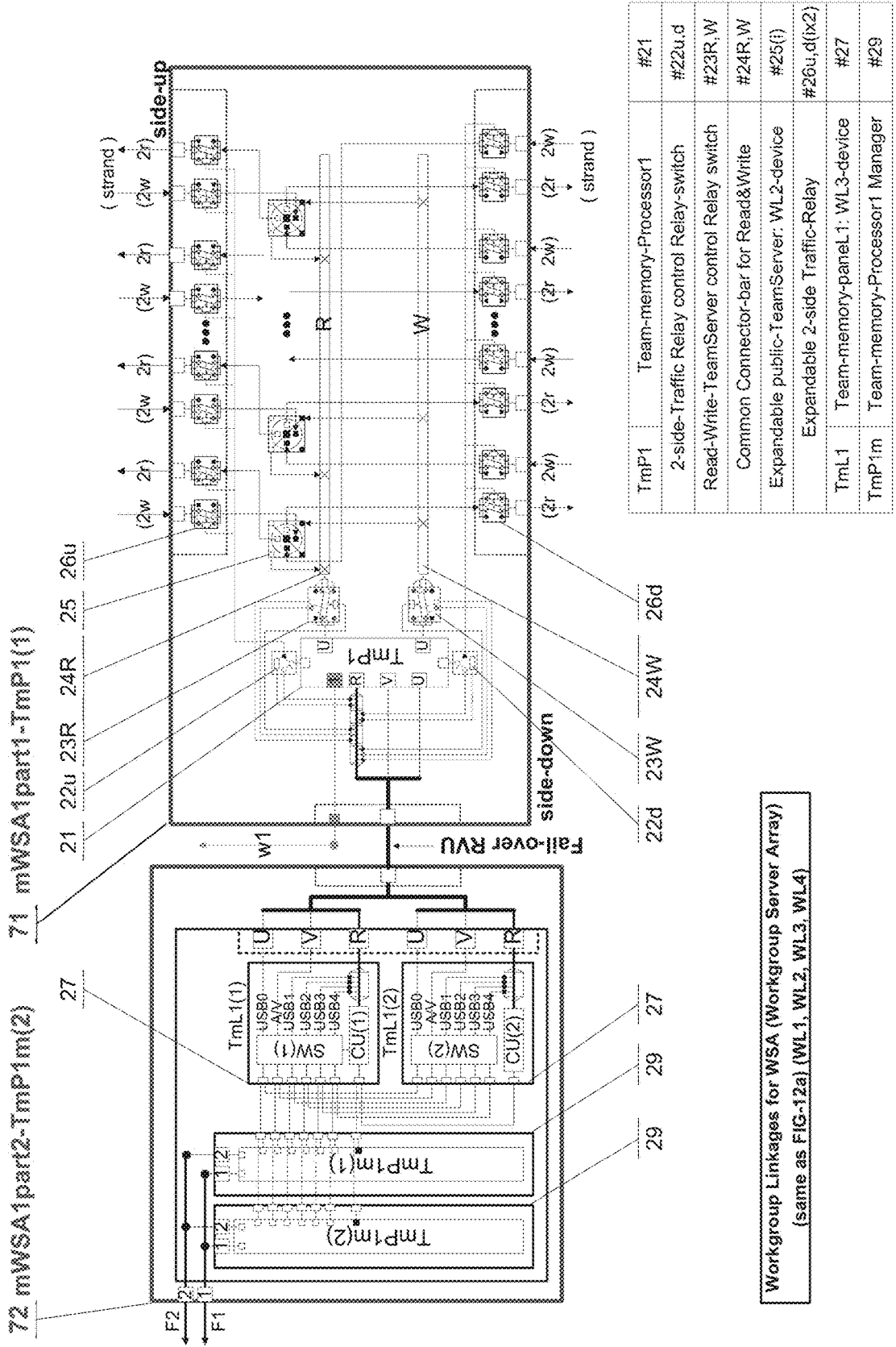
FIG-13a: mWSA1=(w2)-directional 2-sided memory-based WSA (1+2)-type1-version1

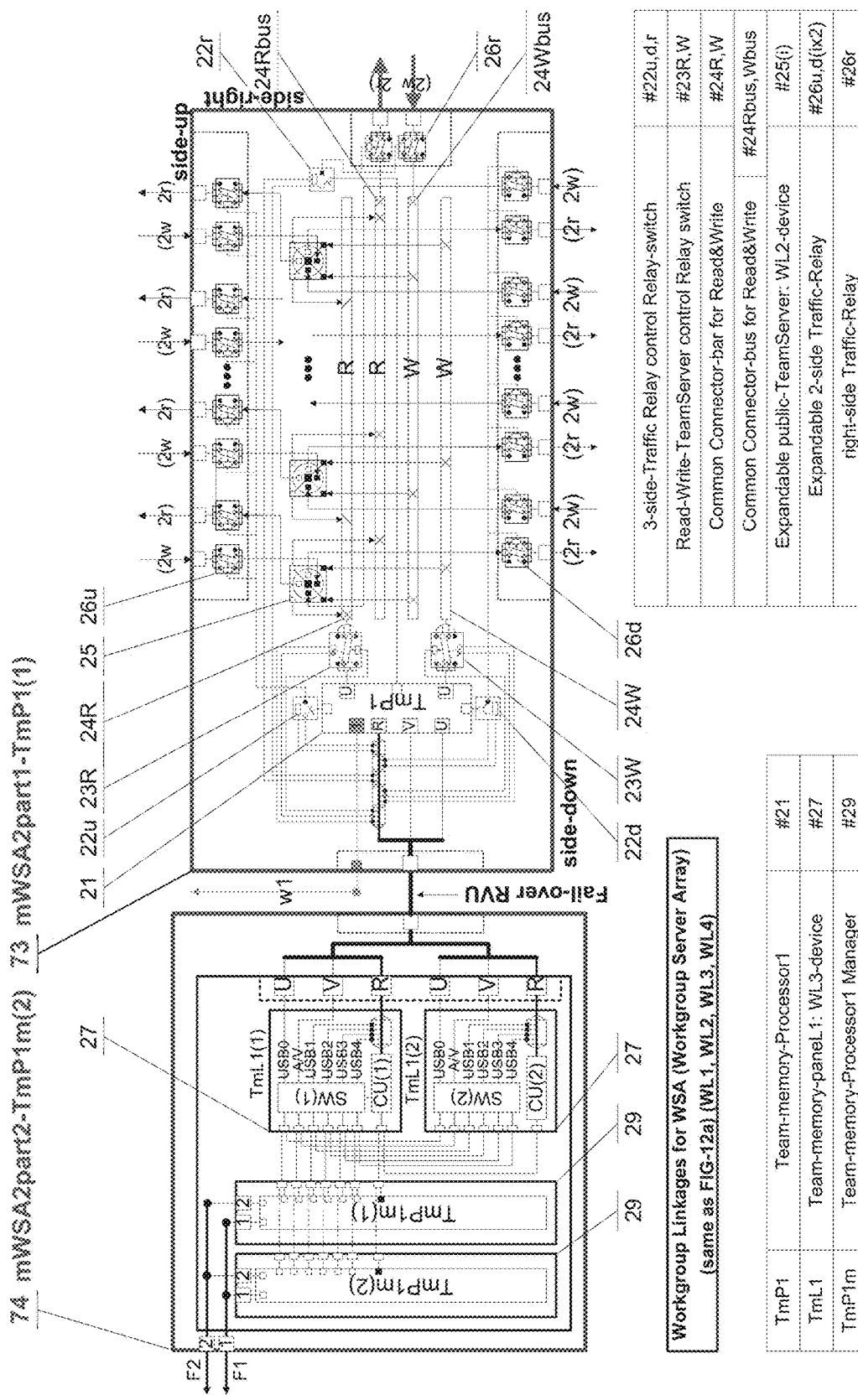
FIG-13b: mWSA2= (w2)-directional 3-sided memory-coupling WSA (1+2)-type1-version2

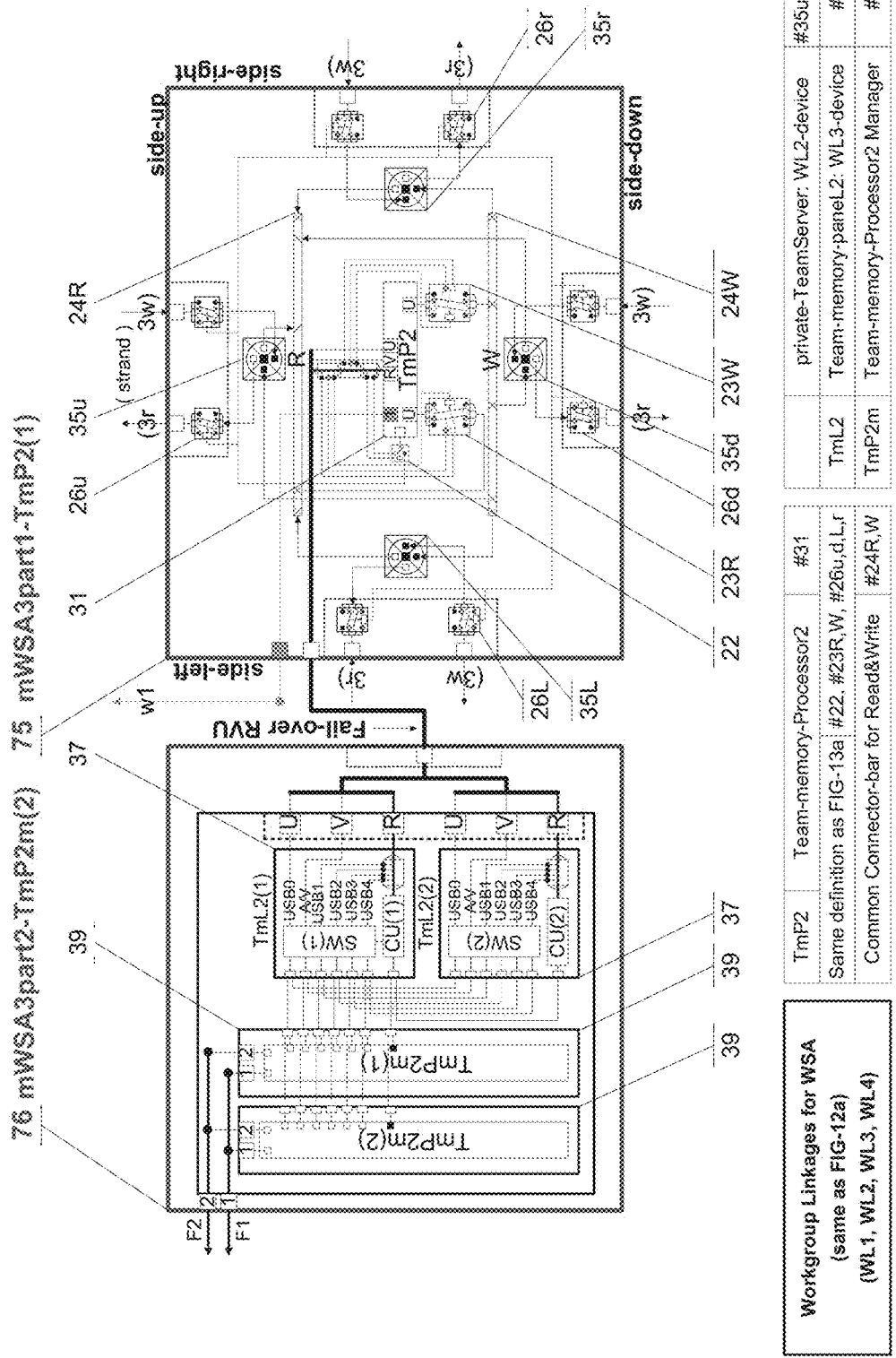
FIG-13c: mWSA3=(w3)-bi-directional 4-sided memory-based WSA (1+2)-type2-version3

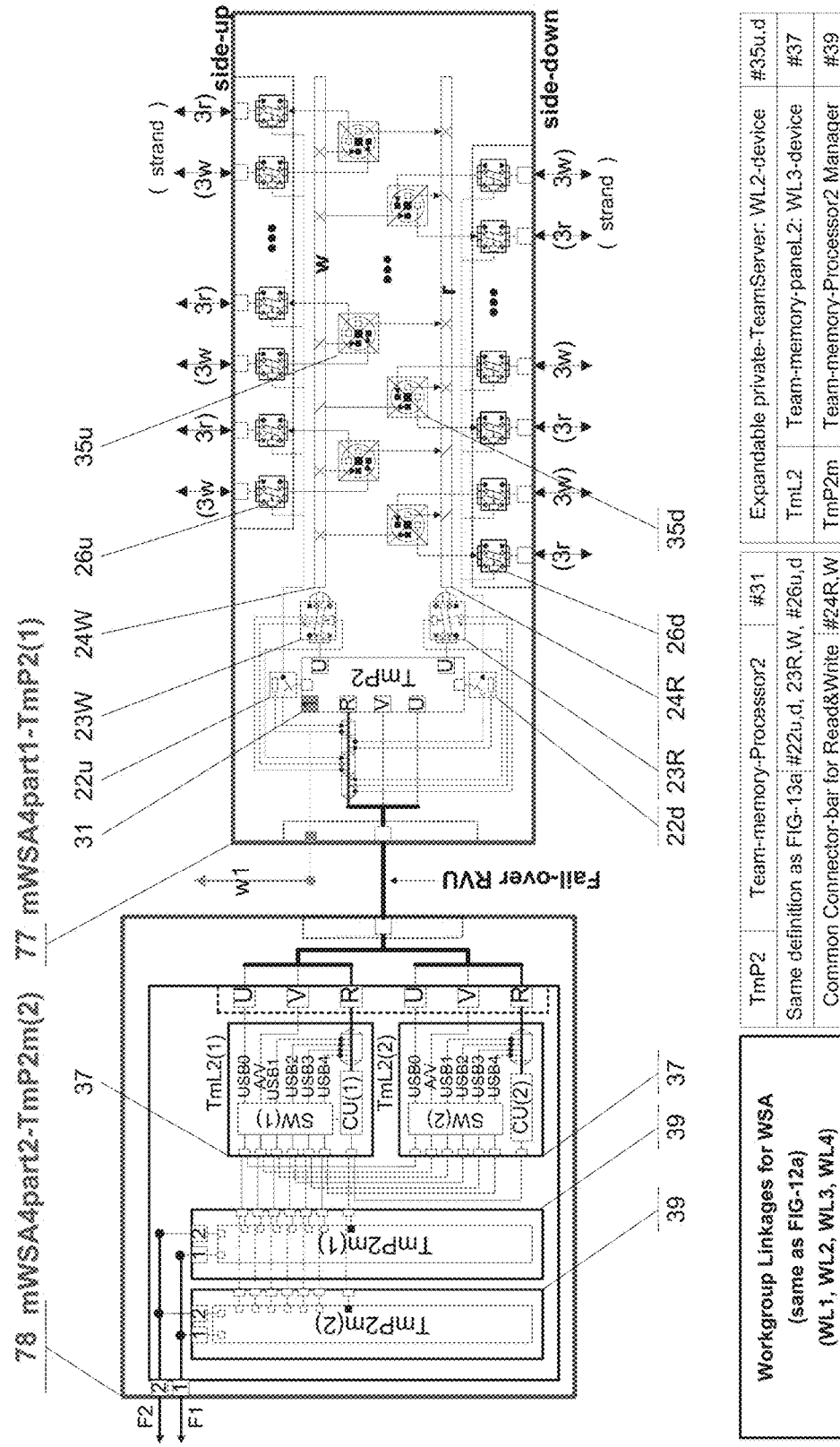
FIG-13d: mWSA4=(w3)-bi-directional 2-sided memory-based WSA (1+2)-type2-version4

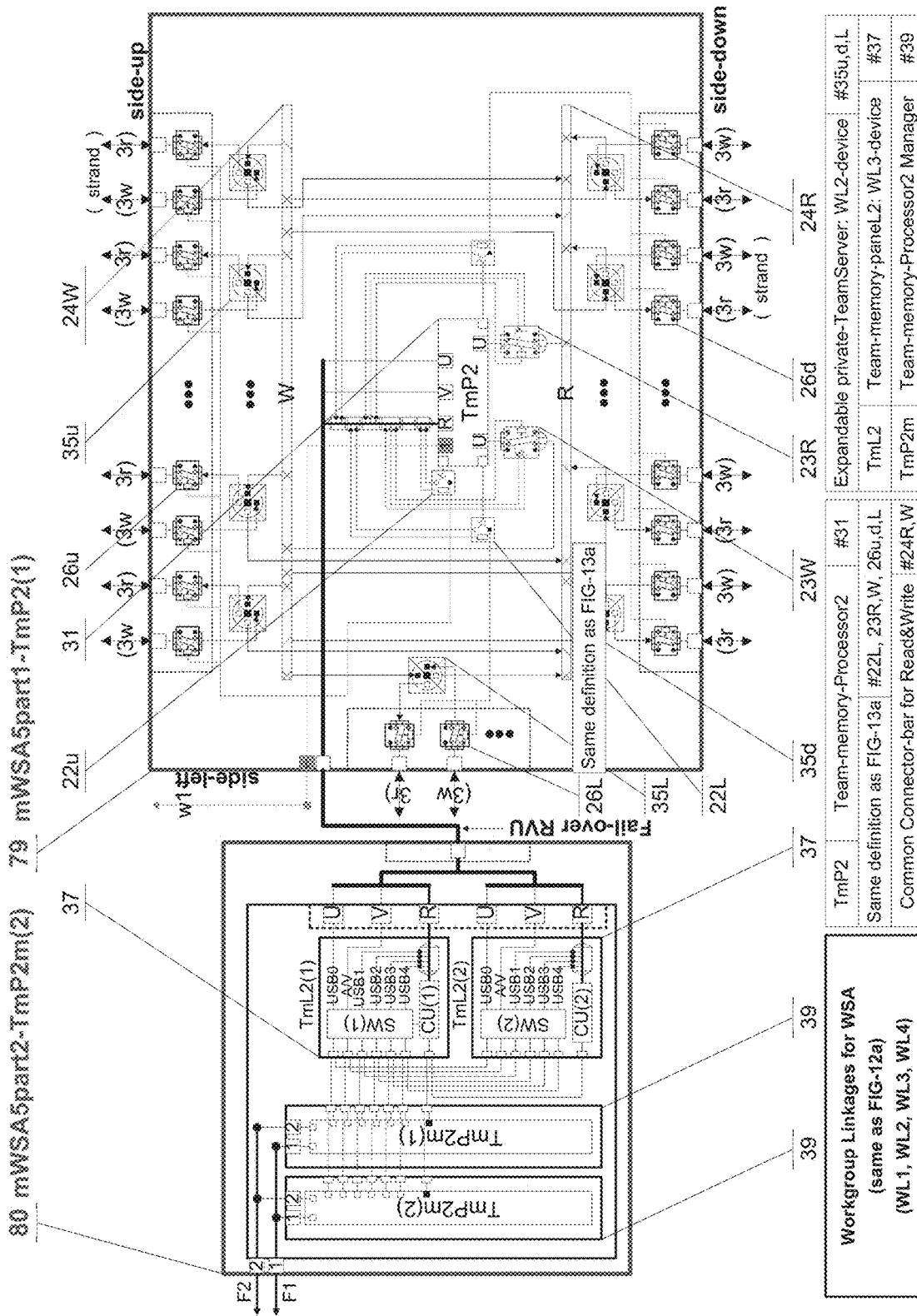
FIG-13e: mWSA5 = (w3)-bi-directional 3-sided memory-based WSA (1+2)-type2-version5

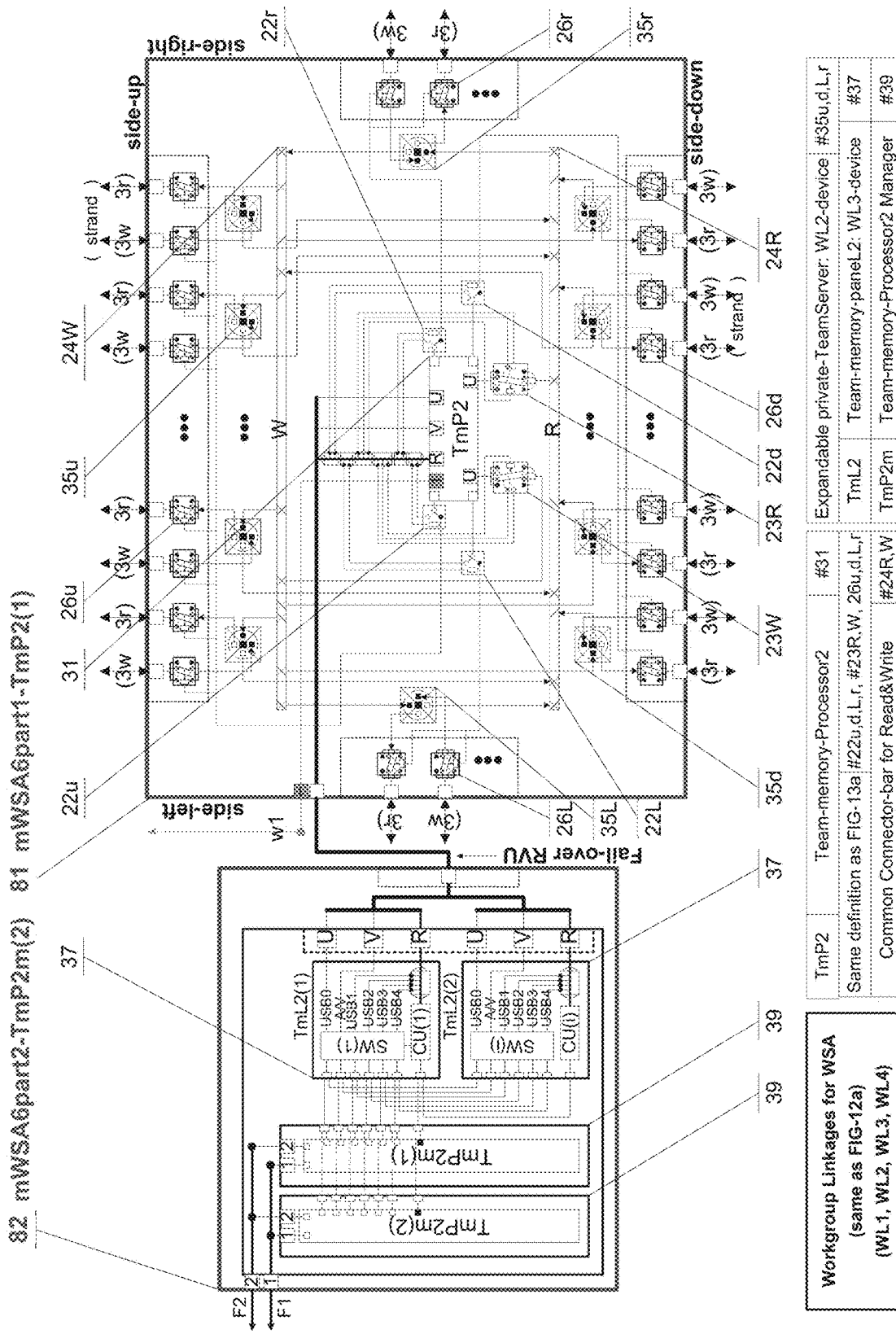
FIG-13f. mWSA6= (w3)-bi-directional 4-sided memory-based WSA (1+2)-type2-version6

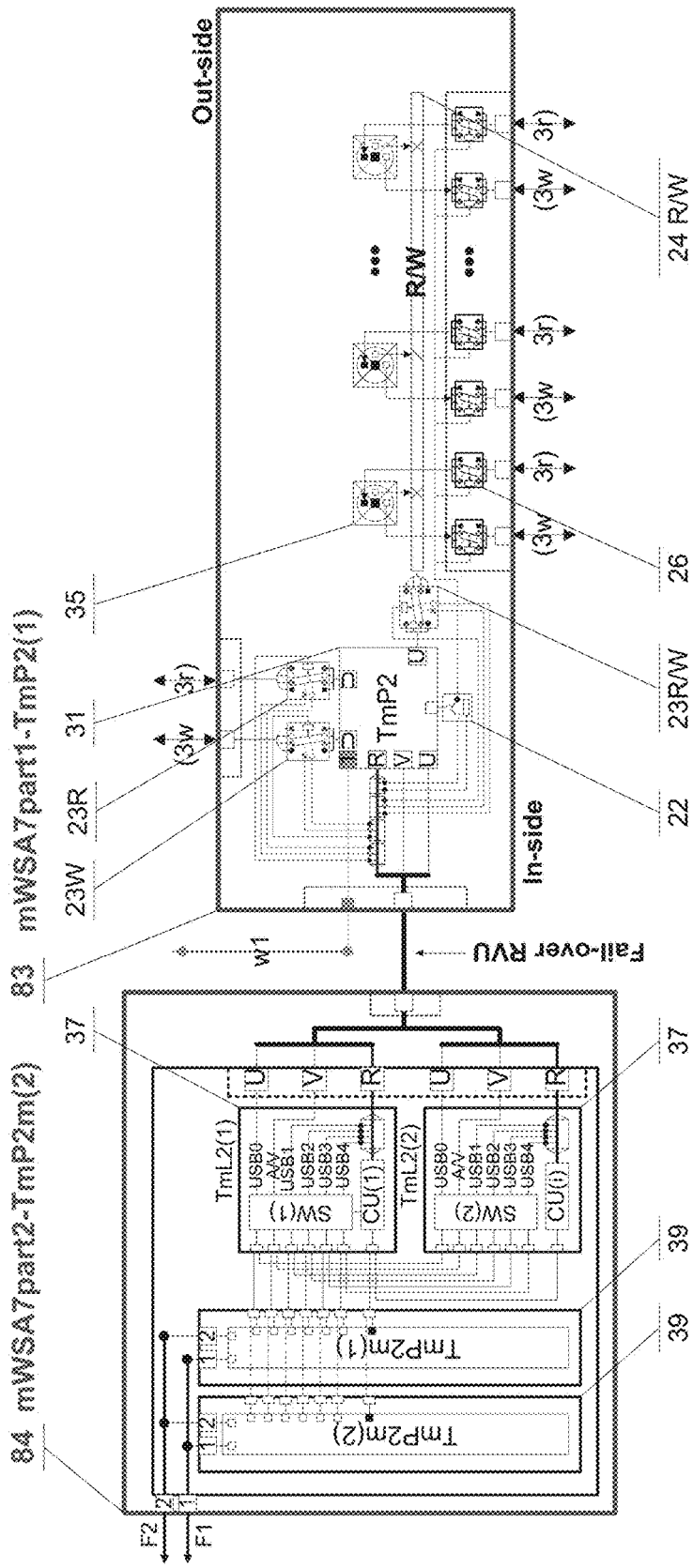
FIG-13g: mWSA7 = (w3)-bi-directional memory-extending WSA (1+2)-type2-version7

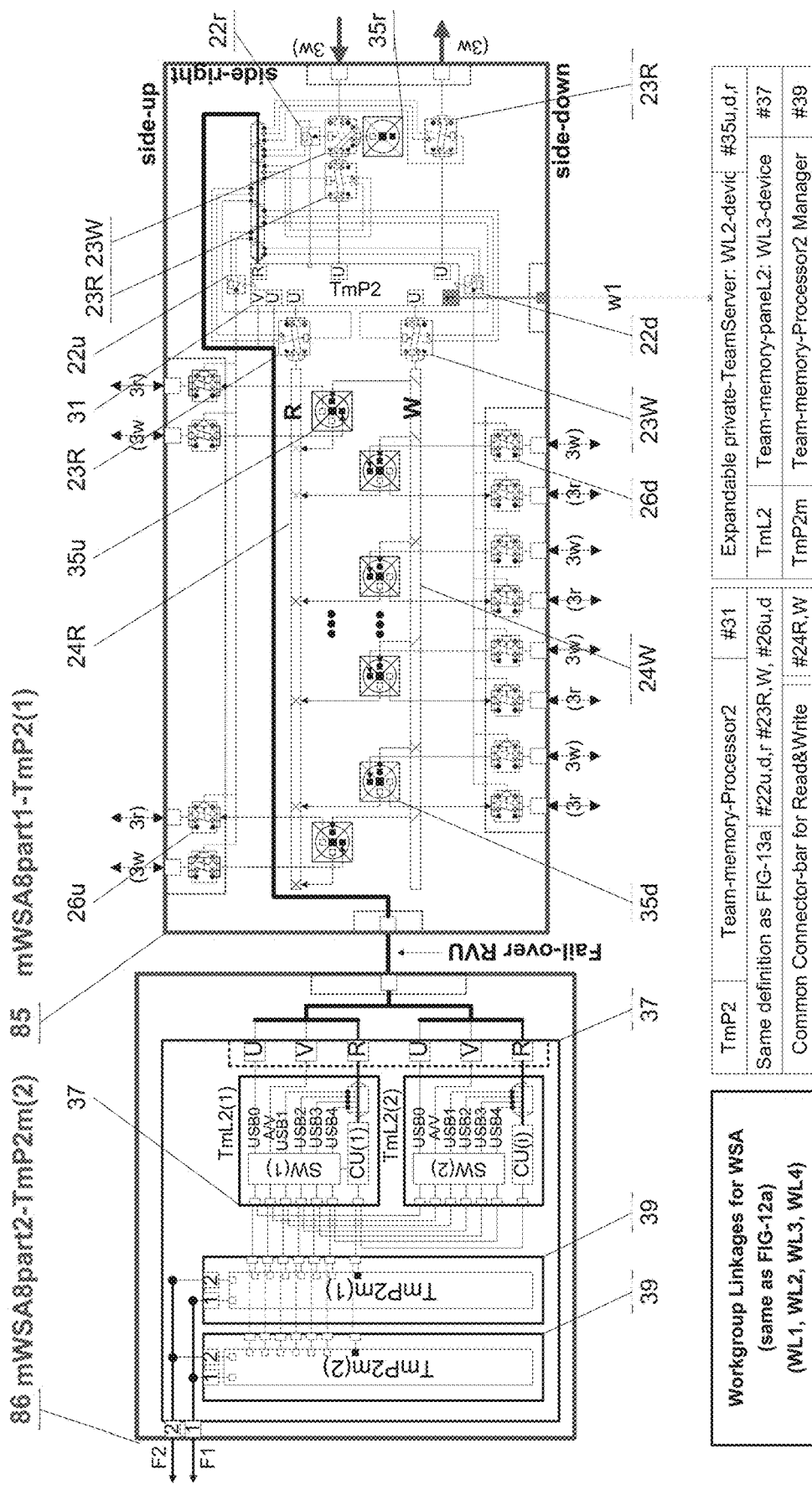
FIG-13h: mWSA8=(w3)-bi-directional 3-sided memory-bonding WSA (1+2)-type2-version8

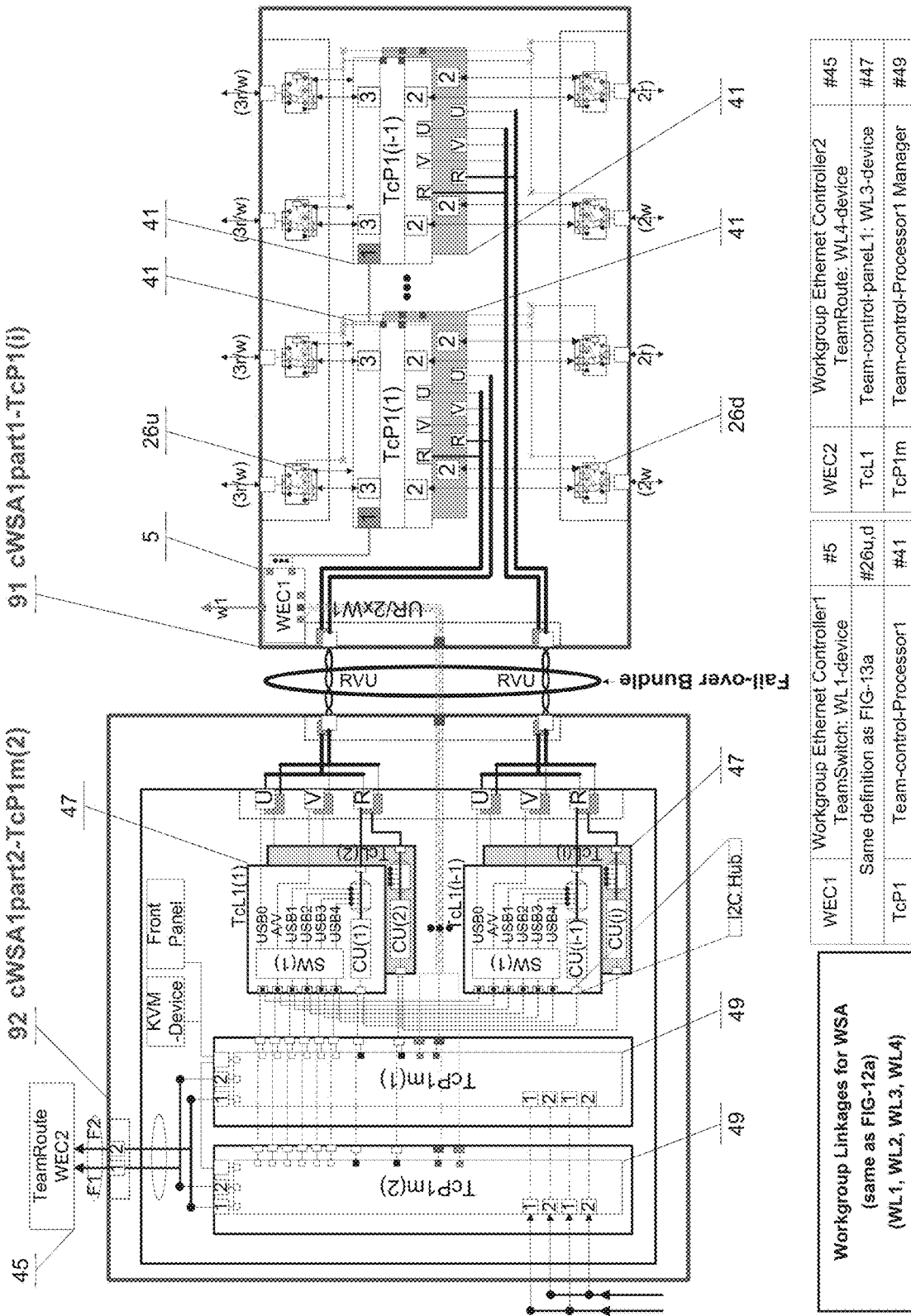

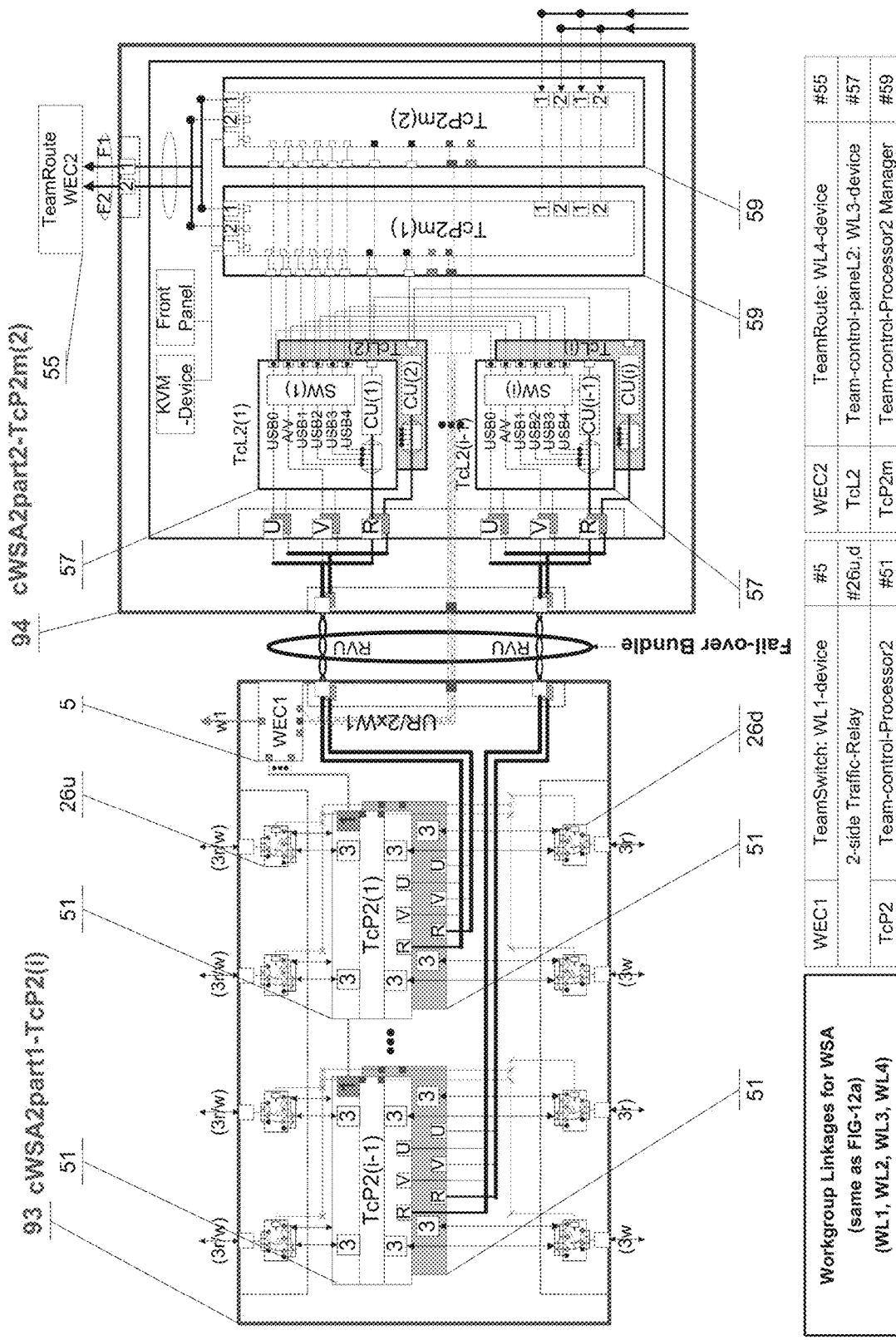
FIG-14b: (w3)-cWSA2= (w3)-bi-directional control-based WSA (i+2)-type2

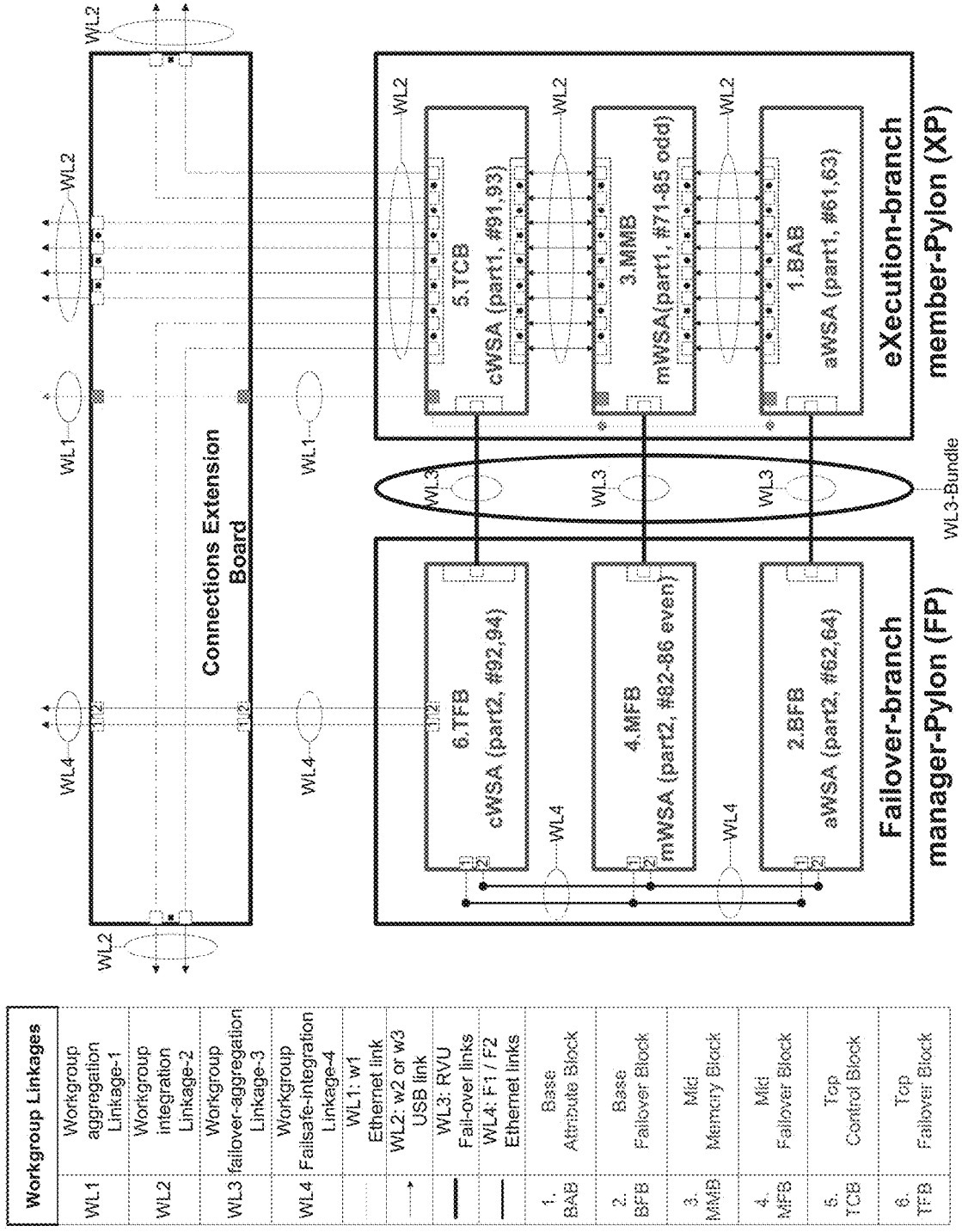
FIG-15: The Six(6) workgroup Basic-Building-Block (wBBB)-based fail-safe workgroup-Entity (wEntity)

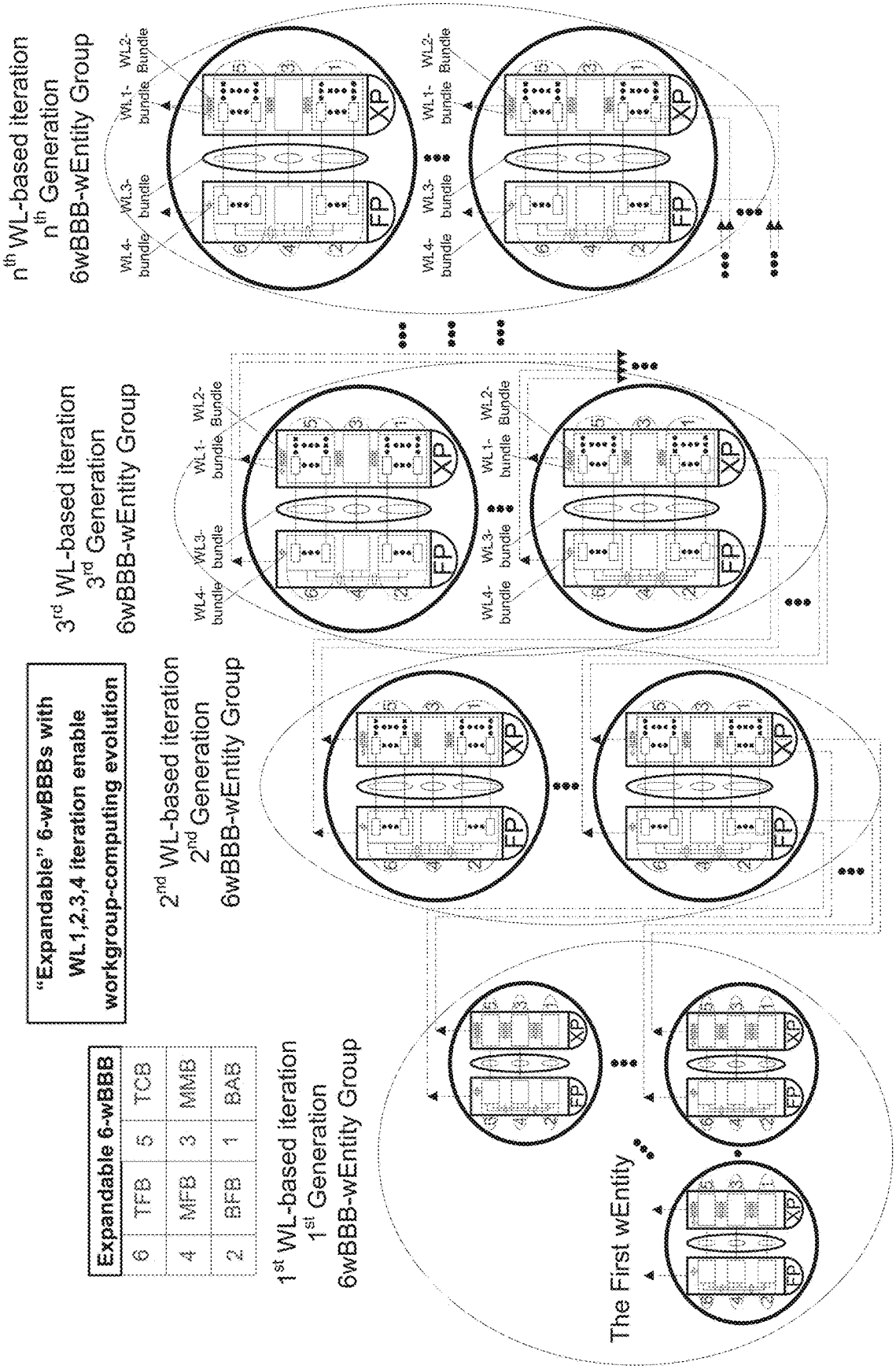
FIG-16: WL-iteration based 6-wBBB Evolutionary Processes, creating next-generation wEntities

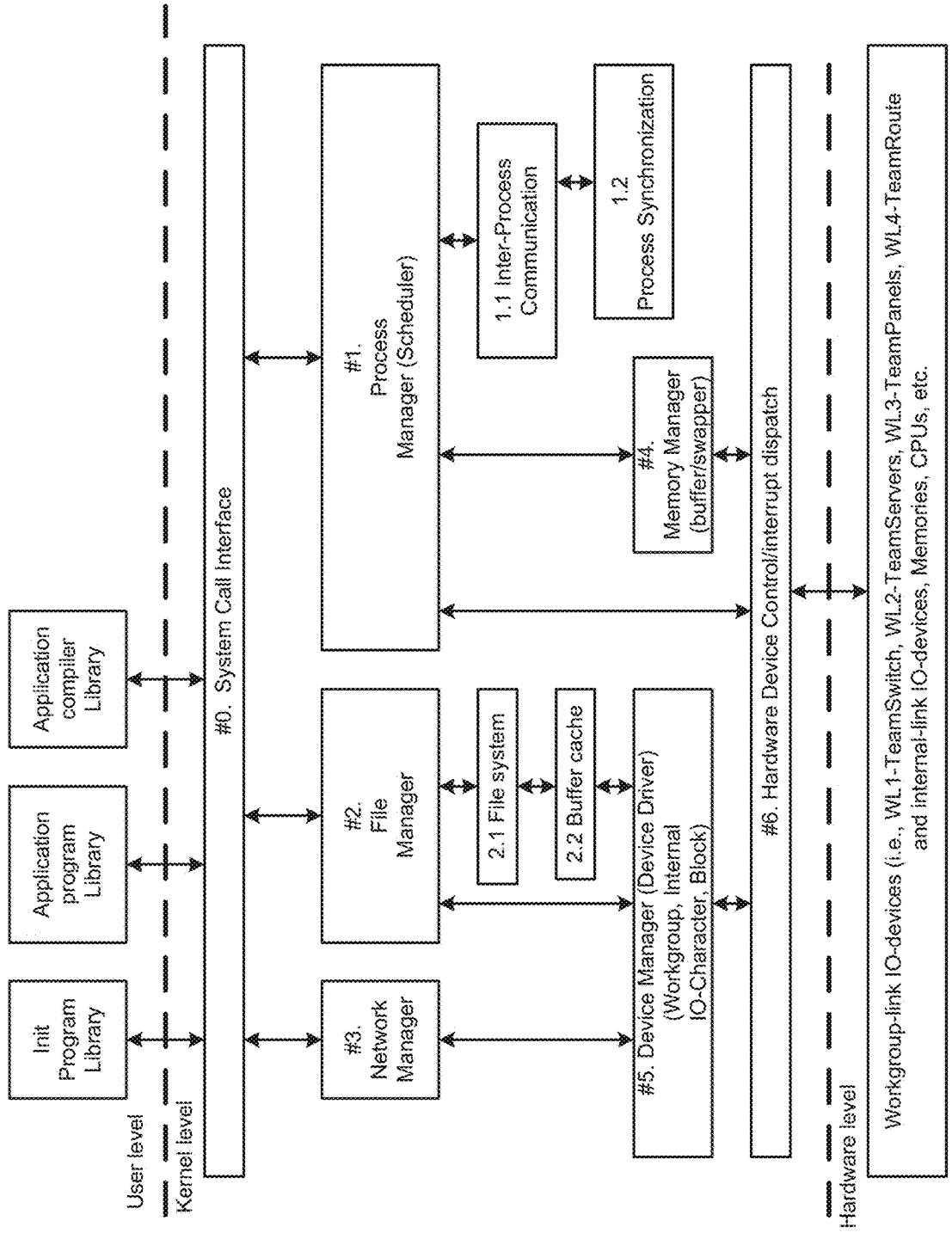
FIG-25a: Workgroup-link-based workgroup-process Operating System Structure for TaP & TmP

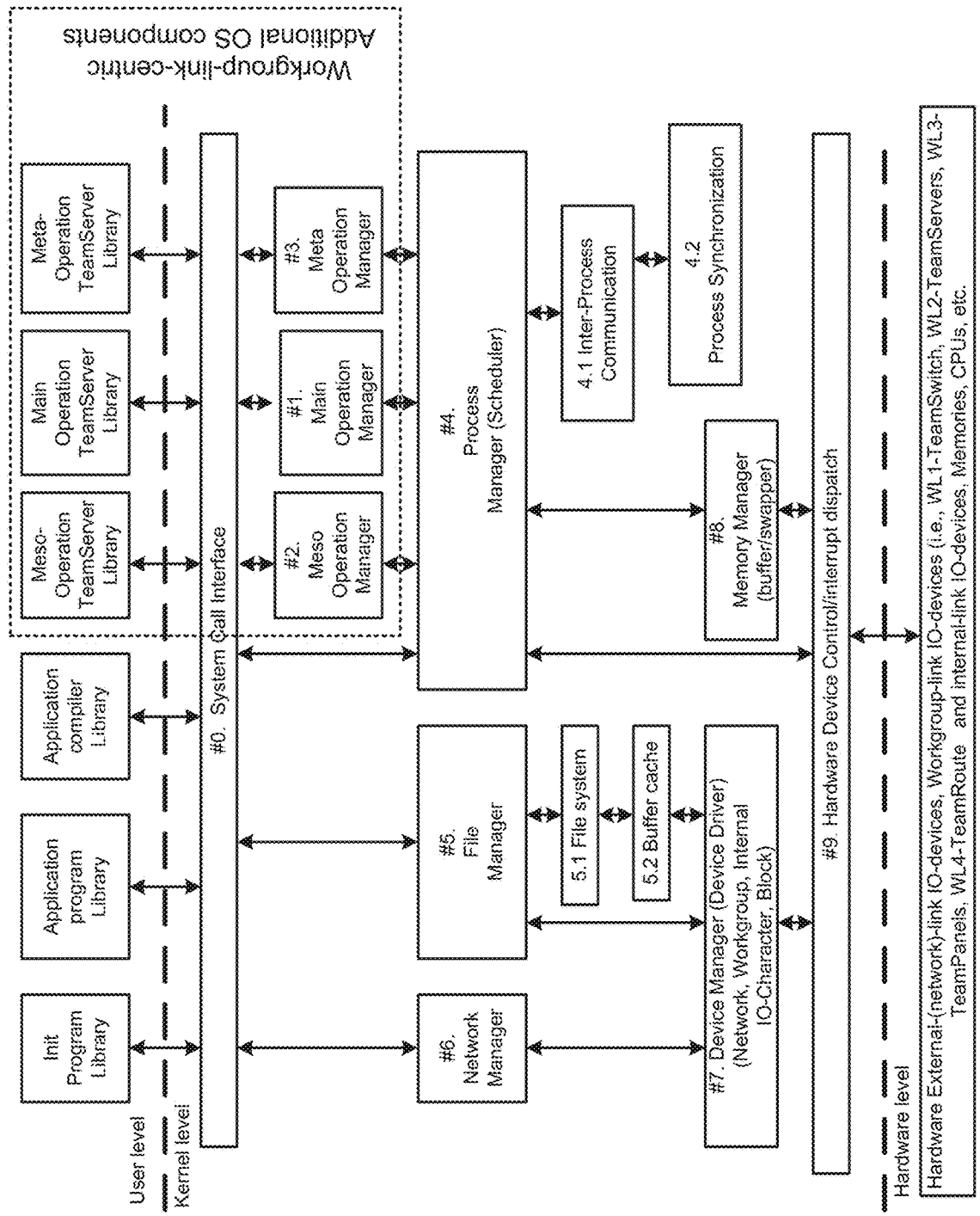
FIG-25b: Workgroup-link-based workgroup-operation Operating System Structure for TcP

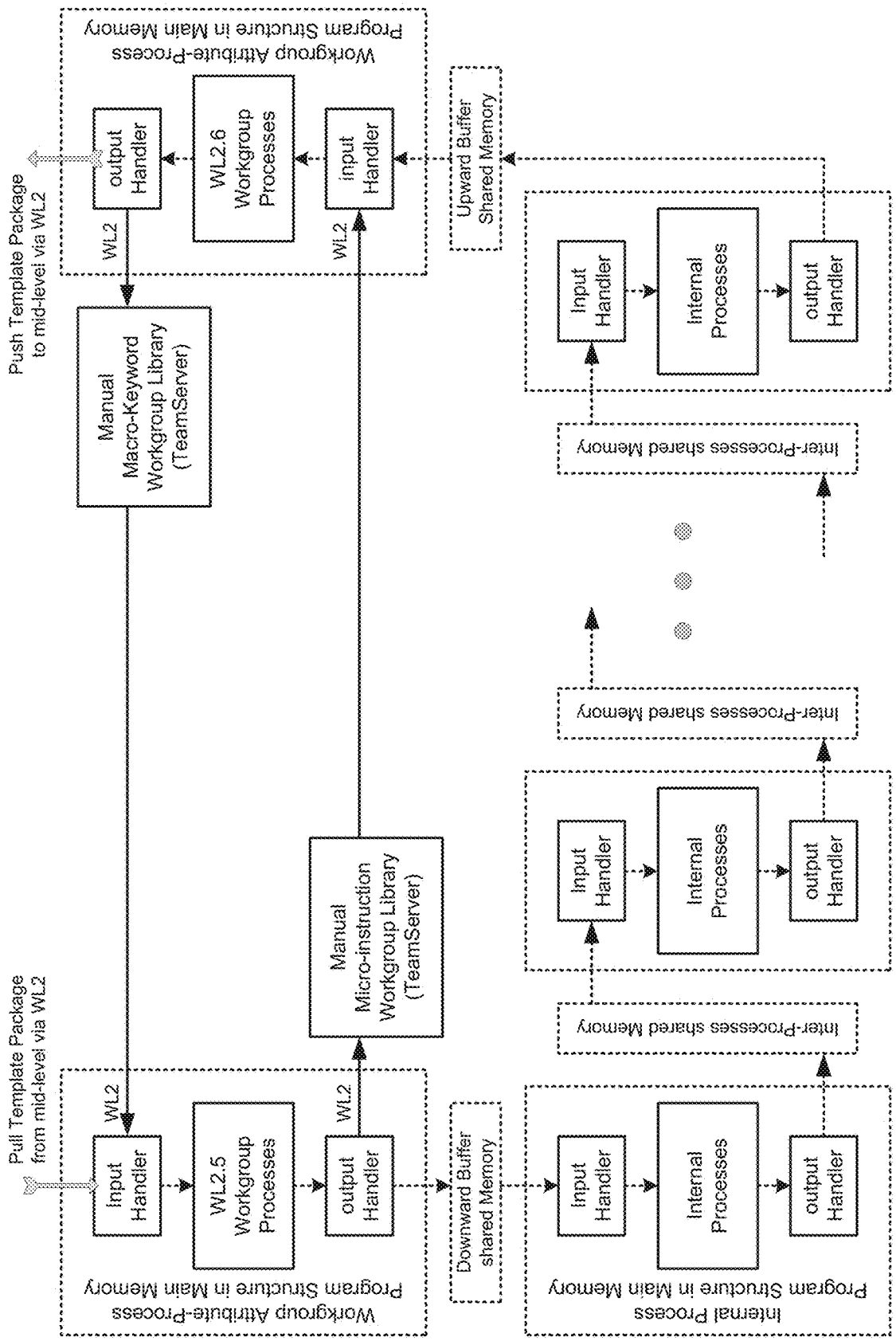

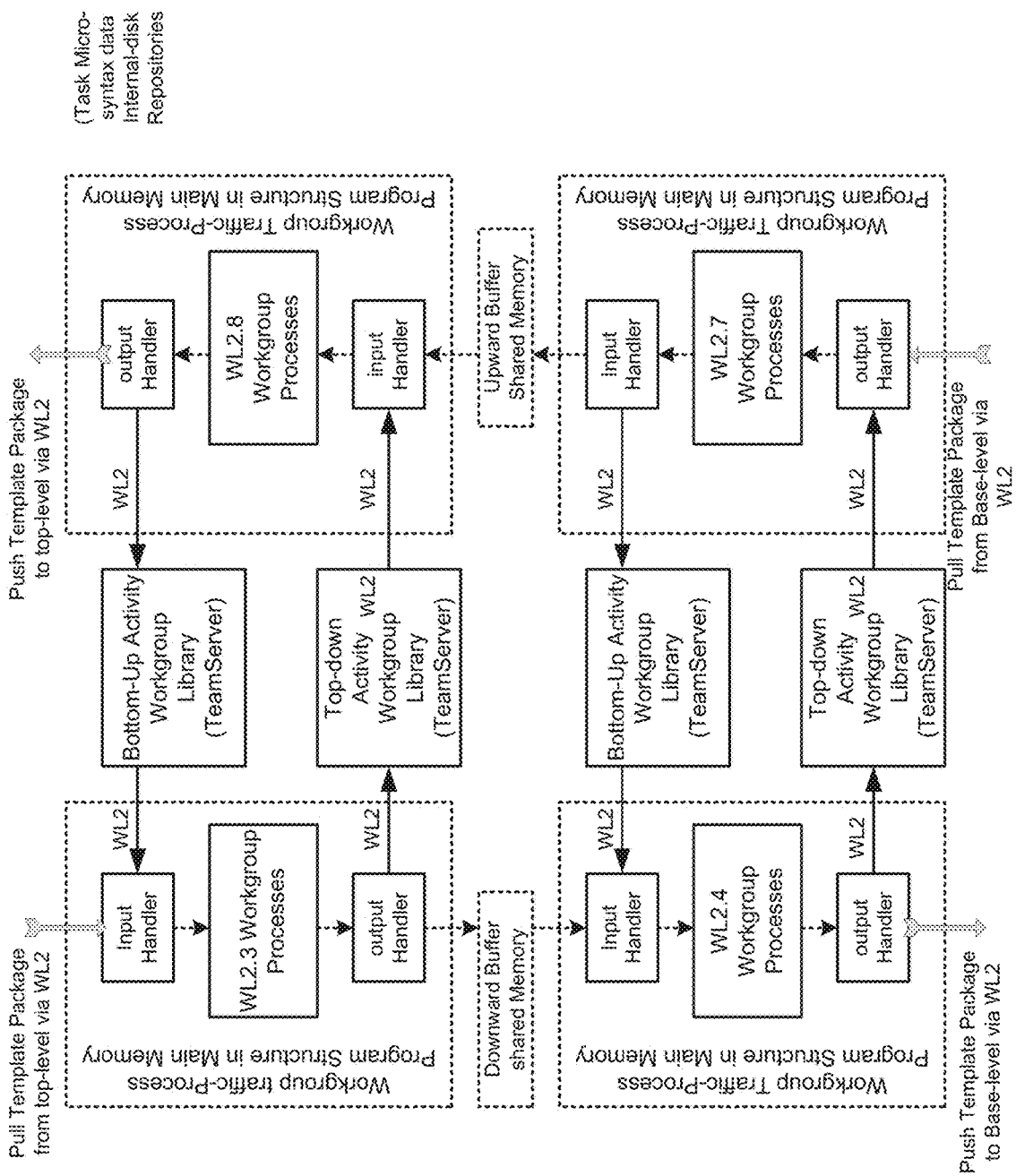
FIG-25d: Task Workgroup-traffic Processing Program Structures for TmP

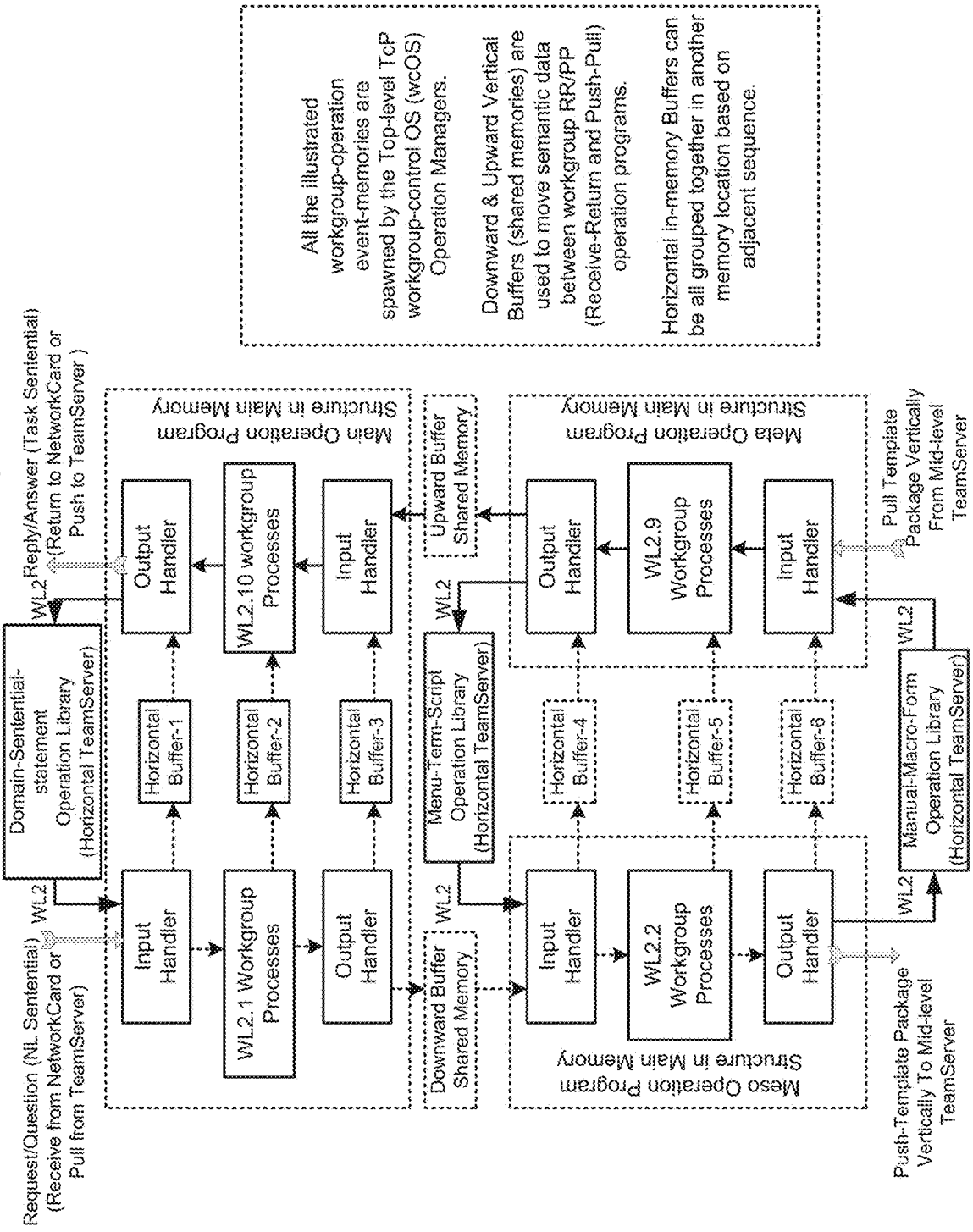

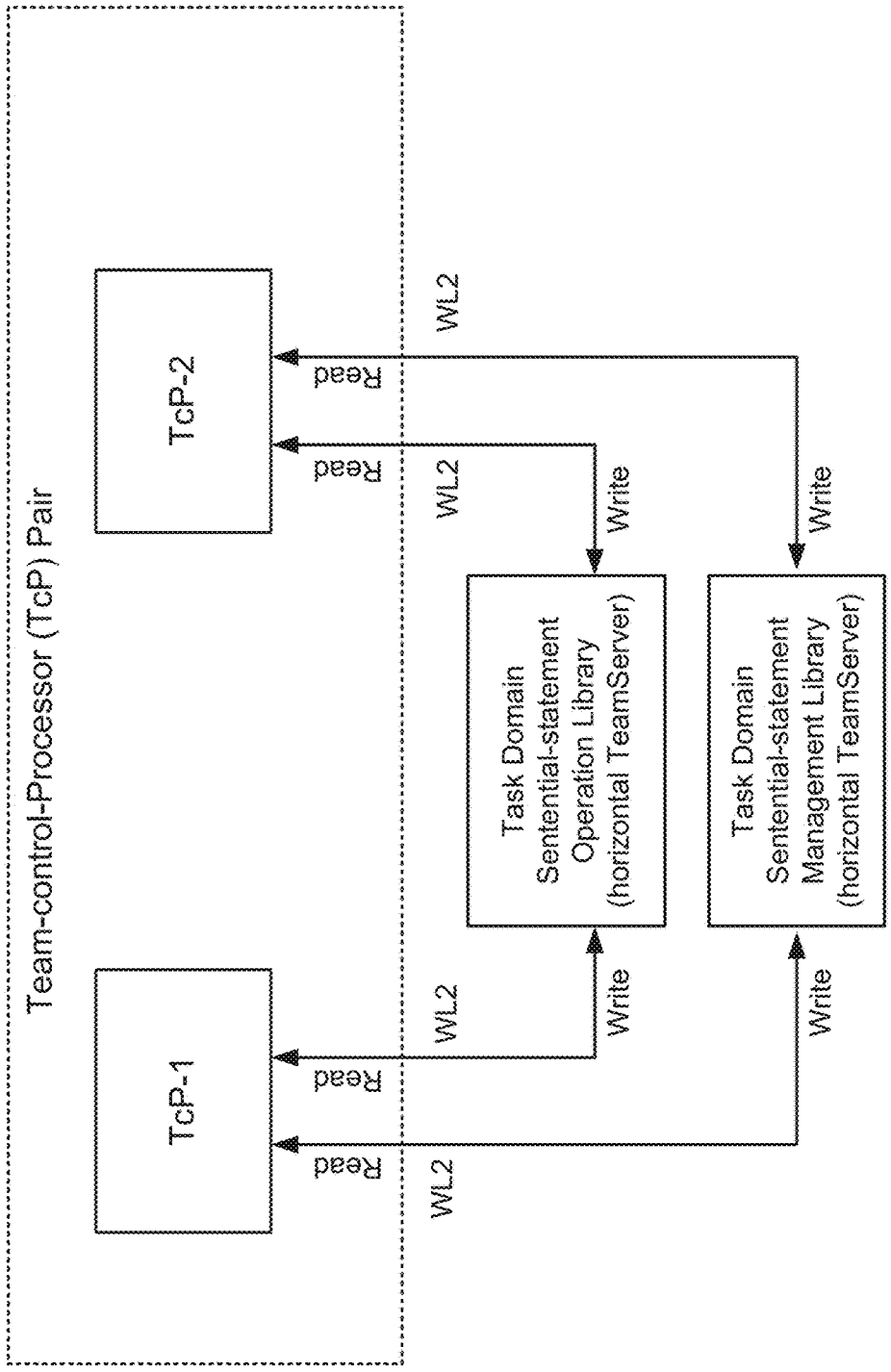

FIG-25f: Task Workgroup-control Domain Sentential Management Library for a TcP pair The method of using two Team-control Processors as a pair to handle two different but dependent operation& operation-management tasks on two distributed main-processing memories concurrently with real-time management capabilities is better than the method of using one node-processor with multiple CPUs to handle two different but dependent tasks on one main processing memory based on sequentially time-sharing one memory-bus, which cannot yield real-time management capabilities.

3-LEVEL REAL-TIME CONCURRENT PRODUCTION OPERATION WORKGROUP SYSTEMS FOR FINE-GRAINED PROACTIVE CLOSED LOOP PROBLEM SOLVING OPERATIONS

FIELD OF THE INVENTION

The present invention related to the field of "Workgroup Computing (WC)." More specifically, this invention is focused on workgroup computing "Evolutionary Principles (wEPs)" concerning workgroup computing-entities' evolvable structures/capabilities duality, and duality-derived "Theoretic Foundations (wTFs)." The wEPs include structure-creation-based Hardware Architecture Theories (HATs) and capability-creation-based Software Architecture Theorems (SATs), along a workgroup computing evolutionary timeline over following 3 periods.

The first period covers the creation of "real-time failover" workgroup module-entities based on wEP1/wTF1. The second period covers the very first creation of "real-time fail-safe" workgroup core-entities based on wEP2/wTF2. The third period covers over 7 evolutionary generations in creating bigger and better fail-safe workgroup unitary-core, zone-core and virtual cloud-core entities based on wEP3/wTF3. They are generation-1 real-time complex workgroup production unitary-core entities, generation-2 real-time diverse workgroup-assembly unitary-core entities, generation-3 real-time dynamic workgroup-fabrication unitary-core entities, generation-4 real-time cognitive-interactive workgroup-transaction unitary-core entities, generation-5 real-time intelligent organization standard unitary-core entities, generation-6 real-time intelligent apparatus compact unitary-core entities and generation-7 real-time intelligent PDA miniature unitary-core entities.

The first and foremost innovation about workgroup computing should be focused on workgroup Hardware Architecture Theory (wHAT) with its related methods, which solidify the concept that every bigger workgroup core entity's hardware structure must first be created by a workgroup evolutionary Hardware Architecture Theory (HAT). Then, based on these created workgroup hardware structures, all the ensuing software operating system (OS) integration and software programs generation can be developed via workgroup core entity duality-dictated Software Architecture Theorems (SATs). Furthermore, real-time intelligent workgroup-computing systems can be generated via workgroup core entity-based system disciplines. This is similar to the von Neumann hardware architecture theory that creates the first node-based 3-level hierarchical core structures (i.e., base-level IO-devices, mid-level main memory and top-level CPU), which can be based on in generating all the von Neumann-based node-computing systems accordingly.

CROSS-REFERENCE TO RELATED PATENT APPLICATIONS

The following United States patents and patent applications, including the present application, are related by subject matter. Each of such patents/applications is incorporated by reference herein in its entirety.

U.S. patent application Ser. No. 08/539,066, entitled "DIRECT-ACCESS TEAM/WORKGROUP SERVER SHARED BY TEAM/WORKGROUP COMPUTERS WITHOUT USING A NETWORK OPERATING SYSTEM," by Ivan Chung-Shung Hwang, filed on Oct. 4, 1995, and granted on Sep. 1, 1998 as U.S. Pat. No. 5,802,391.

U.S. patent application Ser. No. 09/744,194, entitled "SYSTEM AND METHOD FOR IMPLEMENTING WORKGROUP SERVER ARRAY," by Ivan Chung-Shung Hwang, filed on May 17, 2000, and granted on Mar. 30, 2004, as U.S. Pat. No. 6,715,100.

International patent publication number: WO2001/022325, entitled "SYSTEM AND METHODS FOR IMPLEMENTING E-COMMERCE SERVICES," by Ivan Chung-Shung Hwang, filed in Sep. 20, 2000.

DESCRIPTION OF THE RELATED ART 1.0 the Limitations of the Current Node-Computing Application-Based Systems Based on the current 2-link-typed (i.e., internal-links and network links) network hardware structures, installed with network Input-output (IO) process-oriented network-OSs, application programs and application databases can only provide coarse-grained-reactive (cookie-cutting) open-end-problem-solving (PS) processes for external multiple users in a time-sharing parallel and insecure manner, abiding to the fixated golden hammer-nails PS-paradox.

1.1 Object-Oriented Application Systems for Innate Problem Solving are Flawed

All the networkable object-oriented Operating-System (OS)-based parallel-processing application systems, such as Windows-/Linux-based as well as Android-/iOS-based node-application systems, are flawed in self-security protection. These object-oriented OSs installed on a multi-CPU with individual caches, one main-processing memory, multi-IO internal-linked devices and network-linked-devices-based hardware structure are mainly to provide the memory-facility traffic control mechanism on a time-shared main-memory for multiple CPUs in hopes of achieving better multi-input/multi-output (MIMO) through-puts.

However, in so doing on such an "open-end network traffic-hub-like" 2-link-typed network structure, it creates "Meltdown" as well as "Spectre" security holes that are difficult to fix, because they need both hardware and software improvements just to alleviate the security problems, let alone resolving them.

Since they are object-oriented, they can only generate "open-end-pipe IO-processes cascaded" application programs, which provide "cookie-cutting-molded" Coarse-Grained Reactive (CGR) problem solving services for all users with the pre-determined problem solving services. These application programs can never provide Fine-Grained Proactive (FGP) problem solving services to any individual user based on real-time dynamic personal requests. Therefore, these types of object-oriented application systems for individuals as the only operator/controller/user/stakeholder with limited CGR problem solving capability can be classified as single-node Application-Hub Systems (AHS) for innate problem solving.

1.2 Zone-Application Infrastructure Systems (AISs) for Collaborative Problem Solving Then, in order to tackle bigger problem domain based on multiple stakeholder's collaboration using these object-oriented node-application systems, it is only natural to network these systems into a multi-node networked-infrastructure-based application systems, dubbed "multi-node Application-Infrastructure Systems (AIS)," which can be found in the real-world collaborative-stakeholders' problem domains from the small solution-providing teams to the large service-oriented organizations.

One example is the multi-operator collaborative solution-team's problem domain. Well-defined team solutions have to be developed as distributed applications and installed on multi-node AISs, so that team members can collaboratively carry out applications to solve solution-team's problems and this type of AISs can be classified as Zone1-solution-AISs.

Another example is the multi-solution-team collaborative transaction-group's problem domain. Well-defined group transactions have to be developed as distributed applications and installed on multi-node AISs, so that all the teams in the transaction group can collaboratively carry out applications to solve transaction-group's problems and this type of AISs that enclose Zone1-AISs can be classified as Zone2-transaction-AISs.

Still another example is the multi-transaction-group collaborative enterprise-service-group's problem domain. All the well-defined enterprise-service-group's internal and external services have to be developed into distributed applications and installed on multi-node AISs, so that all the members in an enterprise-service group can collaboratively carry out applications to solve enterprise-service group's problems and this type of AISs that enclose Zone2-AISs can be classified as Zone3-service-AISs, ideal for vertical-operation-departments, horizontal-operation-divisions, divisional-management-offices and the central-management-office.

Still yet another example is all the enterprise-group collaborative enterprise's problem domain. All the well-defined enterprise's internal and external services have to be developed into distributed applications and installed on multi-node AISs, so that all the enterprise's groups can collaboratively carry out applications to solve enterprise's problems and this type of AISs that enclose Zone3-AISs can be classified as Zone4-enterprise-AISs.

1.3 Cloud Application-Infrastructure Systems (AISs) for Internet Service-Oriented Cooperative Problem Solving In addition, in order to tackle internet-service-oriented problem domain based on multiple enterprises' cooperation, it is only natural to use the internet-protocol-based connection to network these symbiotic Zone4 enterprise-AISs into cloud-infrastructure-based application systems, so that all the involved enterprises can cooperatively carry out applications to solve cloud-service-oriented problems and this type of AISs that enclose Zone4-AISs can be classified as Cloud-service-AISs, ideal for intranet/extranet/internet service providers.

1.4 Common Drawbacks of AISs

However, by using the Application Infrastructure Systems (AISs) for Zone1 to Zone4 problem domains, as well as for internet cloud-service problem domains, there are at least 4 major drawbacks with limitations that cannot be overcome.

One drawback of AISs is that applications are only Coarse-Grained Reactive (CGR), never Fine-Grained Proactive (FGP). Solution-AISs can only deliver pre-defined/non-flexible/non-adaptive cookie-cutter coarse-grained applications. Consequently, transaction-AISs based on the results from solution-AISs can never deliver "fine-grained proactive" contracts. Moreover, transaction-based service-AISs, enterprise-AISs and cloud-AISs can never provide "fine-grained proactive" contractual services.

Another drawback of AISs is that it can only be lead-time developed, never real-time dynamically formed. Since the functional data-based software components are spread over multiple node-computers, the overall application programming is lead-time fabricated by focusing on the extended directional-data-flow pipe-line connection and interface among networked software components, which is impossible to be real-time handled. Usually, the application workflow logic is not the main coding effort. The majority of the effort is spent on how to assure whether the connection-timing is in sync and whether the rigid interface-format is followed.

Another drawback of AISs is that it is equipped with proprietary network-capable node-OS (i.e., nOS), never standardized. Zone-infrastructure-based application software should be run under the same node-OS to obtain real-time application-execution efficiency and application-supervision effectiveness. However, the networked nodes in each zone may have different OSs from various venders. Therefore, the best way to achieve standardization is to resort to "virtual container environment" that each OS has to comply with and use portable bytecode formats for generating application programs, instilling another unnecessary layer of overhead.

Yet another drawback of AISs is that updated versions keep on coming, never ending. All the above-mentioned node-object-oriented nOSs and virtual controllers are bound to be upgraded, if there is any new improvement in hardware components or software components that needs to be installed. Consequently, the existing working application software needs to be upgraded to utilize any of the improved features, such as security.

1.5 Unsolvable Dilemmas of AISs

Yet, the worst drawback is that AISs create 2 dilemmas, which cannot be resolved.

The first dilemma is about transaction-oriented security. The AISs are always hackable due to the fact that transaction-based application programs installed on node computers in the zones and in the clouds are all pre-developed and laden with object-oriented security holes. Hence, external "virus programs" can sneak in, take over the application processes and conduct illegal activities. Currently, all the security measures are hind-sight-based, making the total eradication of hacking impossible.

The second dilemma is about service-oriented user-privacy. User-privacy via cloud-service-AISs is always problematic because all the cloud-service applications are only company-centric, offering coarse-grained reactive services to the captive users that web-surf on various companies' enterprise-AISs. Therefore, captive users cannot control their own personal data on cloud-AISs and the cloud-service providers can mishandle users' data willfully internally or unwillingly due to hacking externally.

Currently, the best reactive plan to tackle user-privacy issue is focused on the non-technical based measures via ethics enhancement as well as law enforcement. These measures are passive and reactive, which may mitigate the severity and control the damage, but the issue will remain as before.

1.6 Reasons why the Flaws of AISs can Never be Resolved

But then why are all the current zone/cloud-AISs still in existence, providing Coarse-Grained-Reactive (CGR) application-based services to all the PCs and smartphones? The reason is simple.

It is because node computing is no longer evolving and there are no new "evolutionary architecture theories" to create bigger "hardware unitary structure" with better software capability (i.e., bigger "node computers" with better problem solving capabilities).

Since no bigger node-computers can be created to accommodate collaborative zone-based problem domains as well as cooperative cloud-based problem domains, the less-capable multi-node-computer networked Application Infrastructure Systems (AIS) are put together to accommodate bigger zone-based/cloud-based problem domains and provide coarse-grained reactive (CGR) problem-solving services, thereby incurring the aforementioned drawbacks with limitations and with non-resolvable dilemmas.

1.7 Must have Endeavors

But, why has node-computing ceased evolving? One way to better understand is to review the "history of computing" from a hardware architecture point of view, so that the material of the node computing hardware evolution can be verified and the true facts about why node-computing has ceased evolving, can be discovered. Such facts can be the basis for establishing new and better "evolutionary architecture theories" to create more sophisticated computers with bigger "hardware unitary structures" with better software problem-solving capabilities to accommodate zone-based problem domains, replacing the current zone-based Application-Infrastructure Systems (AIS).

2.0 the History of Computing

Based on the timeline, the history of computing can be reviewed in three distinct periods.

2.1 the First Period (Functional-Computing Entities Fm/FM with Duality)

The first period covers the very early stages. In 1836, the first computing machine should be attributed to the Babbage mechanical computing machine, which used mechanical parts to complete the calculation. However, the first workable mechanical computing machine is the Henry Babbage machine, which was built in 1910. This machine was based on an arithmetic function-embedded "hardware mechanical mill" that produced arithmetic "software analytical results."

In 1936, the Turing machine was invented. It was an electro-magnetic circuit-based computing machine, which demonstrated how a tape-memory unit could be added to a multi-function (i.e., move left/right, scan/read, write, as well as arithmetic, etc.) integrated "hardware core structure" and generated finite-state functional automation-based "software capabilities."

Then came a series of the electronic circuit-based Boolean functional machineries (fm), from the "atomic-core" logical gates, such as AND, OR functional gates to the multi-function-gate "integrated" switching logic circuits, such as combinational, sequential and pulse-control Functional Machines (FM), which are equipped with bigger core-structures with better Multiple-input/Single-output (MISO) and Single-Input/Single-output (SISO) based "truth-table" functional capabilities.

In addition, various standard functional Computing Components (CC), such as adders, flip-flops, comparator, registers, multiplexers, demultiplexers, could be functionally integrated by using Functional Machines (FM) via switching-logic rules.

Furthermore, multiple standard functional computing components (CC) could be aggregated "purposely" via various communication linkages into various aspect-oriented Computing Modules (CM), such as various multiplexer/de-multiplexer-based input/output CMs, various flip-flop-based memory CMs and various control-register-adder aggregated central-process-unit CMs.

2.2 the Second Period (the First Evolutionary Node-Core Structure)

The second period began when the first electronic circuit-based "node computer" was invented. In 1945, von Neumann's computing machine was introduced by adding a CPU CM to aggregate with a memory CM and input/output CMs, yielding the first node computer "hardware architecture" based on these 3 node-based Basic Building Blocks (3-nBBB).

The first basic building block is the base-level Input/output-block, comprising an input and an output node-computing modules (nCM). The second basic building block is the mid-level memory block, comprising a memory-based nCM and the third basic building block is the top-level control block, comprising a CPU-based nCM. This 3-hierarchical-level-based 3-nBBB hardware architecture invented by von Neumann created the first "node-based Hierarchical Core structure (nHCS)" that was further equipped with "one overall Integration-control program." Subsequently, based on node-computing system's design-science, develop-technology and deploy-engineering disciplines, the first node-core generic computers were built for solving computing algorithm-based problems, such as sorting.

2.3 the Third Period (the Evolutionary Node-Core and Non-Evolutionary Node-Hub Entities)

The third period covers all the potential 3-nBBB architected node-based computing systems for solving real-world problems along the node-computing advancement timeline up to the present.

In early 1950s, by using different types of memory CMs for stored programs (ROM) and processing (RAM) to construct the memory-nBBB of the 3-nBBB architecture, the first "monolithic node-core structure" was created. Subsequently, based on node-computing system's design-science, develop-technology and deploy-engineering disciplines, monolithic node-core computers were built in the first stage of the first generation along the node-computing advancement timeline, (i.e., nG1.1).

This type of nG1.1 monolithic node-core computers can be best illustrated by the IBM early stage mainframes, using 3270 terminal, card-reader input devices, key-to-disc input devices and paper-printer output devices, and later in 1960s, array-PU vector Cray computers, which still were based on 3-nBBB-architected monolithic node-core structures.

In early 1980s, by using the existing node-core computers as the device nCMs to construct the base I/O-BBB, the improved main-master/slave DMA-based memory nCM to construct the mid-memory BBB and the high-performance CPU nCM to construct the top-control BBB, the second-stage (nG1.2) "singular high-performance (hp)-CPU" node-based "hierarchical (base-mid-top) core structure (nHCS)" was created.

This was the first time, an iterative progressive process (i.e., the evolutionary process had established). It is when the first improved nG1.1 node-cores readily became bigger integrable nCCs, which could be further aggregated into a bigger I/O device nCM to build the "base"-I/O BBB. Together with the improved Direct Memory Access (DMA)-based "mid"-memory-BBB, which can encapsulate all the attached I/O devices and the "top"-control-BBB equipped with high-performance (hp)-CPU, which can run a top-level control program to manipulate a facility-control-based Disk Operating System (DOS)-enabled I/O device drivers, obeying the "functional-core-like" behavior and thereby creating a bigger hardware node core structure with better software problem-solving capabilities (i.e., the nG1.2 node-core structure). Subsequently, various "singular hp-CPU" node-core computers were built via node-computing system disciplines. This type of nG1.2 "singular hp-CPU" node-core computers can be best represented by DOS-based personal computers.

In 1990s, by adding "multiple hp-CPU nCMs" to construct the "top-BBB" instead of just using single hp-CPU, the third-stage (nG1.3) of node computing began. However, the 3-nBBB architected structure is not a node hierarchical-core structure, due to the fact that when multiple-CPU aggregated nCMs are added into the top-BBB, it will turn a MISO/SISO functional-compliant 3-nBBB "hierarchical core" structure into a Multiple-in/Multiple-out (MIMO) non-functional compliant 3-nBBB "Aggregated-traffic spokes-Hub-based" structure (AHS).

Then came the "main-memory-centric" facility-sharing traffic-control programs, dubbed the object-oriented Operating-Systems (OS) and object-oriented application programs, which are installed on this type of MIMO-cluster-structure, so that the object-oriented OS can control multiple application-processes to share a single master main memory without running into various parallel-processing dilemma, such as racing problems. Such "facility-sharing control based" object-oriented Operating Systems as WIN95, WinNT and the likes are prone to become bloated up with unnecessary complications due to the increments of hp-CPUs. Subsequently, various "multi hp-CPU" node-hub computers could be built via node-computing application system disciplines. This type of nG1.3 "multi hp-CPU" node-hub computers can be best illustrated by parallel-processing-based personal computers, super micros, minis and mainframe computers, each of which is equipped with a "non-standardized" facility-sharing control-based object-oriented Operating System to manage the processes of pre-developed object-oriented application programs.

There were no new 3-BBB-architected network-capable node-core structures evolved in the past 20 years, only a number of network-capable node-hub structure-based application computers fabricated to accommodate individual productivity problem domains.

Therefore, the only current way to accommodate those Zone1 to Zone4 collaborative problem domains is to use the most advanced nG1.4 multi-CPU-based network-capable node-hub computers as the zone-based application server systems. These disciplinary methods of building Zone1 to Zone4 client-server-based as well as peer-to-peer-based Application Infrastructure Systems (AISs) will unavoidably incur many drawbacks with limitations and especially unresolvable security and privacy dilemmas, as described earlier.

SUMMARY OF THE INVENTION

Based on the analyses on the limitations of node Evolutionary Principles (nEP) and node Theoretic-Foundations (nTF), particularly, nEP1-nTF1 and nEP2-nTF2 of the node-based Evolutionary Computing Paradigm (nECP) and the proposed ideal ECP, a workgroup-based Evolutionary Computing Paradigm (wECP) can be established to eliminate all the nECP limitations and weaknesses and continue the computing evolutionary pathway by upgrading the 2-link-typed (i.e., internal links and network links) network-capable node-core entities/systems with the third workgroup-link typed devices into integrable computing machineries to construct the workgroup-linked Computing Components (wCC) in the first and earliest stage of wEP1-wTF1, starting the workgroup computing evolution.

1.0 wEP1/wTF1:

In view of the fail-over weakness of nEP1-nTF1, wEP1 is focused on a "workgroup fail-over architecture" and its derived wTF1 comprises the Hardware Architecture Theories (HAT) with Hardware Construction Methods (HCM) in creating early stage "fail-over-capable" workgroup-linked computing components (wCCs) and with Hardware Aggregation Methods (HAM) in aggregating these basic-few wCCs into standard fail-over workgroup-linked computing modules (wCMs).

2.0 wEP2/wTF2:

In view of the weak 3-nBBB evolutionary architecture of nEP2, wEP2 is focused on a "base/mid/top bottom-up hierarchical six workgroup-linked Basic-Building-Block (6-wBBB) based evolutionary architecture." Its derived wTF2 comprises for the first-time Hardware Architecture Theory (HAT) with Hardware Construction Methods (HCM) for constructing these 6 wBBBs with wCCs and wCMs, and with Hardware Aggregation Methods (HAM) for aggregating them into a 3-level (base-mid-top) fail-over workgroup Hierarchical Core Structure (wHCS) via various workgroup linkages.

Also, for the first-time Generic "workgroup-core" Entity (wEntity)-oriented Software Architecture Theorem (SAT) with Generic wEntity-Integration Methods (EIM) for creating Generic wEntity-oriented Operating Systems (OS), (including base-attribute/fail-over-OSs, mid-memory traffic/fail-over-OSs, top-control manipulation/fail-over-OSs), to bottom-up-integrate 3-level "fail-over" wHCS into a "fail-safe" Generic workgroup Core wEntity, and with Generic workgroup Entity-Programming Methods (EPM) for generating Generic wEntity domain programs to equip the first-time fail-safe Generic workgroup core wEntity with fail-safe workgroup Core Entity Domain that is embedded with top-down core-control software capabilities.

Furthermore, the workgroup-linked 6-wBBB-based evolutionary architecture can enable iterative progressive processes, meaning that any newly created hardware core structures can readily become fail-over wCMs to construct the next 6 wBBBs for the next iteration (i.e., a new set of wHATs and wSATs to create even bigger and more sophisticated workgroup core entities). This iterative progressive process never needs to stop and can be dubbed as the "workgroup evolutionary process."

3.0 wEP3/wTF3:

The wEP3 is thus focused on the long-lasting workgroup evolutionary processes to accommodate all the real-world class-1 innate-unitary, class-2 collaborative-zone and class-3 cooperative-cloud problem-solving domains. The workgroup evolutionary processes will cover 7-generations to create a plurality of workgroup wEntities to accommodate the following 7-level real-world service-oriented problem-solving domains. They are (1) multi-function-based production domains, (2) multi-production-based assembly domains, (3) multi-assembly based fabrication domains, (4) multi-fabrication-based transaction domains, (5) multi-transaction-based organization-centric unitary/zone/cloud business-service domains, (6) multi-business-service-based apparatus-centric unitary/zone/cloud user-service domains and (7) multi-user-service-based personal digital assistant (PDA)-centric unitary/zone/cloud individual-service domains.

Therefore, the first-generation evolution of wEP3 is to establish a workgroup-production Evolutionary Architecture (EA) with its derived wTF3.wG1.stages (HATs/SATs), creating a series of multi stage-evolved Task-production wEntities.

Moreover, when all the possible sophisticated Task-production wEntity are created, it is only natural to use these first generation Task-production wEntities as the basic "fail-over-3" wCMs, to create a new set of standard fail-over wCMs for constructing a new set of 6 wBBBs. Based on a new evolutionary process with a new set of HAT/SAT, multiple Task-production wEntities can be bottom-up symbiotically integrated into the first-time "Job-assembly" wEntities along the first evolutionary stage in the second workgroup evolutionary generation.

Therefore, the wEP3-derived wTF3 comprises not only the multiple-stage evolutionary process-generated HAT/SAT-based methodologies, but also up to the seventh workgroup generation-based evolutionary process-generated wG1-HAT/SAT to wG7-HAT/SAT. In general nomenclature description, the wG.s-(HAT/SAT) evolutionary processes can be used to describe the creation of all the theoretic workgroup core entities (wEntities) populated on the real-world workgroup evolutionary pathway along the workgroup evolutionary timeline.

4.0 the Must have New and Better wECP

Furthermore, based on workgroup-Core wEntity System Disciplines wCE-SD(1-3), all the 7-generation theoretically evolved generic workgroup core wEntities from the smallest to the largest, can be scientifically designed, technologically developed and engineering-deployed into 7-generation specialized workgroup core wEntity systems for accommodating real-world Class-1-unitary-core innate-problem solving, Class-2-zone-core collaborative-problem solving and Class-3-cloud-virtual-core cooperative-internet-oriented problem solving. There are (1) the first workgroup generation (wG1) workgroup-production-based Task-core unitary systems, as illustrated by FIG. 8; (2) the second workgroup generation (wG2) workgroup assembly based Job-core unitary systems; (3) the third workgroup generation (wG3) workgroup-fabrication-based Case-core unitary systems; (4) the fourth workgroup generation (wG4) workgroup-transaction-based Contract-core unitary systems, as illustrated by FIG. 9; (5) the fifth workgroup generation (wG5) workgroup-organization-based unitary/zone/cloud systems; (6) the sixth workgroup generation (wG6) workgroup-apparatus-based unitary/zone/cloud systems; and (7) the seventh workgroup generation (wG7) workgroup-PDA-based unitary/zone/cloud systems, as illustrated in FIG. 10, which also shows that the workgroup evolutionary processes can still potentially advance into the eighth workgroup generation evolutionary pathway along the workgroup evolutionary timeline, if necessary.

Based on the illustrations by FIGS. 8/9/10 and the rationale of generic computing nomenclature illustrated by FIG. 7, the nomenclature for workgroup Evolutionary Computing Paradigm (wECP) can be established with five fundamentals, comprising principles, theories and system disciplines, which can be concluded as follows: (1) workgroup-entity evolutionary principles (wEPs), (2) workgroup-entity theoretic foundations (wTFs), (3) workgroup Science/Technology/Engineering unitary System Disciplines (STE-uSDs), (4) workgroup Engineering zone System Disciplines (E-zSDs) and (5) workgroup Engineering cloud System Disciplines (E-cSDs).

In short-form expression, wECP=Period-1 {wEP1-wTF1 (wHAT1)-wSD1s}+Period-2 {wEP2-wTF2 (wHAT2+wSAT2)-wSD2s}+Period-3 {wEP3-wTF3.generation (1-7) .stages (wHAT3+wSAT3)-wSD3s (uSDs-zSDs-cSDs)}.

Guided by wECP, the right course of action is to break down, enhance and upgrade non-evolvable node-application systems with workgroup-linked devices into integrable workgroup computing machineries, which can be used to construct the 3-link-typed (i.e., internal links, network-links and workgroup-links) workgroup Computing Components (wCCs) and real-time fail-over workgroup Computing Modules (wCMs) in the first period along the workgroup computing evolutionary timeline.

Based on these fail-over wCMs, the first workgroup-computing-entity-based fail-safe/evolvable hardware core structure of 3-hierarchical-level 6-workgroup-Basic-Building-Block (6-wBBB), can be created to supplant the node-computing-entity-based non-fail-safe/limited evolvable von-Neumann core structure of 3-hierarchical-level 3-node-BBB, (i.e., base-level IO-devices/mid-level main memory/top-level CPU) and all the first-time generic fail-safe workgroup-core wEntities and specialized wSystems can be subsequently generated in the second period along the workgroup-computing evolutionary timeline.

Furthermore, based on the first 6-wBBB evolvable architecture, the workgroup evolutionary processes can go up to 7 generations in creating standard workgroup-computing core wEntities from the smallest to the largest. They are (1) wG1 workgroup production unitary-core Task wEntities, (2) wG2 workgroup-assembly unitary-core Job wEntities, (3) wG3 workgroup-fabrication unitary-core Case-wEntities, (4) wG4 workgroup-transaction unitary-core wEntities, (5) wG5 workgroup-enterprise/organization standard unitary-core/zone-core/virtual cloud-core wEntities, (6) wG6 workgroup-apparatus compact unitary-core/zone-core/virtual-cloud core wEntities and (7) wG7 workgroup-PDA miniature unitary-core/zone-core/virtual cloud-core wEntities. Consequently, all the 7-generation workgroup-core wSystems can be generated via 7-generation workgroup system disciplines in the third period along the workgroup-computing evolutionary timeline.

5.0 the Advantage of wECP

The nECP that generates all the application-based unitary/zone/cloud systems for providing internet-oriented services with unresolvable weaknesses in security, reliability and proactivity is bound to shift to the wECP that can generate real-time "innate-intelligent" workgroup-unitary systems, real-time "strong-AI" (artificial-intelligent) workgroup-zone systems and real-time "strong-SI" (swarm-intelligent) workgroup-cloud systems for providing internet-oriented services for any individual, anytime and anywhere with real-time security, real-time reliability and real-time proactivity, fending off hacking, guaranteeing trustable integrity and protecting user's privacy.

6.0 the Disclosure of wECP-wTF(1-3)

It will thus be concluded that the new and better workgroup Evolutionary Computing Paradigm (wECP) that comprises wEP(1-3)-(EAMs), wTF(1-3)-(HATs/SATs) and wSD3-(STE-uSDs/E-zSDs/E-cSDs), can be established to supplant the node Evolutionary Computing Paradigm that comprises nEP(1-3)-(EAMs), nTF(1-3)-(HATs/SATs) and nSD3-(STE-uSDs/E-zSDs/E-cSDs), generating non-evolvable 2-link-typed hardware structures installed with network Operating Systems (nOS), application programs and application databases, and yielding Application Infrastructure Systems' (AIS) drawbacks and unsolvable transactional security and privacy dilemmas.

It can also be concluded that the most important part of wECP is the second framework (i.e., wTF(1-3)), which are derived from workgroup evolutionary principles wEP(1-3) that are embedded with rational 3-link-typed evolutionary philosophy on the must-have workgroup fail-over and fail-safe evolutionary architectures based on workgroup-links.

The first and foremost innovation about workgroup computing should be focused on wTF(1-3)-based workgroup Hardware Architecture Theories (wHATs) with its related methodologies, which solidify the concept that every bigger workgroup core entity's hardware structure must first be created by a workgroup evolutionary Hardware Architecture Theory (HAT). Then, based on these created workgroup hardware structures, all the ensuing workgroup OS integration and workgroup software programs generation can be developed via workgroup core entity duality-dictated Software Architecture Theorems (wSATs), thereby creating generic workgroup-core wEntities. Furthermore, real-time intelligent workgroup-core wSystems can be generated via generic wEntity-based system disciplines.

BRIEF DESCRIPTION OF THE DRAWINGS

So that the manner in which the above-recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit other equally effective embodiments.

1.0 nECP: Node Evolutionary Computing Paradigm

Figure 1:
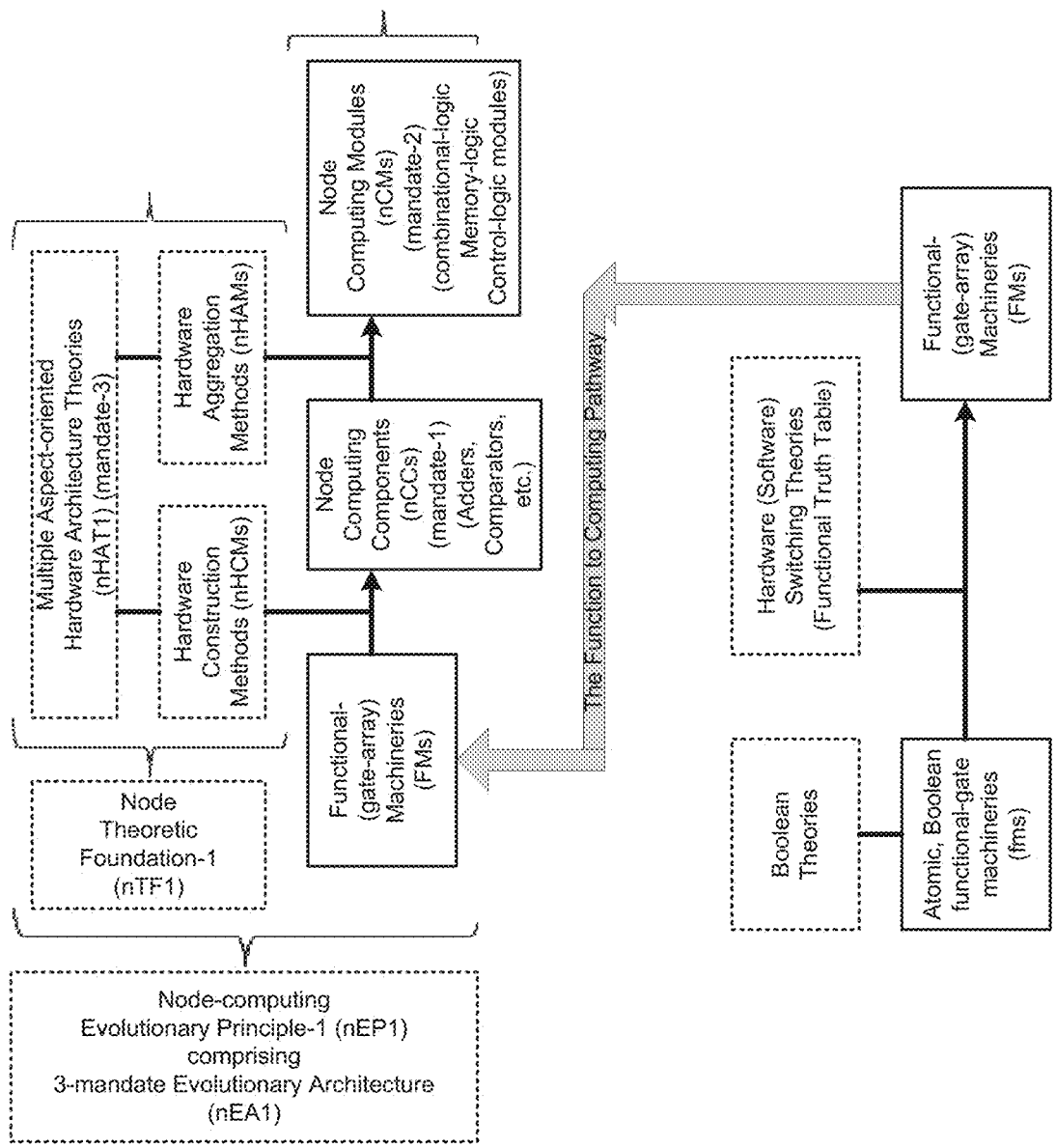

FIG. 1 is a block diagram depicting an exemplary embodiment of the current disclosure of a computer system with node computing components and node computing modules where nEP1: (3-mandate)-nEA1 and derived nTF1: (Mandate-3)-nHAT1, creating node-Computing Components (nCCs) and node-Computing Modules (nCMs).

Figure 2:
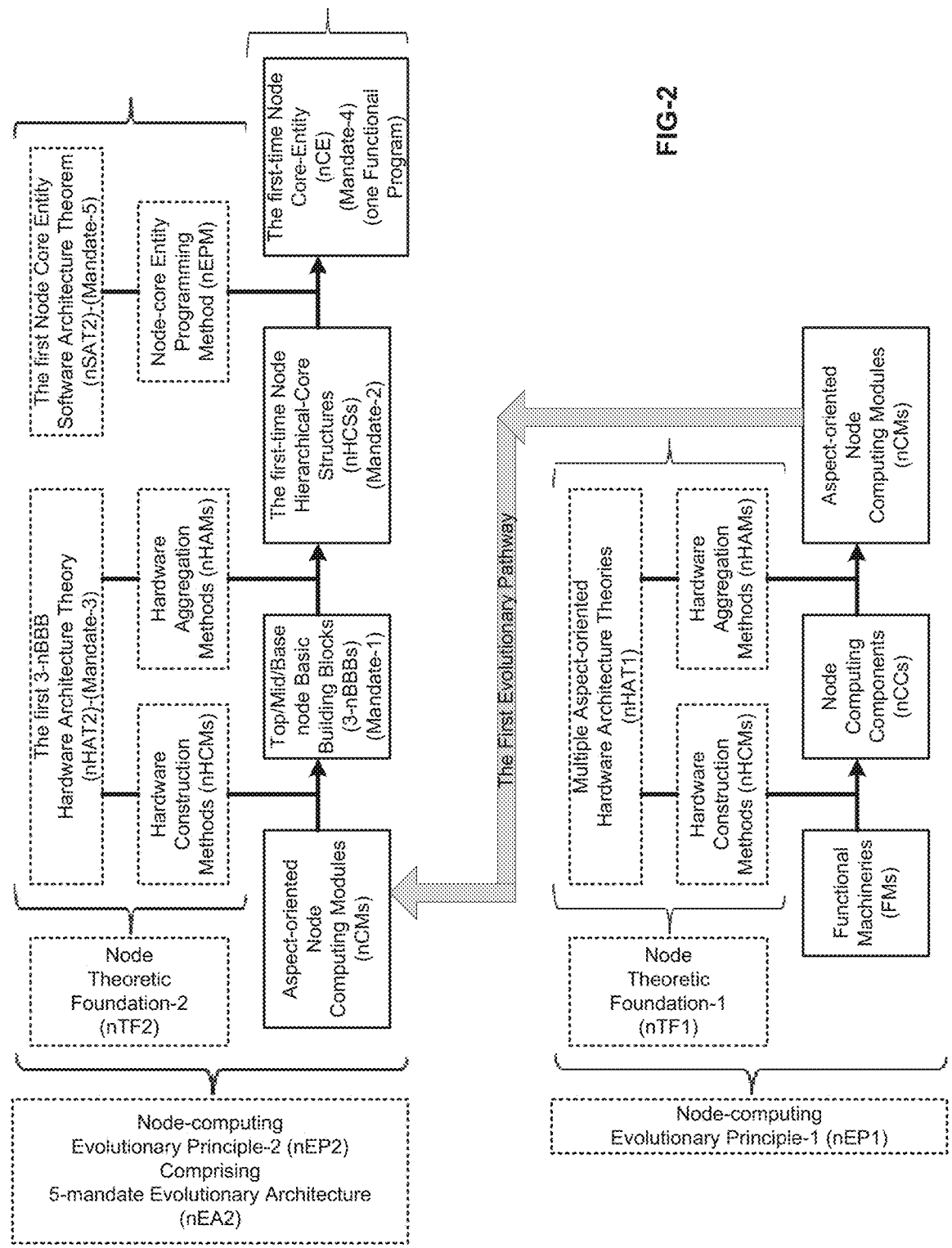

FIG. 2 is a block diagram showing an exemplary embodiment of the current disclosure of a computer system with node hierarchical core structure and node core entities where nEP2: (5-mandate)-nEA2 and derived nTF2: (Mandate-3)-nHAT2+(Mandate-6)-nSAT2, creating 3-nBBBs, node Hierarchical Core structure (nHCS) and node-Core Entities (nCEs).

Figure 3:
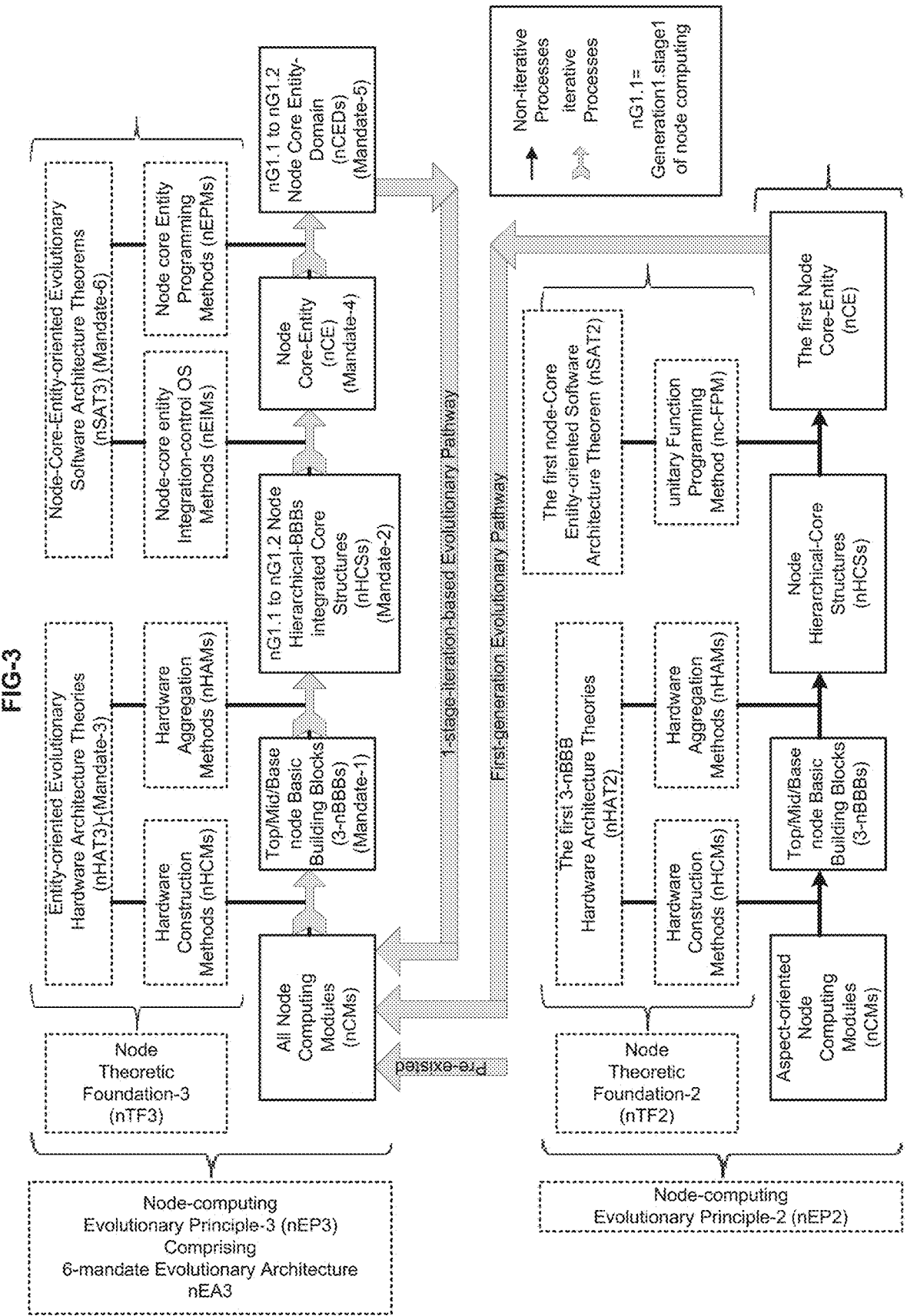

FIG. 3 is a block diagram illustrating an exemplary embodiment of the current disclosure of a computer system with node core entities and node core entities domains where nEP3: (6-mandate)-nEA3 and derived nTF3: (Mandate-3)-nHAT3+Mandate-6)-nSAT3, creating 3-nBBBs, nHCSs, node-Core Entities (nCEs) and node Core-Entity Domains (nCEDs).

Figure 4:
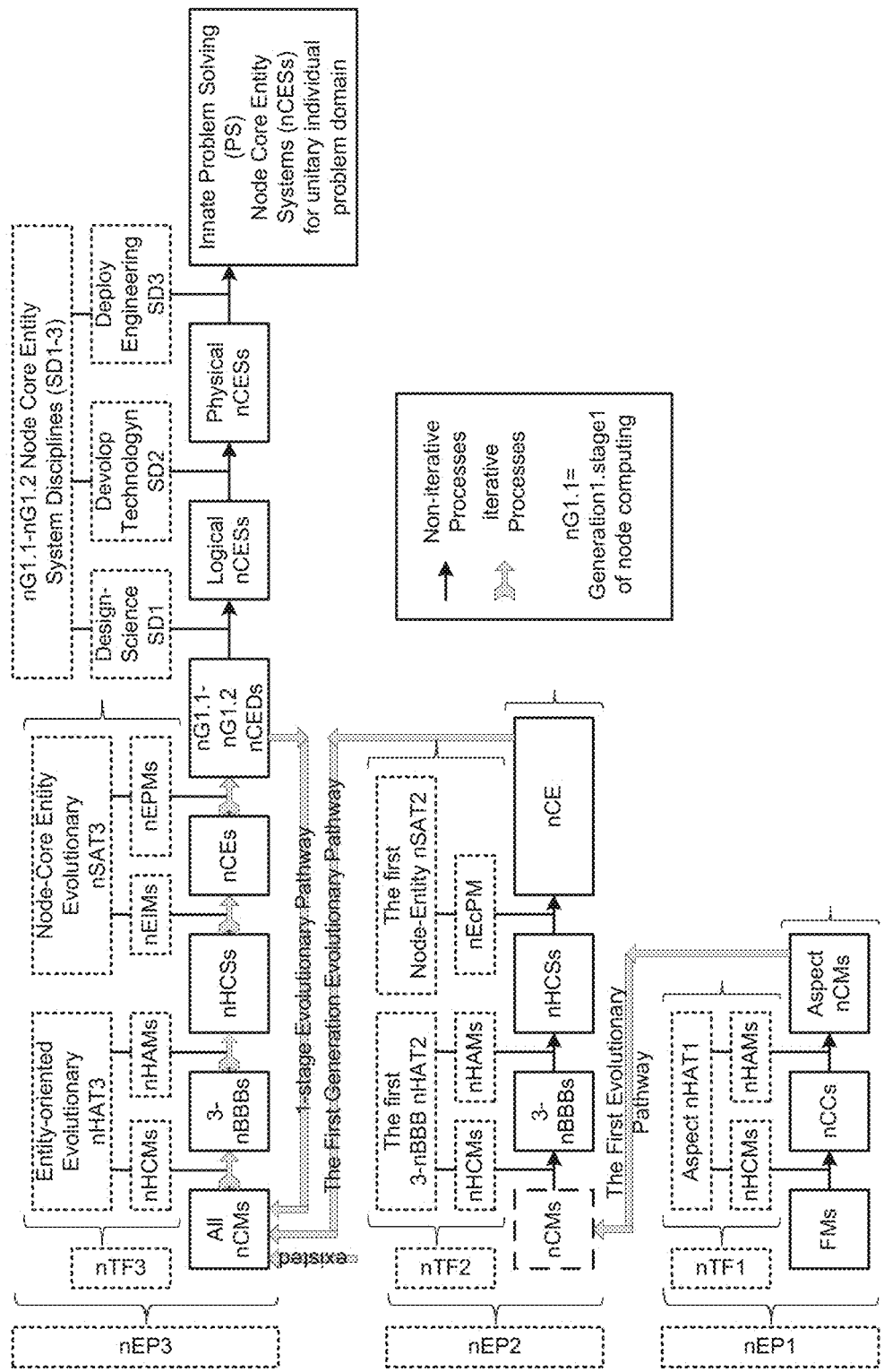

FIG. 4 is a block diagram showing an exemplary embodiment of the current disclosure of a computer system with node core entity systems for innate problem solving where nEP3: nTF3 and derived node-core Entity System Disciplines (nCE-SD), creating node-core Entity Systems (nCESs) for innate problem solving.

Figure 5:
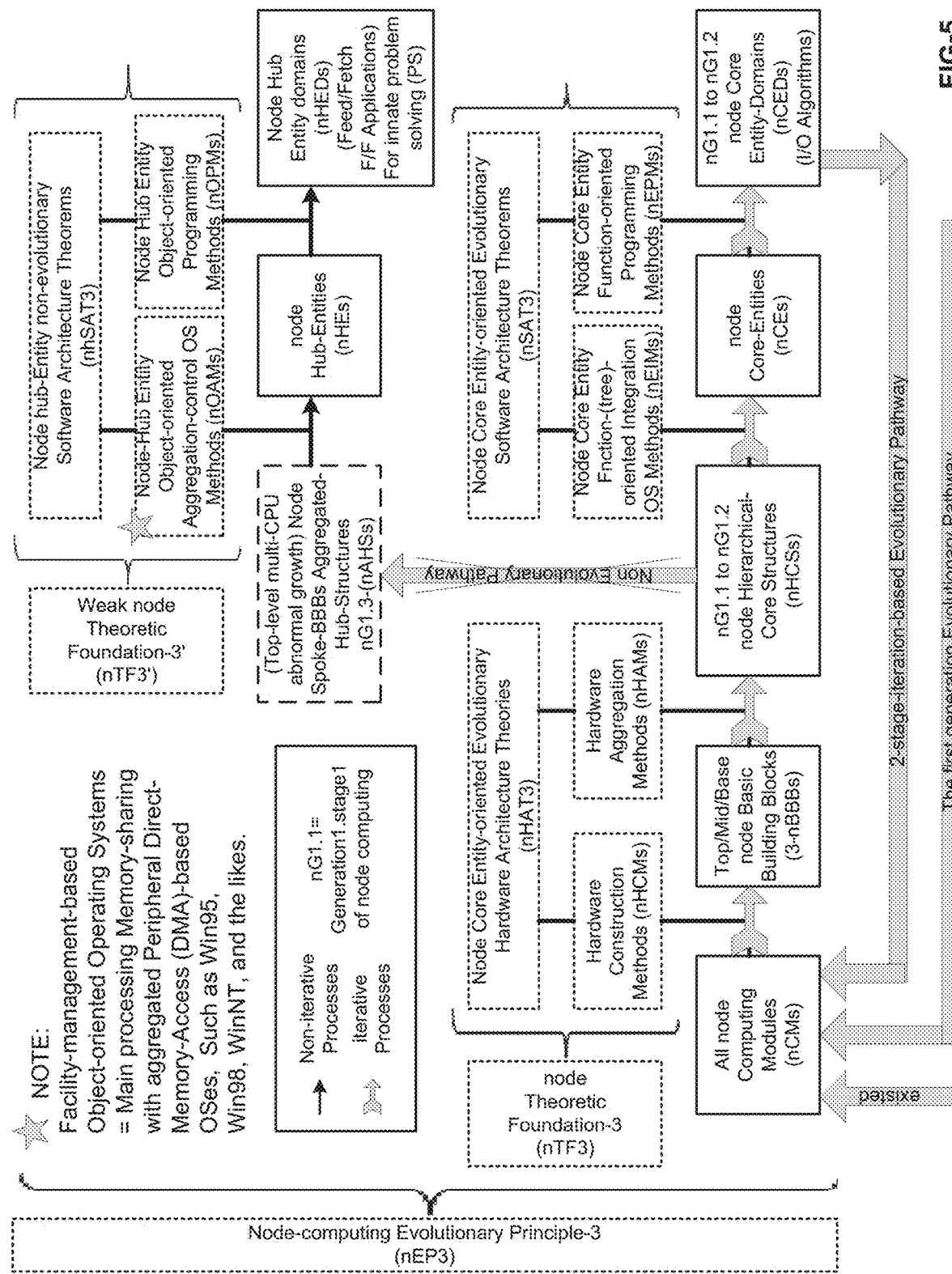

FIG. 5 is a block diagram depicting an exemplary embodiment of the current disclosure of a computer system of Non-evolutionary object-oriented methods using during node-Generation1.stage3 (nG1.3), creating node-Aggregated-Hub-Structures (nAHSs), node-Hub Entities (nHEs) and node-Hub Entity Domain (nHEDs) with (pre-developed/injected) application programs for pre-defined problem solving.

Figure 6:
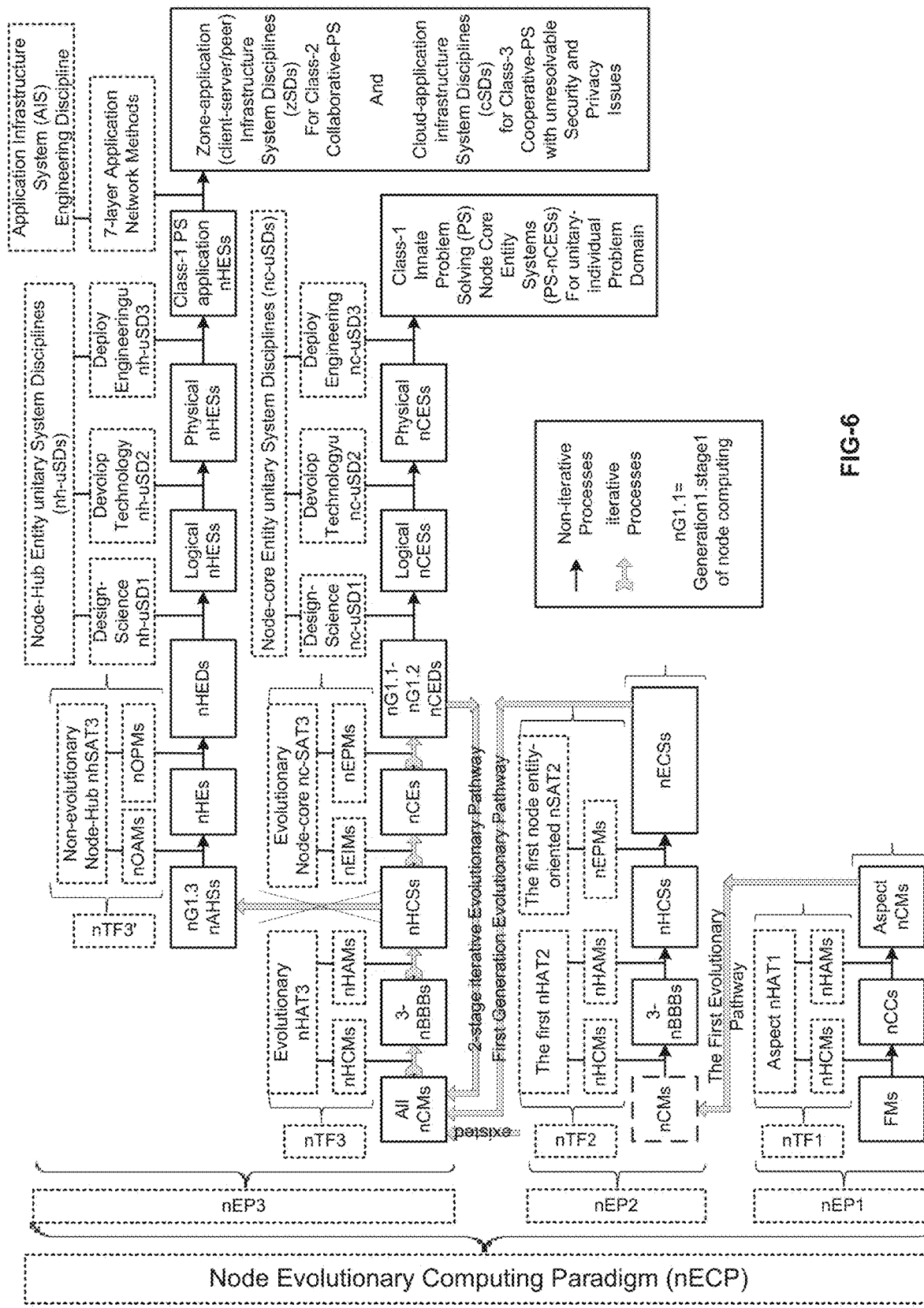

FIG. 6 is a block diagram of an exemplary embodiment of the current disclosure of a computer system where nECP and its cessation of evolution (no further evolutionary pathway), creating object-oriented Class-1 injected-Problem-solving-application unitary-Hub-entity Systems with applications, Class-2-collaborative-Problem solving application zone-infrastructure (entity) Systems (i.e., Zone-application infrastructure systems) and Class-3-cooperative-problem solving application cloud-infrastructure Systems (i.e., Cloud-Application infrastructure systems).

2.0 wECP: Workgroup Evolutionary Computing Paradigm

Figure 7:
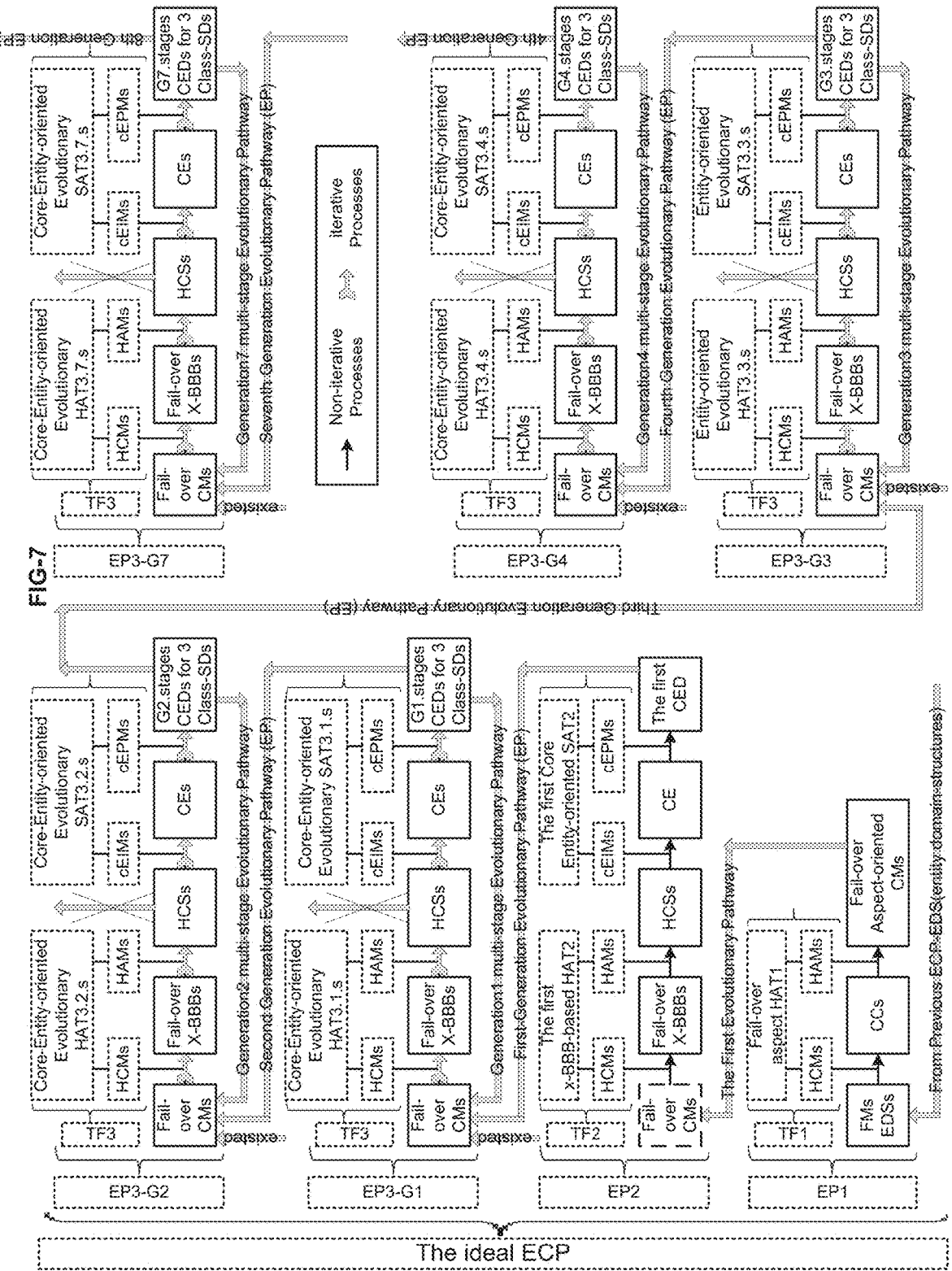

FIG. 7 is a block diagram illustrating an exemplary embodiment the current disclosure of ECP with long-lasting evolutionary processes, comprising EP1, EP2 and EP3-Generations.stages evolved Core-Entities and Core-Entity Domains (CEDs).

Figure 8:
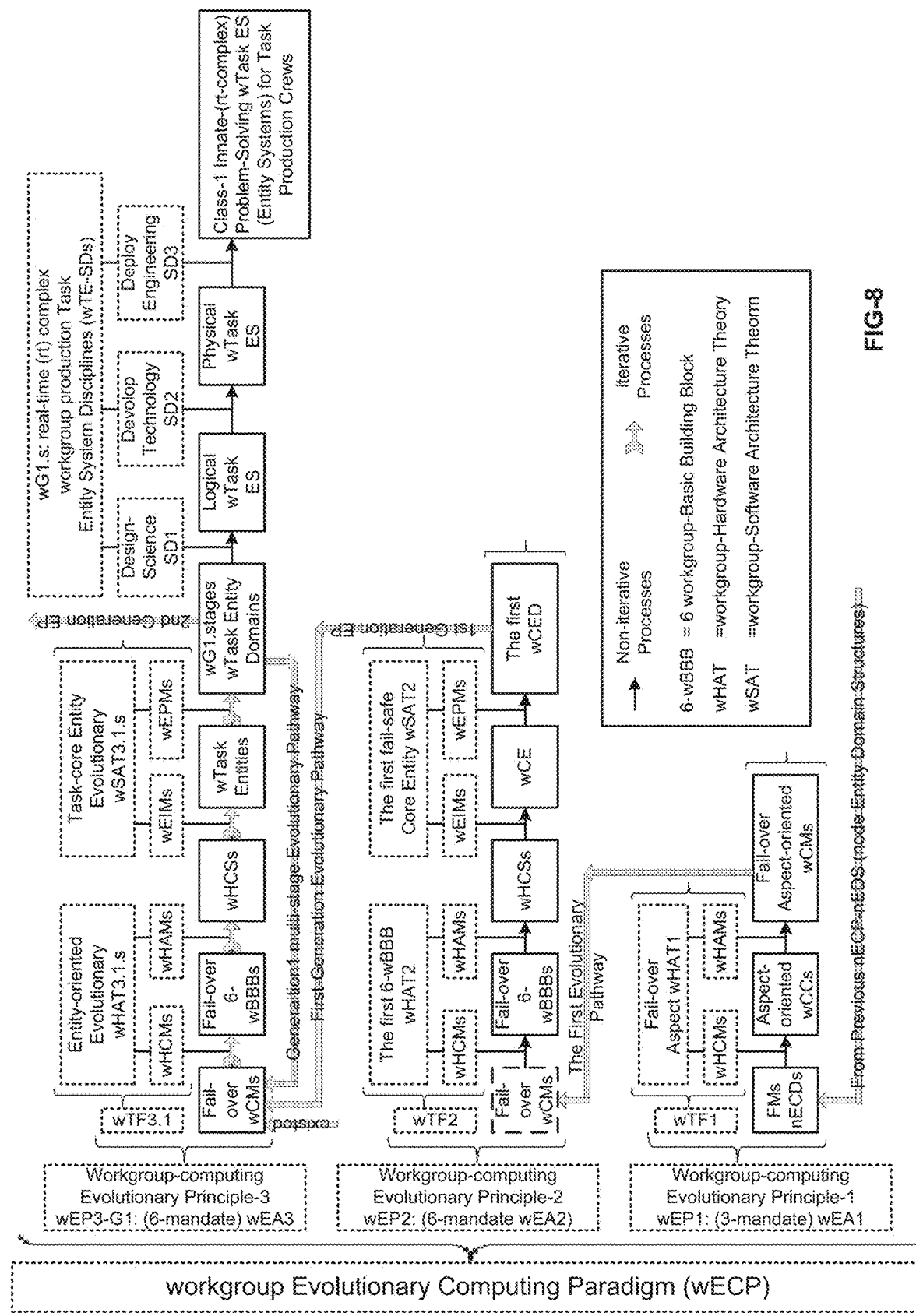

FIG. 8 is a block diagram depicting an exemplary embodiment of the current disclosure of workgroup ECP (wECP) up to workgroup-Generation1.stages (wG1.s) wEntities and Class-1 wEntity Systems.

Figure 9:
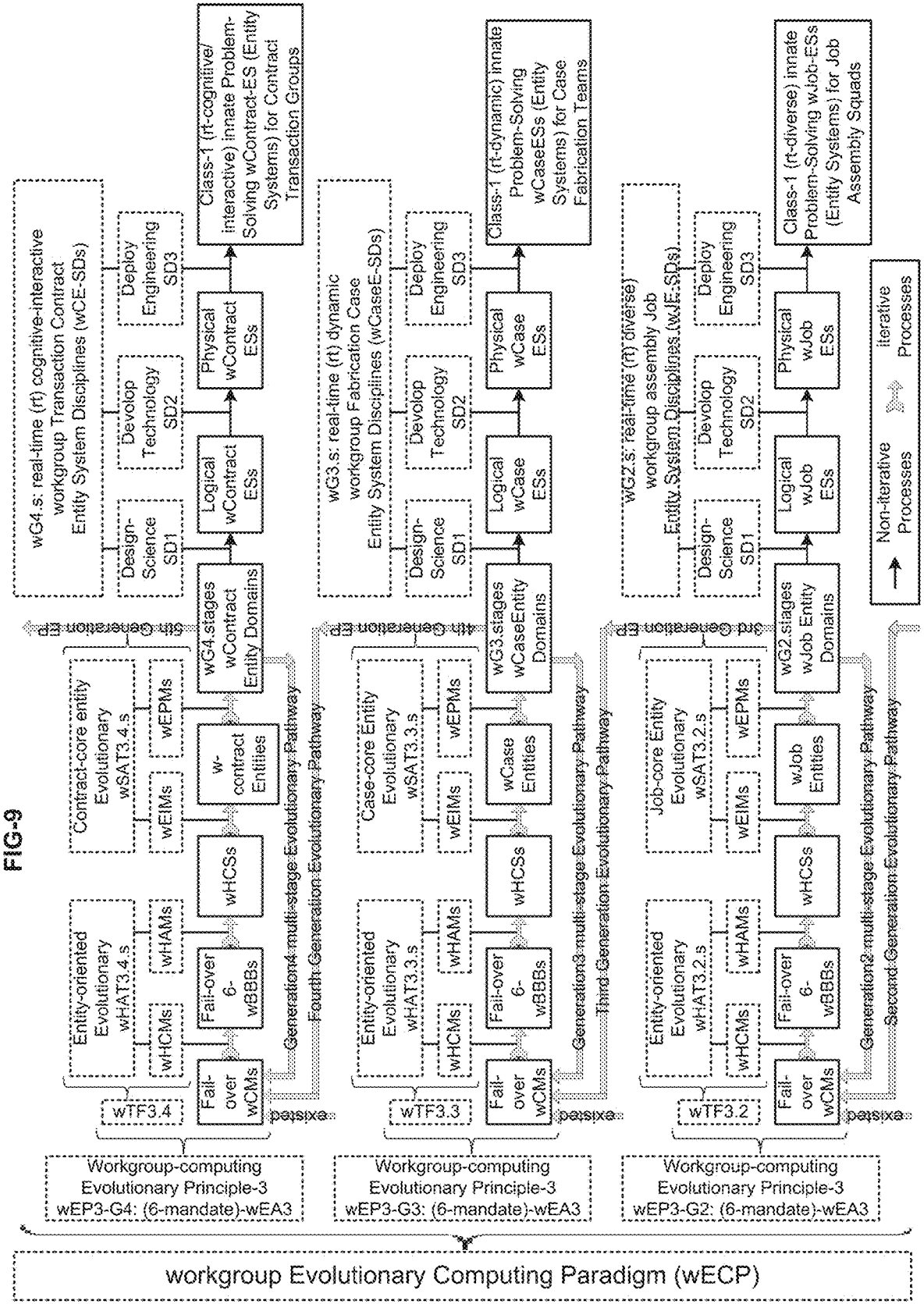

FIG. 9 is a block diagram showing an exemplary embodiment of the current disclosure of workgroup ECP (wECP) up to workgroup-Generation4.stages (wG4.s) wEntities and Class-1 wEntity Systems.

Figure 10:
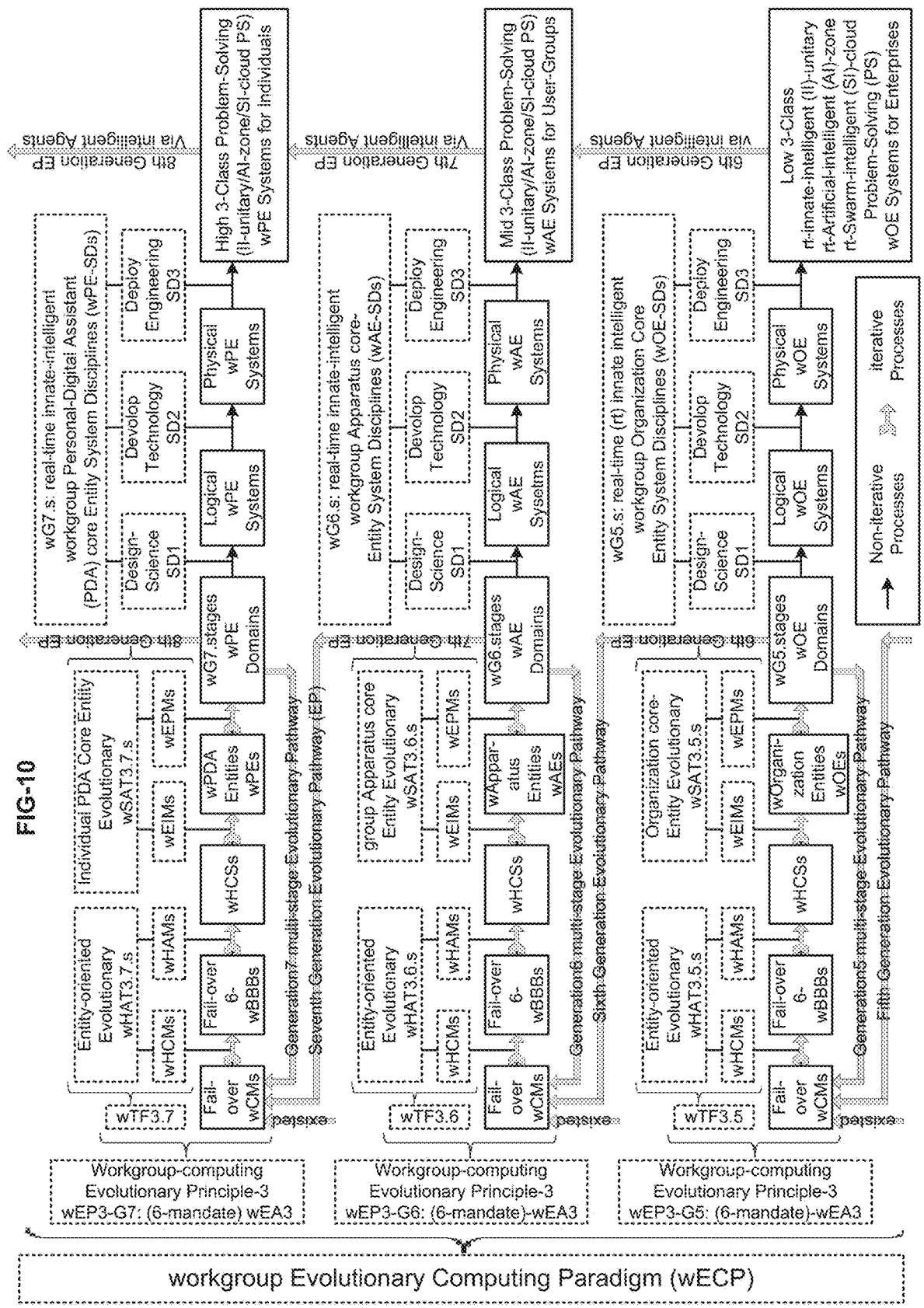

FIG. 10 is a block diagram illustrating an exemplary embodiment of the current disclosure of workgroup ECP (wECP) up to the future Generation7.stages (wG7.s) wEntities and Class-1, 2, 3 wEntity Systems.

3.0 wEP1-(wfo) EA1/TF1-HAT (HCM+HAM)

FIG. 11 is a block diagram illustrating an exemplary embodiment of the current disclosure of a Self-managing fail-over expandable Workgroup Server Array (WSA), defining workgroup-Ethernet-link (w1), workgroup-server-link (w2) and workgroup-peer-to-peer link (w3) and creating TeamProcessors, TeamPanels and TeamServers.

FIG. 12a is a block diagram depicting an exemplary embodiment of the current disclosure of (w2)-aWSA1=(w2)-directional attribute-based Workgroup Server Array (i+2)-type1 with expandable i-parameter.

FIG. 12b is a block diagram showing an exemplary embodiment of the current disclosure of (w2/w3-hybrid)-aWSA2=directional/bi-directional attribute-based Workgroup Server Array (i+2)-type2.

FIG. 13a is a block diagram illustrating an exemplary embodiment of the current disclosure of (w2)-mWSA1=(w2)-directional 2 (multi-strand)-sided memory-based WSA (3)-type1-version1.

FIG. 13b is a block diagram depicting an exemplary embodiment of the current disclosure of (w2)-mWSA2=(w2)-directional 2 (multi-strand)-sided memory-coupling WSA (3)-type1-version2.

FIG. 13c is a block diagram showing an exemplary embodiment of the current disclosure of (w3)-mWSA3=(w3)-bi-directional 4 (single-strand)-sided memory-based WSA (3)-type2-version3.

FIG. 13d is a block diagram showing an exemplary embodiment of the current disclosure of (w3)-mWSA4=(w3)-bi-directional 2-(multi-strand)-sided memory-based WSA (3)-type2-version4.

FIG. 13e is a block diagram depicting an exemplary embodiment of the current disclosure of (w3)-mWSA5=(w3)-bi-directional 3-(multi-strand)-sided memory-based WSA (3)-type2-version5.

FIG. 13f is a block diagram illustrating an exemplary embodiment of the current disclosure of (w3)-mWSA6=(w3)-bi-directional 4 (multi-strand)-sided memory-based WSA (3)-type2-version6.

FIG. 13g is a block diagram showing an exemplary embodiment of the current disclosure of (w3)-mWSA7=(w3)-bi-directional memory-extending WSA (3)-type2-version7.

FIG. 13h is a block diagram illustrating an exemplary embodiment of the current disclosure of (w3)-mWSA8=(w3)-bi-directional 2 (multi-strand)-sided memory-bonding WSA (3)-type2-version8.

FIG. 14a is a block diagram depicting an exemplary embodiment of the current disclosure of (w2/w3-hybrid)-cWSA1=directional/bi-directional control-based WSA (i+2)-type1.

FIG. 14b is a block diagram showing an exemplary embodiment of the current disclosure of (w3)-cWSA2=(w3)-bi-directional control-based WSA (i+2)-type2.

4.0 wEP2-(w Fail-Safe) EA2/wTF2-HAT (HCM+HAM)

FIG. 15 is a block diagram depicting an exemplary embodiment of the current disclosure of the First 6 workgroup Basic-Building-Block (wBBB)-based (fail-safe) workgroup-Entity (wEntity).

FIG. 16 is a block diagram showing an exemplary embodiment of the current disclosure of 6-wBBB-based Workgroup-computing Evolutionary Processes, creating bigger and better fail-safe wEntities.

5.0 Wep3-(Wgn.s) Ea3/Tf3-Hat (Hcm+Ham)

Figure 17:
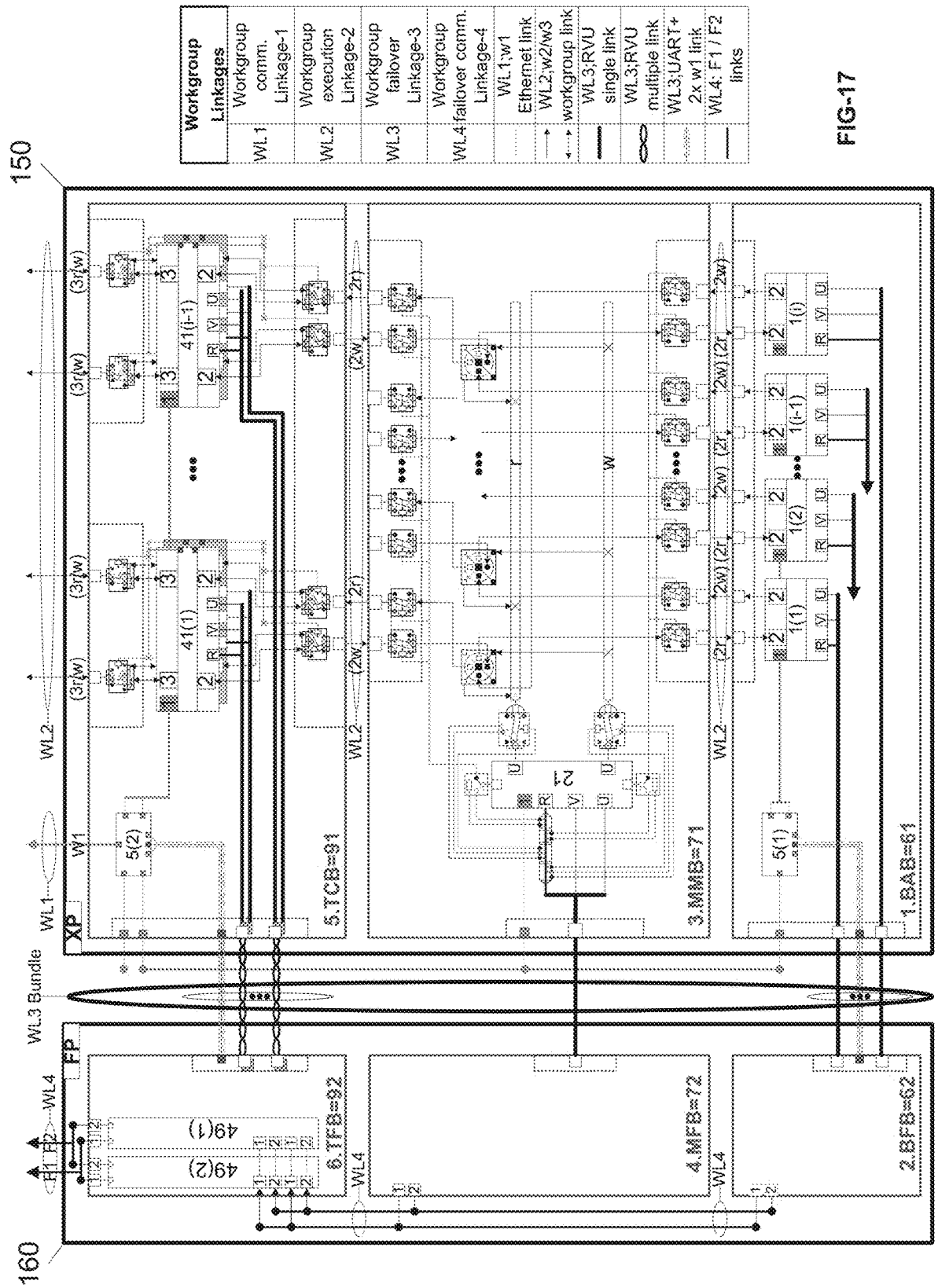

5.1 wGeneration-1 6-wBBB-evolved HCSs for building rt-complex Task wEntities/wSystems FIG. 17 is a block diagram showing an exemplary embodiment of the current disclosure of G1.1: Array(i) Task1-wEntity-based Hierarchical Core Structure (HCS) (Standard 1D Task1-Production Unit).

Figure 18:
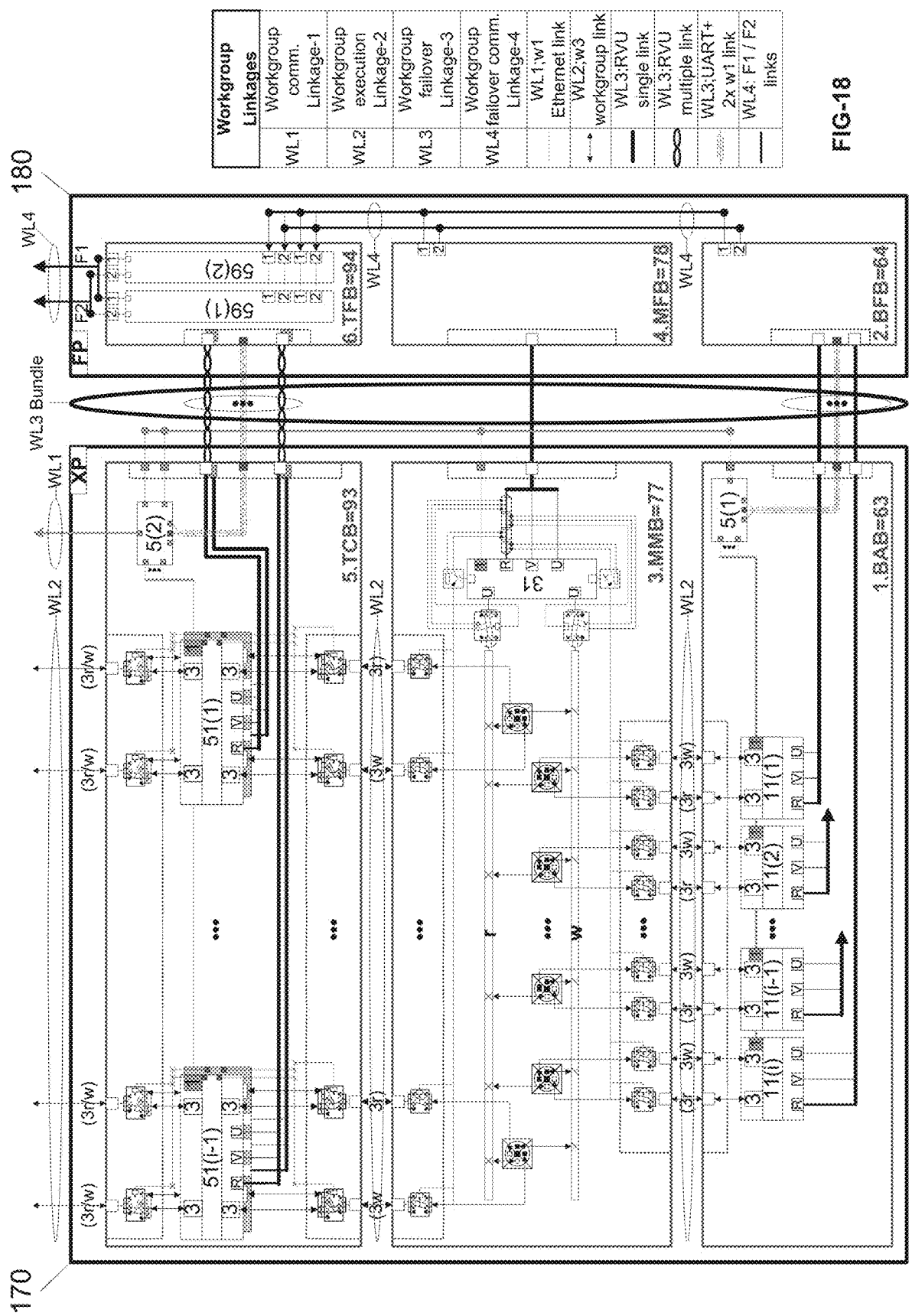

FIG. 18 is a block diagram illustrating an exemplary embodiment of the current disclosure of G1.2: Seg(i) Task2-wEntity-based Hierarchical Core Structure (HCS) (Standard 1D Task2-Production Unit).

Figure 19:
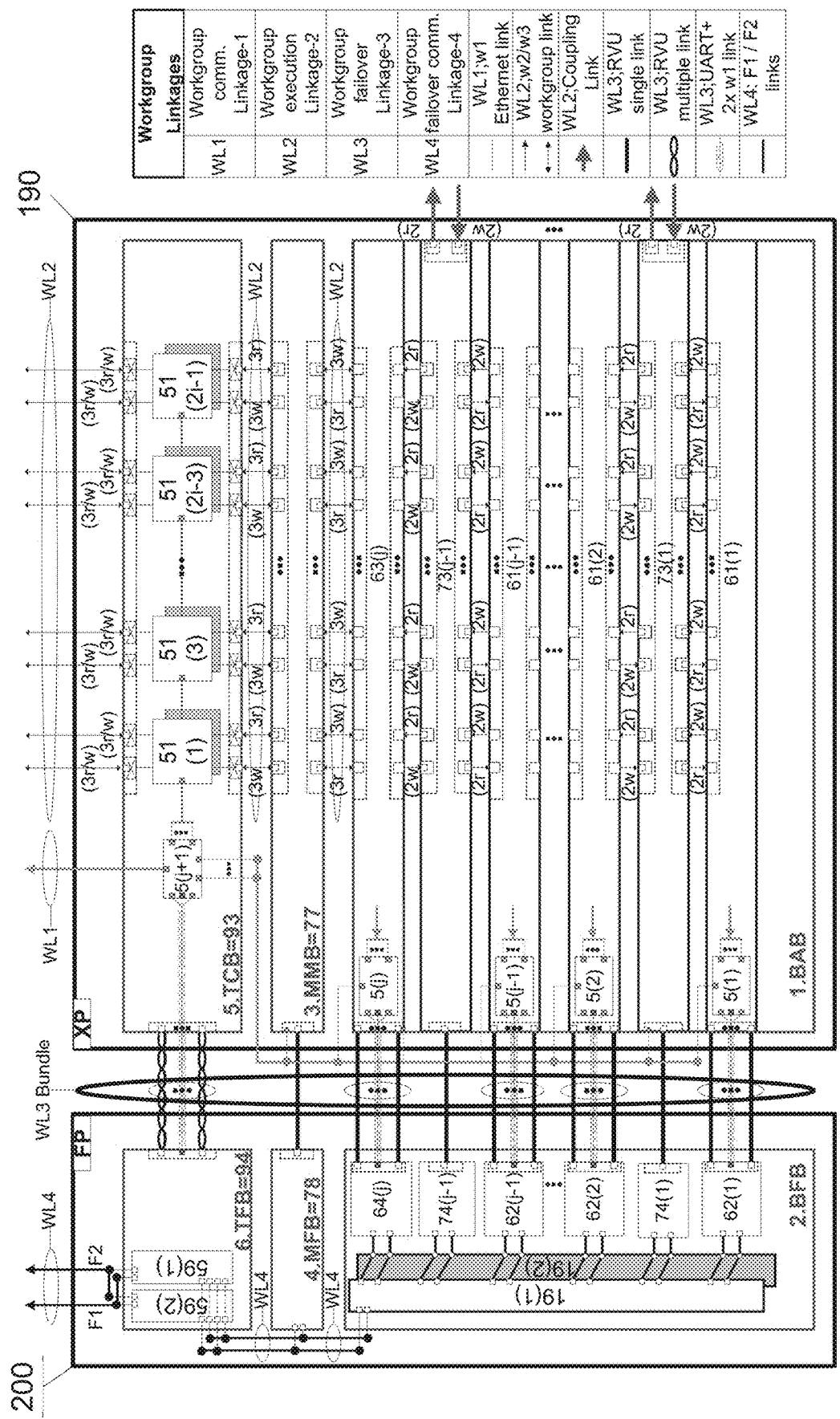

FIG. 19 is a block diagram depicting an exemplary embodiment of the current disclosure of G1.3: Matrix(i,j) Task1-wEntity-based Hierarchical Core Structure (HCS) (Standard 2D Task1-Production Unit).

Figure 20:
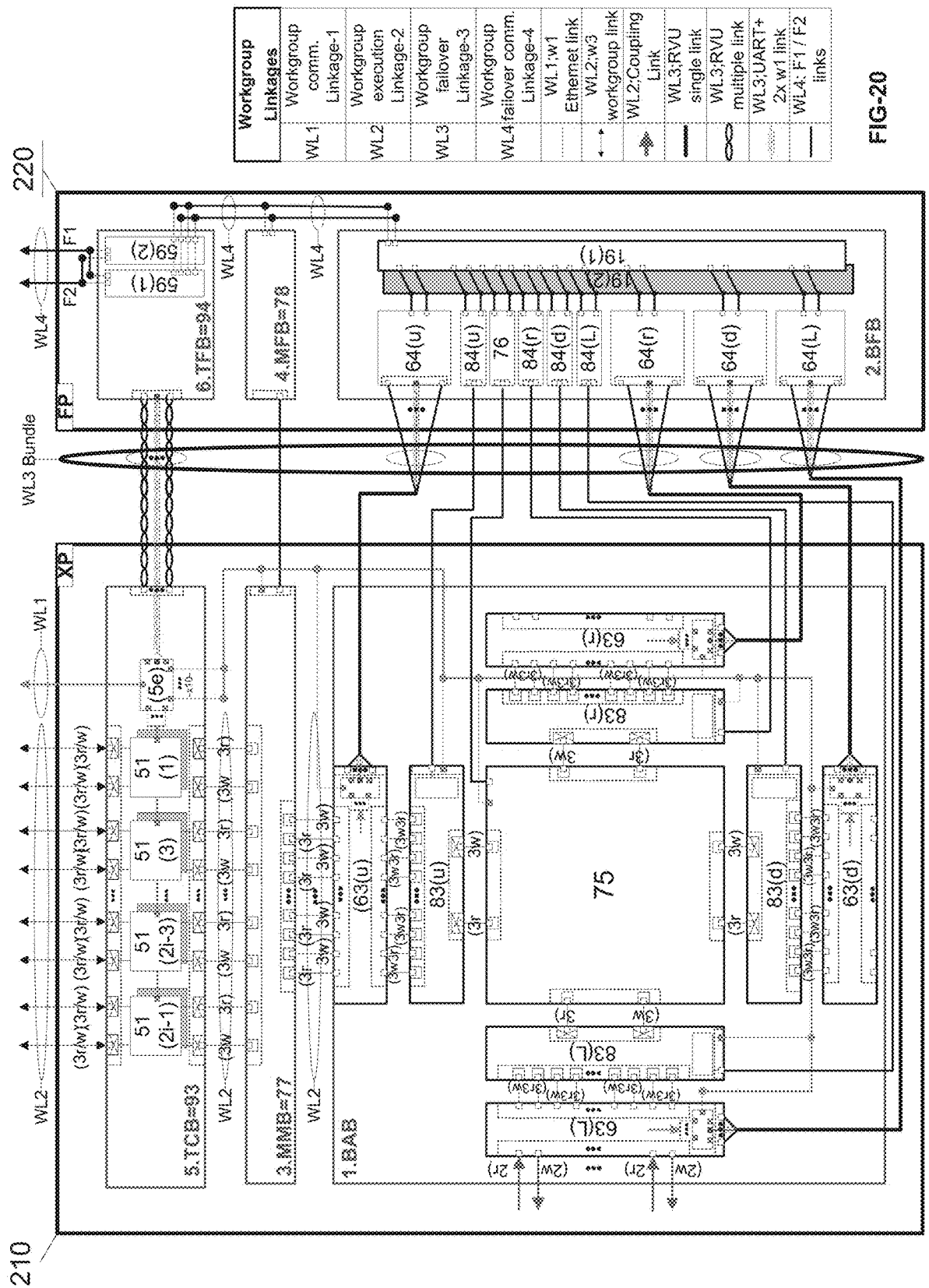

FIG. 20 is a block diagram showing an exemplary embodiment of the current disclosure of G1.4: Polygon(i,4) Task2-wEntity-based Hierarchical Core Structure (Standard 2D Task2-Production Unit).

Figure 21:
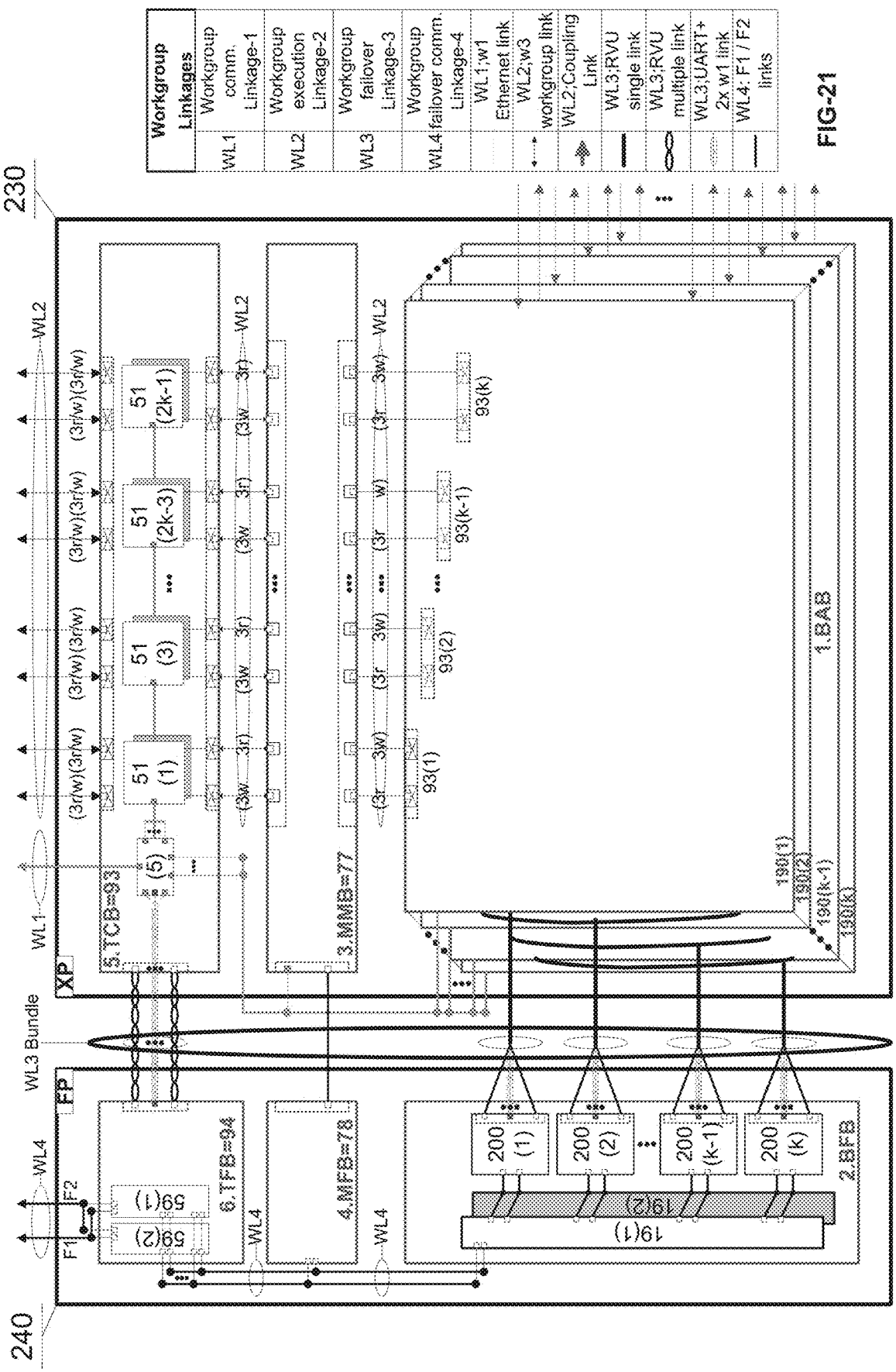

FIG. 21 is a block diagram illustrating an exemplary embodiment of the current disclosure of G1.5: Tie(i,j,k) Task1-wEntity-based Hierarchical Core Structure (HCS) (Standard 3D Task1-Production Unit).

Figure 22:
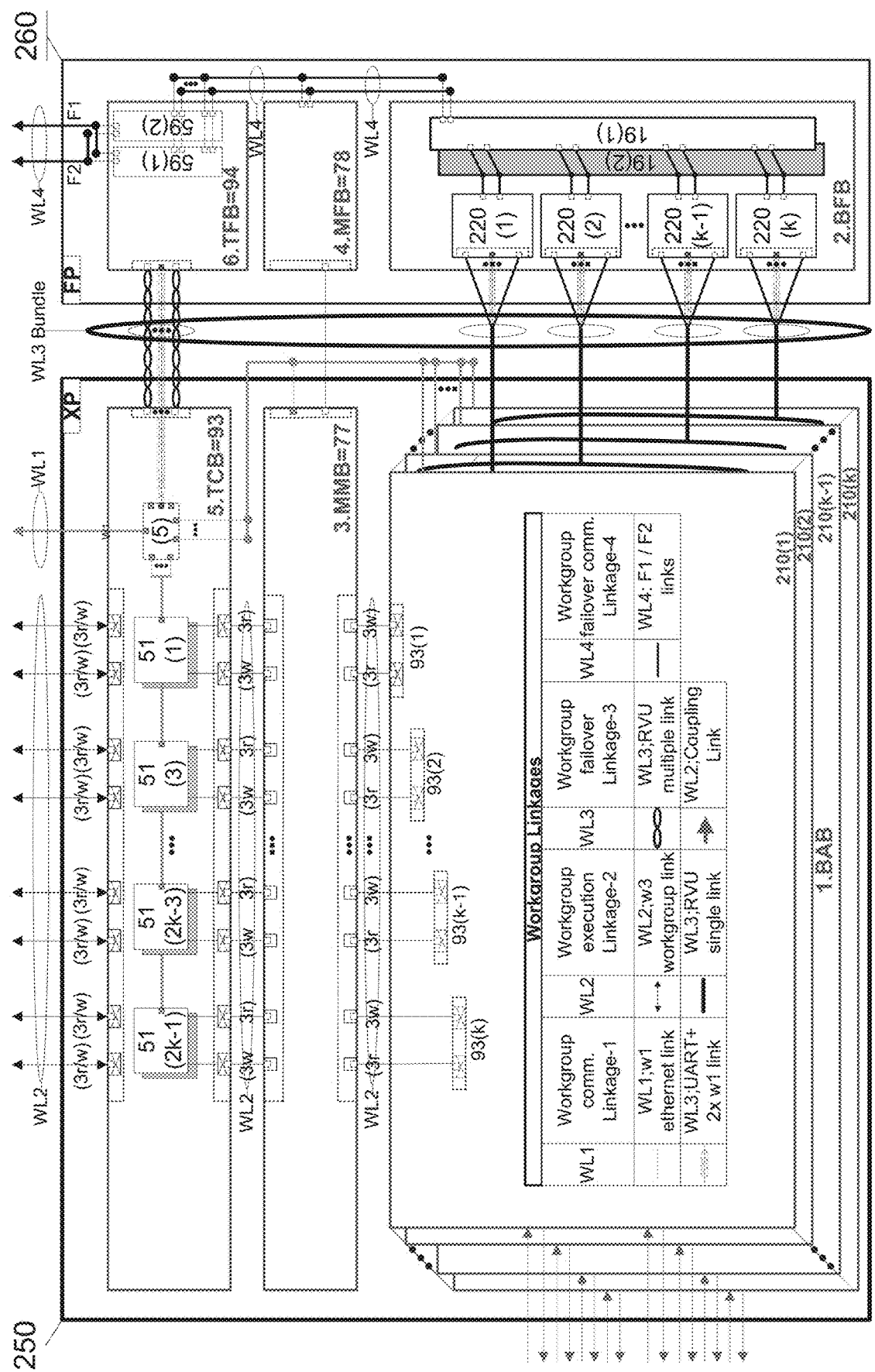

FIG. 22 is a block diagram depicting an exemplary embodiment of the current disclosure of G1.6: Align(i,4,k) Task2-wEntity-based Hierarchical Core Structure (HCS) (Standard 3D Task2-Production Unit).

Figure 23:
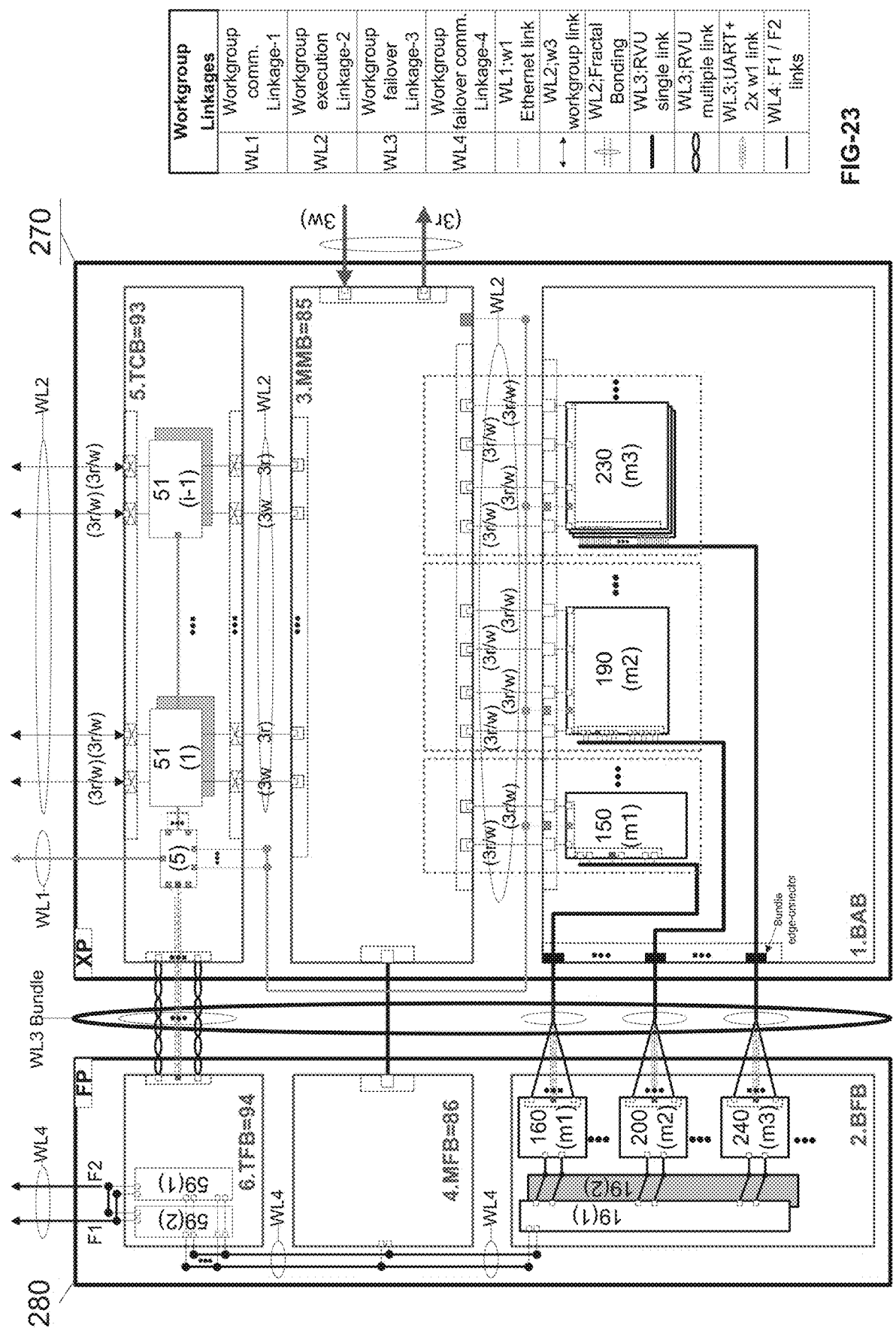

FIG. 23 is a block diagram illustrating an exemplary embodiment of the current disclosure of G1.7: Fractal1 Task1-wEntity-based Hierarchical Core Structure (Standard Poly3D Task1-Production Unit).

Figure 24:
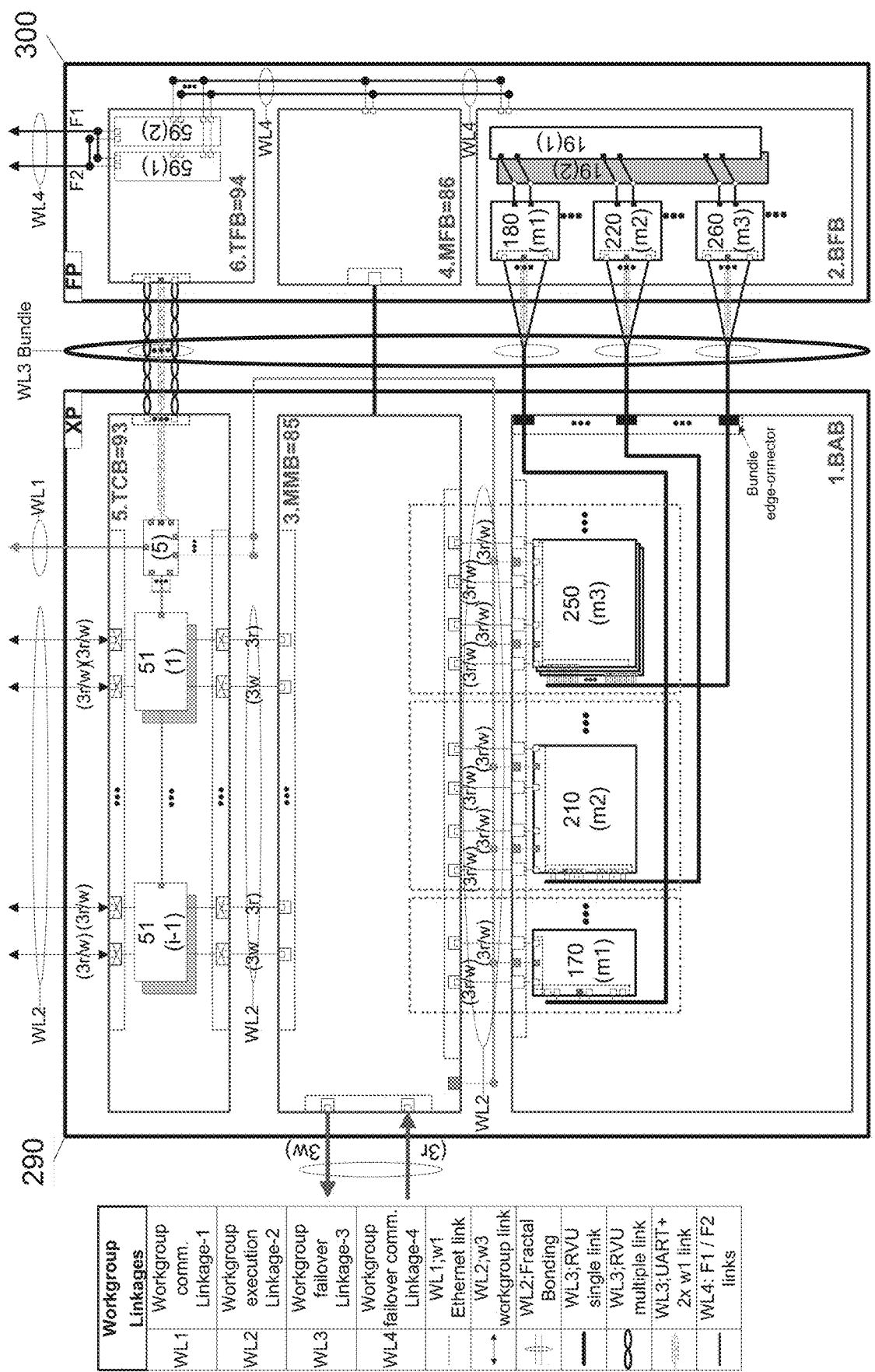

FIG. 24 is a block diagram showing an exemplary embodiment of the current disclosure of G1.8: Fractal2 Task2-wEntity-based Hierarchical Core Structure (Standard Poly3D Task2-Production Unit).

FIG. 25a is a block diagram showing an exemplary embodiment of the current disclosure of a workgroup-link-based workgroup-process operating system structure for a team-attribute-processor (TaP) and a team-memory-processor (TmP).

FIG. 25b is a block diagram showing an exemplary embodiment of the current disclosure of a workgroup-link-based workgroup-operation operating system structure for a team-control-processor (TcP)

FIG. 25c is a block diagram showing an exemplary embodiment of the current disclosure of task workgroup-attribute process program structures for TaP.

FIG. 25d is a block diagram showing an exemplary embodiment of the current disclosure of task workgroup-traffic processing program structures for TmP.

FIG. 25e is a block diagram showing an exemplary embodiment of the current disclosure of wG1 task workgroup-control operation program structures for TcP.

FIG. 25f is a block diagram showing an exemplary embodiment of the current disclosure of a task workgroup-control domain sentential management library for a TcP pair.

DETAILED DESCRIPTION OF THE INVENTION

A workgroup-computing-entity-based fail-safe/evolvable hardware core structure is disclosed, which includes a 3-hierarchical-level 6-workgroup-Basic-Building-Block (6-wBBB) created to supplant the node-computing-entity-based non-fail-safe/limited evolvable von-Neumann core structure of 3-hierarchical-level 3-node-BBB (i.e., base-level IO-devices/mid-level main memory/top-level CPU) and all the first-time fail-safe workgroup entity-core systems can be subsequently generated in the second period along the workgroup-computing evolutionary timeline. Furthermore, based on the first 6-wBBB evolvable architecture, the workgroup evolutionary processes can go up to 7 generations in creating standard workgroup-computing entity-based hardware hierarchical core structures (wHCSs), which are 3-link-typed (i.e., internal-links, network-links and workgroup-links) hardware evolvable structures where internal workgroup-linked devices can keep on expanding, increasing and integrating. Most importantly, they have better self-protecting security than any 2-link-typed (i.e., internal-links and network links) network hardware structures, due to the fact the workgroup-linked devices come in between the network-linked devices and the internal-linked devices, breaking down insecurity-prone OSI-7-based network-processes/internal-processes interconnect into top-4 network-processes/workgroup-processes interconnect and bottom-3 workgroup-processes/internal-processes interconnect, dubbed as Workgroup System Interconnect WSI-7.

This current disclose is also focused on how to utilize the 3-level wHCSs created in the first generation to accommodate 3-level conveyer-integrated workgroups in a production facility so that these workgroups can work collaboratively as one Task crew-entity. Moreover, by installing the 3-level 3-link-typed TeamProcessors in a 3-level wHCS with Task feedback-control operation-oriented OSs, Task operation programs and Task-operation and management libraries, a 3-level Task operation workgroup-computing Entity-oriented system (i.e., Task operation wEntity), can be established to support the Task crew-entity as a whole and provide fine-grained-proactive closed-loop-problem-solving (PS) operations for external users, collaborators and supervisors in a real-time concurrent and secure manner, abiding by the self-improving solution-domain PS-principle. While all the current 2-link-typed network structures, installed with network Input-output (TO) process-oriented network-OSs (i.e., Windows/Linux/Unix), Task application programs and application databases and supported by specialized workgroups, can only provide coarse-grained-reactive (cookie-cutting) open-end-problem-solving (PS) processes for external users in a time-sharing parallel and insecure manner, abiding to the fixated golden hammer-nails PS-paradox.

1.0 the Discovery of 5 Computing Facts Via the History of Computing

After reviewing the history of computing from the hardware architecture point of view, it can be concluded that node-computing did evolve from less sophisticated 3-nBBB architected nG1.1 node-core structures to more complex hierarchical 3-nBBB-architected nG1.2 node-core structures and then stopped at generation1 stage3 with multi-CPU node-hub structures. Before understanding why node-computing stopped evolving, it is imperative to analyze some underlying facts about the evolution of node computing, which can be summarized as follows.

1.1 the First Set of Facts: Duality-Based Computing Entities

A first set of facts can be concluded based on the historical material to support the existence of the "function-core innate-duality principle" on the creation of all the basic functional machineries.

1.1.1 Fms and FMs

The historical material shows that the "basic/atomic" digital electronic logical-gate-based functional machines (fm) (i.e., AND, OR, NAND, NOR, etc.) were created by using Boolean-Algebra. Then the ensuing multi-digital gate-based bigger electronic Functional Machineries (FM) were integrated, comprising (1) combinational logic-gate circuits for decoders, encoders, multiplexers and demultiplexers, etc.; (2) sequential logic-gate circuits for flip-flops, shift-registers, etc.; and (3) control logic-gate circuits for synchronous and asynchronous transfers, etc.

Most importantly, every atomic functional machine (fm) has its "functional hardware core-structure with innate truth-table-based multiple-in/single-out (MISO) and single-in/single-out (SISO) software core capabilities," dubbed "the Function core innate-Duality Principle (FC-DP)."

1.1.2 Functional-Core "Innate Duality"

That is the reason why multiple atomic function machines can be "logically switched" and integrated into bigger and more complicated Functional Machines (FMs), which are still intrinsically equipped with a bigger core structure with innate truth-table capabilities. Moreover, every integrated FM can be readily used as an integrable component to build even bigger FMs.

Furthermore, when a smaller FM became one of the integrable components for constructing a bigger FM core-structure, then its functional core capability was innately integrated as a vital part of that bigger FM's core capabilities. That is also implying that "the halting problem" is never going to happen in a bigger FM, unless these smaller FMs are not functionally integrated, only randomly aggregated into "non-functional core-based" multiple-in-multiple-out (MIMO) "cluster-like" structure without innate truth-table capabilities, totally disobeying the function-core innate-duality principle and thereby causing the halting problems (i.e., no determinable resulting effect can be detected in existence). Therefore, cluster-like non-functional-core structures that do not have innate duality cannot be used as integrable components, because they do not have truth tables and they cannot be well controlled.

1.2 the Second Set of Facts: Node-Computing Entity Duality-Evolutionary Principles and Theories A second set of facts can be concluded based on the historical material to support the existence of three fundamental principles on the 3 periods of evolutionary node-computing, dubbed the "node Evolutionary Principles" (nEP1-3) for establishing evolutionary architectures (EAs) based on duality-(structure/capability)-mandates (EAMs) and derived Theoretic-Foundations (nTF1-3) of a plurality of Hardware Architecture Theories (nHAT1-3) and Software Architecture Theorems (nSAT1-3) to create hardware node-core structures with software node-core capabilities along the node-computing evolutionary timeline over 3 periods.

1.2.1 nEP1-EA/nTF1-HAT-nCCs+nCMs, Illustrated by FIG. 1

The first nEP1 begins with the rational mandate-1 in creating "the early stage node-Computing Components (nCCs)" by using all the potential switching circuit-based readily integrable Functional Machineries (FMs) and the rational mandate-2 in creating multi-nCC aggregated node Computing-Modules (nCMs) by using various inter-links based on various aspects of concern regarding node computing-centric attributes for multiple functionalities, memories for data-exchanges, controls for efficient/effective deliverables, etc.

Furthermore, based on the above 2 rationales of nEP1, the derived nTF1 comprises Switching-Logic-based Hardware Construction Methods (nHCMs) in creating node-computing early stages (nG0.stages)-based node-computing components (nCCs) (i.e., computing-oriented combinational, sequential and control switching circuits) by using various FMs and Aspect-Linkage-based Hardware Aggregation Methods (nHAMs) in generating various aspect-oriented node-computing Computing Modules (nCMs) (i.e., Input/output modules, various memory modules and CPU modules), by aggregating multiple nCCs via aspect-oriented directional inter-linkages. Moreover, nHCMs and nHAMs together constitute an architecture-type-based theory, which involves (1) components (mandate-1), (2) aggregate-architecture methods and (3) architected module-structures (mandate-2), thereby dubbed as "Hardware Architecture Theory" (nHAT1) of nTF1, which can be regarded as the rational mandate-3 of the nEP1. These 3 rational mandates of nEP1 constitute the node-computing-based first-period evolutionary architecture (EA), which can be dubbed as 3-mandate nEA1.

The historical material about categorically defined fms, FMs, nCCs and nCMs were discussed in the aforementioned "the first-period" of computing history and the underlying fact based on the existence of categorically defined nCCs and nCMs and the categorical relationship among nEP1, nEA1, nTF1, nHAT1, nHCMs and nHAMs are illustrated by FIG. 1.

1.2.2 nEP2-(3-nBBB)-EA/nTF2-(HAT-nHCS/SAT-nCEs+nCEDs), Illustrated in FIG. 2.

A second nEP2 dictates a number of rational mandates in first creating the electronic node-computing-based three Basic Building Block (3-nBBB, mandate-1), where the first nBBB is built by using IO-nCMs as the base-nBBB, the second BBB is built by using Memory-nCMs as the mid-nBBB and the third nBBB is built by using CPU-nCMs as the top-nBBB. In addition, all these 3 nBBBs must be bottom-up aggregated by block-to-block inter-links, creating a node-based Hierarchical (base/mid/top) Core-Structure (nHCS, mandate-2), which can be further equipped with one active entity-oriented hierarchical control program with innate core capabilities, creating an "Core Entity" (nCE, mandate-4). This innate core-entity software program is run "in an active self-control mode," dubbed "node core entity innate-duality principle," which conforms to the "functional-core innate-duality principle."

Furthermore, based on the rationales of nEP2, the derived nTF2 comprises not only the Hardware Architecture Theory (nHAT2, mandate-3), which consists of (1) the Hardware Construction Methods (nHCMs) in constructing all the 3 nBBBs by using IO, memory and CPU nCMs and (2) the Hardware Aggregation Methods (nHAMs) in aggregating these 3 nBBB into a hierarchical core structure (HCS), but also the Software Architecture Theorem (nSAT2, mandate-5), which consists of the core Entity Programming Methods (nEPMs) in building active core entity core control programs to equip nHCS into a Core-Entity (nCE-mandate-4). Moreover, all these 5 rational mandates of nEP2 constitute the node-computing-based second-period evolutionary architecture (EA), which can be dubbed as 5-mandate nEA2.

The material on the first nCE, such as von Neumann machinery, was discussed in the aforementioned "the second-period" of computing history and the underlying facts about the existence of categorically defined 3-nBBBs, nHCSs, nCEs and the categorical relationship among nEP2, nEA2, nTF2, nHAT2, nHCMs, nHAMs, nSAT2, nEPM are illustrated in FIG. 2.

1.2.3 nEP3/nTF3.G1.s-(HAT/SAT)=nCEs/CEDs, Illustrated in FIG. 3

The third nEP3 dictates a number of rational mandates in first creating the ensuing bigger and better three Basic Building Block (3-nBBB, mandate-1) by using the second-period 3-nBBB-architected node Core Entity (nCEs or nEntity) as bigger and better nCCs, which can further be aggregated into bigger aspect-oriented nCMs to construct the base-nBBB. In addition, by using the DMA-Memory-nCMs to construct the mid-nBBB and the CPU-nCMs to construct the top-nBBB, a new bigger bottom-up 3 (base/mid/top) nBBB hierarchical core structure (nHCS, mandate-2) can be created and further be equipped with an entity control program, creating a bigger-domain node Core-Entity (nCE, nEntity, mandate-4). Moreover, by equipping core-entity-domain programs, an nCE can be enhanced into a node Core Entity-Domain (nCED, mandate-5) with all the potential entity-domain capabilities, which can then again readily become an even bigger nCC for building up even bigger base-BBBs.

This iterative bottom-up progressive processes will keep on going, so that additional bigger and better nCEDs can be created along the timeline. This type of iterative progressive processes on core entities can be defined as the "evolutionary processes" and the hierarchical-b/m/t 3-nBBB architecture can also be again defined as an "evolutionary architecture" (EA), which solidifies the concept of "bigger and better node core-entities" are created by bottom-up hierarchically encapsulating smaller node core entities with entity-oriented integration control.

Furthermore, based on the rationales of nEP3, the derived nTF3 comprises not only the iterative Hardware Architecture Theories (nHAT3, mandate-3) that use the above-mentioned nHCMs to build 3-nBBBs and nHAMs to aggregate 3-nBBB into nHCSs, but also the iterative Entity Software Architecture Theorems (nSAT3, mandate-6) that use DOS-based Entity Integration Methods (nEIMs) in enhancing nHCSs into node Core-Entities (nCEs) and use real-time node-core Entity Programming Methods (nEPMs) in equipping nCEs into node-Core Entity Domains (nCEDs) with many "function-like" core-entity domain programs. Moreover, all these 6 rational mandates of nEP3 constitute the node-computing-based third-period evolutionary architecture (nEA3), which can be dubbed as 6-mandate nEA3.

The material on the nG1.1 to nG1.2 node-computing evolution was discussed in the aforementioned "the third period" of computing history and the underlying facts about the existence of categorically defined nHCS, nCEs, nCEDs and the categorical relationship among nEP3, nEA3, nTF3, nHAT3, nHCMs, nHAMs, nSAT3, nEIMs and nEPMs are illustrated in FIG. 3.

1.3 the Third Set of Facts: Node Core Entity Systems (STE SD)

A third set of facts can be reached based on the historical material to support the existence of nTF3-derived "3 node-Core Entity System-Disciplines" (nSD3).

1.3.1 Node Unitary-Core System Discipline uSD1

The first node-Core-Entity uSD1 is to design the ideal logical node-Core Entity problem-solving Systems (nCESs) based on nG1.1-nG1.2 nCEDs for accommodating various real-world problem solving. It involves hardware logical design on all the 3-BBB-based node Computing Components (nCCs) and node Computing Modules (nCMs) to create nHCS and software logic design to equip nHCS with Entity-oriented OS and Entity-domain programs. For example, CPU modules can be designed into RISC or CISC-based. Memory modules can be designed into 8/16/32 bit-based. Input and output modules can be designed based on various connecting buses/ports, etc.

1.3.2 Node-Unitary Core-Entity uSD2

The second node-Core-Entity uSD2 is to develop the logical science-based node core-Entity Systems into physical technology-based node Core-Entity Systems. It involves the physical hardware and software technological development of all the logical 3-nBBB-based nCCs/nCMs into physical 3-BBB nCCs/nCMs and the production of the physical node core-Entity Systems.

1.3.3 Node Unitary Core Entity uSD3

The third deploy-engineering node-Core-Entity uSD3 is to deploy and configure from all the physical technology-based node Core entity systems into a real-time problem solving engineering-based node core entity systems (i.e., node-core computer, controlled and operated by the stakeholders for innate-problem solving, such as productivity).

The material on the nG1.1 to nG1.2 nESs (i.e., the IBM earlier mainframes and PCs), was discussed in the aforementioned "the third period" of computing history and the underlying facts about the existence of categorically defined node-based logical, physical and real-world (innate)-problem-solving node-core-Entity Systems (nCESs).

1.4 the Fourth Set of Facts: Non-Evolvable Node Unitary-Hub/Zone-Infrastructure/Cloud-Infrastructure Systems A fourth set of facts that can be established based on the material to support the weakness of the hierarchical 3-nBBB evolutionary architecture and the usage of "non-evolutionary methods" of generating object-oriented facility-control Operating systems and object-oriented application programs.

1.4.1 the 3-nBBB Cannot Evolve Further (Due to Architectural Weakness)

As in the nG1.3, when multiple hp-CPU-based nCMs are used to construct the top-nBBB, it will turn a node-based 3-nBBB (MISO/SISO-functional) Hierarchical Core Structure (nHCS) into a multiple-in/multiple-out (MIMO-non-functional) Spokes-aggregated Hub-Structure. Multiple core Entity-oriented control programs cannot be equipped on a Hub-structure Entity, due to the fact that there is only one data-processing-based main memory and multiple independent core-entity-oriented control programs will generate data corruption and a total failure in computing.

1.4.2 the Creation of Object-OS and Object-Application Programs Based Node-Hub Entity (Via Non-Evolutionary Methods) with Innate Problem Solving Capabilities.

Then came the "non-evolutionary" Object-oriented Aggregation Methods (nOAMs) in generating facility-(main-memory)-sharing traffic control programs on the MIMO spokes-aggregated node hub-structure, dubbed the object-oriented Operating-Systems (OS), which enhance nG1.3-nAHSs into node-hub Entities (nHEs). Furthermore, Object-oriented Programming Methods (nOPMs) generated application programs to reside on nHEs and enhance them into node-Hub Entity Domain (nHEDs).

Such "facility-sharing control based" object-oriented Operating Systems as WIN95, WinNT and the like are prone to become bloated with unnecessary complications due to the increments of hp-CPUs. These object-OSs control over multiple "pre-defined" fixated-functional-pipe-flow-based application programs, rendering only cookie-cutting problem solving capability, dubbed "node hub-entity non-innate duality" phenomenon.

1.4.3 Material and the "Non-Evolutionary" Application-Based Dead-End Pathway: Illustrated in FIG. 5

The material on the object-oriented OSs, such as WIN95, WinNT and the likes, and the object-oriented application programs was discussed in the aforementioned "the third period" of computing history and the underlying facts about the existence of categorically defined nHEs and nHEDs and the categorical relationship among nhSAT3, nOAMs-(object-OSes), nOPMs-(application programs) are illustrated by FIG. 5.

1.4.4 Node-Application Systems

Once nG1.3 nHEDs are created, the logical node-application unitary-hub systems can be generated based on node-hub entity design-Science System Discipline-1 (nHE-SD1). Then the physical node-application unitary-hub systems can be generated based on nHE development-technology SD2 and the real-world "class-1 innate-problem-solving" node-application unitary-hub systems can be generated based on nHE deployment-Engineering-SD3.

Once node-application unitary-hub systems are generated, multi-node application zone-infrastructure systems can be generated for "class-2 collaborative problem solving" based on artificial-logic-based application engineering disciplines, dubbed weak-Artificial-Intelligence-(AI)-based application engineering disciplines.

Once nodes-application zone-infrastructure systems are generated, multi-zone application cloud-infrastructure systems can be generated for "class-3 internet service-oriented cooperative problem solving" based on swarm-logic-based application engineering disciplines, dubbed weak-Swarm-Intelligence-(SI)-based application engineering disciplines.

1.5 the Fifth Set of Facts: The Existence of nECP with CP Nomenclature

A fifth set of facts via computing history can be concluded based on the already concluded facts to support the existence of nECP and its cessation to evolve further.

1.5.1 nECP Nomenclature Illustrated by FIG. 6

Based on the existence of nEP1-nTF1-nSD1, nEP2-nTF2-nSD2, nEP3-nTF3, node unitary-System Disciplines (uSD1, 2,3) (i.e., duality-design science discipline, duality-development technology discipline and duality-deployment engineering discipline), multi-node zone-infrastructure system application-Engineering discipline (dubbed zSD) and multi-zone cloud-infrastructure system application Engineering discipline (dubbed cSD), it can be concluded what the node-based Evolutionary Computing Paradigm (nECP) is comprised of and the nECP's basic nomenclature is illustrated in FIG. 6.

In short-form expression, nECP=Period-1 {nEP1-nTF1 (HAT1+SAT1)-nSD1s}+Period-2 {nEP2-nTF2 (HAT2+SAT2)-nSD2s}+Period-3 {nEP3-nTF3.generation1.stages (HAT3+SAT3)-nSD3 (uSDs-zSDs-cSDs)}.

1.5.2 Conclusion

The nG1.2 evolutionary processing on the evolutionary pathway along the node-computing evolutionary timeline has "come to an end," meaning that more complex node core entities cannot be created by hierarchically (Base, mid, top) integrating smaller NCEs as the base components.

The beginning of nG1.3 shows that based on "non-evolutionary" software-centric methods in creating object-oriented Operating-System (OS) and object-oriented application programs, only more complicated object-cluster/hub structures are generated by "loosely aggregating" cluster/hub structures together, which cannot be used as integrable nCCs/nCMs to fit into the evolutionary processes.

This type of Class-1 object-oriented application systems are designed to solve one type of pre-defined problems via client-server coarse-grained reactive Feed (input) and Fetch (output) methods. Therefore, more and more application systems are network-aggregated into application infrastructure systems to solve real-world class-2-collaborative-problem solving and class-3 cooperative internet-service-oriented problem solving. However they are laden with drawbacks and unresolvable security and privacy issues, as discussed earlier.

2.0 the Reasons why Node-Computing Cannot Evolve Further

After considering all the facts, there is a series of dependent cause-effect causalities that contribute to the reason why nECP cannot evolve further. The first, which concerns "the current usage of Application-infrastructure Systems (AISs), which generate aforementioned unresolvable security and privacy issues, is caused by the weaknesses of zSDs and cSDs that cannot produce bigger problem solving systems for accommodating collaborative and cooperative problem domains." The second, which concerns "the weaknesses of uSDs" is caused by "the weaknesses of nEP3-nTF3." The third, which concerns "the weaknesses of nEP3-TF3" is caused by the limitations of nEP2-nTF2-created "evolutionary architecture." The fourth, which concerns "the limitations of nEP2-nTF2 evolutionary architecture" is caused by the limitations of nEP1-nTF1-created nCCs and nCMs.

Based on the rationale derived from the nomenclature of node-based evolutionary computing paradigm (nECP), It is imperative to determine the "limitations" about nEP2-TF2 and nEP1-TF1 and based on the knowledge about all these limitations, the new and better EP1-TF1-based hardware architectures can be achieved to create new and better "CCs/CMs," a new and better EP2-TF2-based "evolutionary architecture" can be achieved to create new and better "core-entities" and then new and better EP3-TF3-uSD(1-3) can be obtained to create bigger and better "core Entity Systems." That is to say that a new and better ECP can be established to create bigger and better problem solving systems to accommodate collaborative and cooperative problem domains for resolving security/privacy issues and propelling the current nECP to shift.

2.1 Limitations of nEP2-EA/nTF2 (HAT, SAT)

The limitations of nEP2-TF2 are hinged on its lack of a proper "computing evolutionary" concept, on the need for a "solid evolutionary architecture," which can continue its "iterative progressive processes" without stoppage and create bigger and better "hierarchical core structures," starting from the very bottom with one memory-encapsulated evolutionary process at a time along the evolutionary timeline.

2.1.1 Limitation-1: 3-nBBB

The nEP2-TF2-based "3-nBBB evolutionary architecture" did have evolutionary processes, as shown in nG1.2 HCSs. However, how long can this 3-nBBB evolutionary processes be sustaining? It really depends on the solidity of the 3-nBBB core entity. If new "must-achieve" aspect-oriented nCMs are formed to construct a new set of 3-nBBBs, as illustrated by adding multiple hp-CPU modules to construct top-BBB in nG1.3, the newly formed 3-nBBB hierarchically aggregated structure cannot become a solid-(MISO/SISO)-core structure but a porous-(MIMO)-cluster hub-structure without "innate duality" capabilities, then the 3-nBBB evolutionary architecture has inherited flaws, which cannot be overcome by any modifications.

2.1.2 Limitation-2: Object-Oriented OS and Application Programs

This is why hub-structure based object-oriented application programs, which tend to build a big "logical hammer"

in solving problems that must be treated like nails (i.e., the "hammer/nail" paradox with the incompleteness and incompactness that can never be overcome). It is because object-oriented OSes and application programs are generated based on multiple logic-pipes scaffolding methods and they are not generated by the bottom-up evolutionary architectural methods. Furthermore, this is the reason why no matter how many revisions of the application programs are developed, the security issues will never be resolved.

2.1.3 Ill-Effects

In summary, nEP2-nTF2 cannot create a "solid" "evolutionary architecture" that can maintain its entity-oriented hierarchical core structure (HCS) and keep its "bottom-up" evolutionary processes (i.e., the iterative progressive processes) on going without stoppage.

Once the hierarchical core structure cannot be maintained, then a school of non-evolutionary object-oriented "non-bottom-up scaffolding-like" software architecture methods must generate "application programs for solving real-world problems," based on programmer's skill of scaffolding patterns and practices to achieve "hammer/nail paradox-like" cookie-cutting goals.

2.2 Limitations of nEP1-EA/nTF1 (HAT)

The limitations of nEP1-nTF1 is its lack of a proper "computing evolutionary" concept on the creation of a must-have "fail-over" architecture in creating "multiple bi-directional data-packet-based exchange-links" equipped fail-over-capable computing components (CCs) and multiple fail-over-capable CCs aggregated "fail-over" computing modules (CMs), each of which should be equipped with (1) multiple bi-directional packet-data exchange fail-over links, together with (2) real-time self-replacement and self-expansion fail-over capabilities and (3) real-time self-management fail-over, dubbed three must-have fail-over characteristics as "fail-over-3 capabilities."

2.2.1 Limitation-1: No Fail-Over Internal Links

A "fail-over-capable" CC should be equipped with at least two bi-directional "data-packet" (msg)-exchange links in addition to many other functional-processing-based directional data-bus links, due to the fact that it should send out requested health-based msg via the bi-directional msg-exchange link, so that the fail-over control-manager can react right away, based on the returned health-msg or the non-returned void-exchange, to either send in counter measure-msg into the faulty CC or just totally replace it.

When multiple "fail-over-capable" CCs are aggregated into a "multiple bi-directional links equipped CM," the multi-bi-directional-link effect will contribute to the overall CM fail-over capability (e.g., if one bi-directional msg-exchange link should go down, the other bi-directional msg-exchange link can still keep the fail-over msg as well as the processed data-packaged flow-msg going among related CCs).

2.2.2 Limitation-2: No Self-Managing

Moreover, the real-time self-management effect will also contribute to the overall CM fail-over capability (e.g., if any CC is faulty), the must-have paired-managing CC unit in the CM can self-manage to take over the faulty one and continue the data-flow-processing via the existing as well as the alternative fail-over multi-link.

2.2.3 Limitation-3: No Self-Expanding

Most importantly, the real-time self-expansion effect will again contribute to the overall CM fail-over capability (e.g., if any CC is faulty), then it can be real-time hot-swapped, even hot-swapped with multiple new and better-attribute CCs for more sophisticated expansions.

2.2.4 Ill-Effects

In summary, the nEP1-TF1 did have the aspect-oriented hardware architectures to create the base attribute-aspect-oriented, mid memory aspect-oriented and top-control aspect-oriented nCCs and nCMs, so that base-nBBB, mid-nBBB and top-nBBB can be constructed. However, without the fundamental fail-over-3 capability in all these aspect-oriented nCMs, the 3-nBBB-architected duality-core's hardware structures can never be "fail-safe-capable" to generate any "fail-safe" software capability to guard against any external attacks and internal malfunctions, diminishing the possibility of furthering evolution of node-computing.

2.3 the Inevitable nECP Shift

The limitations of nEP1-EA/TF1 and nEP2-EA/TF2, make it imperative that new and better EP1-TF1 and EP2-TF2 be established.

2.3.1 the New and Better EP(1-2)-TF(1-2) and EP3-TF3-SD3

The new and better EP1-TF1, elevated from nEP1-TF1, should be mandated on having a "fail-over architecture" in creating fail-over-capable computing components (CCs) and "fail-over-3"-based computing modules (CMs). In addition, the new and better EP2-EA/TF2, elevated from nEP2-TF2, should be mandated on having a concurrent control-capable top-BBB-based "solid evolutionary architecture" in creating hierarchical core structures (HCS) with long-lasting bottom-up iterative progressive evolutionary processes. In so doing, the new and better EP3-TF3-uSD can be established to continuously evolve into all the bigger and better "Core" Entity Systems to accommodate real-world collaborative problem domains from the smallest to the largest without stoppage. The new and better ECP, comprising EP1-TF1, EP2-TF2 and EP3-TF3 is illustrated by FIG. 7.

2.3.2 the Must-have nECP Shift, Issues can then be Resolved.

Therefore, the best action to continue computing-based evolutionary processes is to shift the current nECP to a new and better ECP. The nECP shift is critical, since all the current multiple object-oriented application systems as well as network-aggregated AISs have incurred a series of drawbacks and unsolvable dilemmas, which must be resolved.

Since nECP cannot evolve further and all the current non-evolutionary object-oriented application engineering methods in generating application-based systems as well as network-aggregated AISs, which have incurred a series of drawbacks and have even aggravated the security and privacy issues. The only way to resolve these issues is by continuing computing-based evolutionary processes, which is a must to shift the current nECP to a new and better ECP.

3.0 the First Period of wECP: wEP1-EA1 (6-Mandates)/TF1-(HAT)

Based on the aforementioned 3 fail-over limitations of nEP1 and the must-achieve fail-over criteria for enabling computing evolution, the first workgroup evolutionary principle (wEP1) is thus established to bring forth the workgroup "fail-over-3" evolutionary architecture, which involves the following more sophisticated 3 mandates.

3.1 EA1-Mandates

Mandate-1: The must-have fail-over-capable wCCs, which can be constructed by upgrading the aforementioned node-computing based nCCs, nCMs and nCEs with the workgroup fail-over link.

Mandate-2: the must-have the "fail-over-3"-based wCMs for constructing 3-level hierarchical (base/mid/top) work-group-linked Basic-Building-Block (wBBB), just like by using nCMs to construct 3 nBBBs via internal links as well as network-links.

Mandate-3: the must-have hierarchy-iterative evolutionary "Hardware Architecture Theory" (HAT) in creating fail-over-capable wCCs and "fail-over-3-based" wCMs for constructing wBBBs along the evolutionary stages in the first period of workgroup computing evolution.

3.2 wTF1-HATs

Based on the "third mandate" of wEP1 "fail-over" evolutionary architecture, the new and better workgroup Theoretic Foundation (wTF1) can be derived in the early stages of workgroup computing evolution. The wTF1 will contain a fail-over Hardware Architecture Theory (HAT), which comprises multiple-evolutionary stage-based Hardware components Construction Methodologies (HCMs) in creating the fail-over-capable "multiple staged wCCs" and multiple Hardware Aggregation Methods (HAMs) in creating standard "fail-over-3 based" wCMs in the early stages of workgroup computing, as illustrated in FIG. 8.

3.3 Generic WSA

The first "fail-over-3 based" workgroup computing module (wCM) (i.e., "workgroup server array" (WSA)) was invented in year 1999, as described in U.S. patent application Ser. No. 09/744,194, entitled "SYSTEM AND METHOD FOR IMPLEMENTING WORKGROUP SERVER ARRAY," by Ivan Chung-Shung Hwang, filed in May 17, 2000, U.S. Pat. No. 6,715,100, Date of Patent: Mar. 30, 2004.

3.3.1 HCM

As shown in FIG. 11, the wTF1.stage1-based WSA was created based on first-stage HAT, which comprises the first-stage Hardware Construction Methods (HCMs) in creating "3 Basic" wCCs, which can be described as follows:

1) HCM-1 is to implement TeamProcessors (TP)-wCC by using node-core entities/systems (nCEs/nCESs), and is equipped with workgroup execution and fail-over linkages (i.e., W1 (workgroup Ethernet), W2 (directional workgroup server link using SCSI), W3 (bi-directional workgroup peer-to-peer link using SCSI), RAP (Remote Access Port, a 25-pin connection that includes two 8-pin-serial ports, a keyboard port and a reset button), AV (audio/video connection) and USB (for workgroup device sharing)).

2) HCM-2 is to implement TeamServer (TS)-wCC by using SCSI-disk devices.

3) HCM-3 is to construct TeampaneL (TL)-wCC by a functional fail-over-based circuit as shown and is equipped with workgroup fail-over linkages (i.e., RAP, AV and USB). All of the first-stage HCMs can be best illustrated by the HCM3-Table as follows.

| Abbr. Name | Description |
|---|---|
| 1. TP(1-12) | Team Processor(1-12), |
| 2. DAS TS | Direct Access SCSI-based Team Servers, with workgroup SCSI link |
| 3. TL(1-3) | TeampaneL(1-3) with workgroup links |

3.3.2 HAM

Furthermore, by using the first-stage HAM, all the above 3 wCCs can be aggregated via multiple workgroup links, creating the first generic WSA as follows:

(1) HAM-1 is to aggregate TP(1-12) and TS(1-4) via w2-SCSI, w3-SCSI for workgroup execution operations.

(2) HAM-2 is to aggregate TP(1-12) and TL(1-4) via RAP, AV and USB for workgroup fail-over operations.

Therefore, by aggregating all these 3 basic wCCs, a fail-over-3 wCM, which is the first generic WSA is created.

All of the first-stage HAMs can be best illustrated by the HAM2-Table as follows.

| HAM: wCM( ) | wCM = wCCs | Description |
|---|---|---|
| WSA(12) | TP × (12) | Aggregated via w2-SCSI, w3-SCSI, RAP, AV, USB |
| | TS × (4) | Aggregated via w2-SCSI and w3-SCSI |
| | TL × (3) | Aggregated via RAP, AV and USB |

3.3.3 Fail-Over-3 Generic WSA (for Small Environment, it is Ideal)

In summing up, the first-stage workgroup fail-over EA and its derived wTF1.stage1 HAT, creating the first generic WSA with the following fail-over-3 operations.

Fail-over-1: the Generic WSA is equipped with multiple workgroup links and can enable link-to-link fail-over operation (e.g., RAP can be the fail-over alternative for W1 and USB).

Fail-over-2: the generic WSA can assign a pair of Team-Processors as the TeamManagers, which can real-time self-managing the fail-over operations, due to their control over the main-TeamPanel.

Fail-over-3: the generic WSA can real-time self-expand by adding TeamProcessors and then reassign TeamManagers for real-time managing fail-over operations.

The significance of generic WSA is that it creates the first and must-have categorical wCCs (i.e., TeamProcessors, TeamServers, TeamPanels and multi-workgroup linkages), to fulfill workgroup fail-over-3 operations. Most importantly, these categorical wCCs have become the most fundamental workgroup computing components for building standard wCM-based WSAs that are equipped with workgroup fail-over-3 operational capabilities.

Moreover, the importance of "fail-over-3" workgroup server arrays (WSA) is that they are the "basic" standard "wCM" units for building any bigger workgroup core structures, just like the standard (NAND, NOR) gate arrays (e.g., Field-Programmable Gate Arrays (FPGA)), can be used for building any functional core structures.

3.4 Scalable WSA

3.4.1 New improvement (scalable stages of wCCs and wCMs).

Therefore, the wTF1 will contain a new scalable iterative HAT, comprising scalable HCMs to construct new and better fail-over scalable basic wCCs by modifying generic WSA's 4-member-in-1 TeamPanels into 4 singular-member Team-Panels, together with scalable HAMs to aggregate basic wCCs into new and better scalable fail-over-3 wCMs (i.e., scalable WSAs). Furthermore, in order to accommodate base/mid/top 3-aspect-oriented BBBs, there are various ensuing-staged scalable HATs to create scalable WSAs for base-attribute BBBs (i.e., scalable aWSAs), for mid-memory BBBs (i.e., scalable mWSAs) and for top-control BBBs (i.e., scalable cWSAs).

3.4.2 3 Must-have Additional Scalable HATs, Creating Scalable Fail-Over-3 WSAs.

Since the first generic WSA was created based on wTF1.stage1-HAT, it is only natural to assign wTF1.stage2-HAT in creating scalable aWSAs, wTF1.stage3-HAT in creating scalable mWSAs and wTF1.stage4-HAT in creating scalable cWSAs.

3.5 Scalable aWSAs
3.5.1 The must have attribute-WSAs

In order to create scalable aWSAs, it is imperative to analyze how many workgroup attribute-aggregation oriented operations can be generated based on the basic wCCs.

As stated earlier, there are two types of "workgroup data-packet operational links" (i.e., directional W2-(SCSI) and bi-directional W3-(SCSI)), thereby two different characteristics of workgroup base-attribute operations can be achieved.

The first one is for W2-directional sequential-dependent "workgroup internal sequential data-packet operations," such as automatic workgroup "conveyer-like" operations. The second one is for W3-bi-directional inter-dependent data-packet operations, such as discrete workgroup "library-like" operations. Therefore, there are two types of aWSAs (i.e., (w2-only type1)-aWSA1 and (w2/w3 hybrid-type2)-aWSA2) that need to be created to accommodate 2 different workgroup base-attribute aggregation operations.

3.5.2 HCMs

Based on the third mandate of wEP1 fail-over evolutionary architecture and its derived wTF1.stage2 Hardware Architecture Theory (HAT), which comprising Hardware Construction Methods (HCMs) in creating the basic wCCs and Hardware Aggregation Methods (HAMs) in creating standard wCMs and fail-over-3 aWSAs.

Here are the second-stage Hardware Construction Methods (HCMs) in creating the base-attribute-based "fail-over capable" wCCs, which can be described as follows:

(1) HCM-1 is to implement 2 types of attribute-based TeamProcessors (w2)-TaP1, dubbed wCC(1) and (w3)-TaP2, dubbed wCC(11) by using existing node-core entities/systems (nCEs/nCESs) and equipping them with W1 (Ethernet) workgroup execution communication link, W2/W3 (preferred USB or serial SCSI) workgroup execution links and RAP/aV/USB (RVU) workgroup fail-over links, where RAP stands for remote access port, aV stands for audio-and-video and USB stands for universal serial bus.

(2) HCM-2 is to implement Workgroup Ethernet Control (WEC), dubbed wCC(5) by using routers, switches as well as hubs with wireless connections, based on the environmental needs for local operators.

(3) HCM-3 is to construct type1-TeampaneL TaL1, dubbed wCC(7) and type2-TeampaneL TaL2, dubbed wCC(17) by remodifying 4-in-1 TeampaneL (TL) and equipping them with RVU workgroup fail-over links.

(4) HCM-4 is to implement designated type1-based paired-TaP1 managers TaP1m(1&2), dubbed wCC(9) and type2-based TaP2m(1&2), dubbed wCC(19) by using the common sharing TeamServer (TS) with SCSI disk (as patented TeamManager in generic WSA) and equipping them with RVU workgroup fail-over links and F1/F2 (Ethernet) workgroup fail-over communication links. Basically, wCC (9) has the same hardware configuration as wCC(19).

In summary, there are 4 kinds of standard Workgroup Linkages (WL) (i.e., (1) workgroup communication links, dubbed Workgroup-Linkage1 (WL1: w1), (2) workgroup execution links, dubbed Workgroup-Linkage2 (WL2: w2/w3), (3) workgroup fail-over links, dubbed Workgroup Linkage3 (WL3: RVU) and (4) workgroup fail-over communication links, dubbed Workgroup Linkage4 (WL4: F1/F2)).

3.5.3 2-Type HAMs

Based on these second-stage wCCs and the number of them being used for building type1 and type2 mWSAs, there are second-stage type1-HAMs that can build type1-based fail-over-3 (w2)-aWSAs, as illustrated in FIG. 12a and second-stage type2-HAMs that can build type2-based fail-over-3 (w2/w3-hybrid)-aWSAs, as illustrated in FIG. 12b.

FIG. 12a w2-aWSA1

As shown in FIG. 12a, all of the necessary second-stage wCCs for building up type1-based (w2)-aWSA1 can be best illustrated by the wCC-usage Table as follows.

| wCC( ) | Abbr. Name | Description |
|---|---|---|
| 1 | TaP1(1-i) | Team attribute Processor type1(1-i) |
| 5 | WEC(1) | Workgroup Ethernet Controller(1) |
| 7 | TaL1(1-i) | Team attribute paneL type1(1-i) |
| 9 | TaP1m(1-2) | Team attribute Processor manager type1(1-2) |

Based on all the selected second-stage wCCs for type1-(w2) aWSA1, the second-stage type1-based HAMs can aggregate them via workgroup communication linkage1 (WL1:W1) and workgroup execution linkage2 (WL2:W2) for workgroup execution aggregation and workgroup fail-over Linkage3 (WL3:RVU) and fail-over communication Linkage4 (WL4:F1/F2) for workgroup-fail-over aggregation, creating the type1 (w2)-aWSA1=wCM(61+62), which can be best illustrated by the HAM-Table as follows.

| HAM: wCM( ) | wCM = wCCs | Abbr. Name | Description |
|---|---|---|---|
| 61 | wCM(61)= | (w2)-aWSA1p1 | (w2)-attribute Workgroup Server Array-type1/part1 |
| | wCC(1) × (i) | TaP1(1-i) | Agg via WL1, WL2, WL3 |
| | wCC(5) × (1) | WEC(1) | Agg via WL1: w1 |
| 62 | wCM(62)= | (w2)-aWSA1p2 | (w2)-attribute Workgroup Server Array-type1/part2 |
| | wCC(7) × (i) | TaL1(1-i) | Agg via WL3: RAP, aV, USB |
| | wCC(9) × (2) | TaP1m(1-2) | Agg via WL3, WL4: F1, F2 |
| 61 + 62 | wCM(61 + 62) | (w2)-aWSA1 | (w2)-attribute Workgroup Server Array type1 |

FIG. 12b (w2/w3)-aWSA2

As shown in FIG. 12b, all of the necessary second-stage wCCs for building up type2-based (w2/w3-hybrid)-aWSA2 can be best illustrated by the wCC-usage Table as follows.

| wCC( ) | Abbr. Name | Description |
|---|---|---|
| 5 | WEC(1) | Workgroup Ethernet Controller(1) |
| 11 | TaP2(1-i) | Team attribute Processor type2(1-i) |
| 17 | TaL2(1-i) | Team attribute paneL type2(1-i) |
| 19 | TaP2m(1-2) | Team attribute Processor manager type2(1-2) |

Based on all the selected second-stage wCCs for type2-(w3) aWSA2, the second-stage type2-based HAMs can aggregate them via WL1, WL2, WL3 and WL4, creating the type2 (w3)-aWSA2=wCM(63+64), which can be best illustrated by the HAM-Table as follows.

| HAM: wCM( ) | wCM = wCCs | Abbr. Name | Description |
|---|---|---|---|
| 63 | wCM(63)= | (w3)-aWSA2p1 | (w3)-attribute Workgroup Server Array-type2/part1 |
| | wCC(5) × (1) | WEC(1) | Agg via WL1: w1 |
| | wCC(11) × (i) | TaP2(1-i) | Agg via WL1, WL2: w3, WL3 |

-continued

| HAM: wCM( ) | wCM = wCCs | Abbr. Name | Description |
|---|---|---|---|
| 64 | wCM(64)= | (w3)-aWSA2p2 | (w3)-attribute Workgroup Server Array-type2/part2 |
| | wCC(17) × (i) | TaL2(1-i) | Agg via WL3: R, V, U |
| | wCC(19) × (2) | TaP2m(1-2) | Agg via WL3, WL4: F1 and F2 |
| 63 + 64 | wCM(63 + 64) | (w3)-aWSA2 | (w3)-attribute Workgroup Server Array type2 |

3.6 Scalable mWSAs 3.6.1 The must have memory-WSAs

In order to create scalable mWSAs, it is imperative to analyze how many workgroup memory encapsulation-oriented operations can be generated based on the base-attribute aWSAs.

Since there are two types of aWSAs, it is only proper to create two corresponding types of mWSAs (i.e., (w2-type1)-mWSA1 and (w3-type2)-mWSA2) to accommodate 2 different must-have workgroup mid-memory encapsulation operations.

3.6.2 HCMs, Creating the Basic wCCs

Based on the third mandate of wEP1 fail-over evolutionary architecture and its derived wTF1.stage3 Hardware Architecture Theory (HAT), which comprising Hardware Construction Methods (HCMs) in creating the basic wCCs and Hardware Aggregation Methods (HAMs) in creating standard wCMs and fail-over-3 aWSAs.

The third-stage Hardware Construction Methods (HCMs) in creating the mid-memory-based "fail-over capable" wCCs, are described as follows:

(1) HCM-1 is to implement 2 types of memory-based TeamProcessors (w2)-TmP1, dubbed wCC(21) and (w3)-TmP2, dubbed wCC(31) by using existing node-Core Entities/Systems (nCEs/nCESs) and equipping them with workgroup execution linkage2 (WL2:w2/w3) and workgroup fail-over linkage3 (WL3:RVU).

(2) HCM-2 is to implement designated type1-based paired-TmP managers TmP1m(1&2), dubbed wCC(29) and type2-based TmP2m(1&2), dubbed wCC(39) by using the common sharing TeamServer (TS) with SCSI disk (as patented TeamManager in generic WSA) and equipping them with workgroup fail-over linkage3 (WL3:RVU) and workgroup fail-over communication linkage4 (WL4:F1/F2). Basically, wCC(29) has the same hardware configuration as wCC(39).

(3) HCM-3 is to implement concurrent packet exchange (up, down, left, right) side-members read/write fail-over control Relay, dubbed wCC(22:u,d,L,r) by using SPDT relays with normal link to TmP and abnormal link and control link via RAP to TmPm(1&2).

(4) HCM-4 is to implement USB-Read port and Write port fail-over control Relays, dubbed wCC(23:R,W) by using DPDT relays with normal 2-data links to TmP and abnormal 2-data links and control link via RAP to TmPm (1&2).

(5) HCM-5 is to implement USB-Read and USB-Write common connection Bus, dubbed wCC(24:R,W) by using electronic bread-board-like devices for extending USB port data-links to all USB-Disks.

(6) HCM-6 is to implement type1-based TeamMemory Tm, dubbed wCC(25) and type2-based Tm, dubbed wCC (35) by using USB disks with partitions for accommodating side-members' read/write and Read/Write-Bus to access and equipping them with workgroup execution linkage2 (WL2: w2/w3).

(7) HCM-7 is to implement (up, down, left, right) side-member's USB-Read port and Write port control Relays, dubbed wCC(26:u,d,L,r) by using DPDT relays controlled by side-member control relay wCC(22).

(8) HCM-8 is to construct type1-TeampaneL TmL1, dubbed wCC(27) and type2-TeampaneL TmL2, dubbed wCC(37) by remodifying 4-in-1 TeampaneL (TL) and equipping them with workgroup fail-over linkage3 (WL3: RVU).

3.6.3 Type1-HAM 2 Versions and Type2-HAM 6-Versions

Based on these third-stage wCCs and the number of them being used for building type1 and type2 mWSAs, there are third-stage type1-HAMs that can build to achieve the full scalability by creating 2 versions of type1-mWSAs, as illustrated in FIG. 13a and FIG. 13b. There are third-stage type2-HAMS that can build to achieve the full scalability by creating 6 additional versions of type2-mWSAs, as illustrated from FIG. 13c to FIG. 13h.

FIG. 13a (w2)-mWSA1

As shown in FIG. 13a, all of the necessary third-stage wCCs for building type1-based (w2)-mWSA1 (version1) can be best illustrated by the wCC-usage Table as follows.

| wCC( ) | Abbr. Name | Description |
|---|---|---|
| 21 | TmP1 | Team memory Processor type1 |
| 22u | uSPDT | up Single Port Double Throw relay |
| 22d | dSPDT | down Single Port Double Throw relay |
| 23R | DPDT-Read | Double Port Double Throw-Read Relay |
| 23W | DPDT-Write | Double Port Double Throw-Write Relay |
| 24W | w2-Wbus | w2-Write bus |
| 24R | w2-Rbus | w2-Read bus |
| 25 | Tm(1-i) | Team memory(1 to i) |
| 26u | uDPST | up Double Port Single Throw relay |
| 26d | dDPST | down Double Port Single Throw relay |
| 27 | TmL1(1-2) | Team memory paneL type1(1-2) |
| 29 | TmP1m(1-2) | Team memory Processor manager type1(1-2) |

Based on the above selected third-stage wCCs for type1-(w2) mWSA1-(version1), third-stage type1-based HAMs can aggregate them via WL1, WL2, WL3 and WL4, creating the type1-(w2) mWSA1=wCM(71+72), which can be best illustrated by the HAM-Table as follows.

| HAM: wCM( ) | wCM = wCCs | Abbr. Name | Description |
|---|---|---|---|
| 71 | wCM(71)= | (w2)-mWSA1p1 | (w2)-memory Workgroup Server Array-type1 version1/part1 |
| | wCC(21) × (1) | TmP1 | Agg via WL1, WL2: w2, WL3 |
| | wCC(22: u, d) × (2) | (u, d)SPDT | Agg via WL2: w2 control lines |
| | wCC(23R) × (1) | DPDT-Read | Agg via WL2: w2 control lines |
| | wCC(23W) × (1) | DPDT-Write | Agg via WL2: w2 control lines |
| | wCC(24R) × (1) | w2-bus-Read | Agg via WL2: w2 |
| | wCC(24W) × (1) | w2-bus-Write | Agg via WL2: w2 |

-continued

| HAM: wCM( ) | wCM = wCCs | Abbr. Name | Description |
|---|---|---|---|
|  | wCC(25) × (i) | Tm(1-i) | Agg via WL2: w2 |
|  | wCC(26: u, d) × (2i + 2i) | (u, d)DPST | Agg via WL2: w2 control line |
| 72 | wCM(72)= | (w2)-mWSA1p2 | (w2)-memory Workgroup Server Array-type1-version1/part2 |
|  | wCC(27) × (2) | TmL1(1-2) | Agg via WL3: R, V, U |
|  | wCC(29) × (2) | TmP1m(1-2) | Agg via WL3, WL4: F1, F2 |
| 71 + 72 | wCM(71 + 72) | (w2)-mWSA1 | (w2)-memory Workgroup Server Array-type1 version1 |

FIG. 13*b* (w2)-mWSA2

As shown in FIG. 13*b*, all of the necessary third-stage wCCs for building type1-based (w2)-mWSA2 (version2) can be best illustrated by the wCC-usage Table as follows.

| wCC( ) | Abbr. Name | Description |
|---|---|---|
| 21 | TmP1 | Team memory Processor type1 |
| 22u | uSPDT | up Single Port Double Throw relay |
| 22d | dSPDT | down Single Port Double Throw relay |
| 22r | rSPDT | right Single Port Double Throw relay |
| 23R | DPDT-Read | Double Port Double Throw-Read Relay |
| 23W | DPDT-Write | Double Port Double Throw-Write Relay |
| 24W | w2-Wbus | w2-Write bus |
| 24R | w2-Rbus | w2-Read bus |
| 25 | Tm(1-i) | Team memory(1-i) |
| 26u | uDPST | up Double Port Single Throw relay |
| 26d | dDPST | down Double Port Single Throw relay |
| 26r | rDPST | right Double Port Single Throw relay |
| 27 | TmL1(1-2) | Team memory paneL type1(1-2) |
| 29 | TmP1m(1-2) | Team memory Processor manager type1(1-2) |

Based on the above selected third-stage wCCs for type1-(w2) mWSA2-(version2), third-stage type1-based HAMs can aggregate them via WL1, WL2, WL3 and WL4, creating the type1 (w2)-mWSA2=wCM(73+74), which can be best illustrated by the HAM-Table as follows.

FIG. 13*c* (w3)-mWSA3

As shown in FIG. 13*c*, all of the necessary third-stage wCCs for building type2-based (w3)-mWSA3 (version3) can be best illustrated by the wCC-usage Table as follows.

| wCC( ) | Abbr. Name | Description |
|---|---|---|
| 22L | LSPDT | Left Single Port Double Throw relay |
| 23R | DPDT-Read | Double Port Double Throw-Read Relay |
| 23W | DPDT-Write | Double Port Double Throw-Write Relay |
| 24W | w2-Wbus | w2-Write bus |
| 24R | w2-Rbus | w2-Read bus |
| 26u | uDPST | up Double Port Single Throw relay |
| 26d | dDPST | down Double Port Single Throw relay |
| 26L | LDPST | Left Double Port Single Throw relay |
| 26r | rDPST | right Double Port Single Throw relay |
| 31 | TmP2 | Team memory Processor type2 |
| 35u | uTm(1-2) | up Team memory(1-2) |
| 35d | dTm(1-2) | down Team memory(1-2) |
| 35L | LTm(1-2) | Left Team memory(1-2) |
| 35r | rTm(1-2) | right Team memory(1-2) |
| 37 | TmL2(1-2) | Team memory paneL type2(1-2) |
| 39 | TmP2m(1-2) | Team memory Processor manager type2(1-2) |

Based on the above selected third-stage wCCs for type2-(w3) mWSA3-(version3), third-stage type1-based HAMs can aggregate them via WL1, WL2, WL3 and WL4, creating the type2 (w3)-mWSA3=wCM(75+76), which can be best illustrated by the HAM-Table as follows.

| HAM: wCM( ) | wCM = wCCs | Abbr. Name | Description |
|---|---|---|---|
| 73 | wCM(73)= | (w2)-mWSA2p1 | (w2)-memory Workgroup Server Array-type2 version2/part1 |
|  | wCC(21) × (1) | TmP1 | Agg via WL1, WL2, WL3 |
|  | wCC(22: u, d, r) × (3) | (u, d, r)SPDT | Agg via WL2: w2 control line |
|  | wCC(23R) × (1) | DPDT-Read | Agg via WL2: w2 control line |
|  | wCC(23W) × (1) | DPDT-Write | Agg via WL2: w2 control line |
|  | wCC(24R) × (2) | w2-bus-Read | Agg via WL2: w2 |
|  | wCC(24W) × (2) | w2-bus-Write | Agg via WL2: w2 |
|  | wCC(25) × (i) | Tm(1-i) | Agg via WL2: w2 |
|  | wCC(26: u, d) × (2i + 2i) | (u, d)DPST | Agg via WL2: w2 control line |
|  | wCC(26r) × (2) | (r)DPST | Agg via WL2: w2 control line |
| 74 | wCM(74)= | (w2)-mWSA2p2 | (w2)-memory Workgroup Server Array-type2 version2/part2 |
|  | wCC(27) × (2) | TmL1(1-2) | Agg via WL3: R, V, U |
|  | wCC(29)(2) | TmP1m(1-2) | Agg via WL3, WL4: F1, F2 |
| 73 + 74 | wCM(73 + 74) | (w2)-mWSA2 | (w2)-memory Workgroup Server Array type1 version2 |

| HAM: wCM( ) | wCM = wCCs | Abbr. Name | Description |
|---|---|---|---|
| 75 | wCM(75)= | (w2)-mWSA3p1 | (w2)-memory Workgroup Server Array-type2 version3/part1 |
| | wCC(22) × (1) | LSPDT | Agg via WL2: w3 control line |
| | wCC(23R) × (1) | DPDT-Read | Agg via WL2: w3 control line |
| | wCC(23W) × (1) | DPDT-Write | Agg via WL2: w3 control line |
| | wCC(24R) × (1) | w3-bus-Read | Agg via WL2: w3 |
| | wCC(24W) × (1) | w3-bus-Write | Agg via WL2: w3 |
| | wCC(26: u, d, L, r) × (8) | (u, d, L, r)DPST | Agg via WL2: w3 control line |
| | wCC(31) × (1) | TmP2 | Agg via WL1, WL2, WL3 |
| | wCC(35: u, d, L, r) × (4) | (u, d, L, r)Tm | Agg via WL2: w3 |
| 76 | wCM(76) | (w2)-mWSA3p2 | (w2)-memory Workgroup Server Array-type2 version3/part2 |
| | wCC(37) × (2) | TmL2(1-2) | Agg via WL3: R, V, U |
| | wCC(39) × (2) | TmP2m(1-2) | Agg via WL3, WL4: F1, F2 |
| 75 + 76 | wCM(75 + 76) | (w3)-mWSA3 | (w3)-memory Workgroup Server Array type2 version3 |

FIG. 13d (w3)-mWSA4

As shown in FIG. 13d, all of the necessary third-stage wCCs for building type2-based (w3)-mWSA4 (version4) can be best illustrated by the wCC-usage Table as follows.

| wCC( ) | Abbr. Name | Description |
|---|---|---|
| 22u | uSPDT | up Single Port Double Throw relay |
| 22d | dSPDT | down Single Port Double Throw relay |
| 23R | DPDT-Read | Double Port Double Throw-Read Relay |
| 23W | DPDT-Write | Double Port Double Throw-Write Relay |
| 24W | w2-Wbus | w2-Write bus |
| 24R | w2-Rbus | w2-Read bus |
| 26u | uDPST(1-2i) | up Double Port Single Throw relay(1-2i) |
| 26d | dDPST(1-2i) | down Double Port Single Throw relay(1-2i) |
| 31 | TmP2 | Team memory Processor type2 |
| 35u | uTm(1-i) | up Team memory(1 to i) |
| 35d | dTm(1-i) | down Team memory(1 to i) |
| 37 | TmL2(1-2) | Team memory paneL type2 (1-2) |
| 39 | TmP2m(1-2) | Team memory Processor manager type2 (1 to 2) |

Based on the above selected third-stage wCCs for type2-(w3) mWSA4-(version4), third-stage type1-based HAMs can aggregate them via WL1, WL2, WL3 and WL4, creating the type2 (w3)-mWSA4=wCM(77+78), which can be best illustrated by the HAM-Table as follows.

FIG. 13e (w3)-mWSA5

As shown in FIG. 13e, all of the necessary third-stage wCCs for building type2-based (w3)-mWSA5 (versions) can be best illustrated by the wCC-usage Table as follows.

| wCC( ) | Abbr. Name | Description |
|---|---|---|
| 22u | uSPDT | up Single Port Double Throw relay |
| 22L | LSPDT | Left Single Port Double Throw relay |
| 22d | dSPDT | down Single Port Double Throw relay |
| 23R | DPDT-Read | Double Port Double Throw-Read Relay |
| 23W | DPDT-Write | Double Port Double Throw-Write Relay |
| 24W | w2-Wbus | w2-Write bus |
| 24R | w2-Rbus | w2-Read bus |
| 26u | uDPST(1-i) | up Double Port Single Throw relay(1-i) |
| 26d | dDPST(1-i) | down Double Port Single Throw relay(1-i) |
| 26L | LDPST(1-2) | Left Double Port Single Throw relay(1-2) |
| 31 | TmP2 | Team memory Processor type2 |
| 35u | uTm(1-i) | up Team memory(1 to i) |
| 35d | dTm(1-i) | down Team memory(1 to i) |
| 35L | LTm | Left Team memory |
| 37 | TmL2(1-2) | Team memory paneL type2(1-2) |
| 39 | TmP2m(1-2) | Team memory Processor manager type2 (1-2) |

Based on the above selected third-stage wCCs for type2-(w3) mWSA5-(version5), third-stage type1-based HAMs can aggregate them via WL1, WL2, WL3 and WL4, creating the type2-(w3) mWSA5=wCM(79+80), which can be best illustrated by the HAM-Table as follows.

| HAM: wCM( ) | wCM = wCCs | Abbr. Name | Description |
|---|---|---|---|
| 77 | wCM(77)= | (w3)-mWSA4p1 | (w3)-memory Workgroup Server Array-type-2 version4/part1 |
| | wCC(22: u, d) × (2) | (u, d)SPDT | Agg via WL2: w3 control line |
| | wCC(23R) × (1) | DPDT-Read | Agg via WL2: w3 control line |
| | wCC(23W) × (1) | DPDT-Write | Agg via WL2: w3 control line |
| | wCC(24R) × (1) | w3-bus-Read | Agg via WL2: w3 |
| | wCC(24W) × (1) | w3-bus-Write | Agg via WL2: w3 |
| | wCC(26: u, d) × (2i + 2i) | (u, d)DPST | Agg via WL2: w3 control line |
| | wCC(31) × (1) | TmP2 | Agg via WL1, WL2, WL3 |
| | wCC(35: u, d) × (i + i) | (u, d)Tm | Agg via WL2: w3 |
| 78 | wCM(78)= | (w3)-mWSA4p2 | (w3)-memory Workgroup Server Array type2-version4/part2 |
| | wCC(37) × (2) | TmL2(1-2) | Agg via WL3: R, V, U |
| | wCC(39) × (2) | TmP2m(1-2) | Agg via WL3, WL4: F1, F2 |
| 77 + 78 | wCM(77 + 78) | (w3)-mWSA4 | (w3)-memory Workgroup Server Array type2-version4 |

| HAM: wCM() | wCM = wCCs | Abbr. Name | Description |
|---|---|---|---|
| 79 | wCM(79)= | (w3)-mWSA5p1 | (w2)-memory Workgroup Server Array-type2-verion5/part1 |
| | wCC(22: u, d, L) × (3) | (u, d, L)SPDT | Agg via WL2: w3 control line |
| | wCC(23R) × (1) | DPDT-Read | Agg via WL2: w3 control line |
| | wCC(23W) × (1) | DPDT-Write | Agg via WL2: w3 control line |
| | wCC(24R) × (1) | w3-bus-Read | Agg via WL2: w3 |
| | wCC(24W) × (1) | w3-bus-Write | Agg via WL2: w3 |
| | wCC(26: u, d) × (2i + 2i) | (u, d)DPST | Agg via WL2: w3 control line |
| | wCC(26L) × (2) | LDPST | Agg via WL2: w3 control line |
| | wCC(31) × (1) | TmP2 | Agg via WL1, WL2, WL3 |
| | wCC(35: u, d) × (i + i) | (u, d)Tm | Agg via WL2: w3 |
| | wCC(35L) × (1) | LTm | Agg via WL2: w3 |
| 80 | wCM(80)= | (w3)-mWSA5p2 | (w2)-memory Workgroup Server Array-type2 version5/part 2 |
| | wCC(37) × (2) | TmL2(1-2) | Agg via WL3: R, V, U |
| | wCC(39) × (2) | TmP2m(1-2) | Agg via WL3, WL4: F1, F2 |
| 79 + 80 | wCM(79 + 80) | (w3)-mWSA5 | (w3)-memory Workgroup Server Array-type2 version5 |

FIG. 13f (w3)-mWSA6

As shown in FIG. 13f, all of the necessary third-stage wCCs for building type2-based (w3)-mWSA6 (version6) can be best illustrated by the wCC-usage Table as follows.

| WCC( ) | Abbr. Name | Description |
|---|---|---|
| 22u | uSPDT | up Single Port Double Throw relay |
| 22L | LSPDT | Left Single Port Double Throw relay |
| 22d | dSPDT | down Single Port Double Throw relay |
| 22r | rSPDT | right Single Port Double Throw relay |
| 23R | DPDT-Read | Double Port Double Throw-Read Relay |
| 23W | DPDT-Write | Double Port Double Throw-Write Relay |
| 24W | w2-Wbus | w2-Write bus |
| 24R | w2-Rbus | w2-Read bus |
| 26u | uDPST(1-2i) | up Double Port Single Throw relay(1 to 2i) |
| 26d | dDPST(1-2i) | down Double Port Single Throw relay(1 to 2i) |
| 26L | LDPST(1-2) | Left Double Port Single Throw relay(1-2) |

-continued

| WCC( ) | Abbr. Name | Description |
|---|---|---|
| 26r | rDPST(1-2) | Right Double Port Single Throw relay(1-2) |
| 31 | TmP2 | Team memory Processor type2 |
| 35u | uTm(1-i) | up Team memory(1 to i) |
| 35d | dTm(1-i) | down Team memory(1 to i) |
| 35L | LTm | Left Team memory |
| 35r | rTM | right Team memory |
| 37 | TmL2(1-2) | Team memory paneL type2(1-2) |
| 39 | TmP2m(1-2) | Team memory Processor manager type2(1-2) |

Based on the above selected third-stage wCCs for type2-(w3) mWSA6-(version6), third-stage type1-based HAMs can aggregate them via WL1, WL2, WL3 and WL4, creating the type2-(w3) mWSA6=wCM(81+82), which can be best illustrated by the HAM-Table as follows.

| HAM: wCM() | wCM = wCCs | Abbr. Name | Description |
|---|---|---|---|
| 81 | wCM(81) | (w3)-mWSA6p1 | (w3)-memory Workgroup Server Array-type2-version6/part 1 |
| | wCC(22: u, d, L, r) × (4) | (u, d, L, r)SPDT | Agg via WL2: w3 control line |
| | wCC(23R) × (1) | DPDT-Read | Agg via WL2: w3 control line |
| | wCC(23W) × (1 | DPDT-Write | Agg via WL2: w3 control line |
| | wCC(24R) × (1) | w3-bus-Read | Agg via WL2: w3 |
| | wCC(24W) × (1) | w3-bus-Write | Agg via WL2: w3 |
| | wCC(26: u, d) × (2i + 2i) | (u, d)DPST | Agg via WL2: w3 control line |
| | wCC(26: L, r) × (2 + 2) | (L, r)DPST | Agg via WL2: w3 control line |
| | wCC(31) × (1) | TmP2 | Agg via WL1, WL2, WL3 |
| | wCC(35: u, d) × (i + i) | (u, d)Tm | Agg via WL2: w3 |
| | wCC(35: L, r) × (1 + 1) | (L, r)Tm | Agg via WL2: w3 |
| 82 | wCM(82) | (w3)-mWSA6p2 | (w3)-memory Workgroup Server Array-type2-version6/part 2 |
| | wCC(37) × (2) | TmL2(1-2) | Agg via WL3: R, V, U |
| | wCC(39) × (2) | TmP2m(1-2) | Agg via WL3, WL4: F1, F2 |
| 81 + 82 | wCM(81 + 82) | (w3)-mWSA6 | (w3)-memory Workgroup Server Array-type2-version6 |

FIG. 13g (w3)-mWSA7

As shown in FIG. 13g, all of the necessary third-stage wCCs for building type2-based (w3)-mWSA7 (version7) can be best illustrated by the wCC-usage Table as follows.

| wCC( ) | Abbr. Name | Description |
|---|---|---|
| 22 | SPDT | Single Port Double Throw relay |
| 23R | DPDT-Read | Double Port Double Throw-Read Relay |
| 23W | DPDT-Write | Double Port Double Throw-Write Relay |
| 23R/W | DPDT-R/W | Double Port Double Throw-Read/Write Relay |
| 24R/W | W3-R/W bus | W3-Read/Write bus |
| 26d | dDPST(1-2i) | down Double Port Single Throw relay(1 to 2i) |
| 31 | TmP2 | Team memory Processor type2 |
| 35 | Tm(1-i) | Team memory (1 to i) |
| 37 | TmL2(1-2) | Team memory paneL type2(1-2) |
| 39 | TmP2m(1-2) | Team memory Processor manager type2(1-2) |

Based on the above selected third-stage wCCs for type2-(w3) mWSA7-(version7), third-stage type1-based HAMs can aggregate them via workgroup execution linkage2 (WL2:W2) for workgroup execution aggregation and workgroup linkage3 (WL3:RVU) for workgroup-fail-over aggregation, creating the type2-(w3) mWSA7=wCM(83+84), which can be best illustrated by the HAM-Table as follows.

| HAM: wCM( ) | wCM= wCCs | Abbr. Name | Description |
|---|---|---|---|
| 83 | wCM(83)= | (w3)-mWSA7p1= | (w3)-memory-expanding Workgroup Server Array-type2-version7/part1 |
|  | wCC(22: d) × (1) | dSPDT | Agg via WL2: w3 control line |
|  | wCC(23R) × (1) | DPDT-read | Agg via WL2: w3 control line |
|  | wCC(23W) × (1) | DPDT-write | Agg via WL2: w3 control line |
|  | wCC(23R/W) × (1) | DPDT | Agg via WL2: w3 control line |
|  | wCC(24R) × (1) | w3-bus-Read | Agg via WL2: w3 |
|  | wCC(24W) × (1) | w3-bus-Write | Agg via WL2: w3 |
|  | wCC(26) × (2i) | DPST | Agg via WL2: w3 control line |
|  | wCC(31) × (1) | TmP2 | Agg via WL1, WL2, WL3 |
|  | wCC(35) × (i) | Tm | Agg via WL2: w3 |
| 84 | wCM(84)= | (w3)-mWSA7p2= | (w3)-memory-expanding Workgroup Server Array-type2-version7/part2 |
|  | wCC(37) × (2) | TmL2(1-2) | Agg via WL3: R, V, U |
|  | wCC(39) × (2) | TmP2m(1-2) | Agg via WL3, WL4: F1, F2 |
| 83 + 84 | wCM(83 + 84) | (w3)-mWSA7 | (w3)-memory Workgroup Server Array-type2-version7 |

FIG. 13h (w3)-mWSA8

As shown in FIG. 13h, all of the necessary third-stage wCCs for building type2-based (w3)-mWSA8 (version8) can be best illustrated by the wCC-usage Table as follows.

| wCC( ) | Abbr. Name | Description |
|---|---|---|
| 22u | uSPDT | up Single Port Double Throw relay |
| 22r | rSPDT | up Single Port Double Throw relay |
| 22d | dSPDT | down Single Port Double Throw relay |
| 23R | DPDT-Read | Double Port Double Throw-Read relay |
| 23W | DPDT-Write | Double Port Double Throw-Write relay |
| 24W | W3-Wbus | W3-Write bus |
| 24R | W3-Rbus | W3-Read bus |
| 26u | uDPST(2 + 2) | up Double Port Single Throw relay(2 + 2) |
| 26d | dDPST(1-2i) | down Double Port Single Throw relay(1 to 2i) |
| 31 | TmP2 | Team memory Processor type2 |
| 35u | uTm(1 + 1) | Up Team memory(1 + 1) |
| 35d | dTm(1 to i) | down Team memory(1 to i) |
| 35r | rTm(1) | right Team memory |
| 37 | TmL2(1-2) | Team memory paneL type2(1-2) |
| 39 | TmP2m(1-2) | Team memory Processor manager type2(1-2) |

Based on the above selected third-stage wCCs for type2-(w3) mWSA8-(version8), third-stage type1-based HAMs can aggregate them via workgroup execution linkage2 (WL2:W2) for workgroup execution aggregation and workgroup linkage3 (WL3:RVU) for workgroup-fail-over aggregation, creating the type2-(w3) mWSA8=wCM(85+86), which can be best illustrated by the HAM-Table as follows.

| HAM: wCM() | wCM= wCCs | Abbr. Name | Description |
|---|---|---|---|
| 85 | wCM(85)= | (w3)-mWSA8p1 | (w3)-memory-bonding Workgroup Server Array-type2-version8/part 1 |
|  | wCC(22: u, d, r) × (3) | (u, d, r)SPDT | Agg via WL2: w3 control line |
|  | wCC(23R) × (2) | DPDT-Read | Agg via WL2: w3 control line |
|  | wCC(23W) × (3) | DPDT-Write | Agg via WL2: w3 control line |
|  | wCC(24R) × (1) | w3-bus-Read | Agg via WL2: w3 |
|  | wCC(24W) × (1) | w3-bus-Write | Agg via WL2: w3 |
|  | wCC(26: u, d) × (4 + 2i) | (u, d)DPST | Agg via WL2: w3 control line |
|  | wCC(31) × (1) | TmP2 | Agg via WL1, WL2, WL3 |
|  | wCC(35: u, d) × (2 + i) | (u, d)Tm | Agg via WL2: w3 |
| 86 | wCM(86)= | (w3)-mWSA8p2 | (w3)-memory-bonding Workgroup Server Array-type2-version8/part 2 |
|  | wCC(37) × (2) | TmL2(1-2) | Agg via WL3: R, V, U |
|  | wCC(39) × (2) | TmP2m(1-2) | Agg via WL3, WL4: F1, F2 |
| 85 + 86 | wCM(85 + 86) | (w3)-mWSA8 | (w3)-memory Workgroup Server Array-type2-version8 |

3.7 Scalable cWSAs
3.7.1 The must have control-WSAs

In order to create scalable cWSA, it is imperative to analyze how many concurrent workgroup top-control operations can be generated based on mid-memory mWSAs.

Since there are two types of mWSAs, it is only proper to create two corresponding types of cWSAs (i.e., (w2/w3-hybrid type1)-cWSA1 and (w3-only type2)-cWSA2) to accommodate 2 different workgroup top-control manipulation operations.

3.7.2 HCMs

Based on the third mandate of wEP1 fail-over evolutionary architecture and its derived wTF1.stage4 Hardware Architecture Theory (HAT), which comprising Hardware Construction Methods (HCMs) in creating the basic wCCs and Hardware Aggregation Methods (HAMs) in creating standard wCMs and fail-over-3 cWSAs.

Here are the fourth-stage Hardware Construction Methods (HCMs) in creating the top-control-based "fail-over capable" wCCs, which can be described as follows:

(1) HCM-1 is to implement 2 types of control-based TeamProcessors (w2/w3 hybrid-type1)-TcP1, dubbed wCC(41) and (w3-type2)-TcP2, dubbed wCC(51) by using existing node-Core Entities/Systems (nCEs/nCESs) and equipping them with workgroup communication linkage1 (WL1: W1), workgroup execution linkage2 (WL2:W2/W3) and workgroup fail-over linkage3 (WL3:RVU).

(2) HCM-2 is to construct type1-TeampaneL TcL1, dubbed wCC(47) and type2-TeampaneL TcL2, dubbed wCC(57) by remodifying 4-in-1 TeampaneL (TL) and equipping them with workgroup fail-over linkage3 (WL3:RVU).

(3) HCM-3 is to implement designated type1-based paired-TcP1 managers TcP1m(1&2), dubbed wCC(49) and type2-based TcP2m(1&2), dubbed wCC(59) by using the common sharing TeamServer (TS) with SCSI disk (as patented TeamManager in generic WSA) and equipping them with workgroup fail-over linkage3 (WL3:RVU) and workgroup fail-over communication linkage4 (WL4:F1/F2). Basically, wCC(49) has the same hardware configuration as wCC(59).

3.7.3 2 Type-HAMs

Based on these fourth-stage wCCs as well as previous-staged wCCs and the number of them being used for building type1 and type2 cWSAs, there are fourth-stage type1-HAMs that can build type1-based fail-over-3 (w2/w3-hybrid)-cWSAs, as illustrated in FIG. 14a and fourth-stage type2-HAMs that can build type2-based fail-over-3 (w3)-cWSAs, as illustrated in FIG. 14b.

FIG. 14a (w2/w3)-cWSA1

As shown in FIG. 14a, all of the necessary fourth-stage wCCs for building up type1-based (w2/w3-hybrid)-cWSA1 can be best illustrated by the wCC-usage Table as follows.

| wCC( ) | Abbr. Name | Description |
|---|---|---|
| 5 | WEC | Workgroup Ethernet Controller |
| 26u | uDPDT(1-i) | up Double Port Double Throw relay(1 to i) |
| 26d | dDPDT(1-i) | down Double Port Double Throw relay(1-i) |
| 41 | TcP1(1-i) | Team control Processor type1(1-i) |
| 47 | TcL1(1-i) | Team control paneL type1(1-i) |
| 49 | TcP1m(1-2) | Team control Processor manager type1(1-2) with a Front-Panel and a keyboard/video/mouse switching (KVM) Device |

Based on all the selected fourth-stage wCCs for type1-(hybrid) cWSAs, the fourth-stage type1-based HAMs can aggregate them via WL1, WL2, WL3 and WL4, creating the type1 (w2/w3-hybrid type1)-cWSA1=wCM(91+92), which can be best illustrated by the HAM-Table as follows.

| HAM: wCM( ) | wCM = wCCs | Abbr. Name | Description |
|---|---|---|---|
| 91 | wCM(91)= | (hybrid)-cWSA1p1 | (hybrid)-control Workgroup Server Array type1/part1 |
|  | wCC(5) × (1) | WEC | Agg via WL1; W1 |
|  | wCC(26: u, d) × (i + i) | (u, d)DPDT | Agg via WL2: control line |
|  | wCC(41) × (i) | TcP1 | Agg via WL1, WL2, WL3 |
| 92 | wCM(92)= | (hybrid)-cWSA1p2 | (hybrid)-control Workgroup Server Array type1/part2 |
|  | wCC(47) × (i) | TcL1 | Agg via WL3: R, V, U |
|  | wCC(49) × (2) | TcP1m(1-2) | Agg via WL3, WL4: F1, F2 |
| 91 + 92 | wCM(91 + 92) | (hybrid)-cWSA1 | (hybrid)-control Workgroup Server Array type1 |

FIG. 14b (w3)-cWSA2

As shown in FIG. 14b, all of the necessary fourth-stage wCCs for building up type2-based (w3)-cWSA2 can be best illustrated by the wCC-usage Table as follows.

| HCM: wCC( ) | Abbr. Name | Description |
|---|---|---|
| 5 | WEC | Workgroup Ethernet Controller |
| 26u | uDPDT(1-i) | up Double Port Double Throw relay(1-i) |
| 26d | dDPDT(1-i) | down Double Port Double Throw relay(1-i) |
| 51 | TcP2(1-i) | Team control Processor type2(1-i) |
| 57 | TcL2(1-i) | Team control paneL type2(1-i) |
| 59 | TcP2m(1-2) | Team control Processor manager type2(1-2) with a Front-Panel and a keyboard/video/mouse switching (KVM) Device |

Based on all the selected fourth-stage wCCs for type2-(w3) cWSA2, the fourth-stage type1-based HAMs can aggregate them via WL1, WL2, WL3 and WL4, creating the type2 (w3)-cWSA2=wCM(93+94), which can be best illustrated by the HAM-Table as follows.

| HAM: wCM( ) | wCM= wCCs | Abbr. Name | Description |
|---|---|---|---|
| 93 | wCM(93)= | (w2/w3)-cWSA2p1 | (w2/w3)-control Workgroup Server Array type2/part1 |
|  | wCC(5) × (1) | WEC | Agg via WL1: W1 |
|  | wCC(26: u, d) × (i + i) | (u, d)DPDT | Agg via WL2: w3 control line |
|  | wCC(51) × (i) | TcP2 | Agg via WL1, WL2, WL3 |
| 94 | wCM(94)= | (w3)-cWSA2p2 | (w3)-control Workgroup Server Array type2/part2 |
|  | wCC(57) × (i) | TcL2 | Agg viaWL3: R, V, U |
|  | wCC(59) × (2) | TcP2m(1-2) | Agg via WL3, WL4: F1, F2 |
| 93 + 94 | wCM(93 + 94) | (w3)-cWSA2 | (w3)-control Workgroup Server Array type2 |

4.0 the Second Period of wECP: wEP2-(Fail-Safe)-EA2/TF2-(HAT)

As stated in the nECP, the first limitation of nEP2-EA is that it uses non-fail-over nCMs to construct 3-nBBBs, which cannot evolve further, due to the fact the evolved nEntities cannot survive in the real world environment. Therefore, these 3-nBBB must be upgraded to equip "fail-over-3" capabilities by using workgroup fail-over links.

4.1 Workgroup Server Array Upgrades

Since the fundamental principle of evolutionary architecture is that it must have the bottom-up base-mid-top hierarchy, as illustrated by the node-computing (base/mid/top hierarchical) 3-nBBB evolutionary architecture, the new and better workgroup evolutionary architecture should maintain the same hierarchy but with each BBB equipped with "scalable fail-over-3" capability.

4.1.1 Upgrade1: 6 wBBB.

Therefore, the first workgroup-linked base-BBB should be constructed by using the scalable attribute-based WSA (aWSA) part1-scalable execution modules and part2-scalable fail-over modules as shown in FIGS. 12a and 12b, for creating two base-level basic building blocks (BBB): (1) Base Attribute-Block (BAB) (i.e. wBBB1) and (2) Base-attribute Fail-over Block (BFB) (i.e., wBBB2).

By the same consideration, the second workgroup-linked mid-BBB should be constructed by using memory-based WSA (mWSA) part1-execution modules and part2-fail-over modules as shown in FIG. 13a-13h, for creating two mid-level basic building blocks: (1) Mid Memory Block (MMB) (i.e., wBBB3) and (2) Mid-memory Fail-over Block (MFB) (i.e., wBBB4).

Again, the third workgroup-linked top-BBB should be constructed by using control WSA (cWSA) part1-execution module and part2-fail-over module as shown in FIG. 14a, 14b, for creating two top-level basic building blocks: (1) Top Control Block (TCB) (i.e., wBBB5) and (2) top-control Fail-over Block (TFB) (i.e., wBBB6).

Therefore, a new and better "workgroup evolutionary architecture" can be established by having six (6) workgroup-linked Basic Building Blocks (6-wBBB) (i.e., base-level BAB, BFB; mid-level MMB, MFB; and top-level TCB, TFB).

4.1.2 Upgrade2: Workgroup Data-Packet Operation

As stated in the nECP, the second limitation of nEP2-EA is that it only allows data-processing via its mid-memory nBBB via directional memory-buses, which will eliminate the possibility of concurrency of multiple data-processing on one directional data-processing, only allowing time-sharing-based parallel data-processing and eliminating the possibility of bottom-up further integration due to mid-memory nBBB is not scalable.

Since the 6-wBBBs will allow concurrent top-control BBB workgroup data-packet down-ward flows thru the mid-memory BBB to the base-attribute BBB, which also can concurrent return the result data-packet flows upward thru the mid-memory BBB to the top-control BBB, enabling "closed-looped" internal workgroup packet-based operation by the top-control managers. Therefore, the hierarchical and fail-over 6-wBBBs can be integrated into a bigger "core-entities," which can become a fail-over-3 wCM to be used to construct the base-attribute BBB, initiating the next iteration for evolving further down without stoppage.

4.2 the Must have wEP2 6-wBBB Workgroup Hierarchical Integration-Based EA2-Mandates Therefore, based on the above must-have upgrades of nEP2-EA's limitations, the second workgroup evolutionary principle (wEP2) is thus established to bring forth the "workgroup-linked hierarchical-integration-based" Evolutionary Architecture (EA) that comprises the following 6 mandates (EAM).

Mandate-1: the must-have 6 workgroup-linked Basic Building Blocks (6-wBBBs), which can be constructed by using the standard 3-link-typed WSAs, as illustrated from FIG. 12.x to FIG. 14.x;

Mandate-2: the must-have workgroup Hierarchical Core Structure (HCS), which can be built by aggregating 6-wBBBs with workgroup four linkages from WL1 to WL4;

Mandate-3: the must-have iterative workgroup-based Hardware Architecture Theory (HAT) with related methods in constructing 6 wBBBs and in aggregating 6 wBBBs into HCS;

Mandate-4: the must-have workgroup entity-oriented OSs to equip HCS into workgroup Core-Entity hardware-structure (CE);

Mandate-5: the must-have workgroup entity domain programs to equip ECS into workgroup Core-Entity Domain (CED) hardware-structure; and Mandate-6: the must-have iterative workgroup Software Architecture Theorem (SAT) with related software methods in generating the workgroup core entity-oriented OSs and workgroup core entity domain programs.

4.3 wTF2-wHAT2 for the First Workgroup HCS

Therefore, based on the third mandate of wEP2 evolutionary architecture, the new and better workgroup Theoretic Foundation (wTF2) can be derived, which contains the Hardware Architecture Theory (HAT), comprising Hardware Construction Methods (HCMs) in creating the 6-wBBBs and Hardware Aggregation Methods (HAMs) in creating the workgroup-based Hierarchical Core Structure (HCS).

4.4 wTF2-wSAT2 for the First Workgroup Entity

Furthermore, based on the "sixth mandate" of wEP2 evolutionary architecture, the new and better workgroup Theoretic Foundation (wTF2) can be derived to contain the Software Architecture Theorem (SAT), which comprises "core-Entity Integration Methodology" (EIMs, or SOM=Software OS architecture Methodology) in creating the workgroup entity-oriented (integrated)-OSs and core-Entity domain Programming Methods (EPMs, or SPM=Software Program architecture Methodology) in creating the workgroup core-entity domain programs.

4.5 the First Evolved Workgroup Entities=(XP+FP) (FIG. 15)

As illustrated in FIG. 15, the first 6-BBB architected generic workgroup Entity (wEntity) can be created, due to the "6-workgroup BBB-based" evolutionary architecture EA and its derived wTF2-(HAT/SAT). Moreover, the internal XP integrated-OSs and FP-integrated OSs can real-time interact with one another, empowering the first generic wEntity with the following three (3) entity-oriented fail-safe capabilities, (i.e., (1) real-time self-healing, (2) self-growing and (3) self-protecting capabilities, dubbed as the "fail-safe-3" entity-oriented capabilities).

Therefore, a new and better "workgroup-computing-based Evolutionary Principle-two (wEP2)" can be established based on the creation of a "6-workgroup BBB-based" evolutionary architecture, which not only can maintain long-lasting evolutionary processes and cultivate continuous evolutionary pathway along the evolutionary timeline, but also can enable the architected workgroup entities to have "fail-safe-3" entity-innate capabilities.

4.6 Ensuing Never-Ending Workgroup Evolutionary Processes (FIG. 16)

Most importantly, the wEP2-generic Evolutionary Architecture with its workgroup evolutionary processing can be continued without stoppage. It means that any newly created wEntity can readily become one of the base-attribute wEntities for starting the next "hierarchical base/mid/top 6-wBBBs integration-based" iterative "progressive" processes (i.e., workgroup evolutionary processes), continuously creating bigger wEntities with better "entity-innate core-domain" capabilities.

Moreover, workgroup evolutionary processes will never cease due to the fact that the newly created core-entities are "innate-duality compliant," allowing them to be aggregated, encapsulated and manipulated to complete the bottom-up hierarchical internal integration, as long as the aggregated symbiotic entity-relationship can be formed without any difficulties. That is when an entity becomes too bigger and powerful and there is no symbiotic relationship can be formed to further create an even bigger and more powerful entity. As illustrated in FIG. 16, based on 6-wBBB evolutionary architecture, numerous iterations of workgroup evolutionary processes create bigger 6-wBBB with WL1, WL2, WL3 and WL4-architected wEntities until the nth iteration, Generating n-stages of bigger wEntities with innate capabilities that are encapsulated by the same mid-memory-block (MMB) and mid-fail-over block (MFB) and manipulated by the same top-control block (TCB) and top fail-over block (TFB) in the first generation along the workgroup evolutionary timeline. Furthermore, all the multi-stage wEntities of the first generation can be used to construct more sophisticated base-attribute-block (BAB) and base fail-over block (BFB) of a new and better evolvable 6-wBBB with new encapsulation-based mid-memory-block (MMB)/mid-fail-over-block (MFB) and new manipulation-control-based top-control-block (TCB)/top-fail-over block (TFB), generating multi-stage wEntities of the second generation with more sophisticated capabilities. By the aforementioned workgroup generation-based evolution, the multi-stage wEntities of the third, fourth, fifth, sixth and seventh generations with various gradient capabilities can all be generated accordingly along the workgroup evolutionary timeline.

As illustrated in FIGS. 8, 9 and 10, there are Generation-1 multi-stage workgroup production entities with multiple degrees of real-time complex production capabilities; Generation-2 multi-stage workgroup assembly entities with multiple degrees of real-time diverse assembly capabilities by integrating a plurality of workgroup production entities; Generation-3 multi-stage workgroup fabrication entities with multiple degrees of real-time dynamic fabrication capabilities by integrating a plurality of workgroup assembly entities; Generation-4 multi-stage workgroup transaction entities with multiple degrees of real-time cognitive-interactive transaction capabilities by integrating a plurality of workgroup fabrication entities; Generation-5 multi-stage workgroup organization entities with multiple degrees of real-time 3-level intelligent organization capabilities (i.e., innate-duality intelligence, collaborative-artificial-intelligence and cooperative-swarm-intelligence) by integrating a plurality of "standard" workgroup transaction entities; Generation-6 multi-stage workgroup apparatus entities with multiple degrees of real-time 3-level intelligent apparatus capabilities by integrating a plurality of "compact" workgroup transaction entities and workgroup organization entities; and Generation-7 multi-stage workgroup PDA (personal-digital-assistant) entities with multiple degrees of real-time 3-level intelligent PDA capabilities by integrating a plurality of "miniature" workgroup transaction entities and workgroup apparatus entities. These 7 workgroup-generation-based capabilities are 7-level gradient, meaning real-time intelligence for organization (e.g., smart-businesses), apparatuses (e.g., smart-homes and smart-cars) and PDA (e.g., smart-PDAs and smart wearables) can never be realized unless the real-time production complexity, real-time assembly diversity, real-time fabrication dynamism and real-time transaction cognitive-interactivity are fulfilled. This also means that the current node-computing application system's computational/computability theories, dealing with how much the time required and how big the memory-space needed to solve a particular "complicated-application" problem, can only lead to weak artificial-intelligence based on pre-set logics, never achieving real-time strong innate-intelligence, strong artificial-intelligence and strong swarm-intelligence, which are based upon real-time complexity, diversity, dynamism and cognitive-interactivity.

5.0 the Third Period of wECP: wEP3/wTF3/wSD3

As stated earlier, wEP2 is focused on a "six workgroup basic building block (6-wBBB) based evolutionary architecture" and its derived wTF2 comprises not only the first-time workgroup Hardware Architecture Theory (HAT) with methodologies for constructing these 6-wBBBs with wCCs and wCMs and for aggregating them into a "fail-over" 3-level (base-mid-top) workgroup hierarchical core structure (wHCS) via workgroup linkages (WL1 to WL4), but also the first-time workgroup Software Architecture Theorem (SAT) with methodologies in creating (1) 3-level workgroup-core structure-based workgroup Operating Systems (wOSs) to enhance the first-time wHCS into a workgroup Entity-Core Structure (ECS or in short, wEntity) and (2) workgroup entity-core solution programs to equip ECS into an workgroup Entity capability-Domain Structure (EDS) (i.e., wEntity with solution domain).

It is because that the first-time workgroup 3-level 6-wBBB-based hierarchical core structure can enable long-lasting progressive hardware iterative processes, meaning that any newly created hardware hierarchical core structure can readily become fail-over wCMs to construct the next 6 wBBBs for the next iteration (i.e., a new set of HAT-based methodologies can be established to create even bigger Hardware hierarchical core structures). These hardware iterative processes will progress along the timeline, which can be dubbed as "workgroup evolutionary processes along the workgroup evolutionary timeline."

Therefore, the second period of wECP, comprising wEP2, wTF2 and wSD2 will immediately evolve into the third period of wECP, comprising wEP3, wTF3 and wSD3, which will evolve along the workgroup evolutionary timeline in the third period, creating hardware wHCSs via wHATs of wTF3 and enhancing them into workgroup core-Entities (wEntities) with solution domains via wSATs of wTF3 to accommodate all the "real-world problem domains," so that any constantly changing problems in the problem domain can be solved by the solutions in the solution domains in a real-time manner. However, the most important "real world problem domains" that need to be tackled with are the service-oriented internet domains, where they involve from the smallest (1) multi-function-based production domains, to the (2) multi-production-based assembly domains, to the (3) multi-assembly based fabrication domains, to the (4) multi-fabrication-based transaction domains, to the (5) multi-transaction-based business-service domains, to the (6) multi-business-service-based user-service domains and the largest (7) multi-user-service-based individual-service domains.

Consequently, the workgroup Evolutionary Architecture Mandates (wEAMs) of wEP3 will derive a 7-workgroup-evolutionary-generation-based wTF3, which comprises a series of 7-generation-based HATs and SATs in theoretically creating 7-generation workgroup-computing wEntities with solution domains to accommodate those aforementioned real-world 7 service-oriented problem domains from the smallest to the largest. Furthermore, based on theoretic wEntities with generic solution domain capabilities, a plurality of specialized design-Science, develop-Technology and deploy-Engineering (STE) System Disciplines (SDs) of wSD3 can be established in generating all the 7-generation workgroup-entity systems (wSystems) with specialized solution domains for accommodating any service-oriented problem domains and solving stakeholders' problems in a real-time and concurrent manner.

Therefore, the third-period of workgroup Evolutionary Computing Paradigm (wECP) comprising wEP3, wTF3 and wSD3 frameworks, will create from the first workgroup-production generation-based, to the second workgroup-assembly generation-based, to the third workgroup-fabrication generation-based, to the fourth workgroup-transaction generation-based, to the fifth workgroup-business-service generation-based, to the sixth workgroup user-service generation-based and to the seventh workgroup individual-service generation-based workgroup computing generic wEntities and specialized wSystems along the workgroup evolutionary timeline.

Since the third period of node Evolutionary Computing Paradigm (nECP) with nEP3, nTF3 and nSD3 has stopped evolving at its first generation, creating node-computing systems, such as DOS-based and Windows/Unix/Linux-based, where DOSsystems are based on one-link-typed hardware structures equipped with only internal-linked IO-devices and Windows systems and the likes are based on two-link-typed hardware structures equipped with network-linked IO-devices and internal-linked IO-devices. Due to the limitations in 2-link-typed nEP3 and nTF3 in deriving weak HATs and SATs, the next level of node-computing evolution based on the 2-link-typed hardware structures can never be achieved, as discussed earlier.

That is why workgroup evolutionary computing paradigm (wECP) is needed firstly to enhance/modify those node-computing 2-link-typed functional components with "the third workgroup links" and therefore create 3-link-typed six(6) workgroup Basic-Building Blocks (6-wBBB) with three(3) hierarchical levels of WSAs (i.e., base-attribute-level aWSAs, mid-memory-level mWSAs and top-control-level cWSAs) in its first period of evolution, secondly to integrate these 3-level WSAs/6-wBBBs into the first-time workgroup-computing wEntities and wSystems in its second period of evolution, and then to start the third period into the first workgroup generation (wG1) by evolving the first-time workgroup computing wEntities into workgroup-production theoretic Task wEntities based on more sophisticated workgroup Evolutionary Architecture Mandates (wG1-EAMs) of wEP3 and the derived Hardware Architecture Theory (wG1-HAT) and Software Architecture Theorem (wG1-SAT) of wTF3, further generating workgroup-production Task wSystems based on design-Science, develop-Technology and deploy-Engineering (STE) specialized Task wSystem Disciplines (wG1-TSDs) of wSD3. All of the aforementioned wG1-EAMs, HAT, SAT and TSDs in creating workgroup-production theoretic Task wEntities and specialized Task wSystems will be described in details hereinafter.

Therefore, in this fifth chapter 5.0, there are seven (7) sections that will cover seven (7) generations of workgroup computing. They are:

5.1 The first workgroup-production generation, creating real-time-complex Task wEntities and Task wSystems;

5.2 The second workgroup-assembly generation, creating real-time-diverse Job wEntities and Job wSystems;

5.3 The third workgroup-fabrication generation, creating real-time-adaptive Case wEntities and Case wSystems;

5.4 The fourth workgroup-transaction generation, creating real-time-interactive Contract wEntities and Contract wSystems;

5.5 The fifth workgroup-business service generation, creating real-time-intelligent business-service-oriented wEntities and wSystems;

5.6 The sixth workgroup user service generation, creating real-time-intelligent user-service-oriented wEntities and wSystems; and 5.7 The seventh workgroup individual-service generation, creating real-time-intelligent individual-service-oriented wEntities and wSystems.

After these 7 sectional disclosure, it can be concluded that the third period of wECP over 7 generations will create all the necessary workgroup-computing systems with real-time solution domains to accommodate all the real-world production-oriented, assembly oriented, fabrication-oriented, transaction-oriented, business-service-oriented, user-service-oriented and individual-service-oriented problem domains. Most importantly, all the fast-changing problems in these accommodated problem domains can be real-time concurrently solved, due to the fact that these workgroup-computing solution domains are larger and denser than the targeted problem domains.

5.1 The First Workgroup-Production Generation (wG1)

The first workgroup evolutionary generation (wG1) of workgroup Evolutionary Computing Paradigm (wECP) is about how to deal with the real world smallest production-oriented problem domain, how to create the workgroup production theoretic Task wEntities via wG1-HAT&SAT and real-world specialized Task wSystems via wG1-TSDs, and how they can achieve real-world production objectives with real-time efficiency and effectiveness. Therefore, in this "workgroup production generation" section, there are nine (9) important "sub-sections" that need to be elaborated upon, from the real-world existent rationale of 3-level conveyer-integrated workgroups collaborated as one Task crew-entity for carrying out fine-grained problem-solving-(PS) operation to the realization of 3-level workgroup-computerized production Task wEntities and wSystems for supporting Task-crew entities.

They are:

5.1.1 The must-have fine-grained problem solving (PS) production-operation systems;

5.1.2 Limitations of nECP-based coarse-grained PS production-processing systems;

5.1.3 Workgroup Production Evolutionary Architecture Mandates (wG1-EAMs of wEP3 of wECP);

5.1.4 Workgroup Production Hardware Architecture Theory (wG1-HAT of wTF3);

5.1.5 Workgroup Production Software Architecture Theorem (wG1-SAT of wTF3);

5.1.6 The essence of wG1 HAT&SAT created theoretic Task operation wEntities;

5.1.7 Workgroup Production Task-operation (unitary-wEntity-based) wSystem Disciplines (wG1-uSDs of wSD3 of wECP);

5.1.8 Workgroup Production Task operation wSystems achieve real-world production objectives with real-time efficiency and effectiveness; and 5.1.9 The summary disclosure on wG1-evolved theoretic Task-operation wEntities.

After these 9 sub-sectional disclosures, workgroup-production-based fine-grained PS-Task operation wSystems can be established to fulfill fine-grained real-time production-oriented problem-solving objectives, based on new and better wEP3/wTF3/wSD3 of wECP that comprises new and better stakeholders' (humans)-PS philosophical thinking with derived 3-level "workgroup-linked devices-integrated" workgroup-operation hardware and software architecture methodologies and workgroup-operation system disciplines, instead of resorting to "machine-PS philosophical thinking" with derived node-processing hardware and software methods and node-processing system disciplines, generating coarse-grained-PS "node-production processing" systems (i.e., production-oriented application infrastructure systems (AIS) with uncorrectable limitations and unresolvable dilemmas), as stated in the prior art section.

5.1.1 The must-have "fine-grained-(PS)" "computerized" production-operation" systems In a real-world production environment, it is imperative to establish a production facility that involves (1) the internal stakeholders, such as operators, messengers and controllers, (2) the external stakeholders, such as general users, collaborators and higher-level assembly controllers, (3) digitized production machines with materials processes and (4) computing machines for controlling digitized production machines. Most importantly, the internal production stakeholders should communicate, process, operate and manage all the machines and produce the results that can satisfy the external stakeholders' requests with real-time efficiency and cost-effectiveness.

In order to achieve that real-time objectives, there are "four basic topics (from I to IV)" with relevant factors that need to be dwelled upon.

Topic-I: The must-have "fine-grained-Problem-Solving (PS) production-operation facilities" based on "human-centered (Stakeholders) PS-thinking" in contrast to the "machine-centered PS-thinking" that creates "coarse-grained-PS production-processing facilities";

Topic-II: Fine-grained-PS production operations can only be carried out by 3-hierarchical-level conveyer-integrated production workgroups that are collaborated as one Task-crew Entity;

Topic-III: Fine-grained-PS Task crew entity production operation facilities should real-time concurrently generate fine-grained PS-operations to solve all the internal and external stakeholders' production-oriented problems; and Topic-IV: The need for an ideal fine-grained-PS "computerized" production-"operation-system-based" facility for accommodating a more efficient Task-crew entity to achieve the real-time objectives.

After these 4 topical disclosures, it can be concluded that an ideal concurrent fine-grained-PS computerized production operation-system-based facility can only be established based on the "humans-centered-PS philosophical thinking" (i.e., internal/external production stakeholders' concurrent PS-philosophical thinking), rather than resorting to the "machine-centered PS philosophical thinking," which can only establish a time-sharing-parallel coarse-grained-PS production processing-system-based facility, due to its golden-hammer/nails paradox.

Topic-I: The must-have "fine-grained-Problem-Solving (PS) production-operation facilities" based on "Stakeholders (human-centered) PS-thinking."

Since there are two major constituents of a production facility (i.e., human-workgroups and machineries), there are only two dichotomy ways of production-oriented problem-solving (PS) thinking, either (1) the machine-centered PS-thinking, which means the problem-solving capabilities of production machines is the primary concern and the human-workgroups are supportive to the PS-machines, or (2) the human-stakeholders-centered PS-thinking, which means the Problem-solving for the external stakeholders and internal stakeholders is the primary concern and the machineries are supportive to the human-stakeholders' production tasks.

However, if the PS-thinking is based on the machinery, then the end result is only to create almighty machineries that can be used for solving some particular well pre-defined problems and all the efforts will be unnecessarily focused on how to create the "golden hammer" and how to format all the real-world problems into nail-like problems, so that the golden hammer can solve them accordingly. Even worse, this type of machine-centered problem solving for users is only cookie-cutter-like coarse-grained problem solving. It is pre-set fixated IO-process-based, which is slow to react to the stakeholder's real-world problem's constant changes. Moreover, if one machine cannot do the job, then cascade multiple machines into a chained-hammering action in a hope that the stakeholders' problems can be solved based on a long-running coarse-grained processing-automation. Meanwhile, all the internal workgroups are supportive and the guideline for the workgroups are machine handbooks that only relate to how to keep the machine running.

It is imperative that how well the problem solving for stakeholders is more important than how good the machines really are. That is to say, the ideal production facility should be established based on the needs of stakeholders (i.e., external production requestors, internal production workgroups), not based on the fancy almightiness of equipped machines. Certainly, the capabilities of the machinery will support and help the internal stakeholder workgroups to complete the overall production tasks as a whole.

Therefore, the human-stakeholder-centered problem-solving (PS) thinking, will be based on how to real-time solve the real-world problems via the immediate requests from external stakeholders and how to deliver the results generated by the internal stakeholders (i.e., controllers, messengers and processors), utilizing internal supportive machines and devices. Most importantly, the human-stakeholder-centered PS-thinking enables fine-grained-PS production events, so that all the internal stakeholders with supportive machines can work collaboratively as one Task-crew entity and solve the particular problems requested by the particular external stakeholders in a real-time concurrent manner.

Topic-II. The fine-grained-PS "production-operations" can only be carried out by 3-level conveyer-integrated workgroups collaborated as one Task-crew Entity.

In the real-world production environment, the fine-grained PS for the external stakeholders is a long-running "fine-grained PS-operation" that depends on how all the internal stakeholders can perform their chores and duties collaboratively. The whole scenario can be illustrated in a hierarchical 3-level conveyer-integrated production workgroups that can collaborate as one Task-crew-entity, as follows:

(1) The base-level conveyer-linked workstation-processors' workgroup to carry out production work-load-based attribute-processing capabilities;

(2) The mid-level conveyer-linked processors' workgroup to carry out production-message-package-based traffic-processing capabilities; and (3) The top-level conveyer-linked controllers' workgroup to carry out production-external information-based feedback-control Receive-Return (RR)-operation capabilities, which is not "simple one directional-information-based control processing capabilities."

Then, a typical external stakeholder's fine-grained-PS (closed-loop)-operation that is based on the above 3-level conveyer-integrated workgroup capabilities can further be summarized into 7-step conveyer-integrated workgroup procedures as follows:

(1) The top-level designated controller receives the external-in request from a particular requester via external links and translates the request into a production menu-solution terms/scripts (i.e., the first controller's external Request-handling procedure);

(2) The top-level designated controller further compiles the menu-solution-terms/scripts into a well-defined empty fields-based manual-workload-forms with workflows among base-level workstations processed the base-level processors and push the manual-forms into the conveyer (i.e., the second controller's top-down preparation procedure);

(3) The mid-level conveyer-technicians/messengers pull-in the manual-forms so that the whole package can be received by the first base-level workstation-processors to start the production-processes (i.e., the third technician's top-down-traffic procedure);

(4) The first-in-line base-level processor pull-in the manual-forms in the package and then start the production-process, finish with results to fulfill the manual-forms and push the package into the conveyer. The next-in-line base-level processor pull-in the package, start/finish the production process and push-out the package into the conveyer. Until the last-in-line base-level processor complete the production processes, the completely fulfilled manual-forms in the package will be push-out to the conveyer (i.e., the fourth workstation processors' production-package completion procedure);

(5) The mid-level conveyer-technicians/messengers will pull-in the completed package and push-out to the designated top-control's buffer, so that the top-level designated controller can work on the completed package (i.e., The fifth technician's bottom-up-traffic procedure);

(6) The top-level designated controller pull-in the completed package from the conveyer and then compiles the data-fields-completed manual-form into the menu-solution terms/scripts with possible new menu-items and further modify the existing menu with new solution terms (i.e., the sixth controller's bottom-up preparation procedure); and (7) The top-level controller then composes a reply presentation page based on the resulted solution-terms/scripts and send it together with the original request-intention pages to the same particular requestor via the external links (i.e., the seventh controller's external Reply handling procedure).

Moreover, the top-level designated controller will have to combine the first Request procedure and the seventh Reply procedure together into a feedback check&control Receive-Return (RR)-workgroup-operation, so that the whole external "fine-grained" Request and Reply (R&R) PS-operation can be achieved. If not, these 7 production procedures cannot provide the production solution to the original requestor, due to the last Reply procedure does not have any detailed information about the original requestor.

Therefore, these 3-level conveyer-integrated production workgroups can collaboratively work together and act as one Task-crew Entity from the external stakeholder's point of view, providing the real-time fine-grained closed-loop PS operation for each external stakeholder, which comprises 7-step conveyer-integrated production procedural-processes, where base-level production-attribute 1-step-procedural IO-processes performed by multiple processors, mid-level production-traffic 2-step-procedural IO-processes performed by the technicians and top-level feedback-control RR-(Receive-Return)-operation of 4-step production procedural processes performed by the designated controller.

In conclusion, these 3-level workgroups have to work collaboratively under one long-running fine-grained-PS operation event, which encapsulates all the involving base-level attribute-process-events, mid-level traffic-process-events and a top-level control-operation event. Hence, these 3-level workgroups are integrated via conveyer-access into a Task-crew Entity that is wholesomely embedded with fine-grained closed-loop PS-capabilities for real-time concurrently solving external stakeholders' production-oriented problems.

Topic-III. The Fine-Grained-PS Production Operation Facility Must Achieve "Real-Time Concurrent Problem Solving for all the Stakeholders."

In order to build a "complete" fine-grained-PS production-operation facility that is real-time efficiency and effectiveness, there are two courses of action that need to be taken.

The first course of action is to establish a production R&R (Request and Reply) solution-oriented Task-crew and equip it with R&R-solution equipments that are integrated with a production solution-execution conveyer and multiple solution workstations for achieving fine-grained R&R-solution-oriented PS capabilities with real-time solution-execution efficiency.

A top-level controller first receives the descriptive product request (i.e., order form with specs/conditions about the product) from an external requestor and then based on the equipped control-workstation, a work-order-based data-item package can be issued, containing data command-messages together with itemized raw materials (even data-centric materials) that can then be sent via the mid-level "workgroup solution-execution conveyer" to all the designated base-level workstation members for production attribute-processes. When each designated workstation member finishes up its own attribute-processes either with the finished data-item package that can go back to the top-level controller or with the semi-finished data-item packages to the next-in-line workstation member via the workgroup solution-execution conveyer. Eventually, the top-level controller will receive the finished data-item packages from the last-in-line base-level member and then repackage them into data-product packages together with fulfilled order-form to return to the requestor, so that the requestor can immediate receive the product package that is met with all the required specs/conditions replied on the fulfilled order form.

The overall Request and Reply (R&R) fine-grained-PS-based production solution-operations on the workgroup solution-execution conveyer can be dubbed as "Task1" "closed-loop" fine-grained PS-operations, due to every external request and reply have to go thru the same top-level controller.

Therefore, the quick turnaround of Task1 R&R solution-execution PS-operation will be considered as efficient. However, in order to achieve more efficient R&R PS-operations, there should be more than one controller at the top-level (i.e., forming a top-level multiple control members' workgroup), then the real-time concurrency can be established and the overall R&R real-time solution execution efficiency can be raised up based on concurrent Task1-R&R fine-grained PS-operations.

After the completion of every single R&R PS-operation, all the timely based "workload manual data forms" of recorded product-producing activities and the fulfilled order-forms can be duplicated by Task1 processors and controllers, all of which can be sent to the buffer-stations of the "workgroup solution-execution conveyer," so that they are ready to be accessed and processed for achieving the other must-have solution-supervision goal.

The second course of action is to establish a production solution-supervision Question and Answer (Q&A) knowledge-oriented Task Crew Entity and to equip it with collaborative production Q&A knowledge equipments that are integrated with a production solution-supervision conveyer and multiple knowledge-workstations for achieving fine-grained Q&A knowledge-oriented PS capabilities with real-time solution-supervision effectiveness.

The buffer-stations on the solution-execution conveyer can be accessed by the first-typed base-level knowledge-workstation members that can also access the workgroup solution-supervision conveyer. The first-typed base-level members can process the real-time solution data and the order forms into production vouchers and push them out into the solution-supervision-conveyer, so that they can be further processed by other knowledge-workstation members. The linkage between two workgroup production conveyers (i.e., workgroup solution-execution conveyer and workgroup solution-supervision conveyer) can be dubbed as "production coupling."

Then the second-typed base-level knowledge-workstation-members can pull-in the production vouchers from the solution-supervision-conveyer and real-time process them into the product-producing-procedure-based routine/program documents, push them out into the workgroup solution-supervision conveyer and maintain a real-time routine/program document based library for various solution products. The third-typed base-level workstation members will pull-in and process the production vouchers and the product routine/program docs into product results/Inventory documents, push them out into the workgroup solution supervision conveyer and maintain a real-time result-document-based library for various solution products. Then the top-level control members can pull-in and process the production vouchers, routines and results into production reports and maintain a real-time solution-supervision report-based knowledge-library for various solution-product execution performances. The top-level solution-supervision control members can accept any inquiry (Question and Answer session) from the internal solution-execution control members as well as any external collaborators as well as top-tiered supervisors for solution-execution status/performance reports.

This external-in Question and external-out Answer (Q&A) workgroup production supervision operations can be dubbed as "closed-loop" "Task2" Q&A-fine-grained PS-operations, due to every Question and Answer have to go thru the same top-level solution supervisor controller. By the same token to speed up the Q&A PS-operations, it is ideal to form a multiple top-level control members' workgroup, so that real-time concurrent fine-grained Q&A-knowledge-oriented PS-operation capabilities can be established.

Then real-time interactions between the two top-level control members will be vital to ensure that the real-time complex fine-grained production PS-operations can be fulfilled with real-time solution-execution efficiency and real-time solution-supervision effectiveness. Each of the solution execution control members' workgroup can issue an Q&A inquiry to anyone of the supervision control members and get a good answer back before a workload work-order data-package is issued, so that this work-order will be formed based on the current best-performed work-order with the current best routines and results, and then issue it to the base-level solution workstations accordingly. Once the finished product is produced, the whole data set will be sent from the solution-execution crew to the solution supervision crew via the real-time coupling-conveyers and the solution-supervision crew can again analyze the product-producing with Routine/Result/Report supervision processes and most importantly, real-time update the libraries based on the most current operation events with the best-performance routines for the next upcoming work-order with the best possible results. Therefore, the real-time information-knowledge library with "Task2 Question and Answer (Q&A) solution-supervision PS-operations" can ensure the next order-formbased "Task1 (R&R) solution-execution PS-operations" to be carried out with both real-time solution-execution efficiency and real-time solution-supervision effectively.

Therefore, the fine-grained-PS production operation facility must have these two Task1 and Task2 crew entities, which are fully integrated via two tightly coupled conveyers and thereby, they can be regarded as one big Task-operation-facility Crew-Entity (i.e., Task(1&2) Crew Entity). Furthermore, in order to achieve the "fail-safe" Task(1&2) fine-grained PS-operation capabilities, it is imperative that each workgroup of Task1 3-level workgroups and Task2 3-level workgroups, should have two managers as a manager-pair to join with the existing members, so that when any member becomes faulty, the primary manager can take over the workload of that faulty member and continue the process to ensure the overall Task PS-operation will still proceed without stoppage. And the secondary manager will take over the primary manager's workload, when it becomes faulty.

Topic-IV. The Must-have Fine-Grained-PS "Computerized" Production Operation Facility for Accommodating a Smaller but More Efficient Task-Crew Entity.

Therefore, in order to achieve real-time solution-execution efficiency and real-time solution-supervision effectiveness, it is imperative that the ideal Task(1&2) fine-grained-PS production-operation facility be established to solve internal and external stakeholders' production problems in a real-time concurrent manner. However, even if the real-time concurrency can be achieved, an ensuing problem will definitely occur, due to the fact that there will be too many members/managers in each workgroup, which will certainly not contribute to the real-time optimized effectiveness.

The only way is to fully computerize the 3-level conveyer-integrated workgroup structures, creating a 3-level computer-systems for accommodating the Task crew entity (i.e., creating the Task-crew entity-oriented computing systems), to support each level workgroup members/managers with completing chores and duties around the clock, so that smaller but more efficient Task1 and Task2 crew entities can be established to achieve the ultimate real-world production PS-objectives with real-time efficiency and effectiveness.

The ideal computerized 3-level production-entity-oriented systems that are supportive to the Task(1&2) Crew Entity, can complete the physical chores and responsibilities for the 3-level workgroup members/managers, perform the integrated 3-level Task(1&2) PS-operations and deliver the results efficiently to the stakeholders via the digital communication without the need of human interventions. Moreover, Task1 operation system and Task2 operation system can be tightly coupled, which means Task1 crew-entity and Task2 crew-entity can be collaborated into one wholesome-facility-based Task(1&2) Crew-Entity, achieving the real-time concurrent fine-grained PS for all the internal and external stakeholders.

Therefore, the ultimate goal in computing is to build 3-level workgrouped-computers integrated "Task(1&2) fail-safe entity-oriented computing systems" to support 3-level conveyer-integrated Task crew entities with real-time concurrent fine-grained PS-operations and achieve real-time production objectives. Moreover, by equipping with these 3-level fail-safe Task(1&2) entity-oriented computing systems, "the ideal production operation facility" can be established, empowering the top-level Task1 solution execution and Task2 solution-supervision controllers with the "real-time solution-domain experience-learning and knowledge-domain decision-making capabilities."

5.1.2 Limitations of nECP-Based "Coarse-Grained-PS" Computerized "Production-Process" Systems In the current node-computing era, a 3-level conveyer-integrated workgroups in a production facility can be computerized by using nECP-based 2-link-typed network-capable hardware structures that are installed with network-OSs, application programs and application databases (i.e., network-capable application systems to support base-level processors, mid-level technicians and top-level controllers in each workgroup).

However, single-node network Application Systems are IO-process-based systems, they are only capable of carrying out base-level production attribute IO-processes, mid-level traffic-processes and top-level control-processes. They cannot support the top-level feed-back control RR (Receive-Return) operation for the top-level controllers, therefore the must-achieve 7-step conveyer-integrated workgroup procedures cannot be accomplished by multi-node-networked Application Infrastructure Systems (AIS) that are established for the 3-level conveyer-integrated workgroups via connecting all the single-node Application Systems equipped for all the individual members in 3 workgroups. Therefore, AISs cannot support the 3-level conveyer-integrated production workgroups, let alone empowering these 3-level workgroups to work collaboratively as one Task crew Entity and to enable real-time fine-grained-closed-loop PS capabilities for external stakeholders. In addition, Task1 &2 fine-grained PS operations cannot be realized via the implementation of nECP-based AISs.

Therefore, the only way to build Task1 and Task2 PS-operation-based production systems to achieve real-time production objectives is to carry out wECP-based (wEP3/wTF3/wSD3) endeavors in the third period along the workgroup evolutionary timeline.

5.1.3 wG1 Hardware and Software Evolutionary Architecture Mandates (wG1-EAMs)

Based on the humans-centered problem solving thinking that applies to the production environment, it means that all the internal production workgroups/stakeholders and external production user-groups/stakeholders' problems must be concurrently solved by using the computerized equipments that are installed in a production facility.

In order to develop the computerized workgroup production operation equipments based on wECP to support the "real-world 3-level conveyer-integrated Task-crew entity fine-grained PS-operations," there are three (3) main topics that need to be dwelled upon.

(1) Topic-I: The nECP-based non-integrable hardware structures' "autophagy" effect.

For all the current node-computing-based non-integrable hardware structures, such as node-hub and nodes-infrastructures, it is imperative that these hardware structures need to be broken down into integrable functional components as well as node-core components and upgrade them with the must-have workgroup links (i.e., for workgroup hierarchical control and for workgroup fail-over), so that these workgroup-linked components can be ready for workgroup hardware construction methodology to build them into workgroup-linked Basic Building Blocks (wBBB). The broken-down processes of all the current node-computing based application systems as well as application infrastructure systems can be dubbed as "autophagy" effect, just like in the biological world, where bad cell materials will be degraded into basic proteins, so that new cells can grow by reusing these basic proteins.

(2) Topic-II: The nECP-based network OSs and application programs' "nullification" effect.

For all the current node-computing-based network and application software that are installed on the non-integrable node hardware structures, it is imperative that all these software (i.e., network-processing OSs and application-processing programs) will be of no use, due to the fact that non-integrable node-hardware structures will be broken down via autophagy effect. Most importantly, more sophisticated and secure workgroup-link software (i.e., workgroup feedback-control operation-OSs and workgroup operation programs) will assume all the capabilities that node-computing software can have and in addition, generate more workgroup-based real-time dynamic capabilities that need to solve fine-grained problems in a real-time concurrent and secure manner. The uselessness of node-computing network software in the presence of workgroup-computing software is because it is just a subset of the workgroup software, and this uselessness effect can be dubbed as "nullification effect."

(3) Topic-III: The must have six(6) new and better workgroup Evolutionary Architecture Mandates (wEAMs of wEP3 of wECP), as the first endeavor to carry out wECP in the third period.

As defined in the general evolutionary computing paradigm (ECP), the first endeavor to carry out wECP in the third period starting the first workgroup evolutionary generation timeline (wG1) for creating multi-function-based workgroup production operation systems is to establish the wG1 workgroup Evolutionary Architecture Mandates (wEAMs) of wEP3 of wECP, based on what have been created in the first period of wECP, such as functional WSAs, illustrated in FIG. 12$s$ to FIG. 14$s$, and in the second period of wECP, such as the first 3-level 6-wBBBs and the first wHCS, illustrated by FIG. 15.

According to the aforementioned rational courses of action for creating Task1 (i.e., workgroup-production solution execution) based and Task2 (i.e., workgroup-production solution-supervision) based workgroup Systems (wSystems) to equip an ideal collaborative production facility with automation and together with the usage of wEP1-workgroup fail-over Evolutionary Architecture (wEA1) and wEP2-workgroup fail-safe Evolutionary Architecture (wEA2), the third-period workgroup evolutionary principle (wEP3) is thus bottom-up-established to bring forth the first generation workgroup-production Evolutionary Architecture (wG1-wEA), which comprises the following six (6) duality (i.e., structure/capability) Mandates (wG1-EAMs) for establishing wG1-HAT and wG1-SAT in creating all the potential workgroup-production-based "Task-operation wEntities," or in short, Task-wEntities.

(1) Workgroup-production Evolutionary Architecture Mandate-1: (EAM-1 on wHCM).

The must-have Task-operation six(6) workgroup-linked Basic Building Blocks (Task 6-wBBBs), which can be constructed by using the standard 3-link-typed (i.e., internal-links, network links and workgroup-links) TeamProcessor-based wCCs and WSA-based wCMs, as illustrated from FIG. 12.$x$ to FIG. 14.$x$, utilizing all the available-existing integrable components and modules, generated from the first period HCM-HAT of wTF1 and the second period HCM-HAT of wTF2 of wECP, as illustrated in FIG. 15.

(2) workgroup-production Evolutionary Architecture Mandate-2: (EAM-2 on wHAM). The must-have Task-operation 3-level-workgroup Hierarchical Core Structure (Task-wHCS), which can be built by aggregating Task-6 wBBBs with workgroup four linkages (i.e., WL1 to WL4) and by integrating them with workgroup devices (i.e., WL2-TeamServer and WL3-TeamPanels), as illustrated in the first-period TeamProcessors and WSAs, shown from FIG. 12.$x$ to FIG. 14.$x$, and in the second period the first wHCS of wECP, shown by FIG. 15.

(3) workgroup-production Evolutionary Architecture Mandate-3: (EAM-3 on wHAT). The must-have iterative Task-operation Hardware Architecture Theory (Task operation HAT) based on HCM and HIM, together with related real-time workgroup-parameter-growth methodology and real-time stage-evolutionary methodologies, in constructing the current-stage Task-6-wBBBs and in aggregating/integrating them into the current-stage self-growing Task-wHCSs.

(4) workgroup-production Evolutionary Architecture Mandate-4: (EAM-4 on workgroup OSs). The must-have Task workgroup-structure-based workgroup Operating-System (Task-wOS) software to equip Task-wHCSs into Task-operation wEntity Core-Structures (Task-ECS) with core-structure boundary (i.e., Task-wEntity in short).

(5) Workgroup-production Evolutionary Architecture Mandate-5: (EAM-5 on Workgroup Programs). The must-have Task workgroup-OS-based workgroup Programs to equip Task-ECS into Task-wEntity Domain Structures (Task-EDS) with capability domain boundary (i.e., Task-wEntity Domain in short).

(6) Workgroup production Evolutionary Architecture Mandate-6: (EAM-6 on wSAT) The evolutionary-stage based Task operation workgroup Software Architecture Theorems (wG1 Task-wSAT) derived from Task-wHAT in generating the current-stage Task-workgroup operation OSs, Task-workgroup programs and real-time workgroup storages for in-event log activities and post-event activity management. Then go to Mandate-1 to start the next evolutionary stage by using the current Task-wEntities as basic fail-over wCMs to build the next stage base-level BBBs. Most importantly, all the stage-evolved workgroup-production Task operation wEntities can then be well defined based on the above wG1 6-EAMs of EP3 of wECP, supporting Task crew entities of all sizes to carry out the real-world production-oriented fine-grained PS-operations, abiding by the "stakeholders'-PS thinking."

5.1.4 wG1 Task Operation-Based Hardware Architecture Theory (wG1-HAT)

The second endeavor to carry out wECP in the third period along the first workgroup production evolutionary generation timeline (wG1) is to establish fine-grained-PS Task operation-based Hardware Architecture Theory (HAT) of wTF3 of wECP.

Just as the creation of the first 3-level wHCS (Hierarchical Core Structure) in the second period via HCM and HAM of HAT of wTF2 of wECP, the creation of Task operation wHCSs will inherit the same kind of HCM (of HAT of wTF2) to build wG1 6-wBBBs with components created in the second period and the same kind of HAM (of HAT of wTF2) to build wG1 Task operation wHCSs with the same workgroup-linkage 1-4 (WL1 to WL4) created in the second period. Both of HCM and HAM of HAT of wTF2 can be "generically inherited" to evolve into wG1 HCM and HAM as the basic methodologies for establishing wG1-HAT of wTF3 of wECP.

In this endeavor, there are 2 important topics that need to be elaborated upon, so that wG1-HAT can be methodologically established along the workgroup evolutionary timeline, fulfilling the hardware fundamentals of wTF3 of wECP.

(1) Topic-I: Establishing wG1 Task operation HAT in creating 3-level wG1.stage(n) Task(1,2) operation wHCSs to support 3-level conveyer-integrated processing-workgroups collaborated as one Task crew operation-entity; and (2) Topic-II: Building wG1.stage(n=1,8) 8-stage evolved standard Task operation wHCSs.

After these 2 topical disclosures, it can be concluded that Task operation HAT, which comprises "hierarchical core" hardware methodologies in a real-time iterative-loop along eight (8) evolutionary stages in the first workgroup production generation, creates wG1.stage(n=1,8) Task operation wHCSs. And these 8-stage-evolved wHCSs have multiple real-time self-healing and self-growing mechanisms with better workgroup-linked hierarchical core-perimeter security protection (i.e., the separation of the internal-linked boundary-enclosed region and the external-network/workgroup-linked open space), for accommodating all the real-world 3-level conveyer-integrated workgroups collaborated as one Task crew operation-entity from the smallest to the largest and they are ready for implementing fine-grained-PS operation software methodologies, so that they can be embedded with "real-time concurrent and secure fine-grained problem-solving capabilities" for all the internal and external stakeholders, achieving the real-world production PS-objectives with real-time efficiency and effectiveness.

Topic-I. Establishing Task Operation HAT in Creating wG1.Stage(n) Task-

The first topic is on how to establish wG1 Task operation HAT in creating 3-level wG1.stage(n) Task(1,2) operation wHCSs to support 3-level conveyer-integrated processing-workgroups collaborated as one Task crew operation-entity.

In order to establish wG1 Task operation HAT, there are six (6) subtopics that need to be discussed in details:

(1) Subtopic-i: Building Task operational six (6) workgroup-link-embedded Basic Building Blocks (wBBBs) (i.e., the first Hardware Construction architecture Methodology (HCM) of HAT, or HAT-m1 in short);

(2) Subtopic-ii: Building Task operation wHCSs via workgroup links aggregation and workgroup-linked devices integration (i.e., the second Hardware Integration architecture Methodology (HIM) of HAT, or HAT-m2 in short);

(3) Subtopic-iii: Enabling Task-operation wHCSs with real-time parameter-growing mechanism (i.e., the third Hardware Growth architecture Methodology (HGM) of HAT, or HAT-m3 in short);

(4) Subtopic-iv: Enabling Task operation wHCSs with real-time stage-evolving mechanism (i.e., the fourth Hardware Evolution architecture Methodology (HEM) of HAT, or HAT-m4 in short);

(5) Subtopic-v: Defining wG1 Task operation HAT with 4 Hardware architectural Methodology (HCM, HIM, HGM, HEM) loop iterations for creating wG1.stage(n) Task operation wHCSs; and (6) Subtopic-vi: Creating 8 standard wG1.stage(n=1,8) Task operation wHCSs.

After the above 6 sub-topical disclosures, it can be concluded that Task operation HAT comprises a plurality of 4 hardware architectural methodologies in an iterative loop that can revolve over eight (8) evolutionary stages along the first workgroup production generation wG1, totaling 32 hardware architecture methodologies up to the current eighth stage to establish all the wG1.stage(n=1,8) Task operation wHCSs for accommodating real-world 3-level conveyer-integrated workgroups collaborated as one Task crew operation-entity from the smallest to the largest.

The first subtopic is centered on how to build Task operational workgroup-link-embedded Basic-Building-Blocks (BBB). By complying to the first Evolutionary Architecture Mandate (wG1-wEAM) as aforementioned, the first generation Hardware Construction Methodology (HCM) in constructing all the integrable workgroup production "Task operation-based" six (6) 3-level 6 workgroup-linked Basic Building Blocks (wBBB) is disclosed in the following three (3)-level steps.

(1) The first step is to construct base-attribute-level wBBBs of Team-attribute-Processors (TaP) and fail-over wBBBs of Team-attribute-Processor-managers (TaPm) by using WL2-based w2-directional and w3 bi-directional aWSAs that are created as illustrated by multiple FIG. 12s.

(2) The second step is to construct mid-traffic-level IO-process wBBBs of Team-memory-Processors (TmP) and fail-over wBBBs of Team-memory-Processors-managers (TmPm) by using all the potential directional/bi-directional mWSAs that are created as illustrated by multiple FIG. 13s.

Basically, there are two types of TmPs. The first type of TmPs is equipped with parameter-numbered common "direct-access TeamServers" (as illustrated in U.S. Pat. No. 5,802,391), each of which can be directly accessed by both the designated top-level TeamProcessor via workgroup-link-2 (WL2) and the designated base-level TeamProcessor without using its own network-OS respectively. And this type of WL2-TeamServer devices, dubbed as "Bulletin Boards," can be shared by three(3) or more TeamProcessors.

The second type of TmP is equipped with base-parameter-numbered and top-parameter numbered private "direct-access TeamServers," each of which is assigned privately to the base-parameter-numbered TaPs and to the top-parameter-numbered TcPs. The TmP will read from the direct-access top-level TeamServers and can write to the direct-access base-level TeamServers, so that any of the top-level TcPs can communicate with any of the base-level TaPs. In addition, the TmP will read from the direct-access base-level TeamServers and can write to the direct-access top-level TeamServers, so that any of the TaPs can communicate with any of the TcPs. And this type of TeamServers, dubbed as "Mail-boxes," can only be shared by one TmP and the other TeamProcessor that can be either TaP or TcP. Examples of the TeamServers may include magnetic storage devices, optical storage devices, solid state devices, or any other suitable storage devices.

(3) The third step is to construct top-level IO-process wBBBs of Team-control-Processors (TcP-pairs) and fail-over wBBBs of Team-control-Processor-managers (TcPm) by using all the potential directional/bi-directional cWSAs that are created as illustrated by multiple FIG. 14s.

The Task operation 6-wBBBs are constructed via wEP3/wTF3-HCM, which inherits from the first/generic 3-level 6-wBBBs via wEP2/wTF2-HCM-HAT as described in FIG. 15 and FIG. 16. Therefore, based on the above three (3)-level-hierarchical hardware construction architectural methods along the first generation workgroup evolutionary timeline, the wG1-Task Hardware Construction Methodology (HCM) of HAT of wTF3 can be thus defined by fulfilling workgroup production Evolutionary Architecture Mandate-1 (EAM-1) of wEP3.

The second subtopic is centered on how to build Task operation wHCSs via workgroup links and workgroup-linked devices. After constructing all the potential 6-wBBBs and by further complying to the second Evolutionary Architecture Mandate (i.e., wG1-wEAM2), the first generation Hardware Aggregation Methodology (wG1-HAM) in creating Task operation wHCSs is disclosed in the following five (5) procedural steps by using workgroup-links for aggregation and workgroup-linked devices for integration.

(1) The first step is to generate "Base-Framework" (i.e., aWSA) by aggregating part1 member-section (TaPs) and part2 manager-pair section (TaPm) together with WL3, which includes RUV (RAP, USB and audio/Video) and UART (WL3s) linkages and integrating them with WL3-TeamPanel Devices, as shown in FIG. 12s, FIG. 13s and FIG. 14s, which is controlled by the base-level TaPm pair for fail-over purposes. Any member TaP is faulty, the primary TaPm will control the TeamPanel to take over the faulty TaP and continue the workgroup-processes without stoppage.

(2) The second step is to generate "Mid-Framework" (i.e., mWSA) by aggregating part1 member-section (TmPs) and part2 manager-pair section (TmPm) together with WL3 and horizontally integrating them with WL3-TeamPanel devices for fail-over purposes.

(3) The third step is to generate "Top-Framework" (i.e., cWSA) by aggregating part1 member-section (TcP-pairs) and part2 manager-pair section (TcPm) together with WL3 and horizontally integrating them with WL3-TeamPanel devices for fail-over purposes (4) The fourth step is to generate Execution Pylon Unit (EPU, or eXecution Pylon-XP in short) by aggregating all the 3-level framework-part-1 member-sections (TaPs, TmPs and TcPs) via WL2 and vertically integrating them with WL2-TeamServers, served either as Bulletin-Boards or as Mail-Boxes, depending on different mechanisms as shown in multiple FIG. 13s. In addition, all the EPU(XP)-based 3-level TeamProcessors (i.e., TaPs, TmPs and TcPs) are networked together vis WL1, which is outside-in and inside-out Ethernet-based linkages (w1s), as illustrated in FIG. 15. And the WL1-based workgroup device is WEC(5) (Workgroup Ethernet Control-box), as shown in FIG. 12s, 13s, 14s, dubbed as TeamSwitch, provides internal workgroup connections for message switches among all the 3-level TeamProcessors in EPU(XP). Furthermore, WL2 can be either USB- or serial SCSI-based outside-in and inside-out linkages that can be used w2-directional or w3-bi-directional, as illustrated in FIG. 15. However, w2-links and w3-links are basically the same USB/serial-SCSI-wire for bi-directional communication and when normal directional-communication mode is required, the w3 links can be restricted in carrying out directional communication becoming w2-links, and also when directional-communication mode-enabled process is faulty, the bi-directional mode on the restricted w3-links can then be released as an aim to facilitate fail-over check-up processes.

Most-importantly, the WL2-based workgroup device is TeamServer and a plurality of TeamServers connected with WL2, acted like a digital conveyer, can vertically integrate all the 3-level TeamProcessors (TaPs, TmPs and TcPs) into a hierarchical core-structure (i.e., EPU(XP)), just like a common conveyer that can integrate 3-level workgroups into one wholesome Task-crew entity.

(5) The fifth step is to generate Fail-over Pylon-Unit (FPU or Fail-over Pylon-FP in short) by Aggregating all the 3-level Framework part2 manager sections (i.e., TaPm(1,2), TmPm(1,2) and TcPm(1,2) together via WL4), which comprises outside-in and inside-out paired Ethernet-based linkages (f1 and f2), as illustrated in FIG. 15. In addition, WL4 (fail-over-pair f1, f2) can be linked together with WL1 (w1s) from outside for mutual fail-over purposes. Furthermore, WL3 and WL4 in FPU(FP) can also be used as mutual fail-over linkages for WL1 and WL2 inside the EPU(XP), since 3-level workgroup TeamProcessor-managers together can real-time carry out the execution processes the same as 3-level TeamProcessors can.

Since 3-framework-part1 EPU(XP) and part-2 FPU(FP) are already Aggregated via WL3 and integrated with WL3-TeamPanels. Therefore, after these 4 Workgroup-Linkage (WL1-4) aggregations and WL2&3-TeamServer and TeamPanel devices integrations, a 3-level 6-wBBB WL-Aggregated/integrated Task workgroup Hierarchical Core Structure (wHCS) is established, comprising both a wEPU(XP) and a wFPU(FP) that are horizontally integrated with WL3-TeamPanel devices and sub-devices, such as AV-switcher and front-panel real-time activity-footprint monitoring display/dashboard.

The wG1.stage1 Task wHCSs are aggregated via wEP3/wTF3-HAM, which inherits from the first/generic 3-level wHCSs via wEP2/wTF2-HAM, as described in FIG. 15 and FIG. 16. Therefore, based on the above 5-step hardware aggregation and integration methods along the first generation workgroup evolutionary timeline, the wG1 Task Hardware Integration Methodology (HIM) of HAT of wTF3 can be thus defined by fulfilling workgroup-production Evolutionary Architecture Mandate-2 (EAM-2) of wEP3.

The third subtopic is centered on enabling Task-operation wHCSs with real-time parameter-growing mechanism. Due to the usage of WSAs that is expandable based on Array-parameter (i), the first Task wHCS can be expandable with 1D-parameters that inherit from the WSA array-parameter, enabling Task operation wHCSs with timely growth base on timely increments of the parameter.

Therefore, by carrying out both the first and the second evolutionary architecture mandates of wG1, real-time parameter-growing wG1.stage1 Task wHCSs can be established along the workgroup computing evolutionary timeline, due to the usage of WSAs, which are built-in with array-parameters for ensuing 1D, 2D, 3D and multi-3D real-time expansion (i.e., real-time growth).

It can be concluded that a real-time parameter-based Hardware self-Growth Methodology, dubbed as real-time HGM, can be established due to the effects of Hardware Construction Methodology (HCM) and Hardware Aggregation Methodology (HAM). Without wG1.stage1 HCM and HAM, the wG1.stage1 real-time HGM cannot be established.

The fourth subtopic is centered on enabling Task operation wHCSs with real-time stage-evolving mechanism. Due to the usage of two different types of WSAs (i.e., w2-WSAs and w3-WSAs along the workgroup computing evolutionary), the first wG1.stage1 1D-parameter(i) 3-level wHCSs can be established by using the w2-aWSAs, which will operate its internal base-level attribute-mechanisms in a directional-sequential manner in the first evolutionary stage, which is ideal to accommodate Task1 R&R 3-level conveyer-integrated workgroups to work collaboratively as one Task1-crew entity, thereby defining wG1.stage1 Task1-operation wHCSs. Whereas the other 3-level 1D-parameter(i) Task wHCS can be established by using the w3-aWSAs, which will operate its internal base-level attribute mechanisms in a bi-directional-discrete manner in the second evolutionary stage, which is ideal to accommodate Task2 Q&A 3-level conveyer-integrated workgroups to work collaboratively as one Task2 crew entity, thereby defining wG1.stage2 Task2-operation wHCSs.

Moreover, due to the flexibility of integrable w2-WSAs and w3-WSAs, the more complex 3-level 2D-parameter Task operation wHCSs can be created, thereby defining wG1.stage3 2D-parameter(i,j) Task1 operation wHCSs and wG1.stage4 2D-parameter(i,j) Task2 operation wHCSs.

Furthermore, due to the hierarchy of wG1.stage1 Task1 wHCSs and wG1.stage2 Task2 wHCSs, the base-level WSAs can be replaced with multiple 2D-parameter Task-wHCSs, creating the more complex wG1.stage5 3D-parameter (i,j,k) Task1 wHCSs and wG1.stage6 3D-parameter(i, j,k) Task2 wHCSs. In addition, the base-level multiple 2D-parameter Task wHCSs can further be replaced with multiple 3D-parameter Task wHCSs, creating wG1.stage7 multi-3D-Fractal1 Task1-wHCSs and wG1.stage8 multi-3D-Fractal2 Task2-wHCSs, along the workgroup evolutionary timeline. However, a Fractal-Task wHCS can start its evolutionary processes with its base-level from having no components to having the first 1D, 2D, 3D Task wHCSs and to multiple 1D, 2D, 3D Task wHCSs. Therefore, the Fractals are the basic and mature Task wHCSs, which can self-evolve from the simplest to the full-fledged workgroup production structures and they can be a good nurturing ground for producing duplicate 1D, 2D, 3D wHCSs for enhancing real-time growing mechanism.

By real-time carrying out both the first and second evolutionary architecture mandates of wG1, new and better real-time stage-evolving Task wHCSs can be generated along the workgroup computing evolutionary timeline. Starting from the first evolutionary stage, the current-stage Task wHCSs can be used as the basic integrable modules for continuing the next stage evolutionary processes (via HCM/HAM/rt-HGM construction/aggregation/rt-growth) along the first generation of workgroup evolutionary timeline (rt-HEM), and there are 8-standard stages, from Task1-1D to 3D fractal wHCSs to Task2 1D to 3D Fractal wHCSs, as discussed above and all the 8-staged Standard Task wHCSs are illustrated in details from FIG. 17 to FIG. 24.

Therefore, real-time stage-based Hardware Evolution (architecture) Methodology, dubbed as wG1.stage(n) real-time HEM are established due to the wG1 Hardware Construction Methodology (HCM) and wG1 Hardware Aggregation Methodology (HAM). Without wG1 HCM and HAM, the real-time wG1.stage(n=1,8) rt-HEMs cannot be realized.

The fifth subtopic is centered on defining wG1 Task operation HAT with 4 Hardware architectural Methodology (HCM, HIM, HGM, HEM) loop iterations for creating wG1.stage(n) Task operation 3-level wHCSs. By complying to the third Evolutionary Architecture Mandate (wG1-wEAM3), the first-evolutionary stage wG1.stage(n=1) Task operation HAT comprises the bottom-up Hardware Construction Methodology (HCM) in creating Task-6 wBBBs, the bottom-up Hardware Integration Methodology (HIM) in creating Task-wHCSs and the derived real-time Hardware Growing Method (HGM) in creating Task(parameter)-wHCSs and real-time Hardware Evolving Method (HEM) in creating wG1.stage(n=1) Task(parameter)-wHCSs that can further be constructed into base-level wBBBs that can further be used and integrated into bigger wHCSs along the evolutionary timeline.

Therefore, the wG1 Task operation HAT actually contains all the four(4) hardware methodologies that are iteratively generated along the evolutionary stages in the first workgroup production generation (wG1).

This is a new category of hardware architecture theory that contains internal 4 methodology-loop that can naturally iterate to generate additional 4-methodologies for constantly creating bigger wHCSs along the evolutionary-stage(n) timeline, which emphasizes the important embedded evolutionary mechanism that a computing hardware "architecture" theory should possess, creating bigger and more sophisticated hardware structures along the evolutionary timeline, in contrast to the logical connection method-based "hardware structure theory" that can only create one-type of fixated structures that cannot evolve.

Most importantly, based on "stakeholders-centered PS-thinking," all the wHCSs created by wG1 Task operation HAT are used for supporting the ideal 3-level conveyer-integrated workgroups to work collaboratively as one Task-crew-entity, thereby TaPs are for base-level attribute-processors/workstation workers, TmPs are for mid-level traffic-processor/conveyer technicians and TcPs are for top-level controller. Task operation wHCSs enhance the physical conveyer integration of Task crew Entity with the computerized digital-integration, so that the smaller but more efficient Task crew entity can complete the fine-grained-PS operations for external stakeholders in a real-time concurrent manner.

The sixth subtopic is centered on creating 8 standard wG1.stage(n=1,8) Task operation wHCSs. As discussed earlier in establishing wG1.stage(n) real-time HEM, all the first generation wG1 Task(parameter)-wHCSs can be evolved along 8 workgroup evolutionary stages, creating 8 standard wG1.stage(n=1,8) Task-wHCSs by 8 sets of standard iterative Task Hardware Architecture Methodologies (i.e., HCM/HIM/HGM/HEM) under Task operation HAT of wG1-wTF3. These 8-staged 3-level Task operation wHCSs with 1D, 2D, 3D and multi-3D Fractal-based parameter-complexity can accommodate all the real world 3-level conveyer-integrated production workgroups collaborated as one wholesome Task crew entity from the smallest to the largest.

Topic-II. Building 8-Stage Evolved Standard wG1.Stage (n=1,8) Task Operation wHCSs Based on wG1 Task operation HAT, all the first generation Task operation wHCSs can be evolved along 8 workgroup evolutionary stages, creating 8 standard wG1.stage(n=1,8) Task wHCSs, as illustrated from FIG. 17 to FIG. 24.

Sub-i. FIG. 17 wG1.1 1D-Array(i) Task1-wHCSs (TmP Common-Tray Model)

As shown in FIG. 17, a preferred 6-wBBB-architected 1D-Array production operation unit based HCS is created, where 1.BAB, 2.BFB, 3.MMB, 4.MFB, 5.TCB and 6.TFB are constructed by using standard WSA-based wCMs, as illustrated by the following HCM-6 Table.

| HCM-6: 6BBB | wCM( ) | Abbr. Name | Description |
|---|---|---|---|
| 1.BAB= | | | Base Attribute Block (FIG.-12a) |
| | wCM(61) | aWSA1p1 | attribute Workgroup Server Array type1/part1 |
| 2.BFB= | | | Base Failover Block (FIG.-12a) |
| | wCM(62) | aWSA1p2 | attribute Workgroup Server Array type1/part2 |
| 3.MMB= | | | Mid Memory Block (FIG.-13a) |
| | wCM(71) | mWSA1p1 | memory Workgroup Server Array type1-version1/part1 |
| 4.MFB= | | | Mid Failover Block (FIG.-13a) |
| | wCM(72) | mWSA1p2 | memory Workgroup Server Array type1-version1/part2 (FIG.-13a) |
| 5.TCB= | | | Top Control Block (FIG.-14a) |
| | wCM(91) | cWSA1p1 | control Workgroup Server Array type1/part1 |
| 6.TFB= | | | Top Failover Block (FIG.-14a) |
| | wCM(92) | cWSA1p2 | control Workgroup Server Array type1/part2 |

In addition, there are 5 wCMs (i.e., 1.BF, 2.MF, 3.TF, 4.XP and 5.FP), are aggregated by using 6 wBBBs via WL1, WL2, WL3-bundle and WL4 and further integrated with WL2-TeamServers and WL3-TeamPanel workgroup device, creating the preferred Integrated Array(i) production unit's HCS=wCM(150+160), as illustrated by the following HIM-5 Table.

| HIM-5 Module: wCM( ) | Names | Description |
|---|---|---|
| BF: wCM(61 + 62) (1.BAB + 2.BFB) | Base Framework | Aggregated via base-level WL3 and Horizontally integrated with WL3-TeamPanels |
| MF: wCM(71 + 72) (3.MMB + 4.MFB) | Mid-Framework | Aggregated via mid-level WL3 and Horizontally integrated with WL3-TeamPanels |
| TF: wCM(91 + 92) (5.TCB + 6.TFB) | Top-Framework | Aggregated via top-level WL3 and Horizontally integrated with WL3-TeamPanels |
| EPU(XP): wCM(150) (1.BAB + 3.MMB + 5.TCB) | Array-EPU(XP) | Array-Execution Pylon-Unit (EPU or XP in short): Aggregated via WL1 and WL2 and Vertically integrated with WL2-TeamServers |
| FPU(FP): wCM(160) (2.BFB + 4.MFB + 6.TFB) | Array-FPU(FP) | Array-Failover Pylon Unit (FPU or FP in short): Aggregated via WL4 |
| EPU(XP) + FPU(FP): wCM(150 + 160) | Array-HCS | Array(i) Hierarchical Core Structure: Aggregated via WL1, WL2, 3-level WL3-Bundle and WL4; Horizontally integrated with WL3-TeamPanels; Vertically integrated with WL2-TeamServers |

From a hardware configuration point of view, the preferred Array(i)-HCS is basically equipped with the base-level aWSA1(i), mid-level mWSA1(i) and top-level cWSA1(i), which are hierarchically aggregated via standard workgroup linkages from WL1 to WL4. The i-parameter for aWSA1 and mWSA1 should be equal and i-parameter for cWSA1 should have the flexibility from more than 1 to i, depending on the situational requirement for concurrent controls.

In conclusion, by carrying out wG1.stage1 HAT, the first-stage wG1.1 1D-Array(i) Task1-wHCSs are created via (1) wG1.stage1 Task1-HCM using wCMs to generate 1D-array 3-level WSA fail-over components, (2) wG1.stage1 Task1-HAM using WL1- to WL4 to generate 1D-array wHCSs, (3) wG1.stage1 Task1-HGM to real-time parameter-grow into 1D-Array(i) Task1-wHCSs and (4) wG1.stage1 Task1 HEM to real-time stage-evolve the current Array(i)-wHCSs into more complex Task1 wHCSs along the workgroup evolutionary timeline as those of the base-level wBBBs (workgroup Basic Building Blocks).

Sub-ii. FIG. 18 wG1.2 1D-Seg(i) Task2-wHCSs (TmP Local Mailer/Mail-Box Model)

As shown in FIG. 18, a preferred 6-wBBB-architected 1D-Seg Task2-production unit based HCS is created, where 1.BAB, 2.BFB, 3.MMB, 4.MFB, 5.TCB and 6.TFB are constructed by using standard WSA-based wCMs, as illustrated by the following HCM-6 Table.

| HCM-6: 6BBB | wCMs | Abbr. Name | Description |
|---|---|---|---|
| 1.BAB= | | | Base Attribute Block |
| | wCM(63) | aWSA2p1 | attribute Workgroup Server Array type2/part1 |
| 2.BFB= | | | Base Failover Block |
| | wCM(64) | aWSA2p2 | attribute Workgroup Server Array type2/part2 |
| 3.MMB= | | | Mid Memory Block |
| | wCM(77) | mWSA4p1 | memory Workgroup Server Array type2-version4/part1 |
| 4.MFB= | | | Mid Failover Block |
| | wCM(78) | mWSA4p2 | memory Workgroup Server Array type2-version4/part2 |

| HCM-6: 6BBB | wCMs | Abbr. Name | Description |
|---|---|---|---|
| 5.TCB= | | | Top Control Block |
| | wCM(93) | cWSA2p1 | control Workgroup Server Array type2/part1 |
| 6.TFB= | | | Top Failover Block |
| | wCM(94) | cWSA2p2 | control Workgroup Server Array type2/part2 |

In addition, there are 5 wCMs (i.e., 1.BF, 2.MF, 3.TF, 4.XP and 5.FP), are aggregated by using 6 wBBBs via WL1, WL2, WL3-bundle and WL4 and further integrated with WL2-TeamServers and WL3-TeamPanel workgroup device, creating the preferred Integrated Seg(i)-HCS=wCM(170+ 180), as illustrated by the following HIM-5 Table.

wG1.stage2 Task2-HCM using wCMs to generate 1D-Seg 3-level WSA fail-over components, (2) wG1.stage2 Task2-HAM using WL1- to WL4 to generate 1D-Seg wHCSs, (3) wG1.stage2 Task2-HGM to real-time parameter-grow into 1D-Seg(i) Task2-wHCSs and (4) wG1.stage2 Task2-HEM to real-time stage-evolve into more complex Task2 wHCSs

| HIM-5 Module: wCM( ) | Names | Description |
|---|---|---|
| BF: wCM(63 + 64) (1.BAB + 2.BFB) | Base Framework | Aggregated via base-level WL3 and Horizontally integrated with WL3-TeamPanels |
| MF: wCM(77 + 78) (3.MMB + 4.MFB) | Mid- Framework | Aggregated via mid-level WL3 and Horizontally integrated with WL3-TeamPanels |
| TF: wCM(93 + 94) (5.TCB + 6.TFB) | Top- Framework | Aggregated via top-level WL3 and Horizontally integrated with WL3-TeamPanels |
| XP: wCM(170) (1.BAB + 3.MMB + 5.TCB) | Seg-XP | Seg-eXecution Pylon XP(=EPU): Aggregated via WL1 and WL2 and Vertically integrated with WL2-TeamServers |
| FP: wCM(180) (2.BFB + 4.MFB + 6.TFB) | Seg-FP | Seg-Failover Pylon FP(=FPU): Aggregated via WL4 |
| XP + FP: wCM(170 + 180) | Seg-HCS | Seg(i) Hierarchical Core Structure: Aggregated via WL1, WL2, 3-level WL3-Bundle and WL4; Horizontally integrated with WL3-TeamPanels; Vertically integrated with WL2-TeamServers |

From a hardware configuration point of view, the preferred Seg(i)-HCS is basically equipped with the base-level aWSA2(i), mid-level mWSA4(i) and top-level cWSA2(i), which are hierarchically aggregated via workgroup linkages from WL1 to WL4. The i-parameter for aWSA2 and mWSA4 should be equal and i-parameter for cWSA2 should have the flexibility from more than 1 to i, depending on the situational requirement for concurrent controls.

In conclusion, based on wG1.stage2 HAT, the first-stage wG1.2 1D-Seg(i) Task2-wHCSs are created via (1) along the workgroup evolutionary timeline as the base-level wBBBs (workgroup Basic Building Blocks).

Sub-iii. FIG. 19 wG1.3 2D-Matrix (i,j) Task1-wHCSs

As shown in FIG. 19, a preferred 6-wBBB-architected 2D-Matrix Task1-production unit based HCS is created, where 1.BAB, 2.BFB, 3.MMB, 4.MFB, 5.TCB and 6.TFB are constructed by using standard WSA-based wCCs and wCMs, as illustrated by the following HCM-6 Table.

| HCM-6: 6BBB | wCCs + wCMs | Abbr. Name | Description |
|---|---|---|---|
| 1.BAB= | | | Base Attribute Block |
| | wCM(61) × (j-1) | aWSA1p1 | attribute Workgroup Server Array type1/part1 |
| | wCM(63) × (1) | aWSA2p1 | attribute Workgroup Server Array type2/part1 |
| | wCM(73) × (j-1) | mWSA2p1 | memory Workgroup Server Array type2 version2/part1 |
| 2.BFB= | | | Base Failover Block |
| | wCC(19) | TaP1m(1-2) | Team attribute Processor manager(1-2) |
| | wCM(62) × (j-1) | aWSA1p2 | attribute Workgroup Server Array type1/part2 |
| | wCM(64) × (1) | aWSA2p2 | attribute Workgroup Server Array type2/part2 |
| | wCM(74) × (j-1) | mWSA2p2 | memory Workgroup Server Array type2- vesion2/part2 |
| 3.MMB= | | | Mid Memory Block |
| | wCM(77) | mWSA4p1 | memory Workgroup Server Array type2 version4/part1 |
| 4.MFB= | | | Mid Failover Block |
| | wCM(78) | mWSA4p2 | memory Workgroup Server Array type2 version4/part2 |
| 5.TCB= | | | Top Control Block |
| | wCM(93) | cWSA2p1 | control Workgroup Server Array type2/part1 |

| HCM-6: 6BBB | wCCs + wCMs | Abbr. Name | Description |
|---|---|---|---|
| 6.TFB= | | | Top Failover Block |
| | wCM(94) | cWSA2p2 | control Workgroup Server Array type2/part2 |

In addition, there are 5 wCMs (i.e., 1.BF, 2.MF, 3.TF, 4.XP and 5.FP), are aggregated by using 6 wBBBs via WL1, WL2, WL3-bundle and WL4 and further integrated with WL2-TeamServers and WL3-TeamPanel workgroup device, creating the preferred Integrated Matrix(i,j)-HCS=wCM (190+200), as illustrated by the following HIM-5 Table.

| HIM-5 Module: wCM( ) | Abbr. Name | Description |
|---|---|---|
| BF: wCM( ) (1.BAB + 2.BFB) | Base Framework | Aggregated via base-level WL3 and Horizontally integrated with WL3-TeamPanels |
| MF: wCM(77 + 78) (3.MMB + 4.MFB) | Mid-Framework | Aggregated via mid-level WL3 and Horizontally integrated with WL3-TeamPanels |
| TF: wCM(93 + 94) (5.TCB + 6.TFB) | Top-Framework | Aggregated via top-level WL3 and Horizontally integrated with WL3-TeamPanels |
| XP: wCM(190) (1.BAB + 3.MMB + 5.TCB) | Matrix-XP | Matrix-eXecution Pylon XP(=EPU): Aggregated via WL1 and WL2 and Vertically integrated with WL2-Team Servers |
| FP: wCM(200) (2.BFB + 4.MFB + 6.TFB) | Matrix-FP | Matrix-Failover Pylon FP(=FPU): Aggregated via WL4 |
| XP + FP: wCM(190 + 200) | Matrix-HCS | Matrix(i, j) Hierarchical Core Structure: Aggregated via WL1, WL2, 3-level WL3-Bundle and WL4; Horizontally integrated with WL3-TeamPanels; Vertically integrated with WL2-TeamServers |

From a hardware configuration point of view, the preferred Matrix(i,j)-HCS is basically equipped with multiple base-level 1D aWSA(i)s, together with mid-level 1D mWSA4(i) and top-level 1D cWSA2(i), which are bottom-up hierarchically aggregated via standard workgroup linkages from WL1 to WL4. The newly defined j-parameter is to denote that there are j-number of aWSA(i)-based rows are included in the Matrix-HCS, which is 2D scalable.

In conclusion, based on wG1.stage3 HAT, the first-stage wG1.3 2D-Matrix(i,j) Task1-wHCSs are created via (1) wG1.stage3 Task1-HCM using wCMs to generate 2D-Matrix 3-level WSA fail-over components, (2) wG1.stage3 Task1-HAM using WL1- to WL4 to generate 2D-Matrix wHCSs, (3) wG1.stage3 Task1-HGM to real-time parameter-grow into 2D-Matrix(i,j) Task1-wHCSs and (4) wG1.stage3 Task1-HEM to real-time stage-evolve into more complex Task1 wHCSs along the workgroup evolutionary timeline as the base-level wBBBs (workgroup Basic Building Blocks).

sub-iv. FIG. 20 wG1.4 2D-Polygon(i,j) Task2-wHCSs

As shown in FIG. 20, a 6-wBBB-architected 2D-Polygon Task2-production unit based HCS is created, where 1.BAB, 2.BFB, 3.MMB, 4.MFB, 5.TCB and 6.TFB are constructed by using standard WSA-based wCCs and wCMs, as illustrated by the following HCM-6 Table.

| HCM-6: 6BBB | wCCs + wCMs | Abbr. Name | Description |
|---|---|---|---|
| 1.BAB= | | | Base Attribute Block |
| | wCM(63) | (u/d/L/r)-aWSA2p1 | (Up/down/Left/right)-attribute Workgroup Server Array type2/part1 |
| | wCM(75) | mWSA3p1 | memory Workgroup Server Array type2 version3/part1 |
| | wCM(83) | (u/d/L/r)-mWSA7p1 | (Up/down/Left/right) memory Workgroup Server Array version7/part1 |
| 2.BFB= | | | Base Failover Block |
| | wCC(19) | TaP1m(1-2) | Team attribute Processor manager(1-2) |
| | wCM(64) | (u/d/L/r)-aWSA2p2 | (Up/down/Left/right)-attribute Workgroup Server Array type2/part2 |
| | wCM(76) | mWSA3p2 | memory Workgroup Server Array type2 version3/part2 |
| | wCM(84) | (u/d/L/r)-mWSA7p2 | (Up/down/Left/right)-memory Workgroup Server Array version7/part2 |
| 3.MMB= | | | Mid Memory Block |
| | wCM(77) | mWSA4p1 | memory Workgroup Server Array type2 version4/part1 |
| 4.MFB= | | | Mid Failover Block |
| | wCM(78) | mWSA4p2 | memory Workgroup Server Array type2 version4/part2 |
| 5.TCB= | | | Top Control Block |
| | wCM(93) | cWSA2p1 | control Workgroup Server Array type2/part1 |

| HCM-6: 6BBB | wCCs + wCMs | Abbr. Name | Description |
|---|---|---|---|
| 6.TFB= | wCM(94) | cWSA2p2 | Top Failover Block<br>control Workgroup Server Array type2/part2 |

In addition, there are 5 wCMs (i.e., 1.BF, 2.MF, 3.TF, 4.XP and 5.FP), are aggregated by using 6 wBBBs via WL1, WL2, WL3-bundle and WL4 and further integrated with WL2-TeamServers and WL3-TeamPanel workgroup device, creating the preferred Integrated Polygon(i,4-side)-HCS=wCM(210+220), as illustrated by the following HIM-5 Table.

| HIM-5 Module:<br>wCM( ) | Names | Description |
|---|---|---|
| BF: wCM( )<br>(1.BAB + 2.BFB) | Base Framework | Aggregated via base-level WL3 and Horizontally integrated with WL3-TeamPanels |
| MF: wCM(77 + 78)<br>(3.MMB + 4.MFB) | Mid-Framework | Aggregated via mid-level WL3 and Horizontally integrated with WL3-TeamPanels |
| TF: wCM(93 + 94)<br>(5.TCB + 6.TFB) | Top-Framework | Aggregated via top-level WL3 and Horizontally integrated with WL3-TeamPanels |
| XP: wCM(210)<br>(1.BAB + 3.MMB + 5.TCB) | Polygon-XP | Polygon-eXecution Pylon XP(=EPU): Aggregated via WL1 and WL2 and Vertically integrated with WL2-TeamServers |
| FP: wCM(220)<br>(2.BFB + 4.MFB + 6.TFB) | Polygon-FP | Polygon-Failover Pylon FP(=FPU): Aggregated via WL4 |
| XP + FP: wCM(210 + 220) | Polygon-HCS | Polygon(i, j = 4-side) Hierarchical Core Structure: Aggregated via WL1, WL2, 3-level WL3-Bundle and WL4;<br>Horizontally integrated with WL3-TeamPanels;<br>Vertically integrated with WL2-TeamServers |

From a hardware configuration point of view, the preferred Polygon(i,j=4)-HCS is basically equipped with multiple base-level aWSAs(i), together with mid-level mWSA4 (i) and top-level cWSA2(i), all of which are bottom-up hierarchically aggregated via standard workgroup linkages from WL1 to WL4. The newly defined j-parameter is to denote that there are j-number of aWSA2(i)-based sides included in the Polygon-HCS, which is 2D-scalable.

In conclusion, based on wG1.stage2 HAT, the first-stage wG1.2 1D-Seg(i) Task2-wHCSs are created via (1) wG1.stage2 Task2-HCM using wCMs to generate 1D-Seg 3-level WSA fail-over components, (2) wG1.stage2 Task2-HAM using WL1- to WL4 to generate 1D-Seg wHCSs, (3) wG1.stage2 Task2-HGM to real-time parameter-grow into 1D-Seg(i) Task2-wHCSs and (4) wG1.stage2 Task2-HEM to real-time stage-evolve into more complex Task2 wHCSs along the workgroup evolutionary timeline as the base-level wBBBs (workgroup Basic Building Blocks).

sub-v. FIG. 21 wG1.5 3D-Tie(i,j,k) Task1-wHCSs

As shown in FIG. 21, a preferred 6-wBBB-architected 3D-Tie Task1-production unit based HCS is created, where 1.BAB, 2.BFB, 3.MMB, 4.MFB, 5.TCB and 6.TFB are constructed by using standard WSA-based wCCs, wCMs and 2D-wCMs(190,200), as illustrated by the following HCM-6 Table.

| HCM-6: | wCCs + wCMs | Abbr. Name | Description |
|---|---|---|---|
| 1.BAB= | wCM(190)<br>{wCM(93)} | Matrix-XP(1-k)<br>{cWSA2p1(1-k)} | Base Attribute Block<br>Matrix-eXecution Pylon(1-k)<br>{including control Workgroup Server Array type2/part1(1-k)} |
| 2.BFB= | wCC(19)<br>wCM(200) | TaP1m(1-2)<br>Matrix-FP(1-k) | Base Failover Block<br>Team attribute Processor manager(1-2)<br>Matrix-Failover Pylon(1-k) |
| 3.MMB= | wCM(77) | mWSA4p1 | Mid Memory Block<br>memory Workgroup Server Array type2 version4/part1 |
| 4.MFB= | wCM(78) | mWSA4p2 | Mid Failover Block<br>memory Workgroup Server Array type2 version4/part2 |
| 5.TCB= | wCM(93) | cWSA2p1 | Top Control Block<br>control Workgroup Server Array type2/part1 |
| 6.TFB= | wCM(94) | cWSA2p2 | Top Failover Block<br>control Workgroup Server Array type2/part2 |

In addition, there are 5 wCMs (i.e., 1.BF, 2.MF, 3.TF, 4.XP and 5.FP), are aggregated by using 6 wBBBs via WL1, WL2, WL3-bundle and WL4 and further integrated with WL2-TeamServers and WL3-TeamPanel workgroup device, creating the preferred Integrated Tie(i,j,k)-HCS=wCM(230+ 240), as illustrated by the following HIM-5 Table.

| HIM-5 Module: wCM( ) | Abbr. Name | Description |
|---|---|---|
| BF: wCM( ) (1.BAB + 2.BFB) | Base Framework | Aggregated via base-level WL3 and Horizontally integrated with WL3-TeamPanels |
| MF: wCM(77 + 78) (3.MMB + 4.MFB) | Mid-Framework | Aggregated via mid-level WL3 and Horizontally integrated with WL3-TeamPanels |
| TF: wCM(93 + 94) (5.TCB + 6.TFB) | Top-Framework | Aggregated via top-level WL3 and Horizontally integrated with WL3-TeamPanels |
| XP: wCM(230) (1.BAB + 3.MMB + 5.TCB) | Tie-XP | Tie-eXecution Pylon XP(=EPU): Aggregated via WL1 and WL2 and Vertically integrated with WL2-TeamServers |
| FP: wCM(240) (2.BFB + 4.MFB + 6.TFB) | Tie-FP | Tie-Failover Pylon FP(=FPU): Aggregated via WL4 |
| XP + FP: wCM(230 + 240) | Tie-HCS | Tie(i, j, k) Hierarchical Core Structure: Aggregated via WL1, WL2, 3-level WL3-Bundle and WL4; Horizontally integrated with WL3-TeamPanels; Vertically integrated with WL2-TeamServers |

From a hardware configuration point of view, the preferred Tie(i,j,k)-HCS is basically equipped with multiple 2D Matrixes(i,j), together with mid-level mWSA4s and top-level cWSA2s, all of which are bottom-up hierarchically aggregated via standard workgroup linkages from WL1 to WL4. The newly defined k-parameter is to denote that there are k number of 2D Matrix(i,j) in the Tie-HCS, which is 3D scalable.

In conclusion, based on wG1.stage5 HAT, the first-stage wG1.5 3D-Tie(i,j,k) Task1-wHCSs are created via (1) wG1.stage5 Task1-HCM using wCMs/mWSAs/cWSAs and (base-level) 2D-Matrixes to generate 3D-Tie 3-level failover components, (2) wG1.stage5 Task1-HAM using WL1- to WL4 to generate 3D-Tie wHCSs, (3) wG1.stage5 Task1-HGM to real-time parameter-grow into 3D-Tie(i,j,k) Task1-wHCSs and (4) wG1.stage5 Task1-HEM to real-time stage-evolve into more complex Task1 wHCSs along the workgroup evolutionary timeline as the base-level wBBBs (workgroup Basic Building Blocks).

sub-vi. FIG. 22 wG1.6 3D-Align(i,j,k) Task2-wHCSs

As shown in FIG. 22, a 6-wBBB-architected 3D-Align Task2-production unit based HCS is created, where 1.BAB, 2.BFB, 3.MMB, 4.MFB, 5.TCB and 6.TFB are constructed by using standard WSA-based wCCs, wCMs and 2D-wCMs (210,220), as illustrated by the following HCM-6 Table.

| HCM-6: 6BBB | wCCs + wCMs | Abbr. Name | Description |
|---|---|---|---|
| 1.BAB= | | | Base Attribute Block |
| | wCM(210) | Polygon-XP(1-k) | Polygon-Execution Pylon(1-k) |
| | {wCM(93)} | {cWSA2p1(1-k)} | {including control Workgroup Server Array type2/part1(1-k)} |
| 2.BFB= | | | Base Failover Block |
| | wCC(19) | TaP1m(1-2) | Team attribute Processor manager(1-2) |
| | wCM(220) | Polygon-FP(1-k) | Polygon-Failover Pylon(1-k) |
| 3.MMB= | | | Mid Memory Block |
| | wCM(77) | mWSA4p1 | memory Workgroup Server Array type2 version4/part1 |
| 4.MFB= | | | Mid Failover Block |
| | wCM(78) | mWSA4p2 | memory Workgroup Server Array type2 version4/part2 |
| 5.TCB= | | | Top Control Block |
| | wCM(93) | cWSA2p1(1-k) | control Workgroup Server Array type2/part1(1-k) |
| 6.TFB= | | | Top Failover Block |
| | wCM(94) | cWSA2p2 | control Workgroup Server Array type2/part2 |

In addition, there are 5 wCMs (i.e., 1.BF, 2.MF, 3.TF, 4.XP and 5.FP), are aggregated by using 6 wBBBs via WL1, WL2, WL3-bundle and WL4 and further integrated with WL2-TeamServers and WL3-TeamPanel workgroup device, creating the preferred Integrated Align(i,j=4-side,k)-HCS=wCM(250+260), as illustrated by the following HIM-5 Table.

(base-level) 2D-Polygons to generate 3D-Align 3-level failover components, (2) wG1.stage6 Task2-HAM using WL1-to WL4 to generate 3D-Align wHCSs, (3) wG1.stage6 Task2-HGM to real-time parameter-grow into 3D-Align(i,j,k) Task2-wHCSs and (4) wG1.stage6 Task2-HEM to real-time stage-evolve into more complex Task2 wHCSs along

| HIM-5 Module: wCM( ) | Abbr. Name | Description |
|---|---|---|
| BF: (1.BAB + 2.BFB) | Base Framework | Aggregated via base-level WL3 and Horizontally integrated with WL3-TeamPanels |
| MF: wCM(77 + 78) (3.MMB + 4.MFB) | Mid-Framework | Aggregated via mid-level WL3 and Horizontally integrated with WL3-TeamPanels |
| TF: wCM(93 + 94) (5.TCB + 6.TFB) | Top-Framework | Aggregated via top-level WL3 and Horizontally integrated with WL3-TeamPanels |
| XP: wCM(250) (1.BAB + 3.MMB + 5.TCB) | Align-XP | Align-eXecution Pylon XP(=EPU): Aggregated via WL1 and WL2 and Vertically Integrated with WL2-TeamServers |
| FP: wCM(260) (2.BFB + 4.MFB + 6.TFB) | Align-FP | Align-Failover Pylon FP(=FPU): Aggregated via WL4 |
| XP + FP: wCM(250 + 260) | Align-HCS | Align(i, 4, k) Hierarchical Core Structure: Aggregated via WL1, WL2, 3-level WL3-Bundle and WL4; Horizontally integrated with WL3-TeamPanels; Vertically integrated with WL2-TeamServers |

From a hardware configuration point of view, the preferred Align(i,j,k)-HCS is basically equipped with multiple base-level 2D Polygon(i,j), together with mid-level mWSA4s and top-level cWSA2s, all of which are bottom-up hierarchically aggregated via standard workgroup linkages from WL1 to WL4. The k-parameter is for denoting that there are k number of 2D Polygon(i,j) in the Align-HCS, which is 3D scalable.

In conclusion, based on wG1.stage6 HAT, the first-stage wG1.6 3D-Align(i,j,k) Task2-wHCSs are created via (1) wG1.stage6 Task2-HCM using wCMs/mWSAs/cWSAs and the workgroup evolutionary timeline as the base-level wBBBs (workgroup Basic Building Blocks).

Sub-vii. FIG. 23 wG1.7 Multi-x(1,2,3)D(n) Fractal1 Task1-wHCSs

As shown in FIG. 23, a preferred 6-wBBB-architected poly3D-Fractal1 Task1-production unit based HCS is created, where 1.BAB, 2.BFB, 3.MMB, 4.MFB, 5.TCB and 6.TFB are constructed by using standard WSA-based wCCs, wCMs and 1D/2D/3D-wCMs, as illustrated by the following HCM-6 Table.

| HCM-6: 6BBB | wCCs + wCMs | Abbr. Name | Description |
|---|---|---|---|
| 1.BAB= | | | Base Attribute Block |
| | wCM(150) × m1 | Array-XP | m1 units of Array-Execution Pylon |
| | wCM(190) × m2 | Matrix-XP | m2 units of Matrix-Execution Pylon |
| | wCM(230) × m3 | Tie-XP | m3 units of Tie -Execution Pylon |
| 2.BFB= | | | Base Failover Block |
| | wCM(160) × m1 | Array-FP | m1 units of Array-Failover Pylon |
| | wCM(200) × m2 | Matrix-FP | m2 units of Matrix-Failover Pylon |
| | wCM(240) × m3 | Tie-FP | m3 units of Tie-Failover Pylon |
| | wCC(19) | TaP1m(1-2) | Team attribute Processor manager(1-2) |
| 3.MMB= | | | Mid Memory Block |
| | wCM(85) | mWSA8p1 | Memory-bonding Workgroup Server Array type2-version8/part1 |
| 4.MFB= | | | Mid Failover Block |
| | wCM(86) | mWSA8p2 | Memory-bonding Workgroup Server Array type2-version8/part2 |
| 5.TCB= | | | Top Control Block |
| | wCM(93) | cWSA2p1 | control Workgroup Server Array type2/part1 |
| 6.TFB= | | | Top Failover Block |
| | wCM(94) | cWSA2p2 | control Workgroup Server Array type2/part2 |

In addition, there are 5 wCMs (i.e., 1.BF, 2.MF, 3.TF, 4.XP and 5.FP), are aggregated by using 6 wBBBs via WL1, WL2, WL3-bundle and WL4 and further integrated with WL2-TeamServers and WL3-TeamPanel workgroup device, creating the preferred Integrated Fractal1-HCS=wCM(270+ 280), as illustrated by the following HIM-5 Table.

| HIM-5 Module: wCM( ) | Abbr. Name | Description |
|---|---|---|
| BF: wCM( ) (1.BAB + 2.BFB) | Base Framework | Aggregated via base-level WL3 and Horizontally integrated with WL3-TeamPanels |
| MF: wCM(85 + 86) (3.MMB + 4.MFB) | Mid-Framework | Aggregated via mid-level WL3 and Horizontally integrated with WL3-TeamPanels |
| TF: wCM(93 + 94) (5.TCB + 6.TFB) | Top-Framework | Aggregated via top-level WL3 and Horizontally integrated with WL3-TeamPanels |
| XP: wCM(270) (1.BAB + 3.MMB + 5.TCB) | Fractal1-XP | Fractail-eXecution Pylon XP(=EPU): Aggregated via WL1 and WL2 and Vertically integrated with WL2-TeamServers |
| FP: wCM(280) (2.BFB + 4.MFB + 6.TFB) | Fractal1-FP | Fractail-Failover Pylon FP(=FPU): Aggregated via WL4 |
| XP + FP: wCM(270 + 280) | Fractal1-HCS | Fractail Hierarchical Core Structure: Aggregated via WL1, WL2, 3-level WL3-Bundle and WL4; Horizontally integrated with WL3-TeamPanels; Vertically integrated with WL2-TeamServers |

From a hardware configuration point of view, the preferred Fractal1-HCS is basically equipped with multiple 1D-Arrays, 2D-Matrixes, 3D-Ties, together with mid-level mWSA8(i) and top-level cWSA2(i), all of which are bottom-up hierarchically aggregated via standard workgroup linkages from WL1 to WL4. The newly defined m1, m2, m3 parameters are to denote that there are m1 number of 1D Arrays, m2-number of 2D Matrixes and m3-number of 3D-Ties in the Fractal1-HCS, which can be expandable in numbers for real-time duplications of 1D/2D/3D HCSs and also can be reduced in numbers when the duplications are done one at a time and ready for aggregation into building other Task1-based HCSs.

In conclusion, based on wG1.stage7 HAT, the first-stage wG1.7 multi-3D Fractal1

Task1-wHCSs are created via (1) wG1.stage7 Task1-HCM using wCMs/mWSAs/cWSAs, (base-level) 1D-Array(s), 2D-Matrix(s) and 3D-Tie(s) to generate Fractal1 3-level fail-over components, (2) wG1.stage7 Task1-HAM using WL1-to WL4 to generate Fractal1 wHCSs, (3) wG1.stage7 Task1-HGM to real-time parameter-grow into Fractal multiple(i,j,k) Task1-wHCSs and (4) wG1.stage7 Task1-HEM to real-time generation-evolve into multi-complex-production-unit-integrated bigger and more diverse wHCSs along the workgroup evolutionary timeline as the base-level wBBBs (workgroup Basic Building Blocks).

sub-viii. FIG. 24 wG1.8 multi-x(1,2,3)D(n) Fractal2 Task2-wHCSs

As shown in FIG. 24, a 6-wBBB-architected poly3D Fractal2 Task2-production unit based HCS is created, where 1.BAB, 2.BFB, 3.MMB, 4.MFB, 5.TCB and 6.TFB are constructed by using standard WSA-based wCCs, wCMs and 1D/2D/3D wCMs, as illustrated by the following HCM-6 Table.

| HCM-6: 6BBB | wCCs + wCMs | Abbr. Name | Description |
|---|---|---|---|
| 1.BAB= | | | Base Attribute Block |
| | wCM(170) × m1 | Seg-XP | m1 units of Seg-Execution Pylon |
| | wCM(210) × m2 | Polygon-XP | m2 units of Polygon-Execution Pylon |
| | wCM(250) × m3 | Align-XP | m3 units of Align-Execution Pylon |
| 2.BFB= | | | Base Failover Block |
| | wCM(180) × m1 | Seg-FP | m1 units of Seg-Failover Pylon |
| | wCM(220) × m2 | Polygon-FP | m2 units of Polygon-Failover Pylon |
| | wCM(260) × m3 | Align-FP | m3 units of Align-Failover Pylon |
| | wCC(19) | TaP1m(1-2) | Team attribute Processor manager(1-2) |
| 3.MMB= | | | Mid Memory Block |
| | wCM(85) | mWSA8p1 | Memory-bonding Workgroup Server Array type2 version8/part1 |
| 4.MFB= | | | Mid Failover Block |
| | wCM(86) | mWSA8p2 | Memory-bonding Workgroup Server Array type2 version8/part2 |
| 5.TCB= | | | Top Control Block |
| | wCM(93) | cWSA2p1 | control Workgroup Server Array type2/part1 |
| 6.TFB= | | | Top Failover Block |
| | wCM(94) | cWSA2p2 | control Workgroup Server Array type2/part2 |

In addition, there are 5 wCMs (i.e., 1.BF, 2.MF, 3.TF, 4.XP and 5.FP), are aggregated by using 6 wBBBs via WL1, WL2, WL3-bundle and WL4 and further integrated with WL2-TeamServers and WL3-TeamPanel workgroup device, creating the preferred Integrated Fractal2-HCS=wCM(290+ 300), as illustrated by the following HIM-5 Table.

| HIM-5 Module: wCM( ) | Abbr. Name | Description |
|---|---|---|
| BF: wCM( ) (1.BAB + 2.BFB) | Base Framework | Aggregated via base-level WL3 and Horizontally integrated with WL3-TeamPanels |
| MF: wCM(85 + 86) (3.MMB + 4.MFB) | Mid-Framework | Aggregated via mid-level WL3 and Horizontally integrated with WL3-TeamPanels |
| TF: wCM(93 + 94) (5.TCB + 6.TFB) | Top-Framework | Aggregated via top-level WL3 and Horizontally integrated with WL3-TeamPanels |
| XP: wCM(290) (1.BAB + 3.MMB + 5.TCB) | Fractal2-XP | Fractal2-eXecution Pylon XP(=EPU): Aggregated via WL1 and WL2 and Vertically integrated with WL2-TeamServers |
| FP: wCM(300) (2.BFB + 4.MFB + 6.TFB) | Fractal2-FP | Fractal2-Failover Pylon FP(=FPU): Aggregated via WL4 |
| XP + FP: wCM(290 + 300) | Fractal2-HCS | Fractal2 Hierarchical Core Structure: Aggregated via WL1, WL2, 3-level WL3-Bundle and WL4; Horizontally integrated with WL3-TeamPanels; Vertically integrated with WL2-TeamServers |

From a hardware configuration point of view, the preferred Fractal2-HCS is basically equipped with multiple 1D-Segs, 2D-Polygons, 3D-Aligns, together with mid-level mWSA8(i) and top-level cWSA2(i), all of which are bottom-up hierarchically aggregated via standard workgroup linkages from WL1 to WL4. The newly defined m1, m2, m3 parameters are to denote that there are m1-number of 1D-Segs, m2-number of 2D-Polygons and m3-number of 3D-Aligns in the Fractal2-HCS, which can be expandable in numbers for real-time duplications of 1D/2D/3D HCSs and also can be real-time reduced in numbers when the duplications are done one at a time and ready for aggregation into building other Task2-based HCSs.

In conclusion, based on wG1.stage8 HAT, the first-stage wG1.8 multi-3D-Fractal2 Task2-wHCSs are created via (1) wG1.stage8 Task2-HCM using wCMs/mWSAs/cWSAs, (base-level) 1D-Seg(s), 2D-Polygon(s) and 3D-Align(s) to generate Fractal2 3-level fail-over components, (2) wG1.stage8 Task2-HAM using WL1- to WL4 to generate Fractal2 wHCSs, (3) wG1.stage8 Task2-HGM to real-time parameter-grow into Fractal2 multiple-(i,j,k) Task2-wHCSs and (4) wG1.stage8 Task2-HEM to real-time generation-evolve into multi-complex-production-unit-integrated bigger and more diverse wHCSs along the workgroup evolutionary timeline as the base-level wBBBs (workgroup Basic Building Blocks).

5.1.5 wG1 Task Operation-Based Software Architecture Theorem (wG1-SAT)

The third endeavor to carry out wECP in the third period along the first workgroup production evolutionary generation timeline (wG1) is to establish the fine-grained PS Task operation-based Software Architecture Theorem (wG1-SAT) of wTF3 of wECP.

In this endeavor, there are four (4) important topics that need to be elaborated upon, so that wG1-operation SAT can be established along the workgroup production evolutionary timeline to enhance wG1.stage(n) Task wHCSs created by wG1-HAT with real-time concurrent problem solving capabilities for all the internal and external stakeholders.

They are:

Topic-I. Establishing wG1 Task operation SAT for generating wG1.stage(n) Task(1,2) operation-wEntities;

Topic-II. Building wG1.stage(n=1,8) 8-stage evolved standard Task(1,2) operation wEntities;

Topic-III. Establishing wG1 Task Fail-Safe (FS)-operation-SAT for generating wG1.stage(n) Task(1,2) FS-(operation) wEntities;

Topic-IV. Building wG1.stage(n=1,8) 8-stage evolved standard Task(1,2) FS-wEntities;

After the first two (2) topical disclosures (i.e., Topic-I and Topic-II), it can be concluded that wG1 Task (PS)-operation SAT, which comprises software methodologies in creating workgroup-link-based 3-level workgroup OSs, workgroup programs and workgroup storages for TcPs, TmPs and TaPs along 8-evolutionary stages for enhancing stage-evolved Task wEPU(XP)s (Execution Pylon Unit or eXecution Pylon in short) of wHCSs into Task operation wEntities. And these Task operation wEntities are created for smaller production environments where fail-over/fail-safe is not an issue, but they are still equipped with real time self-growing and self-improving concurrent problem solving Task1-R&R solution/Task2-Q&A knowledge domains that can achieve real-time concurrent fine-grained PS for all the internal and external stakeholders.

However, it is imperative that wG1 Task Fail-Safe (FS)-operation wEntities be created for bigger and more sophisticated production environment where fail-safe is a must. Therefore, to computerize "the 3-level fail-safe conveyer-integrated production operation facility" based on the aforementioned 3-level Fail-over Pylon Unit (FPU) of a workgroup Hierarchical Core Structure (wHCS), it can be identified as such that, (1) a top-level TcPm can act as a top-level controllers' manager and assume the same Fail-safe PS-operation event-forming capabilities, (2) a mid-level TmPm can act as a mid-level conveyer technicians' manager and assume the same fail-safe traffic-directing event-forming capabilities and (3) a base-level TaPm can act as a base-level workstation operators' manager and assume the same fail-safe attribute-producing event-forming capabilities.

If the last two (2) topics are to be disclosed, it can be concluded that Task Fail-Safe (FS)-operation SAT, which comprises another set of FS-operation methodologies along 8-evolutionary stages for further enhancing stage-evolved Task wFPU(FP)s (Fail-over Pylon Unit or Fail-over Pylon in short) of wHCSs with fail-over capabilities and most importantly, creating the unitary-core (wHCS)-based Task FS-operation wEntities along 8-evolutionary stages.

Due to the fact that the disclosure about Task FS-operation SAT that contains 3-level workgroup-FS-OSs, workgroup FS-programs and workgroup FS-storages for equipping 3-level TaPm-pair, TmPm-pair and TcPm-pair is just too huge, it is impossible to combine Task FS-operation SAT and Task operation SAT together in one disclosure. Therefore, it is only proper that the last two (2) topics (Topic-III and Topic-IV) will be disclosed in the upcoming application, which will be focused on how to create wG1 Task FS-operation wEntities based on the integration of wG1 Task FS-operation SAT and Task Operation SAT.

Topic-I. Establishing Task PS-Operation-SAT in Generating Task (Operation) wEntities The first Topic is on how to establishing wG1 Task operation SAT and generating Task operation wEntities. In order to establish wG1.stage(n) Task operation SAT, there are three(3) software areas that need to be developed for enhancing all the wG1 evolved Task EPUs of wHCSs created by wG1.stage(n=1,8) HAT, as illustrated from FIG. 17 to FIG. 24, with real-time concurrent fine-grained PS-operation capabilities.

The first software area is to develop 3-level workgroup-structure based 3-level workgroup Operating Systems for real-time forming "Task fine-grained PS-operation events" with requirements, such as control templates of 10 workgroup-process workflow with conditions, the second software area is to develop 3-level Task workgroup OS-based 3-level Task workgroup programs for real-time performing "Task fine-grained PS-operation events" with results, such as fulfilled control templates with resulted data sets and the third software area is to develop 3-level workgroup-program-based workgroup storages for real-time managing "Task fine-grained PS-operation events" with reports, such as up to the current 6W1H aspects-oriented performance statistics Once the wG1.stage(n) 3-level workgroup-structure based software OSs/Programs/Storages are developed along each evolutionary stage, they can be installed on wG1.stage (n) Task operation EPUs, generating all the wG1.stage(n) Task operation wEntities that are embedded with real-time self-growing and self-improving fine-grained-PS operation capability domains, which can encapsulate all the potential production problem domains from the smallest to the largest and solve all the internal and external stakeholders' problems in a real-time dynamic and concurrent manner.

To further disclose Task operation SAT in details, there are five (5) subtopics (i to v) that need to be dwelled upon.

Subtopic-i: How to develop 3-level Task workgroup-link (WL1,2,3)-centric wEPU-based 3-level workgroup OSs for installing in the 3-level TeamProcessors (i.e., TaPs, TmPs, TcPs), so that they can execute workgroup OSs collaboratively for real-time forming Task fine-grained PS-operation events with external requirements.

Subtopic-ii: How to develop 3-level Task workgroup OS-based workgroup programs for installing in the 3-level TeamProcessors, so that they can execute 3-level workgroup programs collaboratively for real-time performing Task fine-grained PS-operation events with results.

Subtopic-iii: How to develop 3-level Task workgroup-program-based workgroup storages for installing in these 3-level TeamProcessors, so that they can store 3-level workgroup activities collaboratively for real-time managing Task fine-grained PS-operation events with reports, Subtopic-iv: On defining wG1 Task operation SAT based on real-time three (3) Software methodology-loop (i.e., m1-0 S/m2-Program/m3-Storage Methodology-based m1-m2-m3 loop) iterations along wG1.stage(n=1 to 8), containing a total of 24 software methodologies in the first workgroup production generation (wG1).

Subtopic-v: On creating 8-standard wG1.stage(n=1,8) Task operation wEntities based on wG1 operation HAT and SAT.

After these 5 sub-topical disclosures, it can be concluded that the importance of wG1 Task operation SAT is to generate real-time "self-improving" fine-grained PS-operation capability domains on any Task wEPU/wHCS created by wG1 Task operation HAT along the 8-stage evolutionary timeline inside the first workgroup-production generation (i.e., wG1.stage(n=1,8)).

Sub-i: Developing 3-Level Task Workgroup-Structure-Based Workgroup-OSs (the Control of Processes Structure, Control-Based OS)

The first subtopic is on how to develop 3-level Task workgroup-structure-based OSs. In order to achieve that goal, there are six (6) focuses that need to be dwelled upon.

Focus-1: On computerizing the real-world 3-level conveyer-integrated production operation facilities and enhancing Task crew's real-time dynamic fine-grained PS-operation event creation capabilities based on 3-level workgroup structures equipped with workgroup OSs.

Focus-2: On comparing workgroup-structure-based workgroup OSs (to achieve the goal) and classifying them into categories based on architecture methodology.

Focus-3: On developing 3-level workgroup OS based on the existing processing-based as well as the new/better operation-based architectural methodologies.

Focus-4: On innovating new and better top-level workgroup-control operation-OS (architecture)-Methodology, illustrated by FIG. 25a;

Focus-5: On emphasizing the important rationale of top-level real-time dynamic workgroup feedback-(workflow)-control of TcP, because without it, Task stakeholder's fine-grained (closed-loop) PS-operation cannot be real-time dynamically established and formed with Task stakeholder's real-time requirements.

Focus-6: On defining the first Software OS (architecture)-Methodology of Task Operation SAT (Software Architecture theorem) SAT (i.e., wG1.stage(n) SAT-methodology-1 (SAT-m1)) in creating wG1.stage(n) 3-level Task workgroup operation/process OSs.

After these 6 focus disclosure, it can be concluded that the Task workgroup-structure-based workgroup-OSs for installing in the 3-level TeamProcessors (i.e., TaPs, TmPs and TcPs), all of which can support the internal 3-level conveyer-integrated stakeholders (i.e., workstation-processors, conveyer-technicians and fine-grained-PS controllers), respectively with chore and duty fulfillments and most-importantly, enhance their capabilities of real-time dynamic forming fine-grained-PS closed-loop operation events based on external stakeholders' requirements.

Focus-1: Must-have Workgroup-OSs

The first focus is on how to computerize the 3-level conveyer-integrated production operation facility and enhance Task crew's real-time dynamic fine-grained PS-operation event creation capabilities based on 3-level workgroup structures equipped with workgroup OSs.

3-Level Task Crew's PS-Operation Event Creation Capability

According to the aforementioned fine-grained-PS 3-level conveyer-integrated production operation facility comprising Task1 crew entity and Task2 crew entity, each top-level conveyer-integrated Task1 as well as Task2 controller, has to establish two types of internal feedback-(workflow) check&control workgroup operation for carrying out external fine-grained-closed-loop PS-operations, based on when and where the external message is obtained and delivered. They are (1) the external-message is received and returned via an external messenger for requesting a fine-grained PS operation with requirements and replying it with results for any particular external user (i.e., an internal RR (receive-return) workgroup-operation) will be dynamically formed to carry out the internal 7-step conveyer-integrated workgroup procedures over 3-level workgroups, and (2) the external message is Pulled-in and Pushed-out via an external conveyer for requesting a fine-grained PS operation with requirements and replying it with results for any particular external collaborator and controller (i.e., a PP-(pull-push) workgroup-operation) can be formed to carry out the internal 7-step conveyer-integrated workgroup procedures.

Therefore, a top-level controller must have feedback-control RR/PP (workgroup)-operation event-forming skill-capability based on all the supporting feed-back-control production equipments for generating "workload-control sheet" to flow through 7-step conveyer-integrated workgroup procedures.

Then, the mid-level conveyer's technicians must have the internal workgroup-traffic IO-processing event-forming skill-capability for understanding every workload-sheet and redirecting it to the designated workstation processor. Moreover, the base-level workstation processors must have the workgroup-attribute IO-processing event-forming skill-capability for deciphering the workload-sheet and processing it with the final results.

Therefore, these 3-level Task-production workgroup's event-forming capabilities of carrying out a workload-sheet based on aforementioned 7-step conveyer-integrated workgroup procedures, can then be integrated collaboratively as the overall Task crew-entity's capabilities to enable real-time dynamic and concurrent fine-grained PS-operations for involved stakeholders.

Computerize 3-Level Task Crew's PS-Operation Event Creation Capability

To support and computerize "the 3-level conveyer-integrated production operation facility" based on the aforementioned 3-level workgroup Hierarchical Core Structures (wHCS), it can be identified as such that, (1) a top-level TcP can act as a top-level controller and assume the same PS-operation event-forming capabilities, (2) a mid-level TmP can act as a mid-level conveyer technician and assume the same traffic-directing event-forming capabilities and (3) a base-level TaP can act as a base-level workstation operator and assume the same attribute-producing event-forming capabilities.

In order to generalize the production Task1 R&R PS-solution-execution operations and Task2 Q&A PS-knowledge-supervision operations, it is ideal to use generic Task fine-grained (closed-loop) PS-operations to represent these two externally incurred fine-grained PS production operations. Then, the aforementioned 7-step conveyer-integrated workgroup procedures can be construed as the workgroup-process workflows among the 3-level workgroups for carrying out a complete Task fine-grained PS-operation. In order to computerize the conveyer-integrated procedural workflows, it is ideal to use the workgroup-link-2 (WL2) devices (i.e., WL2-TeamServers), which can act as a digital conveyer, a common storage-buffer that can be accessed by all the involved 3-level TeamProcessors (i.e., TaPs, TmPs and TcPs), just like a real-world conveyer that can be accessed by the top-level RR/PP-operation controllers, the mid-level conveyer traffic-processors and the base-level workstation attribute-processors.

Therefore, from a WL2-TeamServer implementation point of view, real-world 7-step conveyer-integrated workgroup procedures can be computerized into 3-level ten (10) workgroup-link-2 (WL2)-based workgroup IO-process workflows, where each top-control-level TcP has 4 workgroup-process workflows (i.e., 2 top-down and 2 bottom-up), each mid-traffic-level TmP has 4 workgroup-process workflows (i.e., 2 top-down and 2 bottom-up) and each base-attribute-level TaP has 2 workgroup-process workflows (i.e., 1 top-down and 1 bottom-up), as illustrated from FIG. 17 to FIG. 24. And each TcP-TmP-(TaPs)-based 3-level top-down 5 workflows and bottom-up 5 workflows combined 10 workgroup-process closed-loop-workflows must be established to complete an external Task fine-grained (closed-loop) PS-operation for an external stakeholder. Most importantly, multiple concurrent fine-grained PS-operations due to multiple top-level TcPs can be carried out simultaneously on the EPU(XP) (i.e., Execution Pylon Unit or eXecution Pylon in short) of any wHCS (workgroup Hierarchical Core Structure) that is created by the wG1 Task-operation HAT.

It can be concluded that a Task fine-grained PS-operation is based on 3-level TeamProcessors (i.e., TcP, TmP and TaP) that can collaboratively carry out 10 types of WL2-based hierarchical workgroup-process workflows. However, in order to control these workgroup-process workflows on WL2-TeamServers, it is imperative that each TeamProcessor must be installed with a new type of workgroup-link-based Operating System that can control workgroup-link-based devices, such as WL1-TeamSwitches-CM5, WL2-TeamServer CM25 (directional) and CM35 (bi-directional), WL3-TeamPanel CM27, CM37 and CM47, as shown from FIG. 12$x$,13$x$,14$x$. Then, all the Operating Systems installed in these 3-level TeamProcessors of a EPU(XP) workgroup structure, dubbed "work-structure-based workgroup Operating-Systems," can turn these 10 types of WL2-based workgroup-process workflows into a closed-loop fine-grained PS-operation workflow, due to 3-level hierarchy with 5 bottom-up and 5 top-down workflows combined.

The first-type of workgroup-link-2 IO-process workflow, dubbed WL2.1, is the TcP-based workgroup-workflow process that can receive the network-request-message from the external immediate production users via a network device as well as pull the workgroup-request-message from the external production collaborators or production-assembly controllers via the external/shared WL2-TeamServer. The TcP controls the network-link device to receive-in request-message based on user's natural language as well as the workgroup-link TeamServer device to pull-in request-message based on the semantic Task-production domain language that collaborators and controllers should be familiar with and all of which messages are loaded into the main memory of TcP. Then this particular TcP will utilize internal processing routines that can translate/correct these request messages into Task domain-language-based sentential-message requirements on an immediately spawned fine-grained-PS event-control template with event-memory allocation and compile sentential-message requirements into menu-term-script requirements on the control template, just like a top-level controller that has to translate external sentential-messages into menu-terms.

The second type of workgroup-link-2 IO-process workflow, dubbed WL2.2, is a TcP-based workgroup-workflow process that can further utilize related internal processing routines to top-down meso-compile menu-terms requirements into manual-form requirements on the control template, just like a top-level controller that has to compile menu-terms into manual-forms, and to push the control template into the shared TeamServer with a TmP via WL2.

The third-type of workgroup-link-2 IO-process workflow, dubbed WL2.3, is a TmP-based workgroup-workflow process that can pull in the control-template and then utilize the internal processing routines to conduct either bulletin-board TeamServer-based (multiple-sharing among TcP, TmP and TaP) as well as mail-box TeamServer-based (only 2-sharing between TcP and TmP as well as TmP and TaP) data-exchange/transfer processes.

The fourth-type of workgroup-link-2 IO-process workflow, dubbed WL2.4, is a TmP-based workgroup-workflow process that can utilize the internal processing routines to set up the traffic-control procedures and then push out the control-template to the first and designated base-level TaP via the shared TeamServer.

The fifth-type of workgroup-link-2 IO-process workflow, dubbed WL2.5, is the first and last TaP-based workgroup-workflow process that can pull in the control-template via the shared TeamServer and utilize the internal routines to process the manual-form requirements on the control-template into attribute-process instruction requirements and generate resulted data set, just like a base-level workstation processor should do to process workload-manual form into executable instructions and generate results.

The sixth-type of workgroup-link-2 IO-process workflow, dubbed WL2.6, is the first and last TaP-based workgroup-workflow process that can utilize the internal routines to process the resulted data set into resulted manual-form with resulted keywords on the control-template, just like a base-level workstation processor should do, and then push the control-template either to the next designated TaP via the shared bulletin-board TeamServer or to the mid-level TmP via the shared mail-box TeamServer.

The seventh-type of workgroup-link-2 IO-process workflow, dubbed WL2.7, is the TmP-based workgroup-workflow process that can pull-in the control template from the shared TeamServers and utilize the internal routines to process the control-template packaged information, either push the control-template to the designated TaP via the shared mail-box TeamServer for continuing the base-level attribute-processes or if the control-template is fulfilled from the last TaP, then process to find out the right location among the shared mail-box TeamServers to the designated TcP.

The eighth-type of workgroup-link-2 IO-process workflow, dubbed WL2.8, is the TmP-based workgroup-workflow process that can utilize the internal routines to process the resulted control template packaged information and then push it out to the right location of the shared mail-box TeamServer with the designated TcP.

The ninth-type of workgroup-link-2 IO-process workflow, dubbed WL2.9, is the TcP-based workgroup-workflow process that can pull-in the control template from either the shared mail-box TeamServer with TmP or the shared bulletin-board TeamServer with TaP and utilize the internal routines to process the control-template resulted-manual-form and meta-compile them into resulted menu-terms.

The tenth-type of workgroup-link-2 IO-process workflow, dubbed WL2.10, is the TcP-based workgroup-workflow process that can utilize the internal routines to process resulted menu-terms into resulted domain-sentential messages and compose them into the natural language-(NL)-based reply statements and either memory-pipe it into the network Ethernet card that can send out to the original user who sent in the request message or push it into external TeamServer that is shared with external production collaborator-TcP as well as production-assembly TmP that can deliver the NL-based reply statements to the production-assembly TcP, due to the fact that those TcPs sent in the request message previously.

In addition, the top-level controller will have to combine the first translating and the fourth composing IO-process capabilities together into a RR/PP feedback-control operation capability based on in-memory-buffer that can be horizontally shared by two-vertical WL2.1 and WL2.10 workgroup IO-processes. In so doing, the top-down workflow and bottom-up workflow are tied up together based on horizontal in-memory buffer-based workgroup-processes, so that the request messages and the resulted reply statements can be checked and processed together for the same original external stakeholder, dubbed the feedback-workflow check&control workgroup RR/PP-operation that comprises vertical workgroup IO-processes and horizontal workgroup IO-processes.

Therefore, the OS of TcP must handle (1) "feedback check&control" RR/PP-sentential-workgroup operation of two combined translate-WL2.1 and compose-WL2.10 vertical workgroup-workflow IO-processes together with horizontal workgroup-workflow in-memory buffer-IO-processes, (2) top-down-meso-compiling-WL2.2 workgroup-workflow IO-processes and (3) bottom-up-meta-compiling-WL2.9 workgroup-workflow IO-processes, so that the overall external closed-loop fine-grained PS-operations can be completed, just like a top-level controller in an ideal 3-level conveyer-integrated production operation facility must perform.

Most importantly, these 3-level workgroup-structure-based workgroup-OSs must be developed, so that real-time dynamic external fine-grained PS-operations based on internal workgroup-operations, workgroup-processes and internal processes can then be realized.

Focus-2: Categorize Workgroup OSs Based on Structure-Event Rankings

The second focus is on comparing workgroup-structure-based workgroup OSs with existing node-structure-based node-OSs and classifying them into taxonomic OS categories based on hierarchical architecture rankings (i.e., 1-link typed, 2-link typed and 3-link typed), where the higher-ranking 3-link-typed OSs will replace the lower-ranking ones, due to the fact that all the software capabilities of lower-ranking OS-based systems are only a subset of higher-ranking 3-link-typed OS-based systems (i.e., the hardware-structure autophagy effect and the software nullification effect), as discussed earlier (e.g., network OSs replaced DOS), due to 1-link-typed DOS-structures were inferior than 2-link-typed network-capable structures.

In order to develop an Operating System (OS) on a hardware-structure, it is imperative that a hardware structure be classified based on how many different device-link types it has for its OS to control. In fact, there are four (4) Hardware Structural (HS) categories that can be classified based on different types of linked devices.

(1L-Internal Process HS)

The first HS category is about Internal-linked device-based 1-Link-typed Hardware Structure (1L-HS), which can enable internal IO-processes, from one input device, such as keyboard, to another output device, such as display-monitor, and all the IO-activities are under the direct-control and monitoring of one human-processor/user. Therefore, this 1L-HS category based on internal-process-oriented node-core computers is involved with only one single-user stakeholder.

(2L-Network Process HS)

The second HS category is about Network-linked devices and Internal-linked devices combined 2-Link-typed network Hardware Structures (2L-nHS), which can enable network IO-processes that can cascade the internal IO-processes and provide fixated coarse-grained processing results to multiple client-processors/users via network gadgets as well as network hardware structures. Therefore, this 2L-nHS category based on network-processing-oriented node-hub computers, is involved with internal hardware/software stakeholders and external networked-user stakeholders.

(2L-Workgroup Process HS)

The third HS category is about Workgroup-linked devices and Internal-linked devices combined 2-Link-typed workgroup Hardware Structures (2L-wHS), such as TmPs and TaPs, which can enable vertical workgroup IO-processes that can control the input and output of all the internal IO-processes and provide cascaded processing results to other 2-Link-typed workgroup hardware structures and so on, so that the overall workgroup-processing workflows can be long-running, providing more refined end results for collaborators in a workgroup with common goals. Therefore, this 2L-wHS category based on workgroup-vertical-process-oriented TeamProcessors are ideally built for base-level attribute-processors and mid-level conveyer-integrated traffic-processors with internal attribute-processing-chore/traffic-processing duty-oriented capabilities to serve top-level controllers, so that controllers can control the overall end-results from the base-level attribute-processors via mid-level traffic-processors.

(3L-Workgroup Operation HS)

The fourth HS category is about External-linked devices, workgroup-linked devices and internal-linked devices combined 3-link-typed workgroup hardware structures (3L-wHS), such as TcPs, which can enable external network-link-based as well as external workgroup-link-based fine-grained closed-loop Problem-Solving (PS)-operations that encompass multiple internal workgroup-linked vertical and horizontal workgroup-processes, enabling combined internal "feedback-circulation workflow-control RR/PP-workgroup-operations" and thereby providing real-time fine-grained problem solving results to a network-linked users as well as an external workgroup-linked collaborators and higher-level controllers. This 3L-wHS category based on workgroup-operation-oriented TeamProcessors are ideally built for top-level conveyer-integrated controllers with feedback-control capabilities to fine-grained serving 3 types of external stakeholders (i.e., networked users, workgrouped collaborators and higher-level controllers).

Therefore, based on the above 4 HS categories, there are four(4) categories of structure-based Operating systems that can derived and classified as follows:

(1L-HS-based, ip-OS) (for node-core processing OS)

(1) The first OS-category is Internal-Processing-based OSs (ip-OS) for internal 1-link-typed Hardware Structures (1L-HS), such as DOS.

(2L-nHS-Based, Np-OS) (for Node-Hub Processing OS)

(2) The second OS category is Network-processing-based OSs (np-OS) for 2-Link-typed network hardware structures (2L-nHS), such as WinNT, Linux and Unix.

2L-wHS-Based, Wp-OS, for 2-Link-Control Workgroup Control of Processing OS (3) The third OS category is workgroup-processing-based OSs (wp-OS) for 2-link-typed workgroup hardware structures (2L-wHS).

3L-wHS-Based, Wo-OS, for 3-Link-Typed Workgroup-Structure (4) The fourth OS category is workgroup-operation-based OSs (wo-OS) for 3-Link-typed workgroup hardware structures (3L-wHS).

Focus-3: Develop 3-Level Workgroup OSs (waOS, wtOS, wcOS)

The third focus is on how to develop 3-level workgroup OSs based on the existing processing-based as well as the new operation-based architectural methodologies.

Base-Attribute-Level: waOS (FIG. 25a):

The first development of base-attribute-level 2-link-typed workgroup-processing OS (BaL wp-OS, or workgroup-attribute OS (waOS) in short) for TaPs, defined as CM=61-direction and CM=63 bi-directional that are illustrated in FIG. 12a and FIG. 12b, should be centered on how to utilize Process-OS manager to control WL2.5 and WL2.6 two(2) workgroup-processing types. The waOS has the same capability as the network-processing-OS (np-OS) equipped with the Process-OS-manager. Therefore, the current 2L-nHS-based nOSs, such as object-oriented OS and Linux, can be modified to become 2L-wHS-based waOS for TaPs by treating workgroup-processes the same as network-processes without requiring any new architectural method. FIG. 25a illustrates the modified waOS components from the basic network-processing OSs by replacing network-linked devices with workgroup-linked devices.

Mid-Traffic-Level: wtOS (FIG. 25a):

The second development of mid-traffic-level 2-link-typed workgroup-processing OS (MtL wp-OS, or workgroup-traffic OS (wtOS) in short) for TmPs, defined as CM=71-bulletin-board-type, CM=77-mail-box type and CM=85-mailbox with bonding that are illustrated in multiple FIG. 13s, should be centered on how to utilize the Process OS-manager to control WL2.3, WL2.4, WL2.7 and WL2.8 four(4) workgroup-processing types. The wtOS has the same capability as network-processing OS equipped with the Process-OS-manager. Therefore, the current 2L-nHS-based nOSs, such as object-oriented OSs and Linux, can be modified to become 2L-wHS-based wtOS for TmPs by treating workgroup-processes the same as network-processes without requiring any new architectural method. FIG. 25a illustrates the modified wtOS components from the basic network-processing OSs by replacing network-linked devices with workgroup-linked devices.

Top-Control-Level: wcOS

The third development of top-control-level 3-link-typed workgroup-operation-OS (TcL wo-OS, or workgroup-control OS (wcOS) in short) for TcPs, defined as CM=91 and CM=93 that are illustrated in FIGS. 14a and 14b, should be centered on the must-have workgroup operation OS-managers to feedback check&control WL2.1, WL2.2, WL2.9 and WL2.10 four(4) workgroup processing types.

The 3-link-typed workgroup-control Operating-System (wcOS) for TcPs must have the following three(3) additional feedback check&control workgroup operation managers in addition to the existing 2-link-typed network-processing OS (np-OS), such as Windows, Linux and Unix, so that the external fine-grained PS-operations can then be realized to support the 3-level conveyer-integrated top-level controllers to carry out their must-have feedback check&control RR/PP (workgroup)-operation skill-capabilities, as stated in the 7-step conveyer-integrated workgroup procedures.

1) Main-Sentential Operation Manager:

(1) The first additional workgroup operation manager is the "Main-Sentential Operation Manager," which controls semantic-sentential-statement-based (i.e., purchase-order statements that top-level controllers have to handle for external stakeholders) workgroup operations that handle vertical WL2.1 workgroup-processes and WL2.10 workgroup-processes together with horizontal-memory-buffered workgroup-processes, so that feedback check&control main-sentential workgroup operations can be established.

2) Meso-Term Operation Manager:

(2) The second additional workgroup operation manager is the "Meso-Term Operation Manager," which controls semantic term-script-based (i.e., solution-menu scripts that top-level controller have to handle for base-level attribute-processors) workgroup operations that handle WL2.2 workgroup processes and horizontal in-memory-buffered workgroup processes to interface with WL2.9 workgroup processes, so that feedback check&control meso-term workgroup operations can be established.

3) Meta-Macro Operation Manager:

(3) The third additional workgroup operation manager is the "Meta-Macro Operation Manager," which controls a semantic macro-form-based (i.e., processing-manual-forms that top-level controllers have to handle received from base-level attribute-processors) workgroup operations that handles bottom-up WL2.9 workgroup-processes and horizontal in-memory-buffered workgroup processes to interface with WL2.2 workgroup-processes, so that feedback check&control meta-macro workgroup operations can be established.

However, the wcOS with must-have three (3) operation-OS-managers in handling feedback-control workgroup operations is in a totally new Software Operating-System Category that needs to be developed with new innovative operating-system-based architectural methodologies.

Focus-4: New and Better Top-Control Level wcOS (FIG. 25b)

The fourth focus is on innovating new and better top-control-level Software-OS architecture Methodology (SOM) in creating workgroup-control OS for TcPs, which can be dubbed as the first software architecture methodology for establishing the Software Architecture Theorem (SAT-m1).

According to the aforementioned rationale in developing top-control-level OS, each TcP equipped with a "3-link-typed workgroup-operation hardware structure (3L-wHS)" (i.e., wHCS), must have three (3) "workgroup-control Operation-OS-managers in addition to the standard network-processing OSs for the 2-link-typed network hardware structures (i.e., np-OSs for 2L-nHSs)."

(1) 3-link-typed workgroup-link-(WL1, WL2, WL3)-based #1-"Main-Sentential operation OS-manager" or in short "Main operation-manager";

(2) 3-link-typed workgroup-link-(WL1, WL2, WL3)-based #2-"Meso-Term operation OS-manager," or in short "Meso operation-manager"; and (3) 3-link-typed workgroup-link-(WL1, WL2, WL3)-based #3-"Meta-Macro operation OS-manager," or in short "Meta operation-manager."

(wcOSstructure-FIG. 25b)

These three(3) workgroup-link-based Operation OS-managers, together with all the standard (internal-link-based and network link-based)OS-managers (i.e., #4-"Process manager," #5-"File manager," #6-"Network manager," #7-"External-, Workgroup- and Internal-Device manager," #8-"Memory manager," #9-"Hardware Device Control/Interrupt dispatch" and #0-"System Call Interface"), constitute the "basic processing-based OS-structure" of a typical np-OS for a 2L-nHS. Therefore, the hierarchical structure of a wcOS (workgroup-control Operating System) for a TcP, comprising all 10 OS-software components with operation-OS-managers on top to control process-OS manager, is architected as shown in FIG. 25b.

(2-Workgroup-Process-Based Feedback-Control Workgroup Operation Under wcOS)

As illustrated in the drawing, the #1-"Main-Sentential-program OS manager" must control two (2) workgroup-process-typed WL2.1 and WL2.10 and combine them with horizontal common-buffer memory-processes, enabling the sentential-confirming dialog-based RR/PP feedback check&control workgroup operation that executes the translation of request message and immediate composition of reply statements, so that the external stakeholder can check the intentional requirements that can be fulfilled by the upcoming fine-grained PS-operation.

(4-Workgroup-Process-Based Feedback-Control Workgroup Operation Under wcOS)

In addition, the #2-"Meso-Term operation OS-manager" must control/encapsulate the vertical workgroup-process-typed WL2.2 and the #3-"Meta operation OS-manager" must control the vertical workgroup-process-typed WL2.9. Then combine them with the horizontal common-memory buffer(s)-processes, enabling semantic data-confirming dialog-based RR/PP feedback check&control operation of four (4) workgroup-process-types from WL2.1, WL2.2, WL2.9 to WL2.10, which executes the translation of request messages and meso-compile and immediate meta-compile and composition of reply statements, so that the external stakeholder can double-check the potential results that can be fulfilled by the upcoming fine-grained PS-operation.

(10 Workgroup-Process-Based Feedback-Control Workgroup Operation Based on 3-Level wcOS, wtOS and waOS)

Furthermore, each mid-traffic level TmP equipped with a 2-link-typed workgroup-processing hardware structure (2L-wHS), must have the process OS-manager to control 4 workgroup-process-typed WL2.3, WL2.4, WL2.7 and WL2.8. And each base-attribute-level TaP equipped with a 2-link-typed workgroup processing structure (2L-wHS), must have the process OS-manager to control 2 workgroup-process typed WL2.5 and WL2.6. Then the designated top-level TcP, mid-level TmP(s) and base-level TaPs linked via WL2 will enable 3-level RR/PP feedback check&control workgroup operation of 10 vertical workgroup process-typed from WL2.1 to WL2.10 with horizontal workgroup-buffer-processes, thereby executing all the 3-level 10 workgroup-process-typed workflows to establish the overall external closed-loop fine-grained PS-operation for real-time solving the problems for external stakeholders. And the overall 3-level fine-grained PS-operation can be accomplished accordingly based on the 3-link-typed wcOS of a TcP, which can real-time create/spawn a closed-loop fine-grained PS-operation "event control-template" that handles external requirements based on 10 workgroup-processes-typed workflows and condition-data/operation-data for each involved workgroup-process type. A typical preferred scenario of a real-time dynamic 10 workgroup-process-workflow-based overall closed-loop fine-grained PS operation event creation with forming requirements can be described as follows.

As illustrated in FIG. 25b, these three (3) additional workgroup-link-based workgroup operation OS-managers can enable top-level workgroup-feedback-control (RR/PP)-operation inside a TcP via workgroup-linkages, WL1, WL2 and WL3.

Every WL2 (w2-directional/w3-bidirectional) hardware USB(SCSI)-link from external-in with Natural-Language (NL)-based Task Request-sentential-messages will be processed via #9-"Hardware Device Control/Interrupt dispatch" to #7-"USB-device manager" and store the Task Request-sentential-message block-file onto the port-buffer cache that can be further processed by #5-"File manager" to decipher the block-file with the right file-system structure and pass the control to #1-"Main operation-manager, WL2.1" via #0-"System Calls," so that "Main operation-manager" can spawn a PS-operation event control template with allocated main memory via #8-"Memory manager" that can move the NL-request-messages block file into the allocated memory and further load the translation-processing program/routines into the allocated memory and translate the Task NL-request-messages into "Task semantic-term-based service-description program" and pass the control to #2-"Meso operation-manager=WL2.2" for meso-compiling Task semantic-term-based service-description programs into Task semantic-manual macro-form-based service-execution programs all on the allocated main-memory.

Then the #2-"Meso operation-manager" will pass the control to #4-"Process manager" and #8-"Memory manager," so that the Task manual-form-based service-execution program-content can be moved to the control-template and send it to the buffer on the WL2-USB device via #7-"Device manager" that can further send the control-template to the shared USB-disk(TeamServer) with mid-level TmP, which can allow the first base-level TaP to access the shared USB-disk(TeamServer) for reading the Task-manual-form-based service-execution program content on the control template and storing in the WL2-USB (TeamServer) device inside the first TaP for launching the first attribute-processing. Up to this point, the 10 workgroup-process-workflow-based fine-grained PS-operation has completed the first 4 workgroup-processes (WL2.1 to WL2.4).

Then the first-TaP will carry out its attribute-processes, pack its results with the partially completed Task manual-form-based service-execution program on the control-template and send it to the second TaP for the another attribute processing. The sequential-attribute processing among involved TaPs will continue until the last TaP has finished up its attribute processes, pack its results with the completed Task manual-form-based (service-execution program) on the PS-event control template and send it back to the top-level original TcP's WL2-USB-(TeamServer)-(workgroup)-devices via TmP using the shared USB-disk (TeamServer disk). Up to this point, the 10 workgroup-process-workflow-based fine-grained PS-operation has completed the first 8 steps.

Then the WL2-USB-hardware device of the original TcP will be processed via #9-"Hardware Device Control/Interrupt" to #7-"USB-device manager" and store the Task manual-form-based service-execution program of the control-template-based block-file onto the port-Buffer cache that can be further processed by #5-"File manager" to decipher the block-files with the right file-system structure and store it onto the previous allocated main-memory by calling #4-"Process manager" and #8-"Memory manager" via #0-"System Calls." Then, the #4-"Process manager" will pass the control to #3-"Meta operation-manager" via system calls so that "Meta operation-manager" can further bottom-up meta-compile the completed Task manual-form-based service-execution program into Task menu-term-based service-description program and pass the control to #1-"Main Sentential-program operation manager" that can further compose Task solution term-based service-description programs into Task domain-sentence-based Natural-Language Reply messages on the previously allocated main-memory.

Then the "Main-Sentential Operation Manager" will pass the control to the "Process manager" and the "Memory manager," so that the Task-sentence-based NL-Reply messages on the allocated main-memory can be moved to the buffer on the WL2-USB device via "Device manager," which can further send the NL-Reply messages via WL2 (or an External network link) to the production-service requestor's TeamProcessor-node. In so doing, the standard 3-level 10-step RR/PP-workgroup operation via a top-level TcP is completed, based on its workgroup-control OS (wcOS) that has three (3) must-have additional operation OS-managers (i.e., #1-"Main operation-manager" for spawning/loading sentential operation programs, #2-"Meso operation-manager" for spawning/loading semantic-term operation programs and #3-"Meta-operation-manager" for spawning/loading semantic-data-form operation programs).

Therefore, a 3-level workgroup OSs installed on wEPU of wHCS, can accommodate 3-level conveyer-integrated workgroups as one Task crew Entity for real-time generating the overall closed-loop Task fine-grained PS-operation event with "control-routed template that involves the handling of requirements from a particular stakeholder and the delivery of results back to the same particular stakeholder."

Focus-5: The Importance of New and Better wcOS

The fifth focus is on emphasizing the important rationale of the top-level real-time feedback-control (internal)-workgroup-operation of TcPs, because without it, the external stakeholder's fine-grained PS-operation cannot be real-time dynamically established and formed with the stakeholder's real-time operation requirements.

Therefore, the new top-control level wcOS of a TcP based on 3-linked structure, should control all its internal linked-device-based internal IO-processes by hooking up all the inputs to the outputs to the inputs and outputs of workgroup-processes on workgroup-linked devices (WL1-TeamSwitch, WL2-TeamServer, WL3-TeamPanels and WL4-TeamRoute), so that the internal cascaded-IO workgroup-processing mechanism can separate the internal and external processes for better security protection. Then these internal cascaded workgroup-processes are integrated with in-memory-buffer-coupled workgroup-processes, establishing feedback-control workgroup operation, so that the current outputs of workgroup-processes can be real-time checked and compared with the previous inputs of workgroup-processes, ensuring that the external fine-grained PS-operation results catered to the same stakeholder can be fulfilled. In other words, the external fine-grained P/S-operation comprises internal workgroup operations that control internal workgroup processes that control all the internal processes. Moreover, by extending internal four (4) workgroup-processes of a TcP over to four (4) mid-level workgroup-processes of a TmP and two (2) base-level workgroup processes of TaPs, the TcP's workgroup operation can control all these 3-level ten (10) workgroup-processes that control all the 3-level internal processes, enabling external stakeholder's fine-grained PS-operations.

In conclusion, a 3-level workgroup EPU(XP) of wHCS with 3-level workgroup OSs for supporting a 3-level conveyer-integrated Task crew entity as a whole, thereby fulfilling the real-time concurrent stakeholders-(human)-centered PS thinking with fine-grained and security advantages, is more powerful and sophisticated than a plurality of cascaded node-structures with network-OSs for establishing as many different production attribute-servers supported by separated machine-processing production workgroups, only abiding to the time-sharing machine-centered PS thinking with golden-hammer/nails paradox that is laden with coarse-grained limitations and unresolvable security dilemmas.

Focus-6: Define wG1 3-level Software OS Methodology (SOM) (wcOS+wtOS+waOS)

The sixth focus is on defining the first Software OS (architecture)-Methodology of Task Operation SAT (Software Architecture theorem) (i.e., wG1.stage(n) SAT-methodology-1 (SAT-m1)) in creating wG1.stage(n) 3-level Task workgroup operation/process OSs.

In carrying out the fourth evolutionary architecture mandate of wG1, the current-stage wG1.stage(n) Task wHCSs can be software-integrated into "Task wEntity" by equipping top-control-level TcPs with workgroup-control OSs (wcOS), mid-traffic-level TmPs with workgroup-processing-OSs (wtOS) and base-attribute-level TaPs with workgroup-processing OSs (BaL-wpOS, waOS in short). This 3-level Task wEntity is established by using the above-mentioned workgroup-OSs, which can be defined as the first Software Operating-system (architecture) Methodology (SOM) of SAT, or SAT-m1 in short. Based on SOM, the wG1.stage (n=1 to 8) Task wEPU(XP) of each 8-staged wHCS can be upgraded into a wG1.stage(n) Task wEntity with core-domain capabilities, for enabling real-time fine-grained PS-operation-event creation with forming requirements.

Sub-ii. Developing 3-Level Task Workgroup OS-Based Workgroup Programs

The second subtopic is how to develop 3-level Task workgroup-OS-based workgroup programs. In order to achieve that goal, there are six (6) focuses that need to be dwelled upon.

Focus-1: On computerizing the real-world 3-level conveyer-integrated production operation facilities and enhancing Task crew's real-time dynamic fine-grained PS-operation "event-execution" capabilities based on 3-level workgroup-OS-based workgroup programs.

Focus-2: On comparing workgroup-OS-based workgroup programs with the current node-programs and classifying them into different categories based on architecture-methodologies.

Focus-3: On developing 3-level workgroup EPU-structure-based Task workgroup programs based on the existing processing-based and the new and better operation-based program architectural methodologies.

Focus-4: On innovating top-level Task workgroup-control RR/PP-feedback Operation Program (wcOP) architecture methodology, illustrated by FIG. 25b.

Focus-5: On emphasizing the important rationale of top-level real-time dynamic workgroup-control operation-programming (wcOP) capability of TcP, because without it, the external Task stakeholder's fine-grained (closed-loop) PS-operation cannot be real-time dynamically performed with real-time results for external Task stakeholders.

Focus-6: on defining the second Software Program Methodology (SPM) of Task Operation SAT (i.e., wG1.stage(n) SAT-methodology-2 (SAT-m2)) in creating all the wG1.stage(n) 3-level Task workgroup operation/processing programs.

After these 6 focus disclosure, it can be concluded that the Task workgroup-OS-based workgroup-programs for installing in the 3-level TeamProcessors (i.e., TaPs, TmPs and TcPs), all of which can support the internal 3-level conveyer-integrated stakeholders (i.e., workstation-processors, conveyer-technicians and fine-grained-PS controllers), respectively with performing chore and duty fulfillments and most-importantly, enhance their capabilities of real-time dynamic performing "fine-grained-(closed-loop) PS-operation events" with results.

Focus-1: Must-have Workgroup Programs

The first focus is on how to computerize the real-world 3-level conveyer-integrated production operation facilities and enhance Task crew's real-time dynamic fine-grained PS-operation "event-execution" capabilities based on 3-level workgroup-OS-based workgroup programs.

3-Level Task Crew's PS-Operation Event Execution Capabilities

Based on the aforementioned analogical model of "an ideal 3-level conveyer-integrated fine-grained-PS production-operation facility," members in the 3-level workgroups must have the skill and capabilities to carry out their chores and duties, as follows:

(1) The top-level controllers must have the feedback check&control Receive-Return (RR)/Pull-Push (PP) workgroup-operation skills for enabling real-time dynamic fine-grained PS event execution with performing results;

(2) The mid-level technicians must have the traffic-processing skills for enabling traffic-processing event execution with performing results; and (3) The base-level workstation processors must have the attribute-processing skills for enabling attribute-production processing event execution with performing results.

Based on the aforementioned analogical model on "an ideal conveyer-integrated production facility with 7-step conveyer-integrated workgroup-procedure operations," the "top-level controller" must know the following three (3) languages in order to carry out the feedback check&control RR/PP-workgroup-operation that involves "Menu and manual processes."

They are:

(1) Natural-sentential Language-(NL)-based Request-statements and Reply statements to communicate with external requestors, including users, collaborators and upper-level controllers;

(2) Menu-term language to know all the internal attribute-production capabilities; and (3) Manual-form language to communicate with the internal base-level processors.

As discussed earlier, the external Request-procedure and Reply procedure should be combined together, so that fine-grained 7-step PS-operations can then be established. Without combination, the controller will have no idea which requestor to reply. In order to combine these two processes together, it is ideal to implement "common trays/buffers" to transfer and share documents of the same requestor and to use a "momentum-token" to guide the flow from the incoming Request-process to the outgoing reply process, so that the fine-grained PS-operation can be achieved by the top-level controller.

Computerized 3-Level Task Crew's PS-Operation Event-Execution Capabilities

In order to computerize the 3-level Task crew performing activities, each TeamProcessor in each 3-level workgroup has to carry out what top-level controllers, mid-level technicians and base-level workstation processors have to perform, as stated above. Therefore, (1) Each TcP must be equipped with the "workgroup-control operation programs" for carrying out external fine-grained PS-operations with performing results;

(2) Each TmP must be equipped with the "workgroup-traffic processing programs" for carrying out workgroup-traffic processing-event with performing results; and (3) Each TaP must be equipped with the "workgroup-attribute processing programs" for carrying out workgroup-attribute processing-event with performing results.

Focus-2: Categorize Workgroup Programs Based on Event-Context Rankings

The second focus is on comparing workgroup-OS-based workgroup programs with the current node-programs and classifying them into "taxonomic categories" based on processing as well as operation event-contexts rankings (i.e., "why," "what," "when," "where," "which," "who" and "how" 6W1H 7-contexts, as in human-spoken natural languages). The more contexts-based operation event programs will encapsulate less contexts-based processing event programs, due to the fact that more-contexts-based operation event programs can only be established based on the integration of multiple less-contexts-based processing event programs. That is to say, multiple vertical-processing programs for generating current new-results and horizontal processing-programs for accessing existing old-results are integrated into real-time feedback new and old-results check&control operation programs and multiple feedback check&control operation programs acting as vertical processing programs together with horizontal processing-programs can be again integrated into higher-level feedback check&control operation programs, enabling complex workgroup-operations of less-complex workgroup-operations iterations (e.g., Fractal operation programs of multi 3D operation programs of multiple 2D operation programs of multiple 1D operation programs of multiple internal processing programs).

In order to develop PS-activity-event program software under the four (4) OS categories on four hardware structure HS-categories, it is imperative that all the PS-activity-performing programs be classified into the following four (4) PS-Activity-performing-Software Program (SP) categories.

1. (iPP) 1-Link-Typed-OS-Based Internal Processing Programs in 4W1I1-Context Language The first Software-Program (SP) category is about the 1-link-typed hardware structure internal-process OS (1L-HS/ip-OS)-based internal-Processing Programs (iPP), such as DOS-based IO-processing programs. Due to the ip-OS, the internal process event can be established based on processing statement that is involved with processing-codes in "How" context and processing arguments in "What" context, under processing conditions in "When" and "Where" contexts, for achieving processing results in "Why" context. Therefore, the machine-centered processing-program comprises programming statements that carry out processing event and generate performing results in 4W1H context.

2. (nPP) 2-Link-Typed-OS-Based Network Processing Programs in 4W1H-Context Language The second Software-Program (SP) category is about the 2-link-typed network hardware structured network-process OS (2L-nHS/np-OS)-based network Processing Programs (nPP), such as Windows-based network IO-processing programs. Due to the np-OS, the network process event can be established based on processing statements that are involved with network processing-codes in "How" context and processing arguments in "What" context, under situational conditions in "When" and "Where" contexts, for captive clients in "whom treated as object-what" context to achieve processing results in "Why" context. Therefore, the machine-PS-centered network processing-program comprises programming statements that carry out network processing-event and generate performing results in syntax 4W1H context.

3. (wPP) 2-Link-Typed OS-Based Workgroup-Process Programs in 5W1H-Context Language The third Software-Program (SP) category is about the 2-link-typed workgroup hardware structured workgroup-process OS (2L-wHS/wp-OS)-based workgroup Processing Programs (wPP). Due to the wp-OS, the workgroup process event can be established based on processing statements that are involved with workgroup processing-codes in "How" context and processing arguments in "What" context, under processing conditions in "When" and "Where" contexts, via different processing machines in "Which" context to achieve processing results in "Why" context. Therefore, the human-PS-centered workgroup processing-program comprises programming statements that carry out workgroup processing-event and generate performing results in semantic 5W1H context, which can be understood by the human processors, such as the mid-level conveyer traffic-processors and the base-level workstation attribute-processors.

4. (wOP) 3-Link-Typed OS-Based Workgroup Operation Programs in 6W1H-Context Languages The fourth Software-Program (SP) category is about the 3-link-typed workgroup hardware structured (3L-wHS/wo-OS)-based workgroup Operation Programs (wOP).

Due to the wo-OS, the feedback check&control workgroup operation event can be established based on operation statements that are involved with workgroup operation codes in "How" context and operation arguments in "What" context, under operational conditions in "when" and "where" contexts, via operational machines in "Which" context for internal and external stakeholders in "Who" context to achieve operational results in "Why" context. Therefore, the human-PS-centered feedback workgroup operation program comprises programming statements that carry out workgroup operation event and generate performing results in semantic 6W1H context, as in the natural languages, which can be understood by the feedback-control operators, such as the top-level controllers.

Focus-3: Develop 3-Level Workgroup Programs (waPP(2), wtPP(1-4), wcOP(3))

The third focus is on how to develop 3-level workgroup EPU-structure-based Task workgroup programs based on the existing processing-program-based as well as the new and better operation-program-based architectural methodologies.

1. (waOS-waPP(2)): FIG. 25c

The first type is the base-attribute-level workgroup processing programs (BaL-wPP, or waPP in short), which have the workgroup processing capabilities that can control the inputs and outputs of all the cascading internal processing programs in 4W1H contexts, based on 2-link-typed workgroup hardware structures (2L-wHS).

There are two kinds of waPP, the first waPP (waPP1), installed in a TaP under waOS is a bottom-up WL2.6-workflow based waPP, which can load-in a bottom-up macro-compile processing routine to control a number of cascaded syntax micro-instruction-(codes/data)-based attribute-processing programs with an end-resulted-data-set in 4W1H contexts and compile them into a semantic macro-keywords (multi-cascaded programs-route keyword, conditions-keywords, results-keyword and id-keyword of TaP) tablet-based workgroup attribute-descriptive program in 5W1H contexts, so that any 5W1H-context language-based workgroup attribute-descriptive program comprising the same semantic macro-keyword tablet can trigger the same results generated by the multi-cascaded micro-instruction-based attribute-processing programs that comprise routines of subroutines of methods and functions. This type of 5W1H-context-language based macro-keywords workgroup-attribute descriptive programs is generated based on a plurality of cascaded 4W1H-context-language based internal attribute-processing programs via WL2.6-based waPP1.

Therefore, a whole host of conditionally cascaded 4W1H-language-based micro-instruction-based attribute-processing programs that generate the desired end-results can be bottom-up macro-compiled into a number of semantic conditions/resulted keywords that are sequentially aggregated in a macro-keyword-tablet-based workgroup Attribute Descriptive Program (macro-keyword-tablet ADP) in 5W1H contexts via a WL2.6-workflow-based workgroup attribute-processing program, dubbed macro-waPP1.

The second waPP (waPP2), installed in a TaP under waOS is a top-down WL2.5-workflow-based waPP, which can load-in a top-down micro-compile routine to control the pulled-in macro-ADP from the shared TeamServer and compile it into a set of workflow-cascaded micro-instruction-based attribute-processing programs with a suggested end-resulted data set, so that all the cascaded internal-processing programs can be carried out to generate the desired resulted-data set. Therefore, multiple macro-keyword-tablet ADPs can be real-time micro-compiled into multiple sets of micro-instruction internal-processing programs via a WL2.5-workflow-based workgroup attribute processing program, dubbed micro-waPP2.

Once all the compiled multiple sets of micro-instruction internal programs in a TaP are carried out and the desired end-resulted data set is achieved, the WL2.6-workflow-based waPP1 can then again start its workgroup attribute-processes and bottom-up macro-compile all the cascaded micro-instruction attribute-processing programs with desired resulted-data set, either into an existing macro-keyword-tablet-based attribute-descriptive program (ADP) or into a new and modified macro-keyword-tablet based ADP, if the suggested end-results and the desired end-results are different. Moreover, WL2.6-workflow-based waPP1 in a TaP can always guarantee that a plurality of 4W1H-context language-based attribute-processing programs with resulted data-set solutions in physical existence, can all be called out to duplicate the same results by using a WL2.5-waPP2 to top-down micro-compile a 5W1H macro-keyword-tablet ADP.

The structure of a waPP-(1&2) in a TaP comprises 3 sections: (1) Input-handling section, (2) processes-handling section and (3) output-handling section, and they can workflow-control the inputs and outputs of all the internal attribute-processing programs, as illustrated in FIG. 25c.

2. (wtOS-wtPP(4)): FIG. 25d

The second type is the mid-traffic-level workgroup processing programs (MtL-wPP, or wtPP in short), which have the workgroup traffic-processing capabilities that can control all the TeamServers-based digital-conveyer assembled-packages of macro-keyword-tablet-based attribute-descriptive programs in 5W1H contexts, among 3-level TaPs, TmP and TcPs.

There are four kinds of wtPP, the first wtPP (wtPP1), installed in a TmP under wtOS is a bottom-up WL2.7-workflow based wtPP, which can load-in a bottom-up workgroup traffic-processing routine to handle WL2.7 workgroup-traffic-processes via connected WL2-based TeamServers and pull-in macro-keyword-tablet-based ADP-packages associated with the designated id-keyword addresses from all the base-level WL2.6-waPP1-equipped TaPs.

The second wtPP (wtPP2), installed in a TmP under wtOS is a WL2.8-workflow based wtPP, which can load-in a bottom-up workgroup traffic-processing routine to handle WL2.8 workgroup-workflow processes, reassemble the macro-keyword-tablet-based ADP packages pulled-in from WL2.7-wtPP1 with same-address alignment and push the readdressed packages out to the designed TcPs via connected WL2-based TeamServers.

The third wtPP (wtPP3), installed in a TmP under wtOS is a top-down WL2.3-workflow based wtPP, which can load-in a top-down workgroup traffic-processing routine to handle WL2.3 workgroup-traffic-processes via connected WL2-based TeamServers and pull-in the macro-keyword-form-based ADP-packages with the designated id-keyword addresses from all the top-level TcPs.

The fourth wtPP (wtPP4), installed in a TmP under wtOS is a WL2.4-workflow based wtPP, which can load-in a top-down workgroup traffic-processing routine to handle WL2.4 workgroup-workflow processes, reassemble the macro-keyword-tablet-based ADP packages pulled-in from WL2.3-wtPP3 with same-address alignment and push the readdressed packages out to the designed TaPs via connected WL2-based TeamServers.

All these 4 wtPPs in a TmP have the workgroup-traffic processing routines to access and retrieve resulted macro-ADP-packages on a WL2-based TeamServer, which can serve for two different package-exchange purposes. (1) For uni-directional WL2-based TeamServers served as common-bulletin boards, this traffic-exchange processing routine is to control multi-side (top, down, left, right) relays, so that each side members can transfer macro-ADP-packages to the designated members based on a round-robin scheduling algorithm, as illustrated in FIG. 13a and 13c. (2) For bi-directional WL2-based TeamServers served as mail-boxes, this traffic-exchange processing routine is to control multi-side relays and read from each side member's mailbox and write to the same side member's mailbox with previously gathered address-specified packages in a round-robin scheduling algorithm. At the same time, the processing routine allows non-engaged other-side members to pull (read) and push(write) to its own mailbox. In so doing, the multi-side members can guarantee their ADP-packages to be exchanged with the designated members during each round-robin loop, as illustrated in FIG. 13b and from 13d to 13g.

The structure of a WtPP (1&2) comprises 3 sections: (1) Input-handling section, (2) processes-handling section and 3) output-handling section, but they can direct the workflow traffic over all base-level TaPs, as illustrated in FIG. 25d, either based on directional-bulletin board TeamServers as well as mail-box TeamServers, via top-down WL2.3/2.4 and bottom-up WL2.7/2.8 workgroup-traffic processes.

3. (wcOS-wcOP(3)): FIG. 25e

The third type is the top-control-level workgroup operation programs (TcL-wOP, or wcOP in short), which have the workgroup feedback-control operation capabilities that can encapsulate workgroup-workflow processing routines (i.e., WL2.1, WL2.2, WL2.9 and WL2.10), as illustrated in FIG. 25e.

According to the aforementioned scenario on "an ideal 3-level conveyer-integrated production facility," a top-level controller must be familiar with the following 3 types of Task descriptive languages.

They are:

(1) Natural-language-based Task Request statements and Task Reply statements to communicate with external stakeholders, such as users, collaborators and upper-level controllers;

(2) Task Menu-term language to know all the internal attribute-production capabilities;

(3) Task Manual-form language to communicate with the internal base-level processors.

Actually, there are 4 types of computerized Task semantic descriptive programs (SDP) generated in 4 types of Task-based computerized languages that a TcP should be able to process.

1) Menu-Term Semantic Descriptive Programs (SDP) in 6W1H-Context Language

The first type of Task sematic descriptive program (SDP) is menu-term-script-based SDPs, which are generated via TcP's WL2.9-workflow processes that can meta-compile a plurality of macro-keyword-tablet-based attribute-descriptive programs (ADP) into a menu-term-script-based semantic descriptive program (SDP) in 6W1H-context Task Menu-Terminology language. This Task semantic Menu Language can keep on growing along the time to contain descriptive terms, such as subjects, verbs, objects, adjectives and adverbs, to generate scripted scenes for enriching menu-like production capabilities.

2) Domain-Sentential SDP in 6W1H-Context Language

The second type of sematic descriptive program (SDP) is domain-sentential-statement-based SDPs, which are generated via TcP's WL2.10-workflow processes that can meta-compose a plurality of menu-term-script-based semantic descriptive programs (SDP) into a domain-sentential-statement-based SDP in 6W1H-context Task Domain-Sentential Language. This Task semantic Domain Language can keep on growing along the time to contain natural-language grammar-based sentential statements to generate paragraph, pages and chapters for enriching production-domain problem-solving (PS) capabilities, so that reply statement-based returned messages can be understood by the external stakeholders, who initiated the real-time fine-grained PS operations previously.

3) Natural-Sentential Grammar-Based Statements in 6W1H-Context Language

The third type of sematic descriptive program (SDP) is external stakeholders' intention sentential-statements in natural language, which are handled by TcP's WL2.1-workflow processes that can pre-check and correct intentional sentential statements based on natural-language grammar-based sentential formats and translate them into a well-formatted domain-sentential-statement-based semantic descriptive program (SDP), so that production domain PS-capabilities can be applied to the intentional sentential statements and generate desired PS-results. In addition, TcP's WL2.1 workflow processes can further top-down meso-compile the well-formatted domain-sentential-statement-based semantic descriptive program (SDP) into a defined group of menu-term-script/scene-based semantic descriptive programs (SDPs), based on the feedback control of checking and comparing WL2.10-workflow process already-generated domain-sentential-statement-based SDP from a defined group of menu-term-script/scene-based SDPs.

4) Manual-(Macro-Keyword)-Form SDP in 5W1H-Context Language:

The fourth type of sematic descriptive program (SDP) is manual-macro-(keyword)-form-based SDPs, which are generated based on TcP's WL2.2-workflow processes that can top-down meso-compile menu-term-script-based semantic descriptive programs (SDP) into a defined group of manual-macro-form-based semantic descriptive programs (SDP) in 5W1H-context Task semantic Manual-Macro Language, based on the feedback control of checking and comparing WL2.9-workflow process already-generated menu-term-script-based semantic descriptive programs (SDP). This Task semantic Manual Language can keep on growing along the time to contain as many macro-keyword-forms that are composed of keyword-tablets, which are generated by WL2.6 and processed by WL2.9 to generate Task Menu Language.

Therefore, a TcP must be equipped with the following 3 feedback check&control operation programs to perform the top-level feedback check&control workgroup operations that encapsulate four (4) workgroup-workflow processes (i.e., WL2.1, WL2.2, WL2.9 and WL2.10) to handle these 4 types of semantic descriptive programs (SDP), so that external stakeholders' fine-grained PS-operations based on real-time Task1 R&R and Task2 Q&A in natural languages can be carried out to generate desired operation results, empowering natural language-based intentional sentential statements to real-time dynamically become a well-defined group of micro-instruction-based attribute-processing programs that can generate the real-time fine-grained PS results for external stakeholders.

However, these three (3) top-control level wcOPs handling these 4 types of Task semantic-descriptive programs in 4 types of Task Languages that include the natural languages are in a totally new Software Programming Category that needs to be developed with new innovative operation program-architecture methodologies.

Focus-4: New and Better Top-Control-Level wcOP(1-3) (FIG. 25e),

The fourth focus is on how to develop top-level RR/PP-feedback workgroup-control Operation Program (wcOP)-based Software Program architecture Methodology (SPM), (as illustrated by FIG. 25e.)

As shown in FIG. 25e, top-control-level wcOS-based "workgroup-feed-back control" operation structure, comprising 3 workgroup-control operation programs (wcOP) (i.e., (1) Main sentential operation-program-1, (2) Meso-Term operation program-2 and (3) Meta-Macro operation program-3).

The first workgroup-control operation program (wcOP1) is Main-sentential Operation program, which comprises two vertical workgroup-workflow process programs: 1) WL2.10: the bottom-up Reply sentential bottom-up processing program and 2) WL2.1 the top-down Request-sentential processing program.

The structure of a WL2.1-based Request-sentence IO-processing program is the same as any IO-process program's structure, which has 3 sections: (1) Input-handling section, (2) processes-handling section and (3) output-handling section, as illustrated in FIG. 25e.

The structure of a WL2.10-based Reply sentential IO-processing program is the same as any IO-process program's structure, which has 3 sections: (1) Input-handling section, (2) processes-handling section and (3) output-handling section, as illustrated in FIG. 25e.

1. Main-Operation wcOP1:

As discussed in the top-level OS for TcP, the creation of RR/PP feedback-control operation inside TcP can only be established by combining Receive-WL2.1 and Return-WL2.10 process programs together. As illustrated in FIG. 25e, the outside-in flow Receive-WL2.1 processing program with its standard 3-section program structure can share 3 sectional buffers with the inside-out Return-WL2.10 processing programs with its standard 3-section program structure.

The first input-handling section of Receive-WL2.1 routine will generate at least two sequential outputs, one is to flow into the second processes-handling section and the other is to flow into the "Buffer-1" with all the input data/information for the particular fine-grained requestor. Then the second processes-handling section will generate at least two sequential outputs, one is to flow into the third output-handling section and the other is to flow into the "Buffer-2" with all the related process-based data/information for that particular requestor. Then the third output handling section will generate at least two sequential outputs, one is to flow into the "Downward Buffer" for meso-WL2.2 program to process, the other is to flow into the "Buffer-3" with all the related output data/information for that particular requestor.

As illustrated in FIG. 25e, the bottom-up internal-out Return-WL2.10 program with its standard 3-section program structure can share 3-sectional buffers (i.e., Buffer-1, -2 and -3), generated by the Receive-WL2.1 program. The first input-handling section of Return-WL2.10 program will constantly read the data/information from Buffer-3 and Upward-Buffer that is generated by meta-WL2.9 program. Once the data from both inputs are for the same requestor, then the first input-handling section will process and generate outputs that flow into the second processes section of Return-WL2.10 program. The second processes section will constantly read from the Buffer-2, get the preserved subject-oriented data/information for that particular requestor and process terms-to-sentences procedures for generating Reply sentences output to flow into the third output-handling section. The third output-handling section will constantly read from the Buffer-1, get the preserved subject-oriented data/information for that particular requestor and handle the internal-out Reply sentential package, which will be sent to that particular requestor.

The hierarchical structure of a Main-Sentential operation program of WL2.1 and WL2.10 is totally a new "operation" program structure, which contains 6 sections with 3 horizontal common directional-flow Buffers in between, as shown in FIG. 25e.

As illustrated in the OS-drawing, the #1 main-sentential OS-manager must control two (2) workgroup-process-typed WL2.1 and WL2.10 and combine them with horizontal in-memory buffer-processes, enabling the sentential-confirming dialog-based RR/PP feedback check&control operation that executes the translation of request message and immediate composition of reply statements, so that the external stakeholder can check whether the intentional requirements can be fulfilled by the upcoming fine-grained PS-operation.

2. Meso-Operation wcOP2:

The second workgroup-control operation program (wcOP2-WL2.2) is basically a top-down meso-compiler-type program (Meso-wcOP2), which can be real-time spawned by the meso-operation OS-manager.

The 2-tier-top-down hierarchical structure of a Meso-compile Operation Program (ML2.2) has 3 sections: (1) input-handling section, (2) encapsulated WL2.2 workgroup-processes-handling section and (3) output-handling section. In addition, it has the horizontal in-memory-Buffers (Buffer-4, Buffer-5 and Buffer-6) and workgroup library to share with Meta operation program, forming the top-down feedback-control RR/PP operations over 4 WL2-processes (i.e., WL2.2, WL2.9, WL2.10 and WL2.1), as illustrated in FIG. 25e.

3. Meta-Operation Program: wcOP3

The third workgroup-control operation program (wcOP3) is a bottom-up meta-compiler-type program (Meta-wcOP3), which can be real-time spawned by the Meta operation OS-manager.

The structure of a Meta-compile Operation-Program has 3 sections: (1) input-handling section, (2) encapsulated WL2.9 workgroup-process-handling section and (3) output-handling section. In addition, it has the horizontal in-memory-Buffers (Buffer-4, Buffer-5 and Buffer-6) and workgroup library to share with Meso operation program, forming the bottom-up feedback-control RR/PP operations over 4 WL2-processes (i.e., WL2.9, WL2.10, WL2.1 and WL2.2), as illustrated in FIG. 25e.

Moreover, each mid-traffic level TmP equipped with a 2-link-typed workgroup-processing hardware structure (2L-wHS), must have the process OS-manager to control 4 workgroup-process-typed WL2.3, WL2.4, WL2.7 and WL2.8. And each base-attribute-level TaP equipped with a 2-link-typed workgroup processing structure (2L-wHS), must have the process OS-manager to control 2 workgroup-process typed WL2.5 and WL2.6. Then the designated top-level TcP, mid-level TmP(s) and base-level TaPs linked via WL2 will enable 3-level RR/PP feedback check&control workgroup operation of 10 vertical workgroup process-typed from WL2.1 to WL2.10 with horizontal workgroup-buffer-processes, thereby executing all the 3-level 10 workgroup-process-typed workflows to establish the overall closed-loop fine-grained PS-operation for real-time solving of the problems for the external stakeholder. And the overall 3-level fine-grained PS-operation can be accomplished accordingly based on the 3-link-typed wcOS of a TcP, which can real-time create/spawn a closed-loop fine-grained PS-operation "event control-template" that handles external requirements based on 10 workgroup-processes-typed workflows and condition-data/operation-data for each involved workgroup-process type. A typical preferred scenario of a real-time dynamic 10 workgroup-workflow process-based overall closed-loop fine-grained PS operation event creation with forming requirements can be described as follows.

Due to 3-level hierarchy, the top-control-level operation programs (wcOP) can control over mid-level workgroup-traffic-processing programs (wtPP) and base-level workgroup-attribute process programs (waPP), thereby enabling from WL2.1 to WL2.10 ten(IO) workgroup-process-based feedback-control RR/PP-operation and completing external fine-grained PS-operation event with performing results.

Most importantly, the requestor's Request-intentions in natural language, treated as a production problem, can be real-time dynamically solved by the Reply solutions generated via completing this overall closed-loop Task fine-grained PS-production operation, thereby making real-time dynamic problem solving via natural languages become possible. It is because that Natural language-based intentional requirements from external stakeholders, can be translate/meso-compile into micro-instruction processing programs to generate the desired results that can be meta-compile into natural language-based reply statements to the external stakeholders.

These three (3) new typed workgroup-link-based control-operation programs (wcOP1-3) for TcPs can be dubbed as "subject-oriented" workgroup-control operation programs (wcOPs) as opposed to the current open-end coarse-grained IO-process "object-oriented network-applications" for node-computers.

Therefore, the 3-level workgroup programs installed on wEPU(XP) of wHCS, will enable the 3-level conveyer-integrated workgroups as one Task crew Entity for real-time performing the external closed-loop "Task fine-grained PS-operation event" control template with results that can be delivered back to the same particular stakeholder.

Focus-5: The Importance of New and Better wcOPs:

The fifth focus is on emphasizing the importance of top-level workgroup-control operation-programming (wcOP) capability of TcP, because without it, the external Task stakeholder's fine-grained (closed-loop) PS-operation cannot be real-time dynamically performed with real-time results for external Task stakeholders in natural languages.

According to the hierarchical workgroup OSs, top-level workgroup-control OSs (wcOS) control internal workgroup operations that control internal workgroup processes and mid-level workgroup-processes by wtOS and base-level workgroup-processes by waOSs, all of which control 3-level internal processes. Therefore, the wcOPs control wcPPs, wtPPs, waPPs and 3-level internal processing programs (iPPs). Most-importantly, external PS-operation is established based on the top-level workgroup operation, 3-level workgroup-processes and internal processes. In other words, real-time dynamic fine-grained PS-operation programs in 6W1H-context-based natural language can be established based on the encapsulation of 6W1H-context-based wcOPs that can real-time control 3-level 5W1H-context-based workgroup processing programs and 4W1H-context-based internal processing programs by real-time feeding in the values of keyword conditions in different contexts to each workgroup-processing program that also subsequently feed in the value of keyword conditions to internal processing programs.

Therefore, concurrent external fine-grained PS-operation programs can be real-time dynamically generated based on a 3-level EPU(XP), providing real-time dynamic concurrent fine-grained problem solving for external stakeholders using natural languages, because they are not pre-conditioned programs.

Focus-6: Define wG1 3-Level Software Program Methodology (SPM) (wcOP+wtPP+waPP)

The sixth focus is on defining the second Software Program (architecture) Methodology (SPM) of Task Operation Software Architecture Theorem (SAT) (i.e., wG1.stage (n) SAT-methodology-2 (SAT-m2)) in creating all the wG1.stage(n) 3-level Task workgroup operation/processing programs.

By carrying out the fifth evolutionary architecture mandate of wG1, new and better feedback RR/PP workgroup-operation programs for top-level TcPs can be established. And most importantly, the "one" overall fine-grained-closed-loop PS-operation program for the entire Task-crew entity can be dynamically established, encapsulating internal workgroup operation programs that control workgroup-process programs that control internal process programs, via the above software programming methodology (SPM) for equipping the Task wEPU(XP) of each 8-staged wHCS, which can be thereby defined as wG1 SPM of SAT of wTF3 of wECP.

Sub-iii. Developing 3-Level Task Workgroup Program-Based Workgroup Storages

The third subtopic is centered on how to develop 3-level Task workgroup-program-based workgroup storages on workgroup-linked devices, such as WL2-TeamServers and WL3-TeamPanels. In order to achieve that goal, there are six (6) focuses that need to be dwelled upon.

Focus-1: On computerizing the real-world 3-level conveyer-integrated production operation facilities and enhancing Task crew's real-time dynamic fine-grained PS-operation event management capabilities based on 3-level workgroup-program-based workgroup storages.

Focus-2: On comparing 3-level workgroup-program-based workgroup storages with node storages and classify them with taxonomic categories based on context-language data rankings.

Focus-3: On developing 3-level workgroup-program-based workgroup storages based on existing and the new and better storage architecture methodologies.

Focus-4: On Innovating the new and better top-level Task workgroup-control Library Storage (wcLS) (architecture) methodology, illustrated with FIG. 25$b$.

Focus-5: On emphasizing the important rationale of top-level real-time workgroup-control library-management capability of TcP, because without it, the external-stakeholder's fine-grained (closed-loop) PS-operation cannot be real-time dynamically managed with real-time up-to-the-current reports.

Focus-6: On defining the third Software Storage-(architecture) Methodology (SSM) of Task Operation Software Architecture Theorem (SAT) (i.e., wG1.stage(n) SAT-methodology-3 (SAT-m3)) in creating wG1.stage(n) 3-level Task workgroup operation/process-based storages.

After these 6 focus disclosure, it can be concluded that the Task workgroup-program-based workgroup storages for installing in the 3-level TeamProcessors (i.e., TaPs, TmPs and TcPs), all of which can support the internal 3-level conveyer-integrated stakeholders (i.e., workstation-processors, conveyer-technicians and fine-grained-PS controllers), respectively with real-time storage-based chore and duty fulfillments and most-importantly, enhance their capabilities of real-time dynamic managing "fine-grained-PS closed-loop operation events" with up-to-the-moment reports.

Focus-1: Must-have Workgroup-Storages

The first-focus is on how to computerize the real-world 3-level conveyer-integrated production operation facilities and enhance Task crew's real-time dynamic fine-grained PS-operation management capabilities based on 3-level workgroup-program-based workgroup storages.

3-Level Task Crew's PS-Operation Event Management Capability

According to the aforementioned scenario on "an ideal 3-level conveyer-integrated production facility," the "top-level controller" must have file-cabinets to handle 3 types of operation documents that are concerned with external Task fine-grained PS-operations. They are (1) The external stakeholders' purchase order requirements with delivery results documents, (2) order menu scripts and (3) order operation manual-forms. Each file cabinet should be installed as an information library, using only simple 6W1H-based directory indexes to store each typed documents for easy accessibility. Furthermore, each controller has to real-time manage these three (3) information-operation libraries so that the current on-going PS-operations can access the existing information, compare with the current information and update the current best-performance information with the most feasible one in each library, generating the best-feasible operation results for the external stakeholder in each PS-operation event. Moreover, one addition information-management library can be established, based on management aspect-oriented analytics concerning all the completed PS-Operation event-based stakeholders' requirement and result information that have been generated in the operation libraries. The management library will come up with the current best operation experiences in different aspects of concern, so that the next PS-operation with the same or similar aspect of concern can real-time dynamically be generated based on the current-best experience, which can somewhat guarantee the desirable results.

In summary, based on the aforementioned analogical model of "an ideal 3-level conveyer-integrated fine-grained-PS production-operation facility," members in the 3-level workgroups must have the skill and capabilities to carry out their chores and duties, as follows:

(1) Top-level feedback-operation controllers must have the storage capability for in-event-operation and post-event management (skill)-capabilities, enabling real-time dynamic external fine-grained PS-operation event with real-time information and up-to-the-current performance reports;

(2) Mid-level conveyer traffic-processors has the storage capability for logging (skill) capabilities of enabling workgroup-traffic processing-event with activity reports; and (3) Base-level workstation attribute-processors have the storage capability for logging (skill)-capability of enabling workgroup-attribute processing-event with activity reports.
Computerize 3-Level Task Crew's PS-Operation Event Management Capability Therefore, in order to computerize the 3-level Task crew storage capabilities, each TeamProcessor in each 3-level workgroup has to carry out what top-level controllers, mid-level traffic-processors and base-level attribute-processors storage capabilities, as stated above.

(1) The TcP must have the workgroup operation storage capability for enabling (a) three (3 operation libraries with real-time information and (b) one post-PS-operation event management library with real-time current-best experience reports;

(2) The TmP must have the workgroup-processing event storage capabilities of enabling workgroup-traffic processing data repositories with activity-logging reports; and (3) The TaP have the workgroup-processing event storage and logging capability for enabling workgroup-attribute processing-event data repositories with activity-logging reports.

Therefore, in order to support Task crew computerized 3-level log-activity and management activities, each top-level TcP has to carry out controllers' operation and management activities by installing workgroup-link-2 WL2-storage devices (i.e., TeamServer workgroup devices), mid-level TmP has to carry out conveyer technicians' logging activities by installing WL3-(USB)-TeamServer libraries shared with the TmPm pair and each base-level TaP has to carry out workstation operators' log-activities by installing WL3-(USB)-TeamServer libraries shared with the TaPm pair.

(1) Each TcP must be equipped with the workgroup-control operation programs for carrying out external fine-grained PS-operations with performing results;

(2) Each TmP must be equipped with the workgroup-traffic processing programs for carrying out workgroup-traffic processing-event with performing results; and (3) Each TaP must be equipped with the workgroup-attribute processing programs for carrying out workgroup-attribute processing-event with performing results.
Focus-2: Categorize Workgroup Storages Based on Context-Language Ranking The second focus is on comparing 3-level workgroup-program-based workgroup storages with node-program-based storages and classifying them with taxonomic categories based on hierarchical context-data rankings (i.e., 4W1H-context-based processing syntax database, 5W1H syntax network processing database, 5W1H-context-based semantic workgroup processing-database and 6W1H-context-based semantic workgroup operation and management libraries), where more-contexts-based data storages will encapsulate the less-contexts-based data-storages.

In order to develop performing-program results-based storage capability based on four(4) Activity Program categories under four(4)OS-categories on four hardware structure HS-categories, it is imperative that all the activity-performing program-results storages be classified into the following four (4) activity-program software storage (SS)-categories for performing events with results.

1. iPP-Based Data Storage: iPP-DS in 4W1H-Context Languages

The first Data Storage (DS) category is about the 1-link-typed hardware structure internal-process OS (1L-HS/ip-OS)-based internal-Processing Programs (iPP)-based 4W1H-context-based Data storage, such as DOS-program-based databases. Due to the iPP, the internal process event can be carried out with performing results in 4W1H contexts and the internal storage devices can store the post-event processing results, thereby forming 4W1H-context-based processing databases for post-event processing analytics as well as processing management reports.

2. nPP-Based Data Storage: nPP-DS in 4W1H-Context Languages

The second Data Storage (DS) category is about the 2-link-typed hardware structured network-process OS network Processing Programs (2L-nHS/np-OS/nPP) based syntax 5W1H-context-based Data storage, such as Linux-based databases. Due to the nPP, the network process event can be carried out with performing results in 5W1H contexts and the internal storage devices can store the post-event network processing results, thereby forming 5W1H-context-based syntax databases for post-event network processing analytics as well as network processing management reports.

3. wPP-Based Data Storage: wPP-DS in 4W1H and 5W1H Context Languages

The third Data Storage (DS) category is about the 2-link-typed hardware structure workgroup process OS workgroup Processing Programs (wPP)-(2L-wHS/wp-OS/wPP)-generated 4W1H-based program/result Storage and 5W1H-context-based semantic Descriptive Program-(package) storage. Due to the wPP, the workgroup process event can be carried out with performing results in semantic 5W1H contexts and the workgroup-linked as well, as internal-linked storage devices can store the post-event workgroup processing results, thereby forming semantic 5W1H-context-based databases for post-event workgroup processing analytics as well as workgroup processing management reports.

4. wOP-Based Data Storages: wOP-DS in 5W1H and 6W1H Context Languages

The fourth Data Storage (DS) category is about the 3-link-typed hardware structured workgroup operation OS workgroup Operation Programs (3L-wHS/wo-OS/wOP)-created semantic 5W1H-context ADP storage and semantic 6W1H-context ADP storage.

Due to the wOP, the workgroup operation event can be carried out with performing results in semantic 6W1H contexts and the workgroup-linked as well as internal-linked storage devices can store the in-event workgroup operation results, thereby forming semantic 6W1H-context-based real-time operation libraries for in-event workgroup operation real-time information support. In addition, the workgroup-linked TeamServer can store the post-event workgroup-operation results, thereby forming semantic 6W1H-context-based real-time management library for the current-best-experience-based management reports.

Focus-3: Develop 3-Level Workgroup Libraries: waPL(2), wtPL(4), wcOL(3) and wcML(1)

The third focus is on how to develop 3-level workgroup-program-based workgroup storages based on workgroup-linked TeamServer-based storage architecture methodologies.

1. waOS-waPP-waPL(2): FIG. 25c

The first type is the workgroup library storage resided on a WL2-TeamServer to store what base-attribute-level workgroup processing programs (waPP) generate after the processing event. There are two kinds of base-level workgroup-attribute Processing Libraries (waPL).

1) Macro-waPL1-WL2.6-waPP1: Workgroup-Attribute Processing Library-1

The first kind is a workgroup-attribute process library (waPL1) resided on a WL2-TeamServer to store macro-keyword-tablet-based semantic-descriptive programs in 5W1H-context semantic descriptive language generated by the base-attribute-level workgroup processing program (WL2.6-waPP1) based on already-installed internal micro-instruction-based attribute-processing programs in 4W1H-context syntax parsing-logic language.

There are two inter-related library-file structures in waPL1 (i.e., the back-end file-structure and the front-end file-structure). The back-end file-structure is based on a structured listing of post waPP1 event-experience-files, where each file contains 5W1H manual keyword/value-field tablets as internal records and is sequentially logged in a file folder under the event-timestamp directory. In addition, the waPP1 can generate the front-end file-structure, which is the result-based index-card directory file containing event-timestamp-based index cards with different aspect-oriented meta-data criteria to classify up-to-the-current resulted experiences in different aspects of concern for easy selection.

As illustrated in FIG. 25c, waPL1 is shared with WL2.5-waPP2, which can read and screen the index-card file, pull-in the most-feasible experience-based macro-keyword-tablets to generate all the associated micro-instruction programs with existed results, which can be treated as suggested-reference results.

2) Micro-waPL2 WL2.5-waPP2

The second kind is a workgroup-attribute process library (waPL2) resided on a WL2-TeamServer to store micro-instruction-based attribute-processing programs in 4W1H-context syntax processing-logic language generated by the base-attribute-level workgroup processing program (WL2.5-waPP2) based on top-level macro-keyword-form-based attribute-descriptive programs pulled-in from WL2.4 and the current manual macro-keyword-tablets stored in 5W1H-context waPL1.

There are two inter-related library-file structures in waPL2 (i.e., the back-end file-structure and the front-end file-structure). The back-end file-structure is based on a structured listing of post waPP2 event-experience-files, where each file contains 4W1H micro-instruction-based syntax attribute-processing programs as internal records and is sequentially logged in a file folder under the event-timestamp directory. In addition, the waPP2 can generate the front-end file-structure, which is the result-based index-card directory file containing event-timestamp-based index cards with different aspect-oriented meta-data criteria to classify up-to-the-current resulted experiences in different aspects of concern for easy selection.

As illustrated in FIG. 25c, waPL2 is shared with WL2.6-waPP1, which can read and screen the index-card file, pull-in the current similar experience-based micro-instruction syntax-attribute-processing programs as references to generate all the associated macro-keyword-tablets semantic attribute-descriptive programs with currently obtained results.

2. wtOS-wtPP-wtPL(4): FIG. 25d Processing Libraries

The second type is the workgroup library storage resided on a WL2-TeamServer to store what mid-traffic-level workgroup processing programs (wtPP) generate after the processing event. There are 4 kinds of Mid-level workgroup-traffic Processing Libraries (wtPL).

1) WtPL1-WL2.7-wtPP1

The first kind is a workgroup-traffic Process Library (wtPL1) resided on a WL2-TeamServer, which is to store the WL2.7-wtPP1 activities of handling macro-keyword-tablets attribute-descriptive program-enclosed control-template packages from WL2.6-waPP1.

The file structure of wtPL1 is based on a structured listing of post-event (activity) files, where each file contains the timestamp records of packages-pull-in from WL2.6 and packages-push-out to WL2.8 in a file folder under the timestamp directory. In addition, the wtPP1 as well as another spawned version handled by another CPU to ease the main CPU workload, can generate and maintain an index-card directory file containing processing event-timestamps with different efficient-keyword criteria as the directories to provide traffic information in different aspects of concern.

As illustrated in FIG. 25d, wtPL1 is shared with WL2.4-wtPP4, which can retrieve exchanging packages among base-level id-addressable TaPs by way of WL2.7 to WL2.4). In addition, WL2.4-wtPP4 can read and screen the index-card file, pull-in the current desired traffic information for checking the integrity of normal top-down/bottom-up 10-workgroup-traffic activities without failure, ensuring every WL2.3-WL2.4 flow is processed via WL2.7-WL2.8 for fail-safe purposes.

2) WtPL2-WL2.8-wtPP2

The second kind is a workgroup-traffic process library (wtPL2) resided on a WL2-TeamServer, which is to store the WL2.8-wtPP2 activities of handling macro-keyword-tablets attribute-descriptive program-enclosed control-template packages from WL2.7-wtPP1.

The file structure of wtPL2 is based on a structured listing of post-event (activity) files, where each file contains the timestamp records of packages-pull-in from WL2.7 and packages-push-out to WL2.9 in a file folder under the timestamp directory. In addition, the wtPP2 as well as another spawned version handled by another CPU to ease the main CPU workload, can generate and maintain an index-card directory file containing processing event-timestamps with different efficient-keyword criteria as the directories to provide traffic information in different aspects of concern.

As illustrated in FIG. 25d, wtPL2 is shared with WL2.3-wtPP3, which can read and screen the index-card file, pull-in the current desired traffic information for checking the integrity of normal top-down/bottom-up 10-workgroup-traffic activities without failure, ensuring every WL2.3-WL2.4 flow is processed via WL2.7-WL2.8 for fail-safe purposes.

3) wtPL3-WL2.3 wtPP3

The third kind is a workgroup-traffic process library (WL2.3-wtPL3) resided on a WL2-TeamServer, which is to store the WL2.3-wtPP3 activities of handling macro-keyword-form-based attribute-descriptive program-enclosed control-template packages from top-level TcPs.

The file structure of wtPL3 is based on a structured listing of post-event (activity) files, where each file contains the timestamp records of packages-pull-in from WL2.2 and packages-push-out to WL2.4 in a file folder under the timestamp directory. In addition, the wtPP3, as well as another spawned version handled by another CPU to ease the main CPU workload, can generate and maintain an index-card directory file containing processing event-timestamps with different efficient-keyword criteria as the directories to provide traffic information in different aspects of concern.

As illustrated in FIG. 25d, wtPL3 is shared with WL2.8-wtPP2, which can retrieve exchanging packages among top-level id-addressable TcPs by way of WL2.3 to WL2.8. In addition, WL2.8-wtPP2 can read and screen the index-card file, pull-in the current desired traffic information for checking the integrity of normal top-down/bottom-up 10-workgroup-traffic activities without failure, ensuring every WL2.3-WL2.4 flow is processed via WL2.7-WL2.8 for fail-safe purposes.

4) WtPL4-WL2.4-wtPP4

The fourth kind is a workgroup-traffic process library (wtPL4) resided on a WL2-TeamServer, which is to store the WL2.4-wtPP4 activities of handling macro-keyword-form-based attribute-descriptive program-enclosed control-template packages from WL2.3-wtPP3.

The file structure of wtPL4 is based on a structured listing of post-event (activity) files, where each file contains the timestamp records of packages-pull-in from WL2.3 and packages-push-out to WL2.5 in a file folder under the timestamp directory. In addition, the wtPP4, as well as another spawned version handled by another CPU to ease the main CPU workload, can generate and maintain an index-card directory file containing processing event-timestamps with different efficient-keyword criteria as the directories to provide traffic information in different aspects of concern.

As illustrated in FIG. 25d, wtPL4 is shared with WL2.7-wtPP1, which can read and screen the index-card file, pull-in the current desired traffic information for checking the integrity of normal top-down/bottom-up 10-workgroup-traffic activities without failure, ensuring every WL2.3-WL2.4 flow is processed via WL2.7-WL2.8 for fail-safe purposes.

3. wcOS-wcOP-wcOL(3): FIG. 25e with back-end (6W1H-experience-(tablet-form)) record event-files and front-end index-card files The third type is the workgroup library storage resided on a WL2-TeamServer to store what top-control-level workgroup operation programs (wcOP) generate during the PS-operation event. There are three (3) kinds of Top-level workgroup-control Operation Libraries (wcOL).

1) (Main)-wcOLS1-WL2.1/WL2.10-wcOP1

The first kind is a workgroup-control operation library (wcOL1) resided on a WL2-TeamServer, which is to store domain-sentential-statement-based control descriptive programs in 6W1H-context semantic descriptive language generated by top-control-level WL2.10 workgroup-control Processing Program-4 (wcPP4), which is encapsulated by workgroup-control Operation Program-1 (wcOP1).

There are two inter-related library-file structures in wcOL1 (i.e., the back-end file-structure and the front-end file-structure). The back-end file-structure is based on a structured listing of post wcOP1 event-experience-files, where each file contains 6W1H domain-sentential statements/paragraphs/pages as internal records and is sequentially logged in a file folder under the event-timestamp directory. In addition, the wcOP1 can generate the front-end file-structure, which is the result-based index-card directory file containing event-timestamp-based index cards with different aspect-oriented meta-data criteria to classify up-to-the-current resulted experiences in different aspects of concern for easy selection.

As illustrated in FIG. 25e, wcOL1 is shared with WL2.1-wcPP1, which can read and screen the index-card file, pull-in the right resulted experience-based domain-sentential-statements/paragraphs/pages as references to generate menu-term-scripts semantic descriptive programs with suggested results.

2) (meso) wcOLS2-WL2.2-wcOP2

The second kind is a workgroup-control operation library (wcOL2) resided on a WL2-TeamServer, which is to store manual macro-form-based control-descriptive programs in 5W1H-context semantic descriptive language generated by top-control-level WL2.2 workgroup-control processing program-2 (wcPP2), which is encapsulated by workgroup-control Operation Program-2 (wcOP2).

There are two inter-related library-file structures in wcOL2 (i.e., the back-end file-structure and the front-end file-structure). The back-end file-structure is based on a structured listing of post wcOP2 event-experience-files, where each file contains 5W1H manual keyword-tablets/forms as internal records and is sequentially logged in a file folder under the event-timestamp directory. In addition, the wcOP2 can generate the front-end file-structure, which is the result-based index-card directory file containing event-timestamp-based index cards with different aspect-oriented meta-data criteria to classify up-to-the-current resulted experiences in different aspects of concern for easy selection.

As illustrated in FIG. 25e, wcOL2 is shared with WL2.9-wcPP3, which can read and screen the index-card file, pull-in the right resulted experience-based manual-keyword-tablets/forms as references for generating bottom-up menu-term-scripts/scenes semantic descriptive programs with current results.

3) (meta) wcOLS3-WL2.9-wcOP3

The third kind is a workgroup-control operation library (wcOL3) resided on a WL2-TeamServer, which is to store menu term-scripts/scenes-based control-descriptive programs in 6W1H-context semantic descriptive language generated by top-control-level WL2.9 workgroup-control processing program-3 (wcPP3), which is encapsulated by workgroup-control Operation Program-3 (wcOP3).

There are two inter-related library-file structures in wcOL3 (i.e., the back-end file-structure and the front-end file-structure). The back-end file-structure is based on a structured listing of post wcOP3 event-experience-files, where each file contains 6W1H menu term-scripts/scenes as internal records and is sequentially logged in a file folder under the event-timestamp directory. In addition, the wcOP3 can generate the front-end file-structure, which is the result-based index-card directory file containing event-timestamp-based index cards with different aspect-oriented meta-data criteria to classify up-to-the-current resulted experiences in different aspects of concern for easy selection.

As illustrated in FIG. 25e, wcOL3 is shared with WL2.2-wcPP2, which can read and screen the index-card file, pull-in the right resulted experience-based menu-term-scripts/scenes as references for generating top-down manual keyword-tablets/forms-based semantic descriptive programs with suggested results.

4. wcOS-wcOP-wcML

The fourth type is the workgroup-control Management Library (wcML) resided on a WL2-TeamServer between a TcP pair, which is to store the management activities of a top-level workgroup-control Management Program (wcMP) after the completion of external fine-grained PS-operation events.

However, this real-time management library is totally in a new Software Storage Category that needs to be developed with new innovative methodologies.

Focus-4: New and Better Top-Control Level: wcOL and ML (25e and 25f): (for Support)

The fourth focus is on innovating new and better top-level Task workgroup-control Software Storage (architecture) Methodology (SSM) for establishing workgroup-control Management Libraries (wcML).

As shown in FIG. 25f, the workgroup-control Management Library (wcML) resided on a WL2-TeamServer between a TcP pair, which is to store the management activities of a top-level workgroup-control Management Program (wcMP) equipped in both the primary TcP and the secondary TcP after the completion of external fine-grained PS-operation events via the fulfillment of internal workgroup operations and 10 workgroup processes (i.e., wcPP1-4, wtPP1-4 and waPP1-2) of the primary TcP.

There are two inter-related library-file structures in wcML (i.e., the back-end file-structure and the front-end file-structure). The back-end file-structure is based on a structured listing of post PS-operation event-experience-files, where each file contains the received-requirements and returned-results based fulfilled PS-operation event control-template and is sequentially logged in a file folder under the timestamp directory. In addition, the wcMP of secondary TcP can generate the experience files and maintain as many index-card directory files containing event-template timestamps with different performance-criteria as the directories and 6W1H-context subdirectories to provide the real-time information about the current-best experiences in different aspects of concern for easy selection. Moreover, after the PS-operation event is completed for a particular external stakeholder, any feedback messages from that particular external stakeholder will be ideal for the wcMP of the primary TcP to realign the performance rankings for that particular timestamped template in each aspect of concern.

As illustrated in FIG. 25f, both the primary TcP and the secondary TcP can maintain the wcML. However, it will be ideal for the secondary TcP to maintain all the index-card directory files with the current-best experiences in a fail-over and collaborative mode, so that the primary TcP can read and screen the index-card file, pull-in the right current-best experience-based fine-grained PS-operation event control template as references and launch the next fine-grained PS-operation event with a new control template based on the similar requirements with an aim to yielding the best-feasible results.

The capability of logging all the timestamped PS-operation experiences is beneficial to guarantee that any new PS-operation with received requirements similar to the past experiences will get the similar returned-results. And the variation in different results will be dependent on the conditions and operation data-information that are specified in received requirements via natural language. Based on the 3-level workgroup programs and workgroup libraries, the external Task fine-grained PS-operation program can be real-time dynamically established based on the current-best similar experience with a control template that can go through internal feedback-control workgroup operation and management programs, workgroup-process programs and internal process programs with real-time fed-in conditions, so that the PS-operation program flow-charted-route can be real-time formed, generating best-feasible performing results for real-time solving external problems initiated by the external stakeholder.

Therefore, the coexistence of workgroup operation libraries and management library equipped in paired TcPs can enable real-time dynamic PS-operation natural-language-based programming with current-best experience support for external stakeholders. Since there are multiple pairs of TcPs in a EPU(XP) of wHCS, different external stakeholders, such as network-linked Receive-Return Users, workgroup-linked Pull-Push collaborators and multi-task assembly controllers, can all be accommodated by using different pairs of TcPs.

Most importantly, due to the usage of current-best experiences, all the 3-level workgroup libraries that are architected with back-end timestamped experience log-file and front-end index-timestamp-card contexts-directory/subdirectory files and maintained by their control workgroup programs, can real-time self-insert experience files along the timeline, real-time self-update index-files with best-performance in different aspects, real-time self-delete/cleanse "obsolete" old experiences files and real-time select the current best experience via constantly updated index-files and retrieve it from the current useful experience files as references for launching the next fine-grained PS-operation. There will not be any junk-experience data in these 3-level workgroup libraries, only to store real-time up-to-the-current experience information in 4W1H-contexted syntax-processing languages, 5W1H- and 6W1H-contexted semantic-descriptive languages for supporting internal ten (10) workgroup-workflow processes and three (3) feedback-control workgroup operations to fulfill external fine-grained PS operations in 6W1H-contexted natural languages.

Focus-5: The Importance of Operation and Management Libraries in Coexistence.

The fifth focus is on emphasizing the important rationale of top-level real-time workgroup-control operation and management libraries of TcP, because without them, the external-stakeholder's Task fine-grained-(closed-loop) PS-operation cannot be real-time dynamically managed with real-time aspect-oriented current-best experience reports.

It is imperative that before launching the next external Task fine-grained PS-operation, all the fine-grained requirements with aspect-oriented conditions and desired results should be compared with the aspect-oriented current-best experiences, so that the fine-grained PS-operation program for that particular external stakeholder can be real-time dynamically generated to solve the fine-grained problems with the best-feasible results. Therefore, the coexisted 3-level workgroup processing, operation and management libraries support internal top-level three (3) workgroup operation programs and 3-level ten (10) workgroup process programs that control all the 3-level internal processes, enabling the real-time dynamic external fine-grained PS-operation programming in natural languages with best-feasible solutions due to the real-time current-best experience-management reports.

Most importantly, all these workgroup libraries are real-time self-inserting, real-time self-updating, real-time self-deleting and real-time self-selecting capable. Unlike the current fix-syntax field/record/table format-based databases that store the broken-down node-processing-event activities occurred on other node-computers, there is no possibility of providing real-time management support for launching the next application program on each node-computer for real-time adjustments. Even worse, all the insert, update, delete and select functions have to be handled through database management system (DBMS) programs, yielding possible duplicate-insertions, untimely updates, junk data cleansing and dubious SQL-selection problems.

Focus-6: Define wG1 3-Level-Hierarchical Software Storage Program (SSM) (waPLs, wtPLs, wcOLs and wcML)

The eighth focus is on defining the third Software Storage-(architecture) Methodology (SSM) of Task Operation Software Architecture Theorem (SAT) (i.e., wG1.stage(n) SAT-methodology-3 (SAT-m3)) in creating all the wG1.stage(n) 3-level Task workgroup operation, management and process-based library storages.

Again, by "carrying out both the fourth and fifth" evolutionary architecture mandate of wG1, new and better real-time self-managing 3-level workgroup libraries established via the above software storage methodology (SSM) for equipping the Task wEPU(XP) of 8-staged wHCSs, which can be defined as wG1 Software Storage Method (SSM) of SAT of wTF3 of wECP.

Sub-iv. Defining wG1 Task-(PS) Operation SAT in Creating 3-Level Operational Capabilities on 3-Level Task Operation EPUs The fourth subtopic is on defining wG1 Task-(PS) operation SAT in creating 3-level software capabilities on 3-level Task operation EPUs of 8-staged wHCSs that are created by wG1-HAT over 8 evolutionary stages.

It can be concluded that Task operation SAT contains the following wG1.stage(n) software capabilities, They are:

(1) wSOM (methodology-1) for establishing 3-level workgroup-link-based OSs for enabling real-time dynamic fine-grained PS-operation event-creation with Forming requirements;

(2) wSPM (methodology-2) for generating 3-level workgroup-link-based Programs for enabling real-time dynamic fine-grained PS-operation event-execution with Performing results;

(3) wSSM (methodology-3) for generating workgroup-link-based storage for enabling real-time dynamic fine-grained PS-operation-event management library with performance-reports.

This is a new category of software architecture theorem that contains internal 3 methodology-loop that can naturally iterate to generate additional 3-methodologies for constantly creating bigger wHCSs along the evolutionary-stage(n) timeline, which emphasizes the important embedded evolutionary mechanism that a computing software "architecture" theorem should possess, creating more sophisticated software capabilities along the evolutionary timeline.

By complying to the sixth mandate of wG1-wEA, the endeavor to achieve first generation Software Architecture Theorems (wG1-SAT) can be established by bundling up all the above-mentioned three(3) methodologies (i.e., wG1-stage(n=1,8) SOM, SPM and wSSM), thereby defining wG1-SAT that contains all the wG1.stage(n=1,8) 3-methodology-loop iterations (i.e., 24 iterative methodologies of wG1.stage(1,8) wSOMs, stage(1,8) wSPMs and stage(1,8) wSSMs).

Sub-v. Generating 8-Standard wG1.Stage(n=1,8) Task Operation wEntities

The fifth subtopic is on generating 8-standard wG1.stage (n=1,8) Task operation wEntities. As disclosed earlier, wG1.stage(n=1,8) HAT have generated 8-staged Task wHCSs and then via wG1.stage(n=1,8) SAT, each wEPU of each 8-staged wHCS is equipped with 3-level workgroup-OSs, workgroup programs and workgroup storages, thereby enhancing 8-staged Task wEPU(XP) of wHCSs into 8-staged Task wEntities (i.e., wG1.stage(n=1,8) Task wEntities). Moreover, each wG1-evolved Task wEntity has the following 4 built-in features.

(1) Its workgroup wEPU(XP) of wHCS will real-time grow based on growth parameter and real-time evolve based on 8 evolutionary stages in workgroup production generation (wG1). The wEPU(XP) of wHCS can be as small by gauging the parameters with the smallest number and can real-time grow based on the increments of the parameters. From FIG. 17 to FIG. 24, they are illustrating all the 8 standard Task wEntities that can real-time evolve from 1D, 2D, 3D to multi-3D Fractal s.

(2) Its software capabilities will real-time self-improve/self-learning based on real-time concurrent closed-loop PS-operations and real-time workgroup operation and management libraries with the current best experiences.

(3) Its duality of each wG1-evolved Task wEntity with combining hardware-structure and software-capabilities will create a "real-time parameter-growing and real-time self-improving Task-wEntity operation-based entity-capability domain, which can real-time dynamically generate PS-operation programs for solving real-world fast-changing production problems."

(4) all the wG1-evolved Task wEntities with either real-time evolving Task1 solution-execution operation domains or Task2 knowledge-supervision operation domains (i.e., solution domains and knowledge domains) can accommodate "all the real-world production problem domains" from the smallest to the largest, resolving the production-centric problems for internal controllers, internal processors, external collaborators and external top-level controllers in a real-time manner and especially for solving service-oriented problems for immediate users in a real-time dynamic manner. It is because all the real-world production problem domains are always smaller and less complex than wG1-evolved Task wEntities' "solution and knowledge domains," which are the first and foremost breakthroughs that are needed for advancing "Artificial General Intelligence."

Topic-II. Building 8-Stage Evolved Standard wG1.Stage (n=1,8) Task Operation wEntities In order to establish wG1.stage(n) SAT, there are 3 software areas that need to be developed for equipping all the wG1 evolved Task wHCSs created by wG1.stage(n) HAT, as illustrated from FIG. 17 to FIG. 24. The first one is to develop workgroup operating systems (OSs), the second one is to develop workgroup operation programs (OPs) and the third one is to develop workgroup operation libraries and management libraries.

Based on wG1.stage(n=1,8) HAT and SAT, all the first generation wG1 Task-wEntities can be evolved along 8 workgroup evolutionary stages, creating 8 standard wG1.stage(n=1,8) Task-wEntities with solution and knowledge domains that can accommodate all the real-world production problem domains, all of which are discussed in the following.

Sub-i. Building wG1.1 1D-Array-Task1 wEntities with 1D-Complex PS-Solution Domains Text-6.1: SAT-m1: 3-level WL-based workgroup OSs for wG1.1 EPU(XP)

Based on the wG1.1 1D-Array Task1 WL(1&2)-device (i.e., TeamSwitch and TeamServer)-integrated 3-level Execution-Pylon-Unit (EPU) or eXecution Pylon (XP) in short, as illustrated in FIG. 17, and the established wG1.1 Task operation SAT-m1 (SOM), there are 3-level workgroup-links-based workgroup-OS installing procedures that need to be completed.

(1) Each base-attribute-level TaP is installed with workgroup-links-based 2-link-typed Task1 IO-process-OS (BaL-wpOS or Task1 waOS);

(2) Each mid-traffic-level TmP is installed with workgroup-links-based 2-link-typed Task1 IO-process-OS, (MtL-wpOS or Task1 wtOS);

(3) Each top-control-level TcP is installed with workgroup-links-based 3-link-typed Task1 RR/PP (i.e., external network-linked feedback-control Receive-Return/external workgroup-linked feedback-control Pull-Push)-operation-OS, (TcL-woOS or Task1 wcOS).

Text-6.2: SAT-m2: 3-Level Workgroup OS-Based Workgroup Programs for wG1.1 EPU

Based on the wG1.1 1D-Array Task1 EPU(XP), as illustrated in FIG. 17, and the established wG1.1 Task operation SAT-m2 (SPM), there are 3-level workgroup-OS-based workgroup-program installing procedures that need to be completed.

(1) Each base-attribute-level TaP is installed with Task1 waOS-based IO-process programs (BaL-wPP or Task1 waPP1-2);

(2) Each mid-traffic-level TmP is installed with Task1 wtOS-based IO-process programs (MtL-wPP or Task1 wtPP1-4);

(3) Each top-control-level TcP is installed with Task1 wcOS-based RR/PP-operation programs (TcL-wOP or Task1 wcOP1-3).

Text-6.3 SAT-m3: 3-level workgroup-program-based workgroup-libraries for wG1.1 EPU Based on the wG1.1 1D-Array Task1 EPU(XP), as illustrated in FIG. 17, and the established wG1.1 Task operation SAT-m3 (SSM), there are 3-level workgroup-program-based workgroup-libraries installing procedures that need to be completed.

(1) Each base-attribute-level TaP is installed with two (2) Task1 workgroup-attribute process-program (waPP)-based Processing Libraries (Task1 waPL1-2) for logging workgroup-attribute activities as timestamped-experiences with index-timestamp-card files with result-directory and aspect-oriented subdirectories.

(2) Each mid-traffic-level TmP is installed with Task1 workgroup-traffic process-program (wtPP)-based Processing Libraries (Task1 wtPL1-4) for logging workgroup-traffic activities;

(3) Each top-control-level TcP is installed with three (3) Task1 workgroup-control operation-program (Task1 wcOP1,2,3)-based Operation Libraries (wcOL1,2,3) for real-time logging fine-grained PS operations and with additional WL2-TeamServer-based workgroup-control Management Library (wcML) shared by its paired member for real-time managing Task1-R&R PS-operation events with performance reports.

In addition, all the Task1 workgroup-linked workgroup library storages can have the backup processes via internal-linked disk/tape devices that serve as the back-up data-repositories.

Text-6.4: Task-Operation SAT for wG1.1 EPU(XP)

Once every base-level TaP is installed with waOS/waPPs/waPLs, every mid-level TmP is installed with wtOS/wtPPs/wtPLs and every top-level TcP is installed with wcOS/wcOPs/wcOLs/wcML based on wG1.stage1 Task1 operation SAT-(m1,m2, m3), the real-time dynamic external stakeholders' concurrent fine-grained problem-solving (PS)-operations can be completed by integrating 3-level workgroup TeamProcessors' "software capabilities" to carry out 3 workgroup operations and 10 workgroup processes that control all the 3-level internal processes.

Moreover, each TcP's workgroup control operation libraries and management library can be maintained by workgroup-control operation and management programs (wcOP and wcMP) for real-time self-inserting, self-updating, self-deleting and self-managing each workgroup-control RR/PP-operation event based on 6W1H (who, when, where, what, which-TaPs, why and how) aspects of contextual directories, providing aspect-oriented current best experiences to support the next real-time dynamic Task1-R&R PS-operation event-generation with 1D-array-parameter Abstract-Algebra multiply operator-based group-level complex solutions for concurrently solving external stakeholders' fast-changing production-solution-oriented problems.

Text-6.5: 1D-Array (Task1-R&R) wEntities Based on wG1.1 HAT and SAT

Therefore, by carrying out wG1.stage1 Task operation HAT-(m1,m2,m3,m4), real-time growing 3-level-hierarchical hardware EPU (XP) structure can be created with physical boundary to separate internal-linked region from external-network/workgroup-linked region/space, and further by enhancing EPU(XP) with wG1.stage1 Task operation SAT-(m1,m2,m3), a Task1 1D-Array (solution)-wEntity is generated with real-time growing and real-time improving R&R solution-oriented fine-grained PS-operation capability domain (i.e., 1D-complex/secure solution domain), which can real-time dynamically, concurrently and securely solve production-solution-oriented problems for external stakeholders via Task1 Request and Reply (R&R) 1D-Array-Solution-oriented fine-grained-PS operations in natural languages.

Sub-ii. Building wG1.2 1D-Seg Task2 wEntities with 1D-Complex PS-Knowledge Domains Text-6.1: SAT-m1: 3-level WL-based workgroup OSs for wG1.2 EPU(XP)

Based on the wG1.2 1D-Seg Task2 WL(1&2)-device (i.e., TeamSwitch and TeamServer)-integrated 3-level Execution-Pylon-Unit (EPU) or eXecution Pylon (XP) in short, as illustrated in FIG. 18, and the established wG1.2 Task2 operation SAT-m1 (SOM), there are 3-level workgroup-links-based workgroup-OS installing procedures that need to be completed.

(1) Each base-attribute-level TaP is installed with Task2 workgroup-links-based 2-link-typed IO-process-OS (BaL-wpOS or Task2 waOS);

(2) Each mid-traffic-level TmP is installed with Task2 workgroup-links-based 2-link-typed IO-process-OS, (MtL-wpOS or Task2 wtOS);

(3) Each top-control-level TcP is installed with Task2 workgroup-links-based 3-link-typed RR/PP (i.e., external network-linked feedback-control Receive-Return/external workgroup-linked feedback-control Pull-Push)-operation-OS, (TcL-woOS or Task2 wcOS).

Text-6.2: SAT-m2: 3-Level Workgroup OS-Based Workgroup Programs for wG1.2 EPU

Based on the wG1.2 1D-Seg Task2 EPU(XP), as illustrated in FIG. 18, and the established wG1.2 Task operation SAT-m2 (SPM), there are 3-level workgroup-OS-based workgroup-program installing procedures that need to be completed.

(1) Each base-attribute-level TaP is installed with Task2 waOS-based IO-process programs (BaL-wPP or Task2 waPP);

(2) Each mid-traffic-level TmP is installed with Task2 wtOS-based IO-process programs (MtL-wPP or Task2 wtPP);

(3) Each top-control-level TcP is installed with Task2 wcOS-based RR/PP-operation programs (TcL-wOP or Task2 wcOP).

Text-6.3 SAT-m3: 3-Level Workgroup-Program-Based Workgroup-Libraries for wG1.2 EPU Based on the wG1.2 1D-Seg Task2 EPU(XP), as illustrated in FIG. 18, and the established wG1.2 Task operation SAT-m3 (SSM), there are 3-level workgroup-program-based workgroup-storage installing procedures that need to be completed.

(1) Each base-attribute-level TaP is installed with Task2 workgroup-attribute process-program (waPP)-based Processing-Libraries (Task2 waPL1-2) for logging workgroup-attribute activities;

(2) Each mid-traffic-level TmP is installed with Task2 workgroup-traffic process-program (wtPP)-based Processing-Libraries (Task2 wtPL1-4) for logging workgroup-traffic activities;

(3) Each top-control-level TcP is installed with Task2 workgroup-control operation-program (wcOP)-based Operation-Libraries (Task2 wcOL1-3) for real-time logging workgroup-"feedback-control" operations and with additional WL2-TeamServer-based management Library (Task2 wcML) shared by its paired member for real-time managing Task2-Q&A PS-operation events with reports.

In addition, all the Task2 workgroup-linked data-storages can have the backup processes via internal-linked disk/tape devices that serve as the back-up data-repositories.

Text-6.4: Task-Operation SAT for wG1.2 EPU(XP)

Once every base-level TaP is installed with waOS/waPPs/waPLs, every mid-level TmP is installed with wtOS/wtPPs/wtPLs and every top-level TcP is installed with wcOS/wcOPs/wcOLs/wcML based on wG1.stage2 Task2 operation SAT-(m1,m2,m3), the real-time dynamic internal and external stakeholders' concurrent fine-grained-Q&A problem-solving (PS)-operations can be completed by integrating 3-level workgroup TeamProcessors' "software capabilities" to carry out 3 workgroup operations and 10 workgroup processes that control all the 3-level internal processes.

Moreover, each TcP's workgroup control operation libraries and management library can be maintained by workgroup-control operation and management programs (wcOP and wcMP) for real-time self-inserting, self-updating, self-deleting and self-managing each workgroup-control RR/PP-operation event based on 6W1H (when, where, who, what, which-TaPs, why and how) aspects of contextual directories, providing aspect-oriented current best experiences to support the next real-time dynamic Task1 and Task2 PS-operation event-generation with 1D-Seg-parameter Abstract-Algebra Addition-operator-based group-level complex knowledge for concurrently solving internal and external stakeholders' production-knowledge-oriented problems.

Text-6.5: 1D-Seg (Task2-Q&A) wEntities Based on wG1.2 HAT and SAT

Therefore, by carrying out wG1.stage2 Task operation HAT-(m1,m2,m3,m4), real-time growing 3-level-hierarchical hardware EPU (XP) structure can be created with physical boundary to separate internal-linked region from external-network/workgroup-linked region/space, and further by enhancing EPU(XP) with wG1.stage2 Task operation SAT-(m1,m2,m3), a Task2 1D-Seg (knowledge)-wEntity is generated with real-time growing and real-time improving Q&A knowledge-oriented fine-grained PS-operation capability domain (i.e., 1D-complex/secure knowledge domain), which can real-time dynamically, concurrently and securely solve the production-knowledge-oriented problems for the internal stakeholders to real-time generate the next Task1 R&R 1D-Array solution-oriented fine-grained PS-operations as well as for the external collaborative stakeholders via Task2 Q&A 1D-Seg knowledge-oriented fine-grained PS-operations in natural languages.

Sub-iii. Building wG1.3 2D-Matrix Task1 wEntities with 2D-Complex PS-Solution Domains Text-6.1: SAT-m1: 3-level WL-based workgroup OSs for wG1.3 EPU(XP)

Based on the wG1.3 2D-Matrix Task1 WL(1&2)-device (i.e., TeamSwitch and TeamServer)-integrated 3-level Execution-Pylon-Unit (EPU) or eXecution Pylon (XP) in short, as illustrated in FIG. 19, and the established wG1.3 Task operation SAT-m1 (SOM), there are 3-level workgroup-links-based workgroup-OS installing procedures that need to be completed.

(1) Each base-attribute-bevel TaP is installed with workgroup-links-based 2-link-typed Task1 IO-process-OS (BaL-wpOS (i.e., Task1 waOS));

(2) Each mid-traffic-level TmP is installed with workgroup-links-based 2-link-typed Task1 IO-process-OS, (MtL-wpOS (i.e., Task1 wtOS));

(3) Each top-control-level TcP is installed with workgroup-links-based 3-link-typed Task1 RR/PP (i.e., external network-linked feedback-control Receive-Return/external workgroup-linked feedback-control Pull-Push)-operation-OS, (TcL-woOS (i.e., Task1 wcOS)).

Text-6.2: SAT-m2: 3-Level Workgroup OS-Based Workgroup Programs for wG1.3 EPU

Based on the wG1.3 2D-Matrix Task1 EPU(XP), as illustrated in FIG. 19, and the established wG1.3 Task operation SAT-m2 (SPM), there are 3-level workgroup-OS-based workgroup-program installing procedures that need to be completed.

(1) Each base-attribute-level TaP is installed with Task1 waOS-based IO-process programs (BaL-wPP or Task1 waPP);

(2) Each mid-traffic-level TmP is installed with Task1 wtOS-based IO-process programs (MtL-wPP or Task1 wtPP);

(3) Each top-control-level TcP is installed with Task1 wcOS-based RR/PP-operation programs (TcL-wOP or Task1 wcOP).

Text-6.3 SAT-m3: 3-Level Workgroup-Program-Based Workgroup-Libraries for wG1.3 EPU Based on the wG1.3 2D-Matrix Task1 EPU(XP), as illustrated in FIG. 19, and the established wG1.3 Task operation SAT-m3 (SSM), there are 3-level workgroup-program-based workgroup-storage installing procedures that need to be completed.

(1) Each base-attribute-level TaP is installed with Task1 workgroup-attribute process-program (waPP)-based Processing Libraries (Task1 waPL1-2) for logging workgroup-attribute activities;

(2) Each mid-traffic-level TmP is installed with Task1 workgroup-traffic process-program (wtPP)-based Processing Libraries (Task1 wtPL1-4) for logging workgroup-traffic activities;

(3) Each top-control-level TcP is installed with Task1 workgroup-control operation-program (wcOP)-based Operation Libraries (Task1 wcOL1-3) for real-time logging workgroup-"feedback check&control" operations and additional WL2-TeamServer-based workgroup-control management library (wcML) shared by its paired member for real-time managing Task1-R&R PS-operation events with reports.

In addition, all the Task1 workgroup-linked data-storages can have the backup processes via internal-linked disk/tape devices that serve as the back-up data-repositories.

Text-6.4: Task-operation SAT for wG1.3 EPU(XP)

Once every base-level TaP is installed with waOS/waPPs/waPLs, every mid-level TmP is installed with wtOS/wtPPs/wtPLs and every top-level TcP is installed with wcOS/wcOPs/wcOLs/wcML based on wG1.stage3 Task1 operation SAT-(m1,m2,m3), the real-time dynamic external stakeholders' concurrent fine-grained problem-solving (PS)-operations can be completed by integrating 3-level workgroup TeamProcessors' "software capabilities" to carry out 3 workgroup operations and 10 workgroup processes that control all the 3-level internal processes.

Moreover, each TcP's workgroup control operation libraries and management library can be maintained by workgroup-control operation and management programs (wcOP and wcMP) for real-time self-inserting, self-updating, self-deleting and self-managing each workgroup-control RR/PP-operation event based on 6W1H (who, when, where, what, which-TaPs, why and how) aspects of contextual directories, providing aspect-oriented current best experiences to support the next real-time dynamic Task1-R&R PS-operation event-generation with 2D-Matrix-parameter Abstract-Algebra Multiply/Addition 2-operator-based ring-level-complex solutions for concurrently solving external stakeholders' fast-changing production-solution-oriented problems.

Text-6.5: 2D-Matrix (Task1-R&R) wEntities Based on wG1.3 HAT and SAT

Therefore, by carrying out wG1.stage3 Task operation HAT-(m1,m2,m3,m4), real-time growing 3-level-hierarchical hardware EPU (XP) structure can be created with physical boundary to separate internal-linked region from external-network/workgroup-linked region/space, and further by enhancing EPU(XP) with wG1.stage3 Task operation SAT-(m1,m2,m3), a Task1 2D-Matrix (solution)-wEntity is generated with real-time growing and real-time improving R&R solution-oriented fine-grained PS-operation capability domain (i.e., 2D-complex/secure solution domain), which can real-time dynamically, concurrently and securely solve production-solution-oriented problems for external stakeholders via Task1 Request and Reply (R&R) 2D-Matrix-Solution-oriented fine-grained-PS operations in natural languages.

Sub-iv. Building wG1.4 2D-Polygon Task2 wEntities with 2D-Complex PS-Knowledge Domains Text-6.1: SAT-m1: 3-level WL-based workgroup OSs for wG1.4 EPU(XP)

Based on the wG1.4 2D-Polygon Task2 WL(1&2)-device (i.e., TeamSwitch and TeamServer)-integrated 3-level Execution-Pylon-Unit (EPU) or eXecution Pylon (XP) in short, as illustrated in FIG. 20, and the established wG1.4 Task operation SAT-m1 (SOM), there are 3-level workgroup-links-based workgroup-OS installing procedures that need to be completed.

(1) Each base-attribute-level TaP is installed with Task2 workgroup-links-based 2-link-typed IO-process-OS (BaL-wpOS, or Task2 waOS);

(2) Each mid-traffic-level TmP is installed with Task2 workgroup-links-based 2-link-typed IO-process-OS, (MtL-wpOS, or Task2 wtOS);

(3) Each top-control-level TcP is installed with Task2 workgroup-links-based 3-link-typed RR/PP (i.e., external network-linked feedback-control Receive-Return/external workgroup-linked feedback-control Pull-Push)-operation-OS, (TcL-woOS, or Task2 wcOS).

Text-6.2: SAT-m2: 3-Level Workgroup OS-Based Workgroup Programs for wG1.4 EPU

Based on the wG1.4 2D-Polygon Task2 EPU(XP), as illustrated in FIG. 20, and the established wG1.4 Task operation SAT-m2 (SPM), there are 3-level workgroup-OS-based workgroup-program installing procedures that need to be completed.

(1) Each base-attribute-level TaP is installed with Task2 waOS-based IO-process programs (BaL-wPP, or Task2 waPP);

(2) Each mid-traffic-level TmP is installed with Task2 wtOS-based IO-process programs (MtL-wPP, or Task2 wtPP);

(3) Each top-control-level TcP is installed with Task2 wcOS-based RR/PP-operation programs (TcL-wOP, or Task2 wcOP).

Text-6.3 SAT-m3: 3-level workgroup-program-based workgroup-libraries for wG1.4 EPU Based on the wG1.4 2D-Polygon Task2 EPU(XP), as illustrated in FIG. 20, and the established wG1.4 Task operation SAT-m3 (SSM), there are 3-level workgroup-program-based workgroup-storage installing procedures that need to be completed.

(1) Each base-attribute-level TaP is installed with Task2 workgroup-attribute process-program (waPP)-based Processing Libraries (Task2 waPL1-2) for logging workgroup-attribute activities;

(2) Each mid-traffic-level TmP is installed with Task2 workgroup-traffic process-program (wtPP)-based Processing Libraries (Task2 wtPL1-4) for logging workgroup-traffic activities;

(3) Each top-control-level TcP is installed with Task2 workgroup-control operation-program (wcOP)-based Operation Libraries (Task2 wcOL1-3) for real-time logging workgroup-"feedback check&control" operations and additional WL2-TeamServer-based workgroup-control management library (wcML) shared by its paired member for real-time managing Task2-Q&A PS-operation events with reports.

In addition, all the Task2 workgroup-linked data-storages can have the backup processes via internal-linked disk/tape devices that serve as the back-up data-repositories.

Text-6.4: Task-Operation SAT for wG1.4 EPU(XP)

Once every base-level TaP is installed with waOS/waPPs/waPLs, every mid-level TmP is installed with wtOS/wtPPs/wtPLs and every top-level TcP is installed with wcOS/wcOPs/wcOLs/wcML based on wG1.stage4 Task operation SAT-(m1,m2,m3), the real-time dynamic internal and external stakeholders' concurrent fine-grained-Q&A problem-solving (PS)-operations can be completed by integrating 3-level workgroup TeamProcessors' "software capabilities" to carry out 3 workgroup operations and 10 workgroup processes that control all the 3-level internal processes.

Moreover, each TcP's workgroup control operation libraries and management library can be maintained by workgroup-control operation and management programs (wcOP and wcMP) for real-time self-inserting, self-updating, self-deleting and self-managing each workgroup-control RR/PP-operation event based on 6W1H (when, where, who, what, which-TaPs, why and how) aspects of contextual directories, providing aspect-oriented current best experiences to support the next real-time dynamic Task1 and Task2 PS-operation event-generation with 2D-Polygon-parameter Abstract-Algebra Multiply/Addition 2-operator-based ring-level-complex knowledge for concurrently solving internal and external stakeholders' production knowledge-oriented problems.

Text-6.5: 2D-Polygon-(Task2-Q&A) wEntities Based on wG1.4 HAT and SAT

Therefore, by carrying out wG1.stage4 Task operation HAT-(m1,m2,m3,m4), real-time growing 3-level-hierarchical hardware EPU (XP) structure can be created with physical boundary to separate internal-linked region from external-network/workgroup-linked region/space, and further by enhancing EPU(XP) with wG1.stage4 Task operation SAT-(m1,m2,m3), a Task2 2D-Polygon (knowledge)-wEntity is generated with real-time growing and real-time improving Q&A knowledge-oriented fine-grained PS-operation capability domain (i.e., 2D-complex/secure knowledge domain), which can real-time dynamically, concurrently and securely solve the production-knowledge-oriented problems for the internal stakeholders to real-time generate the next Task1 R&R 2D-Matrix solution-oriented fine-grained PS-operations as well as for the external collaborative stakeholders via Task2 Q&A 2D-Polygon knowledge-oriented fine-grained PS-operations in natural languages.

Sub-v. Building wG1.5 3D-Tie Task1 wEntities with 3D-Complex PS-Solution Domains Text-6.1: SAT-m1: 3-level WL-based workgroup OSs for wG1.5 EPU(XP)

Based on the wG1.5 3D-Tie Task1 WL(1&2)-device (i.e., TeamSwitch and Team Server)-integrated 3-level Execution-Pylon-Unit (EPU) or eXecution Pylon (XP) in short, as illustrated in FIG. 21, and the established wG1.5 Task operation SAT-m1 (SOM), there are 3-level workgroup-links-based workgroup-OS installing procedures that need to be completed.

(1) Each base-attribute-level TaP is installed with workgroup-links-based 2-link-typed Task1 IO-process-OS (BaL-wpOS (i.e., Task1 waOS));

(2) Each mid-traffic-level TmP is installed with workgroup-links-based 2-link-typed Task1 IO-process-OS, (MtL-wpOS (i.e., Task1 wtOS));

(3) Each top-control-level TcP is installed with workgroup-links-based 3-link-typed Task1 RR/PP (i.e., external network-linked feedback-control Receive-Return/external workgroup-linked feedback-control Pull-Push)-operation-OS, (TcL-woOS (i.e., Task1 wcOS)).

Text-6.2: SAT-m2: 3-Level Workgroup OS-Based Workgroup Programs for wG1.5 EPU

Based on the wG1.5 3D-Tie Task1 EPU(XP), as illustrated in FIG. 21, and the established wG1.5 Task operation SAT-m2 (SPM), there are 3-level workgroup-OS-based workgroup-program installing procedures that need to be completed.

(1) Each base-attribute-level TaP is installed with Task1 waOS-based IO-process programs (BaL-wPP or Task1 waPP);

(2) Each mid-traffic-level TmP is installed with Task1 wtOS-based IO-process programs (MtL-wPP or Task1 wtPP);

(3) Each top-control-level TcP is installed with Task1 wcOS-based RR/PP-operation programs (TcL-wOP or Task1 wcOP).

Text-6.3 SAT-m3: 3-Level Workgroup-Program-Based Workgroup-Libraries for wG1.5 EPU Based on the wG1.5 3D-Tie Task1 EPU(XP), as illustrated in FIG. 21, and the established wG1.5 Task operation SAT-m3 (SSM), there are 3-level workgroup-program-based workgroup-storage installing procedures that need to be completed.

(1) Each base-attribute-level TaP is installed with Task1 workgroup-attribute process-program (waPP)-based Processing Libraries (Task1 waPL1-2) for logging workgroup-attribute activities;

(2) Each mid-traffic-level TmP is installed with Task1 workgroup-traffic process-program (wtPP)-based Processing Libraries (Task1 wtPL1-4) for logging workgroup-traffic activities;

(3) Each top-control-level TcP is installed with Task1 workgroup-control operation-program (wcOP)-based Processing-Libraries (Task1 wcOL1-3) for real-time logging workgroup-"feedback check&control" operations and additional WL2-TeamServer-based workgroup-control Management Library (wcML) shared with its paired member for real-time managing Task1-R&R PS-operation events with reports.

In addition, all the Task1 workgroup-linked data-storages can have the backup processes via internal-linked disk/tape devices that serve as the back-up data-repositories.

Text-6.4: Task-Operation SAT for wG1.5 EPU(XP)

Once every base-level TaP is installed with waOS/waPPs/waPLs, every mid-level TmP is installed with wtOS/wtPPs/wtPLs and every top-level TcP is installed with wcOS/wcOPs/wcOLs/wcML based on wG1.stage5 Task1 operation SAT-(m1,m2,m3), the real-time dynamic external stakeholders' concurrent fine-grained problem-solving (PS)-operations can be completed by integrating 3-level workgroup TeamProcessors' "software capabilities" to carry out 3 workgroup operations and 10 workgroup processes that control all the 3-level internal processes.

Moreover, each TcP's workgroup control operation libraries and management library can be maintained by workgroup-control operation and management programs (wcOP and wcMP) for real-time self-inserting, self-updating, self-deleting and self-managing each workgroup-control RR/PP-operation event based on 6W1H (who, when, where, what, which-TaPs, why and how) aspects of contextual directories, providing aspect-oriented current best experiences to support the next real-time dynamic Task1 R&R PS-operation event-generation with 3D-Tie-parameter Abstract-Algebra multiply/division and addition/subtraction 2-pair/4-operator-based field-level complex solutions for concurrently solving external stakeholders' fast-changing production-solution-oriented problems.

Text-6.5: 3D-Tie (Task1-R&R) wEntities Based on wG1.5 HAT and SAT

Therefore, by carrying out wG1.stage5 Task operation HAT-(m1,m2,m3,m4), real-time growing hardware EPU (XP)-core structure can be created with physical boundary to separate internal region from external region/space, and further by enhancing EPU(XP) with wG1.stage5 Task operation SAT-(m1,m2,m3), a Task1 3D-Tie (solution)-wEntity is generated with real-time growing and real-time improving fine-grained-R&R solution-oriented PS-operation capability domain (i.e., 3D-complex/secure solution domain), which can real-time dynamically, concurrently and securely solve production-solution-oriented problems for the external stakeholders via Task1 Request and Reply (R&R) fine-grained-PS 3D-Tie-Solution operations in natural languages.

Sub-vi. Building wG1.6 3D-Align Task2 wEntities with 3D-Complex PS-Knowledge Domains Text-6.1: SAT-m1: 3-level WL-based workgroup OSs for wG1.6 EPU(XP)

Based on the wG1.6 3D-Align Task2 WL(1&2)-device (i.e., TeamSwitch and TeamServer)-integrated 3-level Execution-Pylon-Unit (EPU) or eXecution Pylon (XP) in short, as illustrated in FIG. 22, and the established wG1.6

Task operation SAT-m1 (SOM), there are 3-level workgroup-links-based workgroup-OS installing procedures that need to be completed.

(1) Each base-attribute-level TaP is installed with Task2 workgroup-links-based 2-link-typed IO-process-OS (BaL-wpOS, or Task2 waOS);

(2) Each mid-traffic-level TmP is installed with Task2 workgroup-links-based 2-link-typed IO-process-OS, (MtL-wpOS, or Task2 wtOS);

(3) Each top-control-level TcP is installed with Task2 workgroup-links-based 3-link-typed RR/PP (i.e., external network-linked feedback-control Receive-Return/external workgroup-linked feedback-control Pull-Push)-operation-OS, (TcL-woOS, or Task2 wcOS).

Text-6.2: SAT-m2: 3-Level Workgroup OS-Based Workgroup Programs for wG1.6 EPU

Based on the wG1.6 3D-Align Task2 EPU(XP), as illustrated in FIG. 22, and the established wG1.6 Task operation SAT-m2 (SPM), there are 3-level workgroup-OS-based workgroup-program installing procedures that need to be completed.

(1) Each base-attribute-level TaP is installed with Task2 waOS-based IO-process programs (BaL-wPP, or Task2 waPP);

(2) Each mid-traffic-level TmP is installed with Task2 wtOS-based IO-process programs (MtL-wPP, or Task2 wtPP);

(3) Each top-control-level TcP is installed with Task2 wcOS-based RR/PP-operation programs (TcL-wOP, or Task2 wcOP).

Text-6.3 SAT-m3: 3-Level Workgroup-Program-Based Workgroup-Libraries for wG1.6 EPU Based on the wG1.6 3D-Align Task2 EPU(XP), as illustrated in FIG. 22, and the established wG1.6 Task operation SAT-m3 (SSM), there are 3-level workgroup-program-based workgroup-storage installing procedures that need to be completed.

(1) Each base-attribute-level TaP is installed with Task2 workgroup-attribute process-program (waPP)-based Processing Libraries (Task2 waPL1-2) for logging workgroup-attribute activities;

(2) Each mid-traffic-level TmP is installed with Task2 workgroup-traffic process-program (wtPP)-based Processing Libraries (Task2 wtPL1-4) for logging workgroup-traffic activities;

(3) Each top-control-level TcP is installed with Task2 workgroup-control operation-program (wcOP)-based Operation Libraries (Task2 wcOL1-3) for real-time logging workgroup-"feedback check&control" operations and additional WL2-TeamServer-based workgroup-control Management Library shared with its paired member for real-time managing Task2-Q&A PS-operation events with reports.

In addition, all the Task2 workgroup-linked data-storages can have the backup processes via internal-linked disk/tape devices that serve as the back-up data-repositories.

Text-6.4: Task-Operation SAT for wG1.6 EPU(XP)

Once every base-level TaP is installed with waOS/waPPs/waPLs, every mid-level TmP is installed with wtOS/wtPPs/wtPLs and every top-level TcP is installed with wcOS/wcOPs/wcOLs/wcML based on wG1.stage6 Task operation SAT-(m1,m2,m3), the real-time dynamic internal and external stakeholders' concurrent fine-grained-Q&A problem-solving (PS)-operations can be completed by integrating 3-level workgroup TeamProcessors' "software capabilities" to carry out 3 workgroup operations and 10 workgroup processes that control all the 3-level internal processes.

Moreover, each TcP's workgroup control operation libraries and management library can be maintained by workgroup-control operation and management programs (wcOP and wcMP) for real-time self-inserting, self-updating, self-deleting and self-managing each workgroup-control RR/PP-operation event based on 6W1H (when, where, who, what, which-TaPs, why and how) aspects of contextual directories, providing aspect-oriented current best experiences to support the next real-time dynamic Task1 and Task2 PS-operation event-generation with 3D-Align-parameter 4-operator-based field-level complex knowledge for concurrently solving internal and external stakeholders' production knowledge-oriented problems.

Text-6.5: 3D-Align (Task2-Q&A) wEntities Based on wG1.6 HAT and SAT

Therefore, by carrying out wG1.stage6 Task operation HAT-(m1,m2,m3,m4), real-time growing 3-level-hierarchical hardware EPU(XP) structure can be created with physical boundary to separate internal-linked region from external-network/workgroup-linked region/space, and further by enhancing EPU(XP) with wG1.stage6 Task operation SAT-(m1,m2,m3), a Task2 3D-Align (knowledge)-wEntity is generated with real-time growing and real-time improving Q&A knowledge-oriented fine-grained PS-operation capability domain (i.e., 3D-complex/secure knowledge domain), which can real-time dynamically, concurrently and securely solve the production-knowledge-oriented problems for the internal stakeholders to real-time generate the next Task1 R&R 3D-Tie solution-oriented fine-grained PS-operations as well as for the external collaborative stakeholders via Task2 Q&A 3D-Align knowledge-oriented fine-grained PS-operations in natural languages.

Sub-vii. Building wG1.7 Fractal1 Task1-wEntities with Multi-3D PS-Solution Domains Text-6.1: SAT-m1: 3-level WL-based workgroup OSs for wG1.7 EPU(XP)

Based on the wG1.7 multi-3D-Fractal1 Task1 WL(1&2)-device (i.e., TeamSwitch and TeamServer)-integrated 3-level Execution-Pylon-Unit (EPU) or eXecution Pylon (XP) in short, as illustrated in FIG. 23, and the established wG1.7 Task operation SAT-m1 (SOM), there are 3-level workgroup-links-based workgroup-OS installing procedures that need to be completed.

(1) Each base-attribute-level TaP is installed with workgroup-links-based 2-link-typed Task1 IO-process-OS (BaL-wpOS (i.e., Task1 waOS));

(2) Each mid-traffic-level TmP is installed with workgroup-links-based 2-link-typed Task1 IO-process-OS, (MtL-wpOS (i.e., Task1 wtOS));

(3) Each top-control-level TcP is installed with workgroup-links-based 3-link-typed Task1 RR/PP (i.e., external network-linked feedback-control Receive-Return/external workgroup-linked feedback-control Pull-Push)-operation-OS, (TcL-woOS (i.e., Task1 wcOS)).

Text-6.2: SAT-m2: 3-Level Workgroup OS-Based Workgroup Programs for wG1.7 EPU

Based on the wG1.7 multi-3D-Fractal1 Task1 EPU(XP), as illustrated in FIG. 23, and the established wG1.7 Task operation SAT-m2 (SPM), there are 3-level workgroup-OS-based workgroup-program installing procedures that need to be completed.

(1) Each base-attribute-level TaP is installed with Task1 waOS-based IO-process programs (BaL-wPP or Task1 waPP);

(2) Each mid-traffic-level TmP is installed with Task1 wtOS-based IO-process programs (MtL-wPP or Task1 wtPP);

(3) Each top-control-level TcP is installed with Task1 wcOS-based RR/PP-operation programs (TcL-wOP or Task1 wcOP).

Text-6.3 SAT-m3: 3-Level Workgroup-Program-Based Workgroup-Libraries for wG1.7 EPU Based on the wG1.7 multi-3D-Fractal1 Task1 EPU(XP), as illustrated in FIG. 23, and the established wG1.7 Task operation SAT-m3 (SSM), there are 3-level workgroup-program-based workgroup-storage installing procedures that need to be completed.

(1) Each base-attribute-level TaP is installed with Task1 workgroup-attribute process-program (waPP)-based Processing Libraries (Task1 waPL1-2) for logging workgroup-attribute activities;

(2) Each mid-traffic-level TmP is installed with Task1 workgroup-traffic process-program (wtPP)-based Processing Libraries (Task1 wtPL1-4) for logging workgroup-traffic activities;

(3) Each top-control-level TcP is installed with Task1 workgroup-control operation-program (wcOP)-based Operation Libraries (Task1 wcOL1-3) for real-time logging workgroup-"feedback check&control" operations and additional WL2-TeamServer-based workgroup-control Management Library shared with its paired member for real-time managing Task1-R&R PS-operation events with reports.

In addition, all the Task1 workgroup-linked data-storages can have the backup processes via internal-linked disk/tape devices that serve as the back-up data-repositories.

Text-6.4: Task-Operation SAT for wG1.7 EPU(XP)

Once every base-level TaP is installed with waOS/waPPs/waPLs, every mid-level TmP is installed with wtOS/wtPPs/wtPLs and every top-level TcP is installed with wcOS/wcOPs/wcOLs/wcML based on wG1.stage7 Task1 operation SAT-(m1,m2,m3), the real-time dynamic external stakeholders' concurrent fine-grained problem-solving (PS)-operations can be completed by integrating 3-level workgroup TeamProcessors' "software capabilities" to carry out 3 workgroup operations and 10 workgroup processes that control all the 3-level internal processes.

Moreover, each TcP's workgroup control operation libraries and management library can be maintained by workgroup-control operation and management programs (wcOP and wcMP) for real-time self-inserting, self-updating, self-deleting and self-managing each workgroup-control RR/PP-operation event based on 6W1H (when, where, who, what, which-TaPs, why and how) aspects of contextual directories, providing aspect-oriented current best experiences to support the next real-time dynamic Task1 R&R PS-operation event-generation with multi-3D Fractal1-parameter Abstract-Algebra multiply/division and addition/subtraction 2-pair/4-operator-based field-level complex solutions for concurrently solving external stakeholders' fast-changing production-solution-oriented problems.

Text-6.5: Multi-3D Fractal1 (Task1-R&R) wEntities Based on wG1.7 HAT and SAT

Therefore, by carrying out wG1.stage7 Task operation HAT-(m1,m2,m3,m4), real-time growing hardware EPU (XP)-core structure can be created with physical boundary to separate internal region from external region/space, and further by enhancing EPU(XP) with wG1.stage7 Task operation SAT-(m1,m2,m3), a Task1 multi-3D-Fractal1 (solution)-wEntity is generated with real-time growing and real-time improving fine-grained-R&R solution-oriented PS-operation capability domain (i.e., multi-3D-complex/secure solution domain), which can real-time dynamically concurrently and securely solve production-solution-oriented problems for the external stakeholders via Task1 Request and Reply (R&R) fine-grained-PS multi-3D-Fractal1 Solution operations in natural languages.

Sub-viii. Building wG1.8 Fractal2 Task2-wEntities with Multi-3D PS-Knowledge Domains Text-6.1: SAT-m1: 3-level WL-based workgroup OSs for wG1.8 EPU(XP)

Based on the wG1.8 multi-3D-Fractal2 Task2 WL(1&2)-device (i.e., TeamSwitch and Team Server)-integrated 3-level Execution-Pylon-Unit (EPU) or eXecution Pylon (XP) in short, as illustrated in FIG. 24, and the established wG1.8 Task operation SAT-m1 (SOM), there are 3-level workgroup-links-based workgroup-OS installing procedures that need to be completed.

(1) Each base-attribute-level TaP is installed with Task2 workgroup-links-based 2-link-typed IO-process-OS (BaL-wpOS, or Task2 waOS);

(2) Each mid-traffic-level TmP is installed with Task2 workgroup-links-based 2-link-typed IO-process-OS, (MtL-wpOS, or Task2 wtOS);

(3) Each top-control-level TcP is installed with Task2 workgroup-links-based 3-link-typed RR/PP (i.e., external network-linked feedback-control Receive-Return/external workgroup-linked feedback-control Pull-Push)-operation-OS, (TcL-woOS, or Task2 wcOS).

Text-6.2: SAT-m2: 3-Level Workgroup OS-Based Workgroup Programs for wG1.8 EPU

Based on the wG1.8 multi-3D-Fractal2 Task2 EPU(XP), as illustrated in FIG. 24, and the established wG1.8 Task operation SAT-m2 (SPM), there are 3-level workgroup-OS-based workgroup-program installing procedures that need to be completed.

(1) Each base-attribute-level TaP is installed with Task2 waOS-based IO-process programs (BaL-wPP, or Task2 waPP);

(2) Each mid-traffic-level TmP is installed with Task2 wtOS-based IO-process programs (MtL-wPP, or Task2 wtPP);

(3) Each top-control-level TcP is installed with Task2 wcOS-based RR/PP-operation programs (TcL-wOP, or Task2 wcOP).

Text-6.3 SAT-m3: 3-Level Workgroup-Program-Based Workgroup-Libraries for wG1.8 EPU Based on the wG1.8 multi-3D-Fractal2 Task2 EPU(XP), as illustrated in FIG. 24, and the established wG1.8 Task operation SAT-m3 (SSM), there are 3-level workgroup-program-based workgroup-storage installing procedures that need to be completed.

(1) Each base-attribute-Level TaP is installed with Task2 workgroup-attribute process-program (waPP)-based Processing Libraries (Task2 waPL1-2) for logging workgroup-attribute activities;

(2) Each mid-traffic-level TmP is installed with Task2 workgroup-traffic process-program (wtPP)-based Processing Libraries (Task2 wtPL1-4) for logging workgroup-traffic activities;

(3) Each top-control-level TcP is installed with Task2 workgroup-control operation-program (wcOP)-based Operation Libraries (Task2 wcOL1-3) for real-time logging workgroup-"feedback check&control" operations and additional WL2-TeamServer-based workgroup-control Management Library shared with its paired member for real-time managing Task2-Q&A PS-operation events with reports.

In addition, all the Task2 workgroup-linked data-storages can have the backup processes via internal-linked disk/tape devices that serve as the back-up data-repositories.

Text-6.4: Task-Operation SAT for wG1.8 EPU(XP)

Once every base-level TaP is installed with waOS/waPPs/waPLs, every mid-level TmP is installed with wtOS/wtPPs/wtPLs and every top-level TcP is installed with wcOS/wcOPs/wcOLs/wcML based on wG1.stage8 Task operation SAT-(m1,m2,m3), the real-time dynamic internal and external stakeholders' concurrent fine-grained-Q&A problem-solving (PS)-operations can be completed by integrating 3-level workgroup TeamProcessors' "software capabilities" to carry out 3 workgroup operations and 10 workgroup processes that control all the 3-level internal processes.

Moreover, each TcP's workgroup control operation libraries and management library can be maintained by workgroup-control operation and management programs (wcOP and wcMP) for real-time self-inserting, self-updating, self-deleting and self-managing each workgroup-control RR/PP-operation event based on 6W1H (when, where, who, what, which-TaPs, why and how) aspects of contextual directories, providing aspect-oriented current best experiences to support the next real-time dynamic Task1 and Task2 PS-operation event-generation with multi-3D Fractal2-parameter Abstract-Algebra 4-operator-based field-level complex knowledge for concurrently solving internal and external stakeholders' production solution-oriented and knowledge-oriented problems.

Text-6.5: Multi-3D Fractal2 (Task2-Q&A) wEntities Based on wG1.8 HAT and SAT

Therefore, by carrying out wG1.stage8 Task operation HAT-(m1,m2,m3,m4), real-time growing 3-level-hierarchical hardware EPU(XP) structure can be created with physical boundary to separate internal-linked region from external-network/workgroup-linked region/space, and further by enhancing EPU(XP) with wG1.stage8 Task operation SAT-(m1,m2,m3), a Task2 multi-3D-Fractal2 (knowledge)-wEntity is generated with real-time growing and real-time improving Q&A knowledge-oriented fine-grained PS-operation capability domain (i.e., multi-3D-complex/secure knowledge domain), which can real-time dynamically, concurrently and securely solve the production-knowledge-oriented problems for the internal stakeholders to real-time generate the next Task1 R&R multi-3D-Fractal1 solution-oriented fine-grained PS-operations as well as for the external collaborative stakeholders via Task2 Q&A multi-3D-Fractal2 knowledge-oriented fine-grained PS-operations in natural languages.

5.1.6 wG1 Task Operation wSystem Disciplines (wG1-TSDs)

The fourth endeavor to carry out wECP in the third period along the first workgroup evolutionary generation timeline (wG1) is to establish the workgroup production Task operation wSystem Disciplines (wG1-TSDs) of wSD3 of wECP.

In this endeavor, there are 4 important topics that need to be elaborated upon, so that wG1-TSDs can be methodologically established based on the created 8-staged Task wEntities along the workgroup evolutionary timeline, generating 8-staged Task operation wSystems of wSD3 of wECP. They are:

Topic-I: wG1.stage(n) Task operation wSystem Disciplines (wG1 TSDs of wSD3);
Topic-II: Task(1,2).stage(n) Operation systems;
Topic-III: wG1.stage(n) Task FS-operation System Disciplines;
Topic-IV: Task(1,2).stage(n) FS-operation systems.

After the first two (2) topical disclosures (i.e., Topic-I and Topic-II), it can be concluded that wG1 Task operation System Disciplines (TSDs), which comprises hardware and software system methods in design-science, develop-technology and deploy-engineering based on 8-staged Task operation wEntities for generating 8-staged Task operation wSystems in accommodating real-world various production environments. And these Task operation wSystems are created for smaller real-world production environments where fail-over/fail-safe is not an issue, but they are still equipped with real time self-growing and self-improving concurrent problem solving Task1-R&R solution/Task2-Q&A knowledge system domains that can achieve real-time concurrent fine-grained PS for all the internal and external stakeholders.

Moreover, if the last two (2) topics are to be disclosed, it can be concluded that wG1 Task Fail-Safe (FS)-operation System Disciplines (FS-TSDs), which comprises FS-hardware and software system methods in design-science, develop-technology and deploy-engineering based on 8-staged Task FS-operation wEntities for generating 8-staged Task operation wSystems in accommodating real-world various fail-safe production environments.

It is impossible to combine Task operation SAT and Task FS-operation SAT together in one disclosure, let alone to include Task operation wSystem Disciplines and Task FS-operation wSystem Disciplines. Therefore, it is only proper that these 4 topics will be disclosed fully in the future applications after the upcoming application for Task FS-operation SAT.

5.1.7 the Summary on Generic Task Operation wEntities

On the creation of wG1 generic Task operation wEntities based on wECP instead of nECP, it is ideal to (1) compare nECP with wECP to recognize the reasons why and (2) find out the right course of action to complete the inevitable nECP shift to wECP, based on the must-have upgrades.

As defined in ECP that contains EP, TF and SD, Node-computing based ECP (i.e., nECP), has 3 evolutionary periods and can be expressed by the following format: nECP=(nEP1+nTF1+nSD1)+(nEP2+nTF2+nSD2)+(nEP3+nTF3+nSD3), which can be illustrated in details via the following table.

| nECP | | |
|---|---|---|
| First-period | | |
| | nEP1 = nEA1-EAMs | |
| | nTF1 = nHAT1 + nSAT1 | |
| | (nSD1) = uSD1.(1-3) | |
| Second Period | | |
| | nEP2 = nEA2-EAMs | |
| | nTF2 = nHAT2 + nSAT2 | |
| | (nSD2) = uSD2.(1-3) | (optional development) |
| Third Period | | |
| nG1.stage(n) | nEP3= | |
| nG1.stage(n = 1, 3) | nTF3 = nHAT3 + nSAT3 | |
| nG1.stage(n = 1, 3) | nSD3 = nG1-uSD3.(1-3) | |
| No nG2 | No | |

As in the first node-evolutionary period:
(1) nEP1=nEA1-EAMin defining nCCs (Boolean, Logic Gates) and nCMs,
(2) nTF1=nHAT1+nSAT1 in creating nCMs (combination-logic, memory-logic, control-logic/CPU=Gate Arrays).

As in the second node-evolutionary period:
(1) nEP2=nEA2-EAMs in defining von Neumann (node core structure),
(2) nTF2=nHAT2+nSAT2 in creating the first DOS-nEntities,
(3) nSD2=nSD2.(1-3) in generating the first node-core (science, technology, engineering) Application systems.

As in the current third node-evolutionary period:

(1) nEP3=nG1.stage(n) nEA3-EAMs in defining (Algorithms, DOS, OS2), (2) nTF3=nG1.stage(n) HAT and SAT in creating DOS, OS2 nEntities, (3) nSD3=nG1.stage(n) uSD3.(1-3) in generating (science, technology, engineering) DOS/WinTel-like application systems, (4) zSD3.3 (zone-network engineering) in generating zone-based WinTel-like Application-Infrastructure Systems and (5) cSD3.3 (cloud-network engineering) in generating cloud-based WinTel-like Application infrastructure Systems.

Workgroup-computing-based ECP (i.e., wECP), has three evolutionary periods and can be expressed by the following format: wECP=[wEP1+wTF1+wSD1]+[wEP2+wTF2+wSD2]+[wEP3+wTF3+wSD3], which can be illustrated in details via the following table.

| wECP | | |
|---|---|---|
| First-period | | |
| | wEP1 = wEA1-EAMs | |
| | wTF1 = wHAT1 + (wSAT1) | |
| | (wSD1) | (wSD1 is optional, due to wSD3 can generate more sophisticated workgroup-computing systems |
| Second Period | | |
| | wEP2 = wEA2-EAMs | |
| | wTF2 = wHAT2 + (wSAT2) | |
| | (wSD2) | (wSD2 is optional, due to wSD3 is more sophisticated), |
| Third Period | | |
| wG1.Task | wEP3 = wEA3-EAMs | |
| wG1.Task | wTF3 = wHAT3 + wSAT3 | |
| wG1.Task) | wSD3 = uSD3.(1-3) + (zSD3.3) + (cSD3.3) | |
| wG2.Job | wEP3/wTF3/wSD3 | |
| wG3.Case | wEP3/wTF3/wSD3 | |
| wG4.Contract | wEP3/wTF3/wSD3 | |
| wG5.Business Services | wEP3/wTF3/wSD3 | |
| wG6.User Services | wEP3/wTF3/wSD3 | |
| wG7.Individual Services | wEP3/wTF3/wSD3 | |

As in the first workgroup evolutionary period:

(1) wEP1=wEA1-EAMs;

(2) wTF1=wHAT1+wSAT1 for creating Fail-over aWSAs, mWSAs and cWSAs.

As in the second workgroup evolutionary period:

(1) wEP2 in defining the first wHCSs and wEntities;

(2) wTF2=wHAT2 in creating the first wHCS based on 6 wBBBs and wSAT2 in creating the first wEntity.

(3) wSD2=wSD2(1-3) in generating the first (design-science, develop-technology, deploy-engineering) workgroup Systems.

As in the current third workgroup evolutionary period starting with the first workgroup-production generation (wG1):

(1) wG1-wEP3=wG1 6 EAMs in defining Task wHCSs and Task wEntities, (2) wG1-wTF3=wG1.stage(n) HAT+SAT in creating Task wEntities, (3) wG1-wSD3=(a) wG1-stage(n) uSD3.(1-3) in generating the first generation unitary-core Task (1-science/2-technology/3-engineering) Operation wSystems, (b) zSD3.3 (application-engineering) in generating zone-network-based Task-infrastructure Systems and (c) cSD3.3 (application engineering) in generating cloud-network-based Task-infrastructure Systems.

It can be concluded that due to its deficiency in Hardware Architecture Theories and Software Architecture Theorems, nECP cannot evolve into more sophisticated node-computing structures with better capabilities. After analyzing the comparison tables, it is only natural to come up with the right course of action that nECP has to shift to wECP based on the following five (5) must-have upgrades.

(1) Upgrade the node-computing philosophical thinking based on "processing-based machine-centered" time-sharing coarse-grained hammer/nails problem solving with processes-feedback-control-based operation-workgroup systems to support stakeholder-centered concurrent fine-grained solution-domain problem solving.

(2) Upgrade all the node-computing processing-structure-based HATs from node-cores and node-hubs into workgroup-linked Hierarchical core structure-based HATs.

(3) Upgrade all the node-computing processing-capability-based SATs from processing OSs, processing program and processing databases into workgroup-computing operation-capability-based workgroup operation-OSs, workgroup operation programs and workgroup operation and management libraries.

(4) Upgrade all the node-computing OSI-7-based network-processing systems into workgroup-computing WSI-7-based workgroup operation system Interconnect for eliminating network-oriented security issues.

(5) Upgrade all the node-computing Application infrastructure systems via application hardware-autophagy and application-software-nullification into integrable fail-over workgroup components to contribute to the workgroup-computing 7-generation evolutions.

As stated earlier, in order to computerize the ideal 3-level conveyer-integrated workgroups and manager-workgroups in a fail-safe production environment, it is imperative to develop wG1 Task FS-operation SAT for enhancing 8-evolutionary stage-based FPU(FP) of wHCSs and the details will be disclosed in the upcoming application.

Once the wG1 Task FS-operation SAT is developed, Task FS-operation wEntities are created. Then Task FS-operation wSystems can be developed based on wG1.stage(n) Task FS-operation System Disciplines and the details will be disclosed in the future applications.

Furthermore, the Section 5.1 has discussed the first workgroup production generation (wG1) in the third evolutionary period of wECP as to how to establish HAT and SAT to create all the 8-stage evolved wG1 Task operation wEntities, which can be further based upon in generating real-world class-1 unitary-core-based Task operation wSystems. Since class-2 zone-network-based and class-3 cloud-network-based multiple Task-Infrastructure Systems cannot accommodate the next-level multi-production diverse-assembly problem domains, just as the nECP Application-Infrastructure Systems (AIS) cannot accommodate multi-function complex-production problem domains, the only way to tackle multi-production diverse-assembly problem domains is to use every wG1-evolved Task-wEntity as the fail-over wCM to construct the next workgroup-assembly generation (wG2)-based 3-level six (6) workgroup Basic Building Blocks (wBBB) and start the whole wG2 evolutionary processes of wECP from wG2-EP3/EAMs and wG2-TF3/HAT&SAT to wG2-SD3, all of which will be disclosed in Section 5.2 in the future applications that will be focusing on the workgroup-assembly Job (FS)-operation wEntities and Job (F S)-operation wSystems.

EXAMPLES

Various aspects of the subject matter described herein are set out in the following numbered examples:

Example 1. A computing system comprises an attribute processing unit configured to run an attribute processing operating system (OS), an attribute processing program, and attribute processing libraries; a traffic processing unit configured to run a traffic processing OS, a traffic processing program, and traffic processing libraries; and a control processing unit configured to run a control processing OS, a control processing program, and control processing libraries. The control processing unit is coupled to the attribute processing unit through the traffic processing unit. The control processing unit is configured to: receive an input; convert the input into a machine language; transmit the machine language to the attribute processing unit through the traffic processing unit for processing; receive a processing result from the attribute processing unit through the traffic processing unit; and convert the processing result to an output corresponding to the input.

Example 2. The computing system of Example 1, where the attribute processing OS, the traffic processing OS, and the control processing OS are independent from each other.

Example 3. The computing system of Examples 1 or 2, where the control processing program is configured to control the traffic processing program and the attribute processing program.

Example 4. The computing system of Example 1-3, where each of the attribute processing OS and the traffic processing OS, and the control processing OS includes: a system call interface for interfacing with user level libraries; a network manager coupled to the system call interface; a file manager interfacing with a file system and coupled to the system call interface; a device manager including device drivers; a process manager configured to schedule processes; and a memory manager configured to direct program contents to buffers.

Example 5. The computing system of Examples 1-4, where the control processing OS includes: a meso-operation manager configured to compile menu term requirements from a main operation manager into micro-instruction processing programs; a meta-operation manager configured to compile a processing result of the micro-instruction processing programs into menu terms; and the main operation manager for linking the meso-operation manager and the meta-operation manager. The main operation manager is configured to: translate a natural-language-based intentional requirement into the menu term requirements; and translate the menu terms from the meta-operation manager into a natural language based on a reply statement.

Example 6. The computing system of Examples 1-5, where the micro-instruction processing programs comprise a first plurality of manual-workload forms having a plurality of empty data fields.

Example 7. The computing system of Examples 1-6, where the processing result of the micro-instruction processing programs comprises a second plurality of manual-workload forms.

The second plurality of manual-workload forms are related to the first plurality of manual-workload forms. Data fields of the second plurality of manual-workload forms that correspond to the empty data fields of the first plurality of manual-workload forms are completed.

Example 8. The computing system of Example 1-7, where the attribute processing program includes: a first input module configured to pull template packages from the traffic processing unit; a first attribute processing module configured to process data and instructions received from the first input module; and a first output module configured to receive data from the first attribute processing module and push the received data to the traffic processing unit.

Example 9. The computing system of Examples 1-8, where the attribute processing program includes: a micro-instruction library configured to receive data from an output handler of the first input module and provide data to an input handler of the first output module for logging an internal record of the attribute processing program; and a macro-keyword library configured to receive data from an output handler of the first output module and provide data to an input handler of the first input module for logging event-timestamp-based result experiences from the attribute processing program.

Example 10. The computing system of Examples 1-9, where the first attribute processing module comprises a plurality of attribute processing modules. The data and instructions received from the first input module are processed by the plurality of attribute processing modules sequentially from a first-in-line attribute processing module of the plurality of attribute processing modules to a last-in-line attribute processing module of the plurality of attribute processing modules.

Example 11. The computing system of Examples 1-10, where the attribute processing program uses a menu-term computing language.

Example 12. The computing system of Examples 1-11, where the traffic processing program includes: a request conveyer module configured to pass data and instructions from the control processing unit to the attribute processing unit; and a response conveyer module configured to pass data from the attribute processing unit to the control processing unit.

Example 13. The computing system of Examples 1-12, where each of the request conveyer module and the response conveyer module includes an input handler and an output handler.

Example 14. The computing system of Examples 1-13, where the traffic processing program further includes: a bottom-up activity workgroup-traffic library configured to receive data from the output handler of the response conveyer module and provide data to the input handler of the request conveyer module; and a top-down activity workgroup-traffic library configured to receive data from the output handler of the request conveyer module and provide data to the input handler of the response conveyer module.

Example 15. The computing system of Examples 1-14, where the control processing program includes: a main operation program configured to receive the input and output a response corresponding to the input; a meso compiler-type program configured to perform a top-down operation; and a meta compiler-type program configured to perform a bottom-up operation.

Example 16. The computing system of Examples 1-15, where the main operation program includes: an input handler configured to receive the input; an output handler configured to output the response; and a buffering program configured to store information relating to the input from the input handler for corresponding an output from the output handler to the input.

Example 17. The computing system of Examples 1-16, where the information includes a unique identification code for the input, and the unique identification code is used to check that the input and the response are for a same user.

Example 18. The computing system of Examples 1-17, where the control processing program further includes a buffering program configured to store information relating to an input from the meso compiler-type program for corresponding an output from the meta compiler-type program to the input.

Example 19. The computing system of Examples 1-18, where the attribute processing unit is configured to compare the input with data stored in the attribute processing libraries in determining a processing operation for the input.

Example 20. The computing system of Examples 1-19, where the attribute processing unit is configured to update the attribute processing libraries after a processing operation of the input.

Example 21. The computing system of Examples 1-20, where the control processing unit is configured to: compare the input with data stored in the control processing libraries; and based on the comparison, determine a module in the attribute process unit to which the input will be assigned.

Example 22. The computing system of Examples 1-21, where the control processing unit is configured to update the control processing libraries after converting a processing result to an output.

Example 23. The computing system of Examples 1-22, where the attribute processing libraries include: a micro-instruction workgroup library; and a macro-keyword workgroup library.

Example 24. The computing system of Examples 1-23, where the traffic processing libraries include: a bottom-up activity workgroup library; and a top-down activity workgroup library.

Example 25. The computing system of Examples 1-24, where the control processing libraries include: a domain-sentential-statement operation library; a menu-term-script operation library; and a manual-macro-form operation library.

Example 26. The computing system of Examples 1-25, where the control processing unit comprises a primary control processor and a secondary control processor.

Example 27. A computer system comprises: a first processor receiving a request and transforming the request into an operation instruction; a first buffer storing a first identification corresponding to the request; and a second processor conveying the operation instruction to a third processor. The first processor uses the first identification to identify a reply corresponding to the user request. The third processor executes the operation instruction and generates the reply accordingly. The reply is conveyed back to the first processor by the second processor.

Example 28. The computer system of Example 27, where the request is in a sentential form.

Example 29. The computer system of Examples 27-28, where the transforming includes interpreting the request into a first plurality of predefined menu-solution terms.

Example 30. The computer system of Examples 27-29, where the transforming further comprises generating a second identification corresponding to the first plurality of predefined menu-solution terms and storing the second identification in a second buffer.

Example 31. The computer system of Examples 27-30, where the reply is further processed by the first processor which includes interpreting a second plurality of predefined menu-solution terms back to a sentential form.

Example 32. The computer system of Examples 27-31, where the interpreting the second plurality of predefined menu-solution terms back to the sentential form includes checking the second identification in the second buffer for identifying the second plurality of predefined menu-solution terms being corresponding to the first plurality of predefined menu-solution terms.

Example 33. The computer system of Examples 27-32, where the reply in the sentential form is stored in a sentential library.

Example 34. The computer system of Examples 27-33, where the first processor assesses contents in the sentential library when interpreting the request into the first plurality of predefined menu-solution terms.

Example 35. The computer system of Examples 27-34, where the second plurality of predefined menu-solution terms are stored in a term library.

Example 36. The computer system of Examples 27-35, where the transforming further comprises translating the first plurality of predefined menu-solution terms into a predefined first work-flow manual-form with a plurality of data fields.

Example 37. The computer system of Examples 27-36, where at least one of the newly translated plurality of data fields is empty.

Example 38. The computer system of Examples 27-37, where the plurality of data fields include a conditional data field and an operational data field.

Example 39. The computer system of Examples 27-38, where the first work-flow manual-form is stored in a form library.

Example 40. The computer system of Examples 27-39, where the first processor generates a delivery instruction to select the third processor for processing the operation instruction based on contents of the form library.

Example 41. The computer system of Examples 27-40, where the reply is further processed by the first processor which includes translating from a second work-flow manual-form back to the second plurality of predefined menu-solution terms.

Example 42. The computer system of Examples 27-41, where the second plurality of predefined menu-solution terms is stored in the term library.

Example 43. The computer system of Examples 27-42, where the first processor translates the first plurality of predefined menu-solution terms into the first work-flow manual-form based on contents of the term library.

Example 44. The computer system of Examples 27-43, further comprises an event-library management system that collects requests and corresponding replies.

Example 45. The computer system of Examples 27-44, where the event-library management system provides a current best solution to a request based on past events.

Example 46. The computer system of Examples 27-45 further comprises a supervision controller configured to issue query to and receive answer from the event-library management system for supervising the current best solution.

Example 47. The computer system of Examples 27-46, further comprises a routine-document based library storing production-based routine documents.

Example 48. The computer system of Examples 27-47, further comprises a result-document-based library storing result documents obtained by following a production-based routine.

Example 49. The computer system of Examples 27-48, further comprises a report-based library storing production reports on routines and respective results.

Example 50. A method comprises: receiving, by a control processing unit configured to run a control processing OS, a control processing program, and control processing libraries, an input, where the control processing unit is coupled to an attribute processing unit through a traffic processing unit, where the attribute processing unit is configured to run an attribute processing operating system (OS), an attribute processing program, and attribute processing libraries, and where the traffic processing unit is configured to run a traffic processing OS, a traffic processing program, and traffic processing libraries; converting, by the control processing unit, the input into a machine language; transmitting, by the control processing unit, the machine language to the attribute processing unit through the traffic processing unit for processing; receiving, by the control processing unit, a processing result from the attribute processing unit through the traffic processing unit; and converting, by the control processing unit, the processing result to an output corresponding to the input.

Example 51. The method of Example 50, where the attribute processing OS, the traffic processing OS, and the control processing OS are independent from each other.

Example 52. The method of Examples 50-51, where the control processing program is configured to control the traffic processing program and the attribute processing program.

Example 53. The method of Examples 50-52, where each of the attribute processing OS and the traffic processing OS, and the control processing OS includes: a system call interface for interfacing with user level libraries; a network manager coupled to the system call interface; a file manager interfacing with a file system and coupled to the system call interface; a device manager including device drivers; a process manager configured to schedule processes; and a memory manager configured to direct program contents to buffers.

Example 54. The method of Examples 50-53 further comprises: compiling, by a meso-operation manager of the control processing OS, menu term requirements from a main operation manager of the control processing OS into micro-instruction processing programs; compiling, by a meta-operation manager of the control processing OS, a processing result of the micro-instruction processing programs into menu terms; and translating, by the main operation manager for linking the meso-operation manager and the meta-operation manager, a natural-language-based intentional requirement into the menu term requirements; and translating, by the main operation manager, the menu terms from the meta-operation manager into a natural language based on a reply statement.

Example 55. The method of Examples 50-54, where the micro-instruction processing programs comprise a first plurality of manual-workload forms having a plurality of empty data fields.

Example 56. The method of Examples 50-55, where the processing result of the micro-instruction processing programs comprises a second plurality of manual-workload forms. The second plurality of manual-workload forms are related to the first plurality of manual-workload forms. Data fields of the second plurality of manual-workload forms that correspond to the empty data fields of the first plurality of manual-workload forms are completed.

Example 57. The method of Examples 50-56, further comprises: pulling, by a first input module of attribute processing program, template packages from the traffic processing unit; processing, by a first attribute processing module of the attribute processing program, data and instructions received from the first input module; and receiving, by a first output module of the attribute processing program, data from the first attribute processing module and pushing the received data to the traffic processing unit.

Example 58. The method of Examples 50-57, further comprises: receiving, by a micro-instruction library of the attribute processing program, data from an output handler of the first input module and providing data to an input handler of the first output module for logging an internal record of the attribute processing program; and receiving, by a macro-keyword library of the attribute processing program, data from an output handler of the first output module and providing data to an input handler of the first input module for logging event-timestamp-based result experiences from the attribute processing program.

Example 59. The method of Examples 50-58, where the first attribute processing module comprises a plurality of attribute processing modules. The data and instructions received from the first input module are processed by the plurality of attribute processing modules sequentially from a first-in-line attribute processing module of the plurality of attribute processing modules to a last-in-line attribute processing module of the plurality of attribute processing modules.

Example 60. The method of Examples 50-59, where the attribute processing program uses a menu-term computing language.

Example 61. The method of Examples 50-60, further comprises: passing, by a request conveyer module of the traffic processing program, data and instructions from the control processing unit to the attribute processing unit; and passing, by a response conveyer module of the traffic processing program, data from the attribute processing unit to the control processing unit.

Example 62. The method of Examples 50-61, where each of the request conveyer module and the response conveyer module includes an input handler and an output handler.

Example 63. The method of Examples 50-62, further comprises where the traffic processing program further includes: receiving, by a bottom-up activity workgroup-traffic library of the traffic processing program, data from the output handler of the response conveyer module and providing data to the input handler of the request conveyer module; and receiving, by a top-down activity workgroup-traffic library of the traffic processing program, data from the output handler of the request conveyer module and providing data to the input handler of the response conveyer module.

Example 64. The method of Examples 50-63 further comprises: receiving, by a main operation program of the control processing program, the input and output a response corresponding to the input; performing, by a meso compiler-type program of the control processing program, a top-down operation; and performing, by a meta compiler-type program of the control processing program, a bottom-up operation.

Example 65. The method of Examples 50-64, further comprises: receiving, by an input handler of the main operation program, the input; outputting, by an output handler of the main operation program, the response; and storing, by a buffering program of the main operation program, information relating to the input from the input handler for corresponding an output from the output handler to the input.

Example 66. The method of Examples 50-65, where the information includes unique identification code for the input, and the unique identification code is used to check that the input and the response are for a same user.

Example 67. The method of Examples 50-66 further comprises storing, by a buffering program of the control processing program, information relating to an input from the meso compiler-type program for corresponding an output from the meta compiler-type program to the input.

Example 68. The method of Examples 50-67 further comprises comparing, by the attribute processing unit, the input with data stored in the attribute processing libraries in determining a processing operation for the input.

Example 69. The method of Examples 50-68 further comprises updating, by the attribute processing unit, the attribute processing libraries after a processing operation of the input.

Example 70. The method of Examples 50-69 further comprises: comparing, by the control processing unit, the input with data stored in the control processing libraries; and based on the comparison, determining, by the control processing unit, a module in the attribute process unit to which the input will be assigned.

Example 71. The method of Examples 50-70, further comprises updating, by the control processing unit, the control processing libraries after converting a processing result to an output.

Example 72. The method of Examples 50-71, where the attribute processing libraries include: a micro-instruction workgroup library; and a macro-keyword workgroup library.

Example 73. The method of Examples 50-72, where the traffic processing libraries include: a bottom-up activity workgroup library; and a top-down activity workgroup library.

Example 74. The method of Examples 50-73, where the control processing libraries include: a domain-sentential-statement operation library; a menu-term-script operation library; and a manual-macro-form operation library.

Example 75. The method of Examples 50-74, where the control processing unit comprises a primary control processor and a secondary control processor.

Example 76. A method comprises: receiving, by a first processor, a request; transforming, by the first processor, the request into an operation instruction; storing, by the first processor, a first identification corresponding to the request in a first buffer, where the first processor uses the first identification to identify a reply corresponding to the request; conveying, by a second processor, the operation instruction to a third processor; executing, by the third processor, the operation instruction; generating, by the third processor, the reply accordingly; and conveying, by the second processor, the reply back to the first processor.

Example 77. The method of Example 76, where the request is in a sentential form.

Example 78. The method of Examples 76-77, where the transforming includes interpreting the request into a first plurality of predefined menu-solution terms.

Example 79. The method of Examples 76-78, where the transforming further comprises generating a second identification corresponding to the first plurality of predefined menu-solution terms and storing the second identification in a second buffer.

Example 80. The method of Examples 76-79, where the reply is further processed by the first processor which includes interpreting a second plurality of predefined menu-solution terms back to a sentential form.

Example 81. The method of Examples 76-80, where the interpreting the second plurality of predefined menu-solution terms back to the sentential form includes checking the second identification in the second buffer for identifying the second plurality of predefined menu-solution terms being corresponding to the first plurality of predefined menu-solution terms.

Example 82. The method of Examples 76-81, where the reply in the sentential form is stored in a sentential library.

Example 83. The method of Examples 76-82, further comprises assessing, by the first processor, contents in the sentential library when interpreting the request into the first plurality of predefined menu-solution terms.

Example 84. The method of Examples 76-83, where the second plurality of predefined menu-solution terms are stored in a term library.

Example 85. The method of Examples 76-84, where the transforming further comprises translating the first plurality of predefined menu-solution terms into a predefined first work-flow manual-form with a plurality of data fields.

Example 86. The method of Examples 76-85, where at least one of the newly translated plurality of data fields is empty.

Example 87. The method of Examples 76-86, where the plurality of data fields include a conditional data field and an operational data field.

Example 88. The method of Examples 76-87, where the first work-flow manual-form is stored in a form library.

Example 89. The method of Examples 76-88, where generating, by the first processor, a delivery instruction to select the third processor for processing the operation instruction based on contents of the form library.

Example 90. The method of Examples 76-89, where the reply is further processed by the first processor which includes translating from a second work-flow manual-form back to the second plurality of predefined menu-solution terms.

Example 91. The method of Examples 76-90, where the second plurality of predefined menu-solution terms is stored in the term library.

Example 92. The method of Examples 76-91, where the first processor translates the first plurality of predefined menu-solution terms into the first work-flow manual-form based on contents of the term library.

Example 93. The method of Examples 76-92, further comprises collecting, by an event-library management system, requests and corresponding replies.

Example 94. The method of Examples 76-93, further comprises providing, by the event-library management system, a current best solution to a request based on past events.

Example 95. The method of Examples 76-94, further comprises issuing, by a supervision controller, query to and receiving answer from the event-library management system for supervising the current best solution.

Example 96. The method of Examples 76-95, further comprises storing, by a routine-document based library, production-based routine documents.

Example 97. The method of Examples 76-96, further comprises storing, by a result-document-based library, result documents obtained by following a production-based routine.

Example 98. The method of Examples 76-97, further comprises storing, by a report-based library, production reports on routines and respective results.

The present application generally discusses how to innovate "the first 3-level workgroup hierarchical core structures (wHCS)", based on the workgroup-computing hardware evolutionary architecture methods, which involve not only how to create workgroup-linked components and how to construct array-expandable workgroup basic building blocks (wBBB), but also how to use array-expandable wBBBs to architect a plurality of 3-level-stage-expandable wHCSs.

For example, referring to FIGS. 1 to 10, the present disclosure discusses the importance of computing evolution. The current node-computing has stopped evolving due to its "one and only main-memory" structure and the limitation of main-memory time-sharing/non-concurrent hardware architecture methods, creating "multi-CPU-core parallel-processing"-based node-computing hardware structures that cannot repeatedly/iteratively be used as "concurrent expandable basic building blocks" to evolve further. Therefore, multi-node-integrated workgroup-computing hardware evolutionary architecture methods are vital to enable "workgroup computing evolution", creating bigger and more-sophisticated workgroup computing systems to establish the ideal fine-grained user-proactive service-oriented Internet, where current node-computing systems can only provide with coarse-grained user-captive services. Even worse, node-computing systems incur unsolvable security and privacy issues, as stated in the description of the related art section above.

FIG. 11 and the related descriptions focus on a self-managing fail-over expandable Workgroup Server Array (WSA), defining workgroup-Ethernet-link (w1), workgroup-server-link (w2) and workgroup-peer-to-peer link (w3) and creating TeamProcessors, TeamPanels, TeamServers. The first "fail-over-3 based" workgroup computing module (wCM), i.e., "workgroup server array" (WSA) is also described in U.S. patent application Ser. No. 09/744,194, entitled "SYSTEM AND METHOD FOR IMPLEMENTING WORKGROUP SERVER ARRAY", by Ivan Chung-Shung Hwang, filed in May 17, 2000, U.S. Pat. No. 6,715,100, Date of Patent: Mar. 30, 2004.

FIGS. 12(*a*) to 14(*b*) and the related descriptions focus on how to develop 3-level workgroup components (TaP/TaPm, TmP/TmPm, TcP/TcPm) and workgroup expandable basic-building-blocks (BAB/BFB, MMB/MFB, TCB/TFB), based on four workgroup-links. For example, workgroup-link-1 (WL1, workgroup-aggregation link) may be w1-Ethernet for workgroup aggregation control using Workgroup Ethernet Controller) (WEC1), workgroup-link-2 (WL2, workgroup integration link) may be w2/w3 (directional/bi-directional) USB for workgroup integration control using TeamServers, workgroup-link-3 (WL3, workgroup aggregation fail-over link) may be RVU (=RAP+aV+USB) for workgroup aggregation failover control using TeamPanels, and workgroup-link-4 (WL4, workgroup integration-fail-safe link) may be dual F 1+F2 Ethernet for workgroup integration failsafe control using Workgroup Ethernet Controller2 (WEC2).

FIG. 15 and the related descriptions relate to an exemplary embodiment of the first 6 workgroup Basic-Building-Block (wBBB)-based (fail-safe) workgroup-Entity (wEntity), and FIG. 16 and the related descriptions relate to an exemplary embodiment of 6-wBBB-based Workgroup-computing Evolutionary Processes, creating bigger and better fail-safe wEntities. FIGS. 15 and 16, and related descriptions generally show the first 3-level workgroup Hierarchical Core Structure (wHCS) based on 6 expandable wBBBs and the evolvable wHCSs along the workgroup evolutionary timeline.

With respect to FIGS. 17 to 24, the present disclosure provides descriptions related to the workgroup-computing evolutions to accommodate the service-oriented Internet's problem domains.

Some of the features that may be used for the establishment of the workgroup-link-based evolutionary structure will be discussed in detail below.

First: 4-workgroup-link-based (hardware) node-computing upgrade in creating workgroup components The present disclosure discuss the four workgroup links for (hardware) upgrading node-computing structures with workgroup member/manager components (TaP/TaPm, TmP/TmPm, TcP/TcPm) and details of these features can be summarized as follows.

4 Workgroup Links (WL), as illustrated in FIGS. 12*a* and 15

| WL1 | Workgroup-Link-1 (WL1 = workgroup-aggregation link) | w1-Ethernet for workgroup aggregation control |
| WL2 | Workgroup-Link-2 (WL2 = workgroup integration link) | w2/w3 (directional/bi-directional) USB for workgroup integration control |
| WL3 | Workgroup-Link-3 (WL3 = workgroup aggregation fail-over link) | RVU (=RAP + aV + USB) for workgroup aggregation failover control |
| WL4 | Workgroup-Link-4 (WL4 = workgroup integration-fail-safe link) | dual F1 + F2 Ethernet for workgroup integration failsafe control |

Workgroup member components: (1) Base-attribute-level (WL3/WL2/WL1-based) TaP, as illustrated in FIG. 12*a,b*; (2) Mid-traffic level (WL3/WL2/WL1-based) TmP, as illustrated in FIG. 13*a,b,c,d,e,f,g,h*; (3) Top-control-level (WL3/WL2/WL1-based) TcP, equipped with External Links (EL, N1 Ethernet), as illustrated in FIG. 14*a,b*.

Workgroup manager components: (1) Base-attribute-level (WL3 &WL4-based) TaPm-pair, as illustrated in FIG. 12*a,b*; (2) Mid-traffic-level (WL3 &WL4-based) TmPm-pair, as illustrated by FIG. 13a,b,c,d,e,f,g,h; and (3) Top-control-level (WL3 &WL4-based) TcPm-pair, as illustrated in FIG. 14a,b.

Second: Four workgroup-link-based Team devices (Team Switch, TeamServer, TeamPanel, TeamRoute)

| | | |
|---|---|---|
| WL1-device | Workgroup Ethernet Controller1 (WEC1 = TeamSwitch) | Item #5 in related drawings |
| WL2-device | Public-TeamServers (multi-sharing, Bulletin Board type) | Item #25 |
| | Private-TeamServers (mailbox type) | Item #35 |
| WL3-device | TeamPanels (TaL1, TaL2, TmL1, TmL2, TcL1, TcL2) | Item #7, 17, 27, 37, 47, 57 |
| WL4-device | Workgroup Ethernet Control2 (WEC2 = TeamRoute) | Item #45 |

Third: Workgroup Basic-Building-Blocks (BBBs)

The workgroup Team-components and workgroup Team-devices may be used to create expandable workgroup BBBs for 3 different levels of control-traffic-attribute functionality.

The workgroup member 3 BBBs may include WL-based workgroup production components and WL-based devices, and these components and devices may be connected with WL1 and WL2. For example, the base-attribute block, mid-memory block, and the top control block may be created and connected in the following ways:

(1) Connecting Array of (WL1/WL2/WL3) TaPs for workgroup horizontal attribute-aggregation with WL1-TeamSwitch devices via WL1, creating Base-Attribute Block (BAB)

(2) Connecting attribute-Array-dependent (WL1/WL2/WL3) TmPs for workgroup horizontal-traffic aggregation with WL1-TeamSwitch devices via WL1, creating Mid-Memory Block (MMB)

(3) Connecting Mutually-exclusive (WL1/WL2/WL3) TcP-pairs for workgroup horizontal control-aggregation with WL1-TeamSwitch devices via WL1, creating Top-Control Block (TCB)

(4) Connecting 3-level BAB, MMB and TCB for workgroup vertical integration with WL2-TeamServer device1&2 via WL2, creating a 3-level (WL1/WL2-based) workgroup member execution-pylon/unit.

The workgroup manager 3 BBBs may include WL-based workgroup manager components and WL-based devices, and these components and devices may be connected via WL3 and WL4. For example, the base-fail-over block, mid-fail-over block, and the top fail-over block may be created and connected in the following ways:

(1) Connecting (WL3/WL4) TaPm-pair for workgroup fail-over aggregation with attribute-array of WL3-TeamPanel devices via WL3, creating Base-Fail-over Block (BFB)

(2) Connecting (WL3/WL4) TmPm-pair for fail-over aggregation with attribute-array-dependent WL3-TeamPanel devices via WL3, creating Mid Fail-over Block (MFB)

(3) Connecting (WL3/WL4) TcPm-pair for fail-over aggregation with mutually-exclusive WL3-TeamPanel devices via WL3, creating Top-Fail-over Block (TFB)

(4) Connecting 3-level BFB, MFB and TFB for workgroup vertical fail-safe integration with WL4-TeamRoute devices via WL4, creating a 3-level (WL3/WL4) workgroup manager fail-over-pylon/unit.

Fourth: the first stage-wHCS creation, as illustrated in FIG. 15, which can be summarized as follows:

(1) Connecting BAB, MMB and TCB for vertical workgroup Aggregation with WL1-TeamSwitch devices via WL1, creating a "3-level Internal-Links (ILs)&WL1 2-link-mechanism-based workgroup Hierarchical execution-Pylon";

(2) Further connecting BAB, MMB and TCB for vertical workgroup Integration with WL2-TeamServer devices via WL2, creating a "3-level ILs&WL1&WL2 3-link-mechanism-based wHCS" (workgroup Hierarchical Core Structure);

(3) Further connecting BAB and BFB, MMB and MFB, TCB and TFB for horizontal workgroup fail-over aggregation with WL3-TeamPanel devices via WL3, creating a "3-level ILs&WL1&WL2&WL3 4-link-mechanism-based fail-over wHCS";

(4) Further connecting 1D-BFB, 1D-MFB and 1D-TFB for vertical workgroup fail-safe Integration with WL4-TeamRoute devices via WL4, creating a "3-level ILs&WL1&WL2&WL3&WL4 5-link-mechanism-based fail-safe wHCS";

(5) Further connecting External network Links (ELs) and WL1 TeamSwitch devices with WL4-TeamRoute devices via Ethernet, where WL4-TeamRoute devices may be served as firewalls, creating a "3-level 3-link-typed (ILs+WL1&WL2&WL3&WL4+ELs) 6-link-mechanism fail-safe wHCS"

Fifth: next-generation 3-level stage-expandable wHCSs

As illustrated in FIG. 16, the newly-created stage-wHCSs can be used as workgroup-linked components to construct the next-iterative array-expandable wBBBs and architect the next-generation 3-level stage-expandable wHCSs. This next iterative process can be deemed as the workgroup evolutionary process.

Fail-over Mechanism

When any TeamProcessor-Member is faulty (e.g., the load being sent to/from the same-level TeamProcessor-Manager didn't receive response back), one of TeamProcessor Managers can use the fail-over-aggregation linkage (WL3) to take over RAP (Reset, keyboard, 2-serial-ports=4-USBs), AV, and inter-connect-USB to control the faulty-TeamProcessor-Member to reboot, redirect the load to other Team-Processor-Members as well as finish up the load itself and send the result to the upper-level TeamProcessor-Manager, which can dispatch the load to its TeamProcessor-Members via interconnect USB.

The fail-over sub-structure for workgroup-aggregation-fail-over via WL3, expandable TeamPanels (7,17, 27,37, 47, 57), and TeamManager-pair (9, 19, 29, 39, 49, 59) are thus established to enable fail-over software to real-time replace/ hot-swap the faulty TeamProcessor-Member, to redirect the load to any other TeamProcessor-Members via fail-over-USB, and then consequently enable overall 3-level fail-safe-integration software to real-time fail-safe the on-going closed-loop operation.

The present disclosure may create "3-link-typed" workgroup-computing hardware structures, for example, to replace the current "2-link-typed" node-computing hardware structures (e.g., internal-links and external-links) that can only be equipped with application software to establish coarse-grained and user-captive service-oriented Internet, which may generate unsolvable security and privacy issues.

Compared to the conventional 2-link-typed node-computing, the present 3-link-typed structure may provide 3-different levels of evolutionary workgroup BBBs with the workgroup components (TaP/TaPm, TmP/TmPm, TcP/TcPm) and workgroup devices (WL1-TeamSwitch, WL2-TeamServer, WL3-TeamPanel, WL4-TeamRoute), which may establish fine-grained and non-captive service-oriented Internet and thus be capable of eliminating node-computing incurred security and privacy issues. The 3-link-typed workgroup hardware structure can resolve these security/privacy problems, because the intermediary workgroup-control activities can separate the internal activities and external activities, thereby preventing against any external sabotage to damage the internal processes directly.

Reference throughout the specification to "various aspects," "some aspects," "some examples," "other examples," or "one aspect" means that a particular feature, structure, or characteristic described in connection with the aspect is included in at least one example. Thus, appearances of the phrases "in various aspects," "in some aspects," "certain embodiments," "some examples," "other examples," "certain other embodiments," or "in one aspect" in places throughout the specification are not necessarily all referring to the same aspect. Furthermore, the particular features, structures, or characteristics illustrated or described in connection with one example may be combined, in whole or in part, with features, structures, or characteristics of one or more other aspects without limitation.

It is to be understood that at least some of the figures and descriptions herein have been simplified to illustrate elements that are relevant for a clear understanding of the disclosure, while eliminating, for purposes of clarity, other elements. Those of ordinary skill in the art will recognize, however, that these and other elements may be desirable. However, because such elements are well known in the art, and because they do not facilitate a better understanding of the disclosure, a discussion of such elements is not provided herein.

The terminology used herein is intended to describe particular embodiments only and is not intended to be limiting of the present disclosure. As used herein, the singular forms "a", "an" and "the" are intended to include the plural forms as well, unless otherwise indicated. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which, when executing the series of computer instructions, performs or facilitates the performance of all or part of the disclosed methods and procedures.

The examples may be embodied in the form of computer-implemented processes and apparatuses for practicing those processes. An example may also be embodied in the form of a computer program code containing instructions embodied in tangible media, such as floppy diskettes, CD-ROMs, DVD-ROMs, hard drives, or any other computer-readable non-transitory storage medium, wherein, when the computer program code is loaded into and executed by a computer, the computer becomes an apparatus for carrying out the method. An example may also be embodied in the form of computer program code, for example, whether stored in a storage medium, loaded into and/or executed by a computer, or transmitted over some transmission medium, such as over electrical wiring or cabling, through fiber optics, or via electromagnetic radiation, where when the computer program code is loaded into and executed by a computer, the computer becomes an apparatus for carrying out the method. When implemented on a general-purpose microprocessor, the computer program code segments configure the microprocessor to create specific logic circuits.

It should be understood that various changes and modifications to the examples described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A computer system comprising:
a first processor receiving a request and transforming the request into an operation instruction;
a first buffer storing a first identification corresponding to the request, the first processor using the first identification to identify a reply corresponding to the user request; and
a second processor conveying the operation instruction to a third processor, the third processor executing the operation instruction and generating the reply accordingly, the reply being conveyed back to the first processor by the second processor,
wherein the request is in a sentential form.

2. The computer system of claim 1, wherein the transforming includes interpreting the request into a first plurality of predefined menu-solution terms.

3. The computer system of claim 2, wherein the transforming further comprises generating a second identification corresponding to the first plurality of predefined menu-solution terms and storing the second identification in a second buffer.

4. The computer system of claim 3, wherein the reply is further processed by the first processor which includes interpreting a second plurality of predefined menu-solution terms back to a sentential form.

5. The computer system of claim 4, wherein the interpreting the second plurality of predefined menu-solution terms back to the sentential form includes checking the second identification in the second buffer for identifying the second plurality of predefined menu-solution terms being corresponding to the first plurality of predefined menu-solution terms.

6. The computer system of claim 4, wherein the reply in the sentential form is stored in a sentential library.

7. The computer system of claim 6, wherein the first processor assesses contents in the sentential library when interpreting the request into the first plurality of predefined menu-solution terms.

8. The computer system of claim 4, wherein the second plurality of predefined menu-solution terms are stored in a term library.

9. The computer system of claim 8, wherein the transforming further comprises translating the first plurality of predefined menu-solution terms into a predefined first work-flow manual-form with a plurality of data fields.

10. The computer system of claim 9, wherein at least one of the newly translated plurality of data fields is empty.

11. The computer system of claim 9, wherein the plurality of data fields include a conditional data field and an operational data field.

12. The computer system of claim 9, wherein the first work-flow manual-form is stored in a form library.

13. The computer system of claim 12, wherein the first processor generates a delivery instruction to select the third processor for processing the operation instruction based on contents of the form library.

14. The computer system of claim 9, wherein the reply is further processed by the first processor which includes translating from a second work-flow manual-form back to the second plurality of predefined menu-solution terms.

15. The computer system of claim 14, wherein the second plurality of predefined menu-solution terms is stored in the term library.

16. The computer system of claim 15, wherein the first processor translates the first plurality of predefined menu-solution terms into the first work-flow manual-form based on contents of the term library.

* * * * *